Feb. 4, 1964 C. E. BROOKS ET AL 3,120,581

ELECTRONIC AUTOMATIC TELEPHONE SWITCHING SYSTEM

Filed Nov. 19, 1956 51 Sheets-Sheet 1

INVENTORS C. E. BROOKS
K. W. PFLEGER
BY William F. Simpson
ATTORNEY

ELECTRONIC AUTOMATIC TELEPHONE SWITCHING SYSTEM

Filed Nov. 19, 1956

51 Sheets-Sheet 2

INVENTORS C. E. BROOKS
K. W. PFLEGER
BY William F. Simpson.
ATTORNEY

Feb. 4, 1964 C. E. BROOKS ET AL 3,120,581

ELECTRONIC AUTOMATIC TELEPHONE SWITCHING SYSTEM

Filed Nov. 19, 1956 51 Sheets-Sheet 3

INVENTORS C. E. BROOKS
K. W. PFLEGER
BY William F. Simpson
ATTORNEY

INVENTORS C.E. BROOKS
K.W. PFLEGER
BY William F. Simpson,
ATTORNEY

INVENTORS C. E. BROOKS
K. W. PFLEGER
BY William F. Simpson
ATTORNEY

INVENTORS C. E. BROOKS
K. W. PFLEGER
BY William F. Simpson
ATTORNEY

INVENTORS C. E. BROOKS
K. W. PFLEGER
BY William J. Simpson
ATTORNEY

INVENTORS C. E. BROOKS
K. W. PFLEGER
BY William F. Simpson
ATTORNEY

INVENTORS C. E. BROOKS
K. W. PFLEGER
BY William F. Simpson
ATTORNEY

INVENTORS C. E. BROOKS
K. W. PFLEGER
BY William F. Simpson
ATTORNEY

INVENTORS C. E. BROOKS
K. W. PFLEGER
BY William F. Simpson
ATTORNEY

INVENTORS C. E. BROOKS
K. W. PFLEGER
BY William F. Simpson
ATTORNEY

Feb. 4, 1964 C. E. BROOKS ET AL 3,120,581

ELECTRONIC AUTOMATIC TELEPHONE SWITCHING SYSTEM

Filed Nov. 19, 1956 51 Sheets-Sheet 13

INVENTORS C. E. BROOKS
K. W. PFLEGER
BY William F. Simpson
ATTORNEY

INVENTORS C. E. BROOKS
K. W. PFLEGER
BY *William F. Simpson*
ATTORNEY

INVENTORS C. E. BROOKS
K. W. PFLEGER
BY William F. Simpson
ATTORNEY

INVENTORS C. E. BROOKS
K. W. PFLEGER
BY William F. Simpson
ATTORNEY

INVENTORS C. E. BROOKS
K. W. PFLEGER
BY William F. Simpson.
ATTORNEY

ELECTRONIC AUTOMATIC TELEPHONE SWITCHING SYSTEM

INVENTORS C. E. BROOKS
K. W. PFLEGER
BY William F. Simpson
ATTORNEY

ELECTRONIC AUTOMATIC TELEPHONE SWITCHING SYSTEM

Filed Nov. 19, 1956 51 Sheets-Sheet 19

INVENTORS C. E. BROOKS
K. W. PFLEGER
BY William F. Simpson.
ATTORNEY

INVENTORS C.E. BROOKS
K.W. PFLEGER
BY William F. Simpson.
ATTORNEY

Feb. 4, 1964 C. E. BROOKS ET AL 3,120,581

ELECTRONIC AUTOMATIC TELEPHONE SWITCHING SYSTEM

Filed Nov. 19, 1956 51 Sheets-Sheet 21

INVENTORS C. E. BROOKS
K. W. PFLEGER
BY William F. Simpson
ATTORNEY

INVENTORS C. E. BROOKS
K. W. PFLEGER
BY William F. Simpson
ATTORNEY

INVENTORS C E BROOKS
K. W. PFLEGER
BY William F. Simpson
ATTORNEY

INVENTORS C. E. BROOKS
K. W. PFLEGER
BY William F. Simpson
ATTORNEY

ELECTRONIC AUTOMATIC TELEPHONE SWITCHING SYSTEM

Filed Nov. 19, 1956

51 Sheets-Sheet 25

INVENTORS C. E. BROOKS
K. W. PFLEGER
BY William F. Simpson.
ATTORNEY

INVENTORS C. E. BROOKS
K. W. PFLEGER
BY *William F. Simpson*
ATTORNEY

ELECTRONIC AUTOMATIC TELEPHONE SWITCHING SYSTEM

Filed Nov. 19, 1956 51 Sheets-Sheet 27

INVENTORS C. E. BROOKS
K. W. PFLEGER
BY William F. Simpson
ATTORNEY

Feb. 4, 1964 C. E. BROOKS ET AL 3,120,581

ELECTRONIC AUTOMATIC TELEPHONE SWITCHING SYSTEM

Filed Nov. 19, 1956 51 Sheets-Sheet 28

INVENTORS C. E. BROOKS
K. W. PFLEGER
BY William F. Simpson
ATTORNEY

INVENTORS C. E. BROOKS
K. W. PFLEGER
BY William F. Simpson.
ATTORNEY

INVENTORS C. E. BROOKS
K. W. PFLEGER
BY William F. Simpson
ATTORNEY

INVENTORS C. E. BROOKS
K. W. PFLEGER
BY William F. Simpson.
ATTORNEY

ELECTRONIC AUTOMATIC TELEPHONE SWITCHING SYSTEM

INVENTORS C.E. BROOKS
K.W. PFLEGER
BY William F. Simpson.
ATTORNEY

INVENTORS C.E. BROOKS
K.W. PFLEGER
BY William F. Simpson
ATTORNEY

INVENTORS C. E. BROOKS
K. W. PFLEGER
BY William F. Simpson
ATTORNEY

ELECTRONIC AUTOMATIC TELEPHONE SWITCHING SYSTEM

INVENTORS C.E. BROOKS
K.W. PFLEGER
BY William F. Simpson
ATTORNEY

INVENTORS C. E. BROOKS
K. W. PFLEGER
BY William F. Simpson
ATTORNEY

INVENTORS C.E. BROOKS
K.W. PFLEGER
BY William F. Simpson.
ATTORNEY

Feb. 4, 1964 C. E. BROOKS ET AL 3,120,581

ELECTRONIC AUTOMATIC TELEPHONE SWITCHING SYSTEM

Filed Nov. 19, 1956 51 Sheets-Sheet 38

INVENTORS C.E. BROOKS
K.W. PFLEGER

BY William F. Simpson

ATTORNEY

INVENTORS C. E. BROOKS
K. W. PFLEGER
BY William F. Simpson
ATTORNEY

INVENTORS C. E. BROOKS
K. W. PFLEGER
BY William F. Simpson.
ATTORNEY

INVENTORS C. E. BROOKS
K. W. PFLEGER
BY William J. Simpson.
ATTORNEY

INVENTORS C. E. BROOKS
K. W. PFLEGER
BY William F. Simpson
ATTORNEY

INVENTORS C. E. BROOKS
K. W. PFLEGER
BY William F. Simpson
ATTORNEY

INVENTORS C. E. BROOKS
K. W. PFLEGER
BY William F. Simpson
ATTORNEY

ELECTRONIC AUTOMATIC TELEPHONE SWITCHING SYSTEM

Filed Nov. 19, 1956 51 Sheets-Sheet 45

INVENTORS C.E. BROOKS
K.W. PFLEGER
BY William F. Simpson,
ATTORNEY

INVENTORS C. E. BROOKS
K. W. PFLEGER
BY William F. Lindberg
ATTORNEY

INVENTORS C. E. BROOKS
K. W. PFLEGER
BY William F. Simpson
ATTORNEY

INVENTORS C. E. BROOKS
K. W. PFLEGER
BY William F. Simpson,
ATTORNEY

INVENTORS C. E. BROOKS
K. W. PFLEGER
BY William F. Simpson
ATTORNEY

INVENTORS C. E. BROOKS
K. W. PFLEGER
BY William F. Simpson
ATTORNEY

INVENTORS C. E. BROOKS
K. W. PFLEGER
BY William F. Simpson
ATTORNEY

United States Patent Office 3,120,581
Patented Feb. 4, 1964

3,120,581

ELECTRONIC AUTOMATIC TELEPHONE SWITCHING SYSTEM

Chester E. Brooks, Montvale, and Kenneth W. Pfleger, Kearny, N.J., assignors to Bell Telephone Laboratories, Incorporated, New York, N.Y., a corporation of New York Filed Nov. 19, 1956, Ser. No. 622,926
65 Claims. (Cl. 179—18)

This invention relates to telephone systems and more particularly to systems in which connections between calling and called telephone stations are established by electronic devices, electronic circuits and related methods.

In telephone switching systems of the prior art telephone subscriber lines are interconnected by transmission paths established through and by means of electromechanical devices such as switches, relays, related circuits and the like. The control circuits and devices for the switches likewise comprise electromechanical devices including switches, relays and related circuits. The operation of such devices is relatively slow so that in order to handle the busy hour traffic through switching systems, a large number of control circuits and devices such as senders, markers, links and various types of connecting circuits must be employed. The necessity for using a plurality of such large and complicated control circuits first, increases the cost of such systems and second, since these devices must be used simultaneously, appreciable additional switching, hunting and busy test devices and circuits must be provided to hunt over and make busy tests on each switch, circuit, link, or component before it may be employed either to control the establishment of a connection or in the connection itself through the switching system. These additional switching, hunting and busy test circuits and devices further complicate the common control and switching equipment and thus further increase the expense of the system.

Therefore, an object of this invention is the use of high speed electronic devices, electronic circuits and related methods for automatically selecting, establishing, controlling, supervising and disconnecting telephone switching paths through an electronic switching network.

Briefly, in accordance with an exemplary embodiment of this invention a cathode ray beam tube or some similar device is employed in combination with the phototransistors or their equivalents to periodically scan or sample the signaling condition of the subscribers' lines and to record or store electrostatic charges on the faces or screen of the tube to represent the signaling conditions of the subscribers' lines on each scan or sampling thereof. An electronic switching network comprising electronic crosspoints or switching elements which may include semiconductor devices is used for establishing paths between the subscribers' lines and between the subscribers' lines and other signaling or transmission circuits. In addition, cathode ray beam storage tubes are employed as storage devices for storing electrostatic charges representing the information necessary for the automatic selection, automatic establishing, automatic control and automatic disconnection of telephone transmission paths through the switching system. The speed of operation of such electronic devices and circuits is so great that the single device is usually sufficient to handle all of the busy hour calls through the system. However, it is usually desirable to provide a second unit or circuit for increasing the reliability of the operation of the system.

An object of this invention is therefore the provision of high speed electronic devices, circuits and apparatus for selectively providing interconnections or transmission paths between the various subscribers' lines, and between said lines and other paths over which signaling or voice frequency currents are to be transmitted.

Another object of this invention is the provision of an electronic switching network to establish paths from any subscriber's line to any other subscriber's line, or to any other transmission or communication circuit together with the various control circuits.

Another object of this invention is the provision of a switching network that employs a plurality of electronic devices both to select a transmission or communication path from one subscriber's line to another subscriber's line or to a communication or transmission circuit, and to transmit voice frequency or other signaling or communication currents between the two subscribers' lines over the selected path.

Another object of this invention is the provision of a switching network through which electrical signaling and communication paths are established between subscribers' lines and also to communication paths from sources of ringing current, busy tone and other signaling currents and tones to the subscribers' lines while said paths between the lines are established.

An object of this invention is the the use of a cathode ray tube in combination with phototransistors for periodically scanning the signaling lines or conductors of a communication switching system.

An object of this invention is the use of an electrostatic cathode ray beam storage tube for storing representations of the signaling condition of signaling lines in a communication switching system.

Another object of this invention is the use of electrostatic cathode ray beam storage tubes for recording the identity of calling lines and the information dialed by such calling lines.

Another object of the invention is the use of electrostatic cathode ray beam storage tubes for assembling information relative to each call in available storage areas, or spots, within the storage portions or capacity of the tubes.

Another object of this invention is the use of electrostatic storage tubes for timing purposes to time different functions or phases of establishing and disconnecting switching paths employed for calls or messages.

An object of this invention is the provision of a source of programming pulses and potentials to correlate the operation of the various elements of a communication switching system.

An object of this invention is to provide electronic circuits and equipment which may be readily fabricated by means of printed wiring and circuits which may be arranged on plug-in cards or elements.

Another object of this invention is the provision of detecting, interconnecting, and gating circuits for detecting changes in signaling conditions on scanned signaling lines and direction of this information to previously recorded information with respect to the same communication.

Another object of this invention is the provision of means for periodically regenerating stored information in electrostatic cathode ray beam storage tubes without interfering with the normal operation of the communication switching system.

Another object of this invention is the provision of means for erasing previously stored material in electrostatic cathode ray beam storage tubes employed in a communication switching system when such information recorded is no longer required.

Another object of this invention is to control the establishment of communication paths through an electronic switching system under control of information temporarily stored in electrostatic cathode ray beam tubes.

Another object of this invention is to control supervision of communication paths established through a communication system by means of information temporarily stored in electrostatic cathode ray beam storage tubes.

Another object of this invention is to increase the reliability of an electronic communication switching system by providing duplicates of the more important tubes, circuits and control elements and then normally operating both of the various elements so that if and when any one of the elements of a pair develops trouble, it may be removed and the other element employed to handle the calls. With this arrangement failure of one element of a pair does not impair or interfere with the operation of the system.

Another object of this invention is the provision of a switching system which is sufficiently fast in operation that the use of dial tone is not required or necessary.

A feature of this invention relates to means for disconnecting established paths through the network on termination of the call.

Another object of this invention is the provision of circuits, apparatus and means for disconnecting a ringing trunk from an established connection while leaving the previously established connection intact when the called party answers.

A feature of this invention relates to circuits, apparatus and means for registering each open and each closure of a subscriber's line.

Another feature of this invention relates to identifying each transition or change of signaling condition of a subscriber's line as in a change from open to closed or as a change from closed to open.

Another feature of this invention relates to means for associating with each transition of the signaling conditions of the subscribers' lines, other signals identifying the various subscribers' lines from which the transitions are received.

Another object of this invention is to provide cathode ray storage tubes of the type sometimes referred to as a "Williams" storage tube; that is a storage tube wherein a conductive plate is placed external to and adjacent the end of a cathode ray tube. The beam impinges on the inside of the end of the tube which surface is coated with a fluorescent material and places an electrostatic charge on small areas or spots on the end of the tube. This cathode ray tube has the same general structure and appearance as usual cathode ray tubes.

Another feature of this invention relates to circuits, apparatus and equipment for making busy tests in an electron switching network to determine whether or not the subscribers' lines are interconnected with other subscribers' lines or other communication paths or links.

Another feature of this invention relates to circuits, electric devices and equipment for identifying each communication trunk circuit or path which is interconnected with any selected subscriber's line at any given time.

Another feature of this invention relates to means employing cathode ray storage tubes for distinguishing between supervisory signals such as calling signals, disconnect signals, etc., and between disconnect signals and spurious signals caused by interfering currents and pulses.

Another feature of this invention relates to electronic control circuits for periodically regenerating information stored in cathode ray tubes without interfering with the use of said cathode ray tubes in the establishment of transmission paths, which paths may be employed to convey communications to currents from any selected subscriber's line to other transmission and signaling circuits.

Another feature of this invention relates to temporarily storing changes in signaling conditions on lines together with identification of a line from each of a plurality of lines on different groups of storage devices in succession.

Another feature of this invention relates to providing two main groups of storage devices for temporarily storing information relative to communication calls or messages and employing each of said groups in succession. While one group is being employed to record information the other group is employed to control the various circuits of the system in accordance with the information previously stored in this group of storage devices.

Another feature of this invention relates to a commutator comprising gates and switches for transmitting information temporarily stored in storage devices to electrostatic cathode ray beam storage tubes.

Another feature of this invention relates to switching and matching circuits for relaying each change in signaling condition received from each line to each or to each pair of call registering tubes and comparing the calling line with the calling line indicia registered in the respective register spaces in the register tubes during each cycle of operation.

A feature of this invention relates to control means for timing the operation of the scanning equipment for scanning each of the signaling communication lines once during each scanning cycle.

Another feature of the invention relates to dividing each of the scanning cycles into four portions which may be of equal or unequal duration; during the first portion the calling line number associated with each recently received change in signaling condition from a communication signal line is compared with the calling line number recorded in all of the storage call register spaces; during the second portion new calls are entered in idle call register spaces or portions of the storage means; during the third portion the various timing functions and recordings are advanced as required and during the fourth portion the completion of calls ready for completion is initiated.

A feature of this invention relates to party line and party line control circuits of an electronic switching system.

Another feature of this invention relates to electronic circuits, equipment apparatus and methods establishing paths for communication between different parties connected to the same party line.

Another feature of this invention relates to an electronic switching system for transmitting calling or ringing current over subscribers' lines suitable for actuating horn calling devices at the subscriber's station.

Another feature of this invention relates to transmission of different calling currents to different subscribers' lines in accordance with the identity of the respective parties with which it is desired to communicate.

In switching systems of the prior art a private or control conductor or path, in addition to the communication path, individual to each communication path extends through the switching or interconnecting network. This control conductor has been used to maintain the connection, make busy tests without interfering with the communication path, trace connections and for other functions.

In accordance with an object of this invention the switching and control circuits and apparatus are arranged to cooperate with a switching network in which a single path is established through the network and in which this single path is used both for communication, and (together with short term memory) for control including the above enumerated functions which require a separate path in the systems in the prior art.

Another feature of this invention relates to applying a plurality of different control potentials to electronic switching network whereby various communication lines and paths through the switching network may be identified.

Another feature of this invention relates to electrostatic type cathode ray storage tubes for timing but more particularly for timing a disconnect signal to insure that the transition received from closed circuit to open circuit is a true disconnect signal and is not an extraneous or spurious current or surge.

Another feature of this invention relates to establishing a connection through the network when a busy line is encountered.

Another feature of this invention relates to the method of operating a telephone switching system comprising the following steps:

(1) Scanning each of the subscribers' lines during each scanning interval;

(2) Detecting changes in signaling conditions occurring on the lines since the last time they were scanned;

(3) Storing in temporary storage means indicia of the character of the change in the signaling conditions together with indicia identifying the calling line;

(4) Comparing the latter indicia for similar indicia stored in each of the calling register storage spaces or means in the entire system;

(5) Recording the character of the change and otherwise controlling the storage equipment when the match is found between the identity of the indicia identifying calling lines in the called register devices and in the temporary storage means; and when no match is found, testing the calling line for busy;

(6) Recognizing the completion of dialing and recording of the dialed information in the calling register storage means;

(7) Transmitting the dialed number through a translator by which, if the dialed number is a party line, the indicia are translated into identification of said line;

(8) Comparing the calling line with the translated called or dialed information, and, if the match is obtained, setting up a revertive call connection; if no match is obtained then the circuits are advanced to test the called or dialed line for busy;

(9) If the called line is not connected through the network the called line identification number is compared with the calling line identification stored in all of the registered spaces of all of the called register tubes; if no match is obtained then a path through the switching equipment is set up from the called line to a communiation trunk and to a ringing trunk;

(10) The next identifying potential is applied to the network side of the called line termination and the trunk scanning tubes identify the talking trunk and ringing trunks interconnected with the called line;

(11) Then connect potentials are applied to the identified talking trunk and to the network side of the calling line termination, and a path through the network from the calling subscriber's line to the talking trunk is selected and established. Ringing current is now transmitted from the ringing trunk to the called line and also to the calling line so that the calling party receives audible ringing tone indicating that the called party is being called;

(12) When the called party answers the change in signaling condition of this line from open circuit to closed circuit is detected on the next scan and then stored in temporary storage means, compared with calling line indicia in the register spaces of the called register tubes and then the line tested for a connection through the network. The line will test busy whereupon the change in signaling condition together with the busy test and the ringing indication will cause identifying potentials to be again applied to the network side of the called party's line termination whereupon the trunk scanning tubes identify the ringing and talking trunks interconnected with the called line through the network and apply disconnect conditions to the ringing trunks thus causing the ringing trunks to be disconnected without disturbing the connections between the calling and called party's line and the talking trunk.

Another feature of the invention relates to the method of disconnecting paths through a communication switching network which comprises the following steps:

(1) Scanning busy subscribers' lines during each scanning interval;

(2) Detecting changes in the signaling conditions occurring on the lines since the last time they were scanned;

(3) Storing in temporary storage means indicia of the character of the change in the signaling conditions, together with indicia identifying the lines from which the change is received;

(4) Comparing the indicia identifying the lines for similar indicia stored in each of the calling register storage spaces or means in the entire system;

(5) When no match is found testing the line for busy;

(6) When the line is interconnected through the network applying identifying potential to the network side of the line trmination and identifying the interconnected talking trunk; and (7) Initiating a timing operation individual to the identified trunk;

(8) Continuing the timing operation for a predetermined interval of time so long as no change in signaling condition from the disconnecting line is received; and (9) Then applying disconnect potential conditions to both sides of the identified talking trunk for interrupting the paths through the network from the calling and called party's lines to said identified trunk;

(10) Recognizing a disconnect signal when the second party to a connection hangs up after his line has already been disconnected;

(11) At the end of a predetermined time interval initiating a disconnect operation.

Another feature of the invention relates to identifying interconnections through a switching network which comprises first applying a single connection identification to a network terminal and upon failure to obtain an identification applying a higher multiple path identification potential to the same terminal to identify all of the paths through the network interconnected with said terminal.

Another feature of this invention relates to identifying trunks interconnected with selected lines by applying identifying potentials to the selected line terminals of the network and then scanning the trunk terminals interconnected with the network for a predetermined potential condition transmitted from the selected line terminal through the network to the interconnected trunk terminal.

Another feature of this invention relates to a programming circuit which automatically varies the scanning interval depending upon the traffic load of the system: extending the scanning interval during busy times and shortening the scanning interval during light loads.

Another feature of this invention relates to an electronic telephone system in which different kinds of ringing current are selectively applied to party lines which may be arranged for full selective ringing, semiselective ringing or for code ringing.

Another feature of this invention relates to control of cathode ray beam electrostatic storage tubes wherein the application of beam deflecting signals automatically insures that the beam is turned off after which the deflecting system is brought to equilibrium in accordance with the new deflecting information and thereafter the beam is automatically turned on.

Another feature of this invention relates to means for applying deflecting information in digital form to a deflecting control circuit for a cathode ray electrostatic storage tube and then automatically turning the beam on after the deflecting control circuit have responded to the applied digital information.

The foregoing objects and features of this invention may be more readily understood from the following description when read with reference to the attached drawings in which:

FIGS. 1, 2 and 3 when arranged as shown in FIG. 4 show in outline form elements of an exemplary embodiment of this invention and the manner in which they cooperate;

FIG. 1 shows subscribers' lines and subscriber line scanning, detecting and translating equipment;

FIG. 4 shows the manner in which FIGS. 1, 2 and 3 are positioned adjacent one another;

Figure 60A:
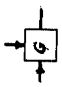
Figure 60:
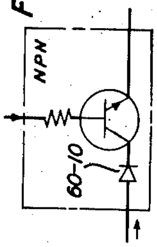
Figure 61A:
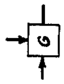
Figure 61:
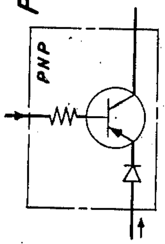
Figure 63A:
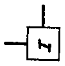
Figure 63:
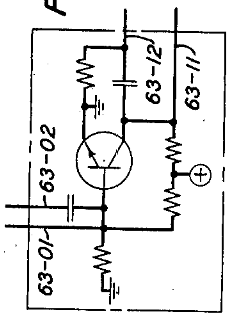
Figure 58A:
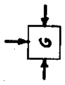
Figure 58:
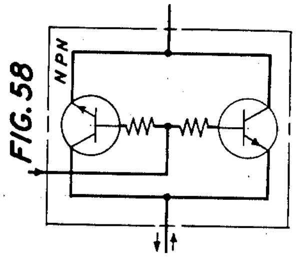
Figure 59A:
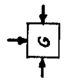
Figure 59:
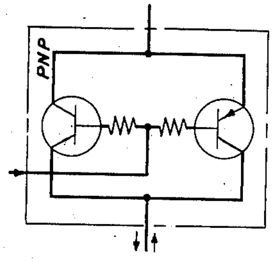
Figure 62A:
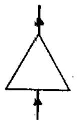
Figure 62:
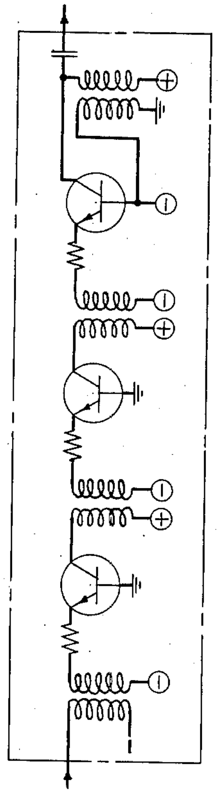
Figure 56A:
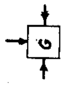
FIG. 56 shows one form of gate circuit.
Figure 57A:
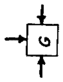
Figure 57:
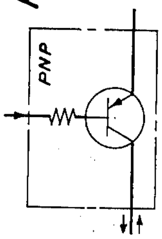
Figure 65A:
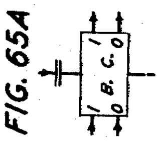
Figure 67A:
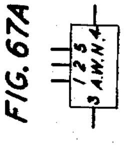
Figure 65:
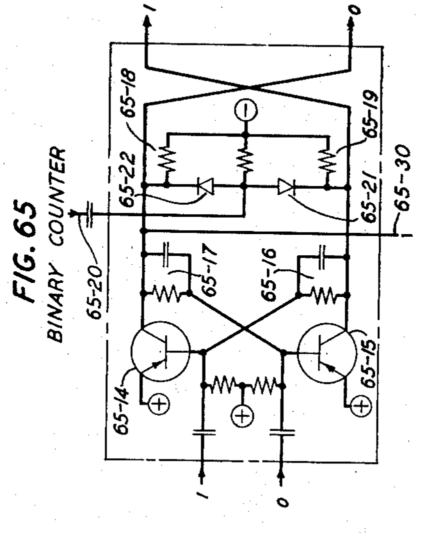
Figure 67:
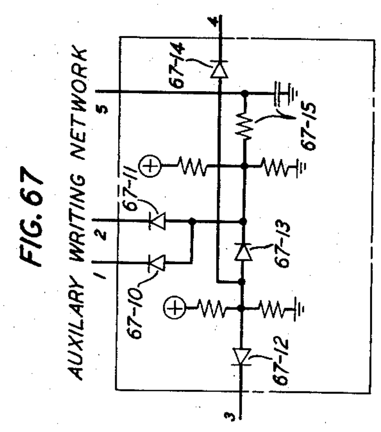
Figure 64A:
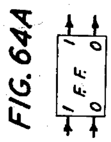
Figure 66A:
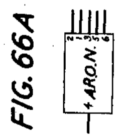
Figure 64:
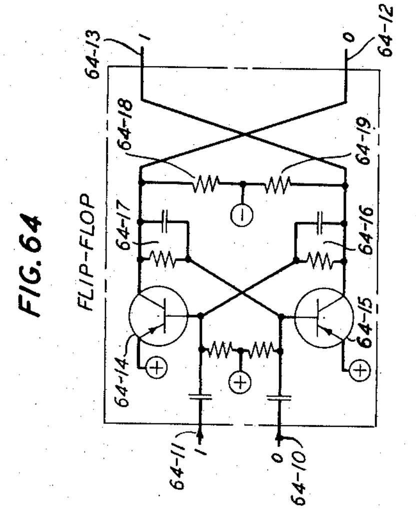
Figure 66:
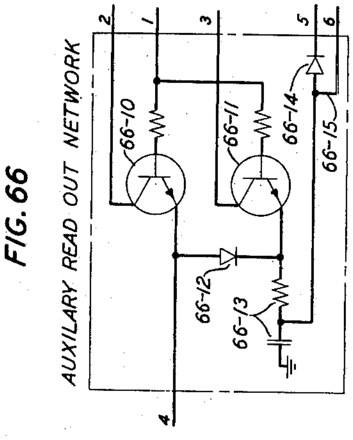

FIG. 56*a* shows a symbolic representation of this gate circuit;

FIG. 57 shows another form of gate circuit;

FIG. 57*a* shows a symbolic representation of this gate circuit;

FIG. 58 shows another form of gate circuit;

FIG. 58*a* shows a symbolic representation of this gate circuit;

FIG. 59 shows another gate circuit;

FIG. 59*a* shows a symbolic representation of this gate circuit;

FIG. 60 shows another gate circuit;

FIG. 60*a* shows a symbolic representation of this gate circuit;

FIG. 61 shows still another gate circuit;

FIG. 61*a* shows a symbolic representation of this gate circuit;

FIG. 62 shows an amplifier circuit;

FIG. 62*a* shows a symbolic representation of this amplifier circuit;

FIG. 63 shows an inverting circuit;

FIG. 63*a* shows a symbolic representation of this inverting circuit;

FIG. 64 shows a circuit of a flip-flop;

FIG. 64*a* shows a symbolic representation of the flip-flop;

FIG. 65 shows a circuit of a binary counter stage;

FIG. 65*a* shows a symbolic representation of such a binary counter stage;

FIG. 66 shows an auxiliary read out network;

FIG. 66*a* shows a symbolic representation thereof;

FIG. 67 shows an auxiliary writing network; and

Figures 1, 4:
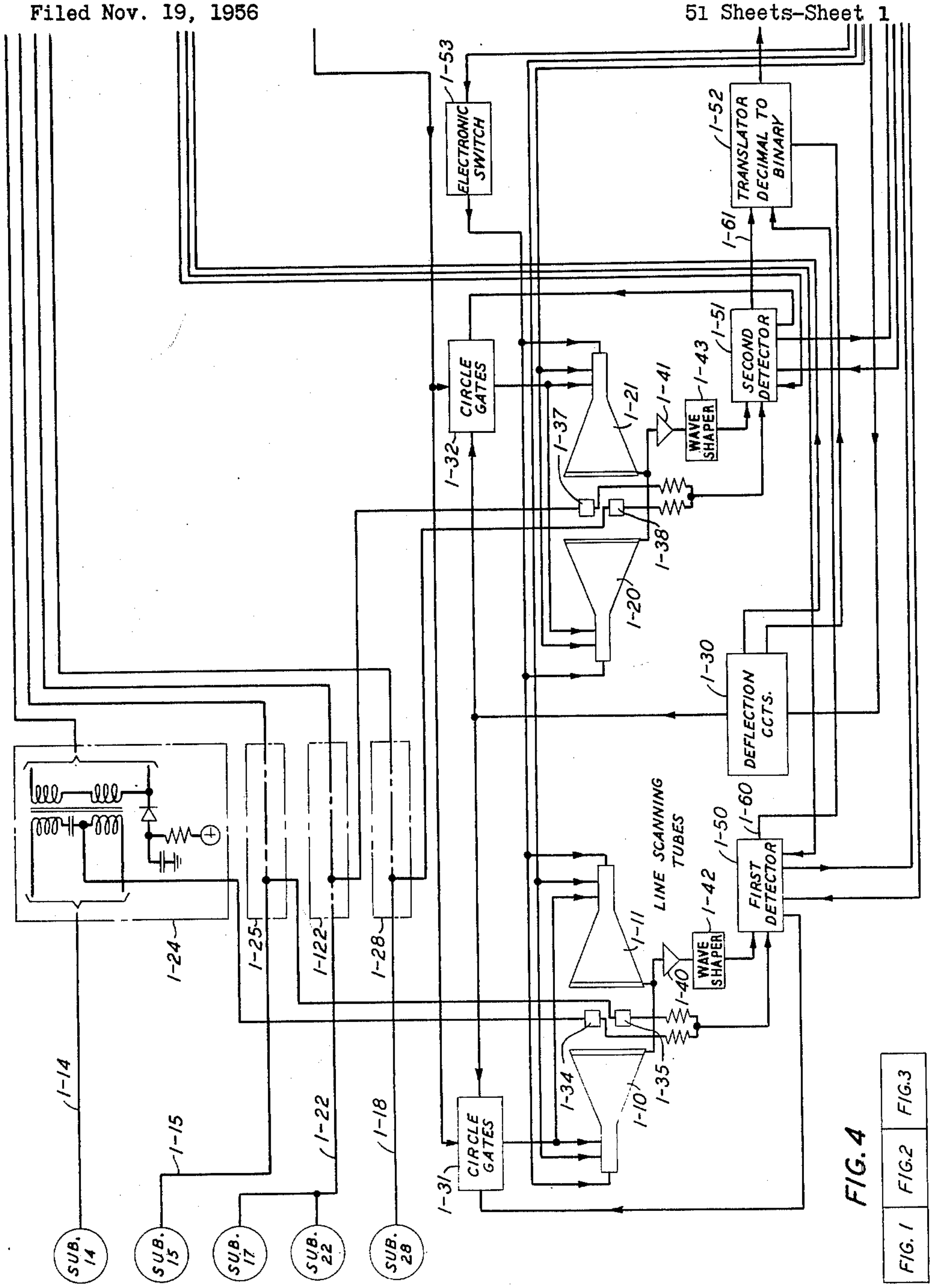
Figure 2:
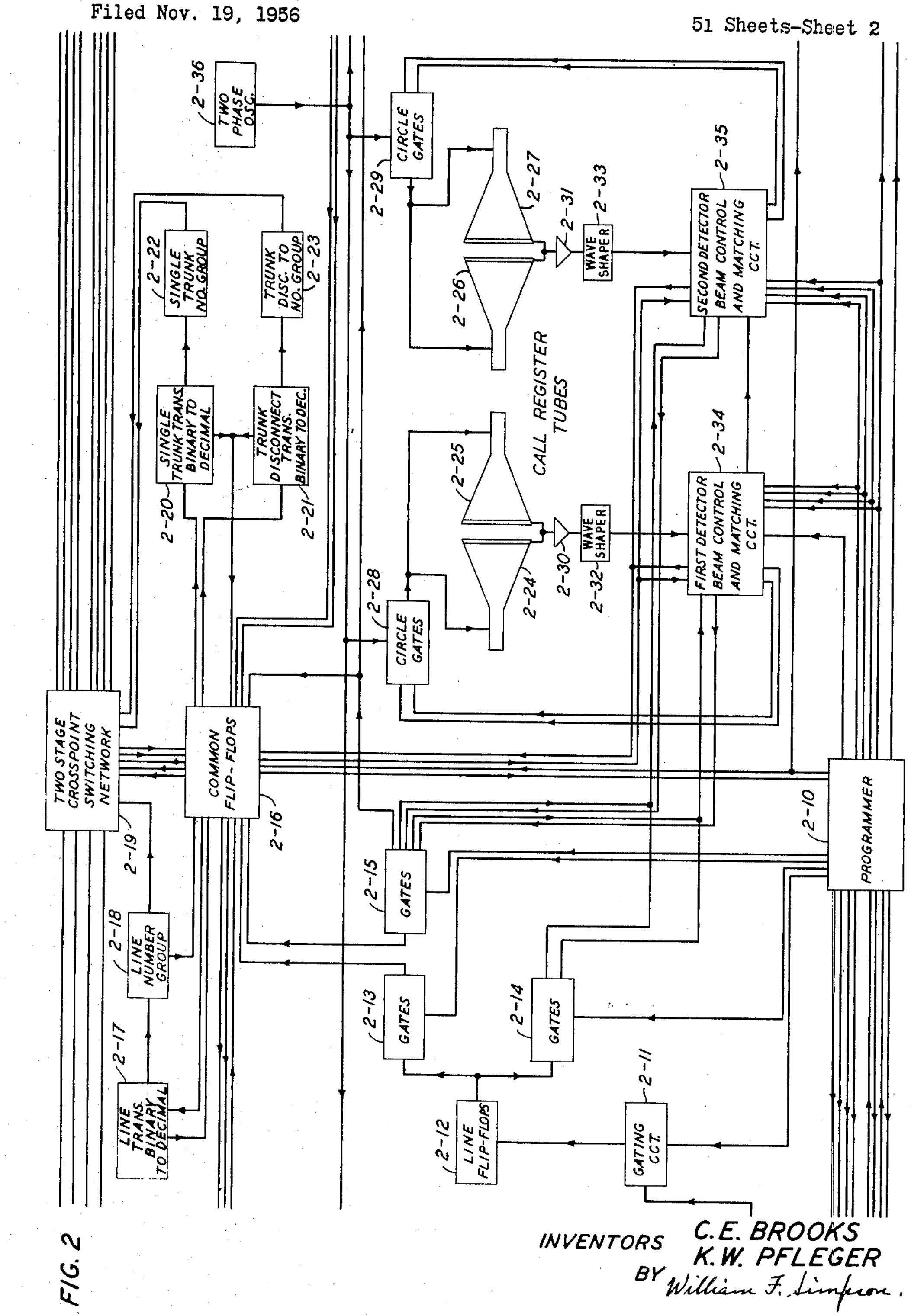
FIG. 2 shows the switching network, control elements, and call register tubes and the control circuits also the programmer.
Figure 3:
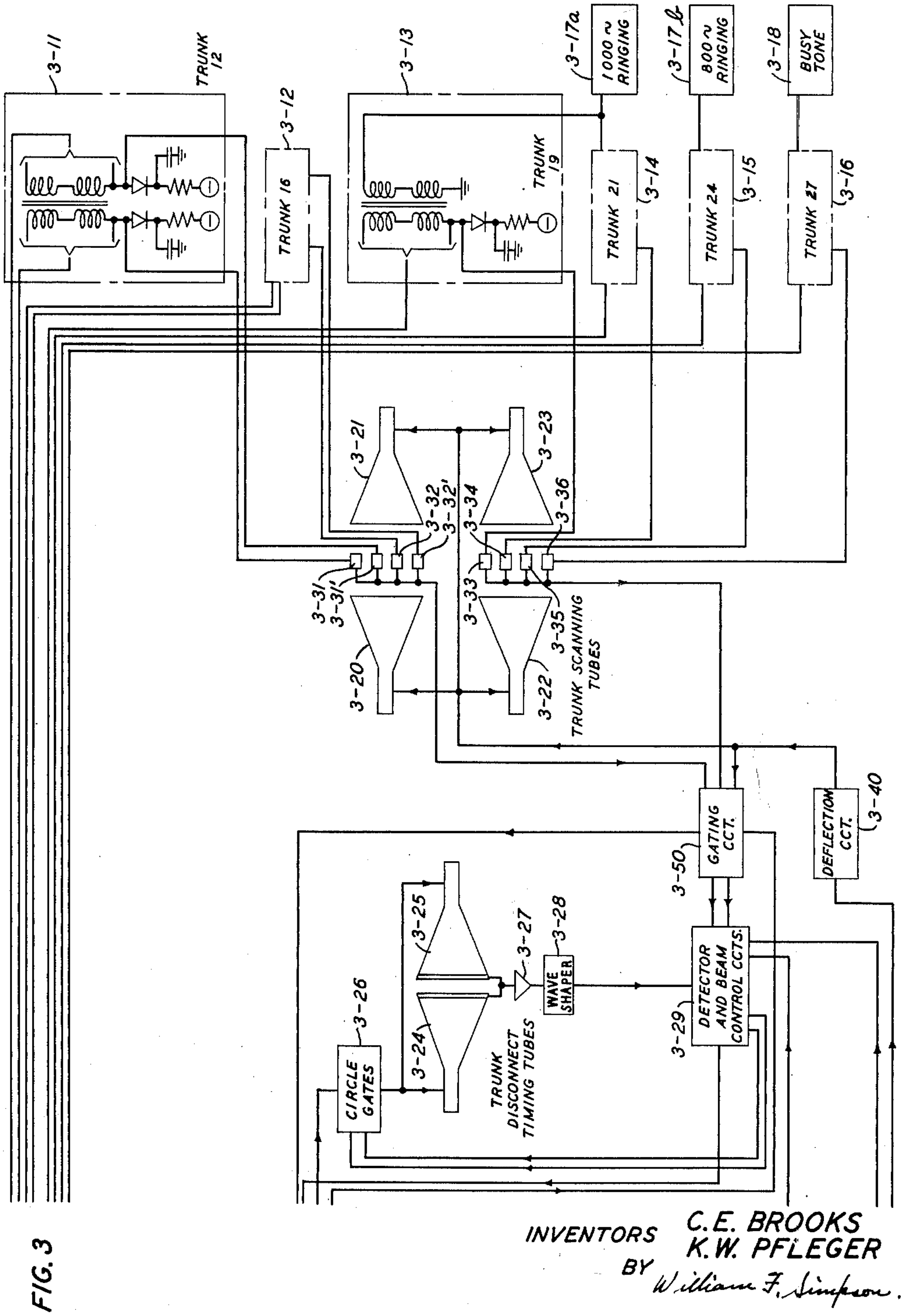
FIG. 3 shows the trunk circuits together with the trunk scanning tubes and related control circuits and the trunk disconnect timing tubes and related control circuits.

FIG. 67*a* shows a symbolic representation thereof;

FIGS. 1, 2 and 3 when arranged as shown in FIG. 4 represent various components of an exemplary embodiment of a switching system of the present invention.

The subscribers' stations are represented by subscribers' stations 14, 15, 17, 22 and 28 connected to lines 1–14, 1–15, 1–18 and 1–22 extending to the central switching station. At the central switching station the subscribers' lines terminate in subscribers' line circuits or terminations 1–122, 1–24, 1–25 and 1–28. These subscribers' line terminations are in turn interconnected with a switching network 2–19 and common control equipment. The switching network 2–19 is also interconnected with a plurality of trunk circuits represented in FIG. 3 by talking trunks 3–11, 3–12, ringing trunks 3–13, 3–14 and 3–15 and a busy trunk 3–16.

The common control equipment comprises a plurality of scanning tubes and circuits which are represented by tubes 1–10, 1–11, 1–20 and 1–21. These tubes are employed to scan the subscribers' line and record the conditions of these lines and transmit a signal when the condition of the line changes. The common control equipment also comprises gating circuits 2–11, and temporary storage circuits and devices 2–12 referred to herein as "line flip-flop." The common equipment also includes a plurality of register tubes which are represented in FIG. 2 by the tubes 2–24, 2–25, 2–26 and 2–27. These tubes, together with the respective detector, beam control, and matching circuits 2–34 and 2–35 are employed to record or register signals representing the directory number of both the calling and called subscribers' station or line. Each of the call register tubes or each pair of these tubes is arranged to register a plurality of calls. The portion of the register or storage capacity of these tubes employed for a call is frequently called a "register" or "register space."

The common equipment also includes a plurality of other circuits such as 2–13, 2–14 and 2–15 employed to control the transmission of signals to and from the register tubes and their circuits and the line flip-flops 2–12. These gates also control transmission signals to the common flip-flop circuits 2–16.

Common flip-flop circuits 2–16 are employed in combination with the call register tubes, line flip-flops, and other circuits described hereinafter to control the switching network 2–19. The common flip-flops 2–16 include a plurality of gating and control circuits as well as a plurality of storage circuits or devices for temporarily storing both the calling and called directory number, and information.

The common flip-flops also cooperate with the line translator 2–17 and line number group 2–18 for controlling the subscribers' side of the switching network 2–19. The common flip-flops also cooperate with the trunk translators 2–20 and 2–21 and the respective number group circuits 2–22 and 2–23 for controlling potentials applied to the trunk side of the switching network 2–19 for controlling the connections through the network. In addition, the common control equipment includes the trunk scanning tubes 3–20, 3–21, 3–22 and 3–23 which are employed to identify particular ones of the trunks as will be described hereinafter and also the trunk timing tubes 3–24 and 3–25 and the related detector and beam control circuits.

In addition, a programmer 2–10 is employed to initiate and control the operation and cooperation between the various components of the system represented in FIGS. 1, 2 and 3. Briefly, the programmer 2–10 initiates and controls each cycle of operations of the line scanning tubes 1–10, 1–11, 1–20 and 1–21.

In an exemplary embodiment of the invention the line scanning tubes are controlled by the programmer to scan all of the subscribers' lines of the central office at least once every .005 second. In accordance with the exemplary embodiment of this invention described herein the .005 second is not a fixed time but rather represents maximum time between one cycle of operation of the control equipment and the corresponding portion of the succeeding cycle of operation. The length of the cycles of operation are a function of the traffic load. When only a few calls are being made the scanning time required to scan each line is a minimum. However, when a line is busy the time to scan a line is often somewhat extended so that when a large number of calls are being made through the system the interval between scans becomes somewhat longer. However, in every case the scanning intervals are sufficiently frequent so that at least one scan or test of each subscribers' line occurs within each dial pulse signaling condition. That is, a test or scanning of each subscriber's line occurs sufficiently frequently so that it occurs during each open interval and also during each subsequent closed interval which represents each dialed pulse transmitted by the subscribers' line.

The programmer 2–10 also divides the scanning intervals into major portions for controlling other portions of the common control equipment. During a first of these intervals the beam control and detector circuits of all the call register tubes initiate matching operation for matching stored calling line number information with similar information received from the line flip-flops 2–12 as will be described hereinafter.

During the second of these major parts of the scanning intervals new calls are recorded in the call register tubes.

In a third part of the scanning interval timer spots are advanced, brought up to date and regeneration of stored spots is initiated at predetermined time intervals.

In the fourth part of this period, operation of the network, common flip-flop, and control circuits is initiated for the establishing of connections through the network when the dialing information is fully recorded in the call register tubes.

Other functions such as ringing, interruption of ringing, disconnect, etc., are also performed during these intervals. As shown in FIG. 1, in an exemplary embodiment of this invention, the line scanning means comprises a plurality of pairs of cathode ray tubes in combination with phototransistors. Phototransistors are provided individual to each of the subscribers' lines. In case of party lines as shown by subscribers' stations 17 and 22 connected to the subscribers' line 1–22 only one phototransistor for this line serving the two party stations is required or provided. In case more subscribers' stations are connected to the same party line the same phototransistor 1–37 will be employed to serve all of the subscribers' stations connected to this line. Other subscribers' lines will be similarly provided with phototransistors. Thus, in the specific showing, in FIG. 1, phototransistors 1–34, 1–35, 1–37 and 1–38 are provided and connected to the respective subscribers' lines 1–14, 1–15, 1–22 and 1–18. Inasmuch as more than one scanning tube or more than one pair of scanning tubes will be frequently provided in the usual telephone switching office, two pairs of such tubes are shown in the exemplary embodiment shown in the drawings and described herein. These two pairs of tubes merely represent two or a plurality of such tubes or pairs of tubes and show the manner in which the various circuits of these tubes are interconnected with each other and with the subscribers' lines, and with the other control and switching equipment at the central switching exchange or office.

Furthermore, in the exemplary embodiment described herein, the subscribers' line scanning tubes as well as the other cathode ray storage and scanning tubes employed are arranged in pairs. While one tube of each pair is required for satisfactory operation of the system, the second tube nevertheless is provided in order to secure greater reliability of operation of the system so that if trouble develops in one of the tubes it may be taken out of service and the operation of the system continued in its normal manner with the remaining good tube. In order that the faulty tube may be removed from the system with the least interruption and interference with the service under normal conditions, both tubes are simultaneously actuated or operated so that all of the information recorded on one tube is recorded in the other. Thus, one tube may be removed from service and the remaining tube continues to function and control a system in its normal fashion.

As shown in FIG. 1 the scanning tubes of each of the pairs of tubes are actuated in parallel. The tubes of each pair are arranged with their screen ends facing each other and the phototransistors positioned between them. Thus, one tube illuminates one side of the phototransistor and the other tube illuminates the other side of the phototransistor. As is well known, phototransistors may be arranged so that they may be illuminated from either side and respond equally well to the illumination of either side.

In addition, the line scanning tubes such as 1–10, 1–11, 1–20 and 1–21 are arranged to operate both as a scanning tube and a storage tube. In actuating a storage tube these cathode ray tubes may be provided with an external plate and function as so-called Williams' storage tubes. (In the present example the external plate has holes through which light from the tube may strike photoelectric devices. Otherwise a screen may be used instead of a plate since the light will pass through the mesh of the screen.) For a more detailed description of such operation of such tubes, reference is made to the United States Patents 2,642,550, granted to F. C. Williams June 16, 1953; 2,671,607, 2,709,230 and 2,727,988, granted to F. C. Williams March 9, 1954, May 24, 1955, and December 20, 1955, respectively. Briefly, these tubes are arranged to store information in binary form. Each elemental portion or "bit" as it is sometimes called is stored in a small area on the face of the tube. This small area of the tube forms a small condenser or capacitance with the external metallic conducting plate located adjacent the face of the tube. A charge is stored in each of these small areas on the inner surface of the face of the tube by directing the electron beam to this small area. In general, two different charge patterns may be stored in each of these small or elemental areas on the face of the tube. The different proposals for different forms of the charge pattern are well known and understood. One such charge pattern comprises either a long or short line, sometimes called a dot or dash pattern. Another form of the pattern is either a dot or a circle. The charge pattern employed herein comprises either a dot or a circle in each of the small elemental areas on the face of the tube.

In the exemplary embodiment set forth herein it is assumed that the dot represents a 0 and the circle a 1, said 0 and 1 being the usual digital values in the binary numbered system. This invention is not limited to such a pattern because any other pattern may be used when desired.

When the same tube is used both for scanning the subscribers' lines and for storing information, then the metallic plate external to the tube has holes cut in it adjacent the phototransistors which are also positioned external to the face of the tube. The phototransistors are located adjacent the holes so that the light from phosphor of the tube when the beam falls upon it will illuminate the corresponding phototransistor.

Figures 50, 51, 52, 53, 54:
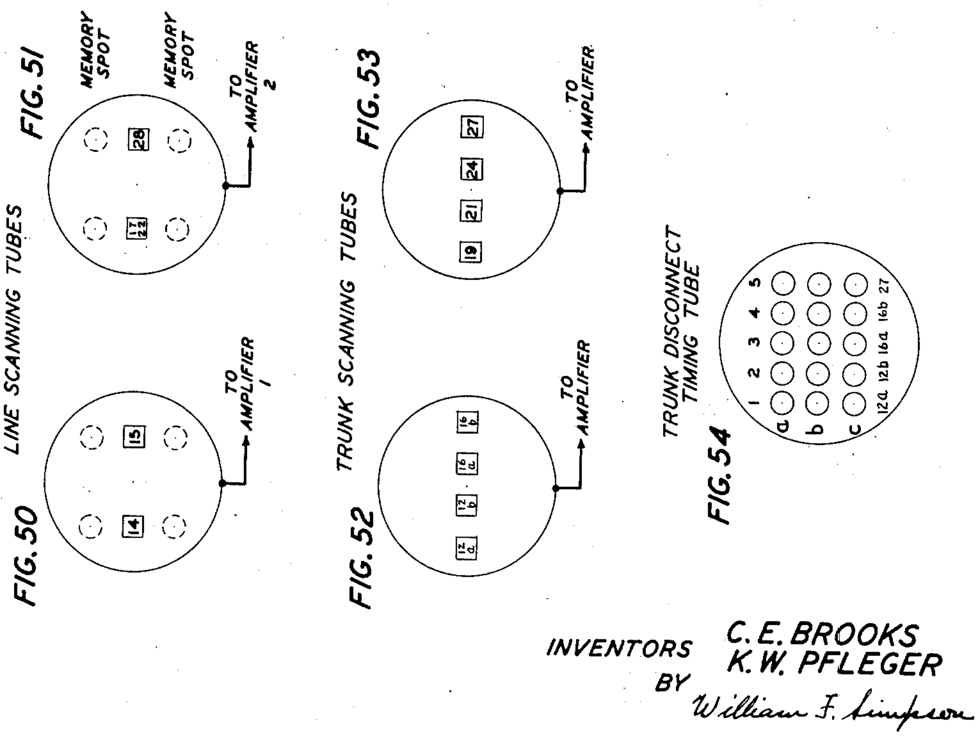
FIG. 50 shows the arrangement of the storage spots and scanning apertures in one pair of line scanning tubes.
FIG. 51 shows the arrangement of storage spots and scanning apertures in a second pair of line scanning tubes.
FIG. 52 shows the arrangement of scanning apertures in a pair of trunk scanning tubes.
FIG. 53 shows the arrangement of scanning apertures in another pair of trunk scanning tubes.
FIG. 54 shows the arrangement of the storage spots in the trunk disconnect timing tubes.

Thus, as shown in FIGS. 50 and 51 an upper storage spot and a lower storage spot together with a scanning aperture is provided for each of the subscribers' lines. While these various positions on the face of the tube may be arranged in any desired order or position, one suitable arrangement is to have one of the spots above the aperture and another below the aperture for each of the subscribers' lines. Of course, when desired, these three elemental areas on the face of the tubes, assigned to each of the subscribers' lines, need not necessarily be located in the same general area adjacent one another. However, it is convenient to show them in this manner for purposes of description. The various elemental areas may be located at different sections on the face of the tube when desired. All that is necessary is that the beam be properly and selectively directed to the various spots when desired. As shown in FIGS. 50 and 51 the upper spot is employed to record and store the condition of the subscribers' line as determined on a previous scan. The lower spot is employed to store and record the fact that ringing current is being supplied to the subscriber's line. In addition to the tubes and their screens, phototransistor, etc., a number of control circuits are provided for controlling these tubes. Thus, the deflection circuit 1–30 is provided for controlling both the horizontal and vertical deflection of the cathode ray beams within the various tubes.

As shown in FIG. 1 in the exemplary embodiment of this invention described herein a single deflection control circuit 1–30 is provided for all of the combined line scanning and line storage tubes such as 1–10, 1–11, 1–20 and 1–21. Of course, when desired, individual deflection circuits may be provided. In addition, one or more circle generators 2–36 and control gates 1–31 and 1–32 are provided for causing the beams within the tubes to trace a small circle on the face of the tube in the desired elemental area as will be described hereinafter.

The output of the external plate or electrode of the tubes is connected to the amplifiers 1–40 and 1–41 and a wave shaping network or other equipment 1–42 or 1–43. The phototransistors together with the output of the wave shaping or other circuits are connected to the detector circuits 1–50 and 1–51 and these in turn are connected to the program control circuit 2–10 and also to the translator 1–52.

Inasmuch as it is desired to obtain appreciably more light from the tube when the phototransistors are illuminated an electronic switch 1–53 is provided for changing the anode voltage on the cathode ray tube so that the intensity of the beam current and the intensity of the emitted light is increased so that ample illumination will be provided for actuating the phototransistor.

The subscribers' station sets are each provided with the usual type of telephone instrument including a transmitter, a receiver, an induction coil, supervisory contacts usually called switchhook contacts or cradle contacts, and a dial or a calling device. In addition, the subscribers' station sets may include one or more transistor amplifiers of one or more stages of amplification. The subscribers' station sets may be arranged for antisidetone operation when desired. In the exemplary embodiment as described herein the subscribers' station equipment may employ either the usual high current subscribers' station sets or it may employ low current subscribers' station sets of the type disclosed in a patent application of L. A. Meacham, Serial No. 461,145, filed October 8, 1954, now Patent 2,808,462, issued October 1, 1957. In such low current subscribers' station sets, transistor amplifiers are employed as set forth in the above-identified patent application.

In the exemplary embodiment in this invention described herein the circuits at the subscribers' station sets are arranged to respond to give an audible signal when ringing current is connected to the subscriber's line. The ringing current comprises a voice frequency carrier current and this carrier current may or may not be modulated at a lower frequency as, for example, a 1000-cycle carrier current modulated at 20 cycles. Such combined alternating currents produce a distinctive signal in the calling device at the subscribers' station. See, for example, a patent application of Meacham and West, Serial No. 469,633, filed November 18, 1954, now Patent 2,824,175, issued February 18, 1958. In all other respects the subscribers' station set operates in its usual and normal manner during initiation of the call, dialing, talking and disconnect, etc.

Thus, under normal conditions when the subscriber's line is idle, the line circuit of the subscriber's station is open. This line circuit then closes and remains closed, except for dial pulses, during the entire call. As indicated above, the dial pulses are transmitted by means of a dial which momentarily interrupts the subscriber's line by a series of pulses, the number of which represents the digits or symbols of the called party station identification usually called the "directory number".

As described herein, control circuits include a program circuit 2–10 at the central office arranged to control the scanning or sampling of the voltage or current conditions of the subscribers' lines once during each 0.005 second. When the subscriber's line is open, predetermined potential conditions are found in the line circuit by the scanning equipment and this in turn causes a predetermined signal to be recorded in the upper line storage spot. So long as the subscriber's line is idle, substantially no output is obtained from the phototransistor individual to that line so that a dot will be stored at this time in the upper storage spot associated with the respective subscriber's line.

When the telephone subscriber raises the instrument at one of the subscribers' stations as, for example, at station 14, the subscriber's line circuit is closed which causes current to flow over the subscriber's line and change the voltage or potential applied to the phototransistor 1–34. Consequently, the next time this phototransistor is illuminated by either or both the cathode ray of tubes 1–10 and 1–11, due to the beams of these tubes striking the phosphors adjacent this transistor, a pulse of current is transmitted by the first detector circuit 1–50. If the subscriber at one of the other stations, such as 28, has lifted a telephone instrument then a pulse of current is transmitted from a corresponding phototransistor 1–38 when it is next illuminated by either or both tubes 1–20 or 1–21 which cause the pulse to be transmitted by the detector circuit 1–51.

Returning to the first pair of tubes and subscriber line 1–14, after the beams are directed to the portions of the faces of the tubes 1–10 and 1–11 adjacent to phototransistor 1–34 these beams will be moved upward to scan the upper storage spot associated with the phototransistor 1–34 and thus the upper storage spot assigned to line 1–14. Under the assumed conditions, this spot will be recording a dot which corresponds to a 0. This information is transmitted through the amplifier 1–40 and wave shaping device 1–42 to the first detector 1–50. The first detector on receiving the current signal from the phototransistor 1–34 and an indication that the line had been previously opened recognizes these signals as indicating that the subscriber's line has changed from an open circuit to a closed circuit signal condition. As a result, pulses are transmitted to the translator 1–52 and also to the program circuit 2-10, which cause the program circuit to be momentarily interrupted or delayed in operation whereupon the beams of tubes 1–10 and 1–11 are directed to the lower storage spot associated with the phototransistor 1–34 and thus assigned to and individual to the line 1–14. The character of the charge stored in the lower spot is then transmitted to the first detector circuit.

When the subscriber's line changes from open to closed this change may occur at a number of different times and indicate a number of different conditions. In the first place it may indicate the initiation of a call by the subscriber. In the second place it may indicate the answering of a call by a subscriber. In order to determine whether or not it indicates the answering of a call by the subscriber the beam is directed to the lower storage spot and if ringing has been previously applied to the line, that is a circle written in the lower storage spot, then the open to closed transition of the subscribers' line indicates the answering of a call by the subscriber. On the other hand if a dot had been previously written in the lower storage spot then the open to closed transition does not represent the answering of a call by a subscriber. Instead, it represents either the initiation of a call, the termination of a dial pulse, the termination of some supervisory signal or the termination of some spurious current or signal. The different conditions represented by the open to closed transition are thereafter determined as described hereinafter.

It should be noted that when such a transition occurs, the operation of the program circuits are delayed so that the scannings of the subscribers' lines (scanned by the other tubes such as 1–20 and 1–21) are also delayed. This delay is provided to permit the determination of the character of signals stored in the lower storage spot.

The process of reading the character of the signal stored in the lower storage spot leaves a charge representing a dot both when a charge representing a circle had been previously stored therein and also when a charge representing a dot had been previously stored therein. If it is desired to leave a charge representing a circle stored in any spot the circle must be rewritten therein after reading the spot.

Upon reading the dot stored in the upper storage spot as pointed out above and under control of a reading of a closed condition on the subscriber's line the beam control circuits are caused to record circles in the upper storage spots.

Thereafter, as long as the subscriber's line remains closed, a pulse of current is obtained from the phototransistor 1–34 and transmitted to the first detector circuit 1–50 each time the line 1–14 is scanned. Likewise, a circle is read and rewritten in the upper storage spot and then the beam is caused to scan the phototransistor individual to the next subscriber's line and the corresponding upper storage spot or elemental area on the face of the combined scanning and storage tube.

At a subsequent time the subscriber's line 1–14 will be opened by the subscriber either due to dialing or disconnecting or transmitting some other signal to a central switching station or due to other signals and spurious currents and signals. Under these circumstances no pulse of current will be transmitted through the phototransistor 1–34 when it is next illuminated by either the tube 1–10 or 1–11 or both of them. Under these circumstances a circle will then be read from the upper storage spot and the corresponding signal transmitted to the first detector circuit 1–50. This detector circuit recognizes these signals as representing the change or transition in the line signaling condition of the subscriber's line from a closed circuit to an open circuit. As a result, a corresponding signal of current conditions is transmitted to the translator 1–52. Thereafter so long as the line remains closed, no further signals are transmitted to the translator 1–52 in response to the scanning of the phototransistor 1–34 and the upper storage spot by either or both of the cathode ray tubes 1–10 and 1–11.

In the above description it is assumed that the signal conditions arose on lines 1–14 extending to the subscriber's station 14. Of course, should the signaling conditions change or arise on the other subscribers' lines, then the corresponding actions and operations of the circuits will take place in the same or in other line scanning and storage tubes and actuate the detector circuit in a similar manner when the phototransistors and storage spots are assigned to such other subscribers' lines.

The change in line condition from closed to open described above with reference to line 1–14 may represent the beginning of a dial pulse, the termination of a call, spurious signals, or currents received by the system in response to the termination of various other supervisory signals or conditions. The circuits and equipment at the central station thereafter determine which of the above conditions the transition represents.

The time required for scanning all of the subscriber's lines is thus a function of a number of subscribers' lines which are busy or active. The more lines that are busy the longer the scanning interval and the fewer the number of lines that are busy the shorter the scanning interval. In all events, the 0.005 second scanning interval referred to above represents the longest or maximum scanning interval, which interval may become shorter dependent upon the traffic conditions; that is depending upon the number of calls being handled by the central office switching equipment.

The signals transmitted from the detector circuits 1–50 and 1–51 and from the deflection circuits 1–30 to the translator circuit 1–52 represent the position of the cathode ray beam within the tube at the time the change of the subscriber's line condition is detected as well as the character of this change. The translator circuit 1–52 then translates these signals representing the conditions of the beam of the cathode ray tube into groups of binary signals representing the digits of the subscriber's station or line upon which the transitions are detected. Thus, when a subscriber's line of subscriber's station 14 changes from open to closed, signals are transmitted to the translating circuit 1–52 representing the position of the cathode ray beam at this time and also the open to closed character of the transition at this time. The translating circuits translate these signals into a group of binary signals or codes representing the 1 from the tens digit of the subscriber's directory number 14 and into another code group of signals representing the 4 of the units digit of a subscriber's directory number. These groups of coded signals together with signals representing the character of a transition are then transmitted from the translator 1–52 to the gating circuit 2–11 and through the gating circuit at the proper time to the line storage or flip-flop circuits 2–12.

The line flip-flop circuits 2–12 comprise two groups of flip-flops or storage circuits and each group of these flip-flop circuits comprises a plurality of subgroups, each subgroup having sufficient elemental storage means or circuits or flip-flops in it to record the character of the transition and whether or not the subscriber's line is being rung, as well as the signals representing the digits of the directory number of the subscriber's station or line, upon which the transition occurs.

The two groups of line flip-flop circuits are provided so that complete overlap operation is provided. Thus, while one group is recording the signals transmitted to it from the translator 1–52, the other group is employed to control other circuits as described hereinafter in accordance with other corresponding signals previously transmitted to these other storage or flip-flop circuits.

The two pairs of line scanning tubes, shown in FIG. 1, represent any suitable plurality of such tubes. When two or more of such pairs of tubes are simultaneously detecting transitions occurring on different subscribers' lines in the manner described above, it is necessary to transmit these signals sequentially at different times to different subgroups of one of the main groups of the line storage or line flip-flop circuits 2–12. Such sequential transmission to the storage means is obtained by delaying the signals from the different tubes or pairs of tubes by progressively greater time intervals and suitably gating the subgroups of flip-flops so that they will successively respond to signals transmitted from the translator through the gate circuits 2–11.

The operation of the phototransistors, the beams within the cathode ray tubes 1–10 and 1–11, 1–20 and 1–21, in illuminating the phototransistors and also in determining the character of the signals recorded in the storage spots above and below the various phototransistors and the laying down of charges on writing in these spots are all performed at high speed, each of these operations requiring from one to two microseconds. Thus, there is ample time for carrying out all of these operations on a large number of subscribers' lines by a much smaller plurality of pairs of scanning tubes. The translator circuit 1–52, the gate circuit 2–11 and the line flip-flop or storage circuits 2–12 likewise operate in comparable time intervals so that there is ample time for determining the transitions on a plurality of lines and translating and transmitting signals representing these transitions and the line upon which they occurred to the line flip-flops all within each of the approximately 0.005 second scanning interval.

During the next cycle after the calling line numbers and the change in signaling conditions on these lines are recorded in one of the main groups of the line flip-flops 2–12 the signals stored in these flip-flops are transmitted through the gate circuits 2–14 to the detector and beam control circuits 2–34 and 2–35 of the storage register tubes 2–24, 2–25, 2–26 and 2–27. At the same time the program circuit 2–10 causes calling line identifying signals stored in the tubes 2–24 and 2–25 to be read out into the detector and beam control circuit and calling line identifying signals stored in the register tubes 2–26 and 2–27 are read into the detector and beam control circuits 2–35. Consequently, the calling line identifying singals as recorded in the line flip-flops 2–12 may be compared in matching circuits with the calling line signals of lines which are dialing and recorded in the register tubes 2–24, 2–25, 2–26 and 2–27. If the compared signals match, that is, if they are identical, then the open to closed transition asumed above will represent the completion of a dial pulse and will be stored in a suitable storage space in the corresponding one of the register tubes and the line flip-flops 2–12 upon which this most recent signaling condition change was stored will be reset to clear them and make them ready for receiving new information.

If the calling line identifying signal stored in the various line flip-flops 2–12 are not identical with the corresponding calling signals stored in tubes 2–24, 2–25, 2–26 and 2–27 no match is obtained in the circuits 2–34 or 2–35, then the gate circuits 2–14 are actuated so that the line flip-flop signals from 2–12 which were originally compared with the similar calling line signals stored in tubes 2–24 and 2–25 will now be compared with the signals stored in the call register tubes 2–26 and 2–27. Likewise, the line flip-flops which were originally compared with the calling line numbers registered in the register tubes 2–26 and 2–27 will now be compared with the corresponding signals recorded in tubes 2–24 and 2–25.

If more than two pairs of register tubes are provided, then the various signals recorded in the particular main group of flip-flops being transferred to the control circuits, will also be compared with the calling line identifying signals stored in such other call register tubes. If the signals stored in the line flip-flops 2–12 correspond identically with similar signals recorded and stored in either pair of the call register tubes 2–24 and 2–25 or 2–26 and 2–27 then as before the indication of a signal that a dial pulse is ended, is added to the information relative to the particular call in question stored in the call register tubes.

The above testing and matching of the calling line numbers recorded in the line flip-flop 2–12 and the calling line numbers recorded in the call register tubes 2–24, 2–25, 2–26 and 2–27 and the restoring of the corresponding line flip-flops when such a match is obtained as well as the recording of additional signals in the call register tubes performed is at high speed so that there is ample time for performing these functions during the first portion of the .005 second scanning interval.

If at the end of this first portion of the .005 second scanning interval all of the line flip-flops 2–12 in the particular main group being transferred to the control circuits during this .005 second interval had not been restored to "0" thus indicating that the open to closed transition assumed above was not the end of a dial pulse, then the gate circuits 2–13 are actuated during the second portion of the .005 second scanning interval and transmit signals from these line flip-flops to the common flip-flops 2–16.

The common flip-flops 2–16 comprise temporary storage or register circuits and devices similar to the line flip-flops 2–12 as well as gate and other control circuits. Upon receiving signals from the line flip-flop circuits 2–12 through the gate circuits 2–13 the common flip-flop circuits apply voltages to leads to the line translator 2–17 which translates binary code signals representing the directory number of the calling line, that is, the directory of the line upon which the transition occurred, into decimal numbered signals representing the same line. These signals are then transmitted to the line number group circuit 2–18 whicha causes a busy test voltage to be applied to the line terminal assigned to the line identified by the translated signals.

If the line is interconnected with some other line or trunk then a signal is received back by the common flip-flops which indicates that the open to closed transition was not in response to the initiation of a call but rather to the answering of a call or the termination of some supervisory or spurious signal.

If, however, upon testing the line in question for a connection through the network no such connection is found then a signal is returned to the common flip-flops 2–16 indicating that the open-to-closed transition assumed above represents the initiation of a call.

Thereafter the nature of the transition as well as the calling line identification number is recorded in one of the idle register spaces or sections of the storage portion of the register tubes 2–24 and 2–25 or 2–26 and 2-27.

Upon the entering of such information in one of the storage sections of the tubes of one of the pairs of the call register tubes, a busy or active signal is recorded in this register space so that it will test busy and be no longer available to similarly record and store similar information from other calling subscribers' lines connected to the central switching station in the manner described herein.

The central office equipment is now ready and in condition to receive dial pulses from the calling subscriber identifying the desired called subscriber. In prior switching systems dial tone is supplied to the calling subscriber as a signal that the equipment is ready and in condition to receive dial pulses.

In the exemplary system described herein the above-described operations are performed at such a high rate of speed that they are completed before subscribers are able to dial the first digit. Consequently dial tone is not necessary and none is supplied to calling subscribers in the exemplary system described herein. When the subscribers are ready to dial they start to dial and the switching equipment is ready to receive the dial signals.

However, when desired, the high speed system described herein may be arranged to supply dial tone to the calling subscribers as in prior systems.

When the subscriber starts to dial, the calling line is opened momentarily and transmits a first series of pulses the number of which corresponds to the number of the first or tens digit of the called subscriber's station identification. Upon the next scan of this line after the line opens on the first one of the pulses a closed-to-open transition signal is transmitted from the combined line scanning and storage tubes through the translator 1–52 in the manner described above. This signal together with the calling line identifying signals identifying the calling line which is starting to dial is again stored in one of the subgroups of one or the other main groups of line flip-flops 2–12. During the first portion of the next scanning interval this line calling line number is compared with a calling line number stored in the pairs of register tubes 2–24, 2–25, 2–26 and 2–27. If a match is obtained, that is if it is identical with one of the calling line numbers stored in the call register tubes, as it will be under the assumed conditions, then this transition indicating the beginning of a dialed pulse is added to the information already stored in the register space assigned to the call in progress on the particular line such as 1–14 and the corresponding line flip-flops 2–12 are then restored to their "0" or initial condition.

At the end of the first dial pulse an open-to-closed transition is again detected by the line scanning and line storage tubes and a corresponding signal transmitted through the translator 1–52. This signal is then transmitted through the gate circuits 2–11 and line flip-flop circuits 2–12 in the manner described above. Thereafter, the signals are compared in the manner described above with the signal already recorded at the register tubes. If, as assumed, this represents the completion of the first dial pulse, a match will be obtained in one of the match circuits and the corresponding information entered in the appropriate register space in the corresponding call register tube.

In the above-described manner, each of the dial pulses of the first series of dial pulses is recorded in the register tubes. Each of the dial pulses received causes the signals stored in the assigned register space of one of the pairs of register tubes to be changed so that it represents the next higher numeral.

Timing register and storage spots or storage sections are included in each of the call register sections of the call register tubes 2–24, 2–25, 2–26 and 2–27. These timing sections in cooperation with appropriate circuits are employed to time the various portions or elements of a call. For example, if upon the receiving of a call initiation signal and the recording of it in a call register space in one of the pairs of call register tubes no further signals are received for a predetermined interval of time, the call is timed out and the calling subscriber connected to busy tone in a manner similar to the establishing of other connections through the network as will be described hereinafter.

In addition, the timing section of the call register spaces in the call register tubes is employed to time the interdigital interval between the various series of dial pulses. If, for example, a sufficiently long interval of time elapses between dial pulses the succeeding received pulses are recorded in elemental storage space for the next succeeding digit. In recording dial pulses in this area the signals recorded therein are changed to represent the next higher numeral in response to the reception of each dial pulse. In this manner the dial pulses representing the called party station identification are entered in the call register spaces of the call register tubes.

At the completion of dialing of all of the digits identifying the calling party station the assigned call register space in one of the pairs of call register tubes has recorded in it the identity of the calling line and the identity of the called line. At this time there is also recorded in this register space an indication that the dialing is complete.

Returning now to the .005 second cycle following the cycle in which the first open to closed transition occurred as discussed above which .005 second cycle was described as being divided into four different portions, as it is described above, the first portion is employed for comparing signals representing the directory number or other identification of the calling line with representations of similar signals stored in the storage spaces of the call register tubes 2–24, 2–25, 2–26 and 2–27. Also, as described above, the second portion of this interval is employed to transmit identifying signals to the common flip-flop circuits in case these signals do not correspond with signals stored in any of the register spaces of the register tubes 2–24, 2–25, 2–26 and 2–27. If the line represented by these signals is not connected through the network then these signals are recorded in an idle register space in the call register tubes as the indication of the initiation of a call.

During the third portion of said .005 second interval the indications of the lapsed time recorded in the timing sections of the register spaces in the call register tubes, as well as the indications of lapsed time stored in the trunk disconnect timing tubes, are advanced and brought up to date when required and at periodic intervals of suitable duration the storage spots of all of the active register spaces of the call registry tubes 2–24, 2–25, 2–26, and 2–27, are regenerated.

As described herein the storage tubes and in particular the call register tubes are the type sometimes referred to as Williams' type storage tubes in which the information is stored by means of charges on small areas of the surface of the end of a cathode ray tube. Such charges will not remain on the small areas of the end of the tube indefinitely. Furthermore, the directing of a beam to adjacent areas sometimes tends to reduce the magnitude of the charge of the adjacent areas. For these and other reasons it is necessary to periodically read, regenerate and rewrite the stored information by renewing the charge stored in respective areas on the phosphor on the end of the cathode ray discharge tube.

In accordance with the exemplary embodiment of this invention described herein the storage spots or elemental areas of the active register spaces in the call register tubes are regenerated during this third portion of each of the .005 second scanning intervals when required.

During the fourth portion of each .005 second scanning interval, calls awaiting completion, that is calls in which dialing has been completed and such an indication recorded in the appropriate register spaces in the call register tubes, are completed or attempted to be completed through the interconnecting network.

During this fourth interval the register spaces of the call register tubes are scanned for an indication that dialing has been completed on one or more of the calls stored in the various spaces of the register tubes. If an indication that dialing has been completed is found in the register spaces, then both the calling and called line identifications or directory numbers are read out of the register spaces recording such information. The signals representing this information are then transmitted to the common flip-flops 2–16. The common flip-flops 2–16 then control the switching network to cause a path to be established through the network from the called line to an idle one of the ringing trunks 3–13, 3–14 or 3–15 and also from the called line to one of the transmission or talking trunks 3–11, 3–12, etc.

After both the calling line number and the called line number are transmitted to the common flip-flops 2–16 from the register tubes, these numbers are compared in order to determine whether or not a subscriber at one party station on a party line is calling another subscriber on the same party line. In order to make this determination the called party's identification as recorded in the common flip-flops is transmitted through a translating circuit therein which translates all party station numbers into the party line number or at least, the same party station number. The called party station identifying or directory numbers which identify stations not connected to a party line are transmitted through the translating circuit without change. After this translation is made the translated called party's number is compared with the calling party's number by a matching circuit, also located within the rectangle labeled common flip-flops 2–16. If the two numbers are not identical a match is not obtained from the matching circuit indicating that the called party is not connected to the same party line as the calling party.

If no match is obtained between the translated called party's station identification and the calling party's station identification, the common flip-flop circuit next causes a busy test to be made on the called party's line by causing a busy test potential to be applied to the called party line circuit through the line translator 2–17 and the line number group 2–18. The busy test comprises applying a higher voltage to the called party's line termination which causes increased current to flow through the crosspoint switching network 2–19 if the line is connected through the network to one or more trunks or other lines. If the called party's line is not so connected the increased voltage applied to its termination produces no increase in current through the switching network. As a result, the line tests idle. The common flip-flop circuit then transmits the called party's directory number or line identification to the call register tubes to ascertain whether the called line is in the process of dialing. If the called line is in the process of dialing then a match is obtained from the call register tubes. The calling line is then connected to a busy trunk as will be described hereinafter.

If no match is obtained from the call register tubes at this time, and the called party's line is idle, then the common flip-flops and their control circuits advance and cause a high "connect" voltage to be applied to the called party's line termination extending to the switching network. In addition, a high "connect" voltage is applied to the network sides of a talking trunk, such as 3–11 and 3–12 and to the ringing trunks such as 3–13 and 3–14. The high voltage is applied directly to trunks 3–11 and 3–13 and through a delay device to the trunks 3–12 and 3–14. Thus, if the talking trunk 3–11 is idle it will be interconnected through the switching network with the called party's line. Similarly, if the ringing trunk 3–13 is idle it will be so connected. If either of these are busy then a sufficiently high voltage will not be applied through them to the switching network to cause the crosspoints to break down and establish a path. Instead, the next idle trunks in the chain such as 3–12 or 3–14, will be selected and connection established between it and the called party's line.

As described herein the two stage crosspoint switching network 2–19 comprises a large plurality of crosspoint elements or devices which crosspoint elements may include one or more transistors, one or more Zener diodes, resistors, condensers, and inductances as may be required. These crosspoint elements have a high impedance when low voltage is first applied to them and then when the applied voltage exceeds a predetermined magnitude, the crosspoint elements abruptly change to a low impedance high current state and thereafter continuing this state until reset in any suitable manner. In resetting the crosspoint elements the current flowing through them must be reduced below the predetermined critical magnitude.

Upon the establishing of a path through the network from the ringing trunk to the called party's station additional storage circuits in the common flip-flops are actuated to register or store the identity of the particular ringing trunk interconnected with the particular called line. In addition, during the next complete scanning cycle when the commutating and scanning equipment is again directed to the called party's line identification, the control circuits 1–50 and 1–51 are actuated to cause a circle to be stored in the lower storage spot immediately below the transistor interconnected with the called party's line.

After the paths from the called line to the ringing trunks have been established as described above, ringing current from source 3–17*a*, for example, is transmitted from the ringing trunk over the path established through the switching network to the called subscriber's line and then over the called subscriber's line to actuate the calling device at the subscriber's station.

Meantime, it is desirable to also set up a path from the same talking trunk to the calling party's line. In order to accomplish this, it is necessary first to determine which talking trunk has been connected to the called party's line. The common flip-flop circuit 2–16 then applies an identifying potential through the line translator 2–17 and number group 2–18 to the called party's line termination. As a result, the potential transmitted from this line termination through the network 2–19 to the interconnected talking trunk causes the the polarity of the voltage applied to the trunk scanning phototransistor such as 3–31 to be reversed so that on the next scan of the trunk scanning tubes 3–20 and 3–21 or 3–22 and 3–23 when the phototransistor 3–31 is illuminated, positive output voltage is transmitted through the gating circuit 3–50 to the common flip-flops 2–16 thus identifying the trunk to which the called party's line is connected. As a result, the common flip-flops apply a connect voltage as described herein under control of the line translator 2–17 and the line number group 2–18 to the calling party's line termination. At the same time, a connect voltage is applied to the other side of the identified talking trunk such as trunks 3–11 with the result that a second talking path is established through the network 2–19 as described herein. Due to the path thus established from the same talking trunk to the calling party's line, the calling party will now hear the ringing tone transmitted to the called party's station.

Thereafter the circuit and equipment operate in a manner described herein until either the called party answers or the calling party abandons a call. If a calling party abandons a call then the paths through the network are interrupted and the circuits restored to their initial condition. If the called party answers the switching system responds so that then the calling and called parties may communicate with each other in the usual fashion. However, upon the answering by the called party by the lifting of the telephone instrument, the called party's line is closed so that during the next scanning interval, the open to closed transition, together with the identity of the called party is stored in the line flip-flops 2–12. Then the line number of the called or answering party as stored in the line flip-flops 2–12 is compared with the calling line numbers stored in the register tubes as described herein and since the called party has just answered, the called party will not be dialing so that no match will be obtained between the called party's line or station identification, and similar information stored in the call register tubes.

Consequently, the signals representing the answering party's line or identification, signals representing the change in signaling condition of this line from open circuit to closed circuit, and a signal indicating that the ringing current had been applied to the called party's line, are all transferred to the common flip-flop circuits. The common flip-flops first test the line busy condition and upon finding the line busy recognize the signal as an answering signal. The common flip-flops then apply a high identifying voltage to the called party's line termination, which voltage is transmitted over the paths from this line through the switching network to the talking and ringing trunks interconnected with the called party's line. These trunks are then identified on the next scanning interval of the trunk scanning tubes 3–20 through 3–23. Thereafter, a disconnect voltage or current pulse is applied to the ringing trunk or ringing trunks which are interconnected with the called party's line. As a result, these trunks are disconnected and the crosspoint elements employed in establishing such paths through the switching network 2–19 restored to their high impedance condition.

At this time the called subscriber and calling subscriber are both still connected to the opposite side of a talking trunk. Consequently, a communicating path exists from the calling party to the called party and this talking condition then continues so long as parties wish to communicate with each other.

At the termination of the call, one or the other of the parties usually hangs up first which interrupts a line circuit. Assume first that the called party hangs up first which in turn causes the called line circuit to be changed from a closed circuit to an open circuit condition. This condition is then recognized by the scanning tubes and equipment of FIG. 1 in the manner described therein and the signal representing this change, together with the identity of the subscriber's line is transmitted through the translator 1–52 and gating circuits 2–11 to the line flip-flops 2–12. During the next scanning cycle this information is transmitted first through the gates 2–14 to the call register tubes and control circuits and compared with the calling line numbers stored therein. Under the assumed conditions the called party line identification number is not stored in any of the call register spaces in any of the call register tubes. Consequently, no match will be obtained in these circuit. At the end of the comparing and matching interval the information is transmitted from the line flip-flops 2–12 through gates 2–13 to the common flip-flop circuits 2–16. The common flip-flops then test the called party's line to determine whether it is busy or interconnected with some other line or trunk or transmission path through the network. Under the assumed conditions this line will be found to test busy whereupon the common flip-flops will apply identifying voltages to the called party's line termination extending to the network, since the line is interconnected through the network to the talking trunk. The trunk will then be identified by the trunk scanning tubes 3–20 through 3–23. Thereafter the operation of the trunk disconnect timing tubes 3–24 and 3–25 is set into operation to time a disconnect signal from the called party's line. If at any time during the succeeding time interval of approximately 0.3 of a second, a change in the subscriber's line condition from open circuit to closed circuit is detected by the scanning circuits, this change together with the identifying signals of the subscriber's line again are transmitted through the translator 1–52 and gating circuits 2–11 to the line flip-flops 2–12. During the first portion of the next scanning cycle these line identifying signals are compared with corresponding line identifying signals in the call register tubes 2–24 through 2–27. Since no match is obtained this information will then be transmitted through the gate circuits 2–13 to the common flip-flop circuits 2–16. Common flip-flops will then test this line for a connection through the network. Under the assumed conditions the line will test busy whereupon the common flip-flops will again identify the trunk interconnected with this line and then interrupt the timing operation of the trunk disconnect timing tubes 3–24 through 3–25, because the subscriber's line first in going open and then being reclosed within the nominal 0.3 second interval is due to some spurious transient current or signal and not a disconnect signal.

On the other hand, if the subscriber's line is not reclosed within about nominal 0.3 of a second interval, then the trunk disconnect timing tubes will cause the particular trunk interconnected with the called and calling party's subscriber's station to be identified and then a disconnect signal and trunk identifying signals are transmitted to the common flip-flops which in turn cause a disconnect voltage to be applied to both sides of the talking trunk with the result that the crosspoints within the network 2–19 employed in establishing connections between the called and calling parties through the network are restored to their high impedance condition, thus interrupting the previously established paths through the network.

When circuits fail to complete operations within a specified time they are sometimes said to "time out" and then the circuits are usually disconnected and a signal given to either or both the subscriber and the maintenance force so troubles may be corrected.

Thereafter, when the calling party hangs up the closed-to-open transition of his line is again detected by the scanning tubes and circuits, and this information together with the identity of the subscriber's line is then transmitted through the translator 1–52 to the line flip-flops 2–12. The line identification or directory numbers are then compared with the directory numbers stored in the call register tubes and under the assumed conditions no match will be obtained. Consequently, this information is transmitted to the common flip-flops which in turn test the calling party's line for connections through the network. Since no connection is found the common flip-flops do not further respond to these signals but are instead restored to normal after which they may be employed for other calls. In addition, after each subscriber's station has been disconnected as described above, they may be employed to make calls between them and to other stations as may be desired.

In the event that the calling party hangs up first instead of the called party as assumed above, the circuits respond to the disconnect signal in substantially the same manner as described above, except that the calling party's identification is transmitted through the translator 1–52 and compared with the information stored in the call register tubes and transmitted to the common flip-flops 2–16. The common flip-flops respond in substantially the same manner and cause disconnect potentials to be applied to both sides of the talking trunk which causes both subscriber's lines to be disconnected in the manner described above and then when the called party hangs up last, the system then responds as described above when the calling party hung up last, except, it is the called party's identity and closed to open signal which is transmitted through the translator 1–52, etc.

If after initiation of a call as described herein the calling party does not complete dialing within a predetermined interval of time, the call register tube timing circuits and equipment times out and registers a dial completion condition. Thereafter the calling party's line identification, together with the incompletely dialed information is transferred to the common flip-flops. These flip-flops recognize the fact that the called party number had not been completely dialed so the calling party's line is at once connected with a busy tone trunk through the switching network 2–19.

Thereafter, when the calling party hangs up, the busy tone trunk is disconnected in the manner similar to disconnections of talking trunks when the parties hang up as described herein. Similarly, if the calling party has completed dialing and the called party's line is found to be busy when tested by the common flip-flops or if the called party is found to be dialing then a connection is similarly set up between the calling party's line to busy tone trunk or other distinctive signal.

If one party on a party line calls another party, on the same party line the initiation of a call is registered in the same manner as described above. The dial pulses are also registered in the same manner as described herein. When the dialing is complete both the party line number and the calling stations' identification are transmitted to the common flip-flops. In this case upon translation of the dialed number and the comparison with the calling party's number or party line number a match will be obtained since these two numbers will be identical. In this case, the common flip-flop circuits will set up connection between the line and the talking trunk and between the line and two ringing trunks, one for the calling party and one for the called party. The calling party will be instructed to hang up upon hearing the ringing and to wait for ringing to stop. When the called party answers the ringing trunks are disconnected in substantially the same manner as for normal calls. The calling party upon observing the cessation of ringing will also pick up his telephone instrument whereupon his station is in communication with the called station. After conversations are over, the subscriber's line will be opened when the last of the two subscribers hangs up. Thereafter, the circuits function to disconnect talking trunk and the party line in substantially the same manner as for an individual call.

On calls to parties on a party line, means are provided to select the proper ringing or calling current and to transmit it over the party line. The ringing current may be for full selective service, semiselective service, or it may be code calling or ringing depending upon the ringing trunk or trunks and station equipment employed.

The exemplary embodiment of this invention, described herein in detail, employs a plurality of semiconductor diodes and transistors. Other types of diodes, amplifiers, or electronic switches may be employed when desired. In addition, some vacuum tube circuits are employed to control the cathode ray vacuum tube storage and scanning tubes.

The exemplary embodiment described in detail herein is arranged to respond to and to employ positive pulses. In general, the normal condition is with the voltage of the various signaling leads at or near ground potential. This condition is frequently called a "0" condition. The signaling condition will be a positive voltage or pulse above ground and this condition is frequently referred to as a "1." When desired, these conditions may be reversed and alternately "0" or ground potential and negative pulses may likewise be employed when desired. Also the different signaling conditions may comprise a negative voltage pulse for one of the two conditions and a positive voltage pulse for the other of the two conditions. In the exemplary embodiment herein, in order to more readily explain the invention the system has been arranged to employ and to respond to positive pulses.

One major exception to the use of positive pulses is in the control of the transistor crosspoint switching network described herein. In such networks it is usually desirable to apply positive voltage conditions on one side of the network and negative voltage conditions to the other side of the network. In the exemplary embodiment described herein in detail, positive voltage conditions are applied to the subscribers' line side of the network and the negative voltage conditions are applied to the trunk side of the network in order to establish and to maintain a connection through the network. These voltage conditions may be reversed when desired or necessary or the entire voltage or potential reference level may be raised or lowered so that all the voltages are either positive or negative and differ merely by their magnitudes. Furthermore, when desirable the given signaling condition may be represented by the positive voltage or pulse in one circuit and repeated to another circuit as a "0" voltage or ground signaling condition or repeated to another circuit as a negative voltage or pulse.

These voltage pulses or signaling conditions are transmitted through various switching and gating circuits, which switching or gating circuits may take any one of numerous different forms depending upon the character of the semiconductors and other circuit parameters. In general, the semiconductors may be either germanium or silicon or any other suitable material and they may be either the so-called positive type or so-called negative type. The diodes may be either point contact diodes or junction type diodes, likewise the transistors may be either point contact transistors or junction type transistors.

When point contact diodes are employed, they may be of either the N or P types and the juncton types may be either N-P or P-N type diodes. In the latter case, the same diode may be connected in either manner when desired. The point contact transistors employed may comprise a base material of either N type semiconductive material or P type semiconductive material of either germanium or silicon. The junction type transistors may be either the N-P-N or the P-N-P type. Furthermore, the various semiconductive devices may be made in any suitable manner such as cut from grown crystals and they may be alloy type devices. Diffusion techniques may be employed and suitable heat treating and forming methods and processes may be employed to make the various semiconductive devices. Since these processes are known and described in greater detail in the prior art, reference is made to the prior art for further detailed information to the manufacture of such devices.

One of the more common uses of such devices is to form gate circuits or gates for selectively permitting or preventing the transmission of signaling and control pulses. Diodes are frequently connected in circuits called "and" circuits or "or" circuits. In general, each of these circuits has a plurality of input leads and a signal output lead. In the case of "and" circuits a predetermined signaling condition i.e. a plus voltage or pulse in the exemplary embodiment described herein must be applied to all of the input circuits or conductors of the "and" circuit before a positive pulse or voltage is obtained from its output. In an "or" circuit, however, the positive output pulse is obtained whenever any one of the input circuit or conductors has applied to it a positive voltage or pulse. Here again, the negative voltages may be employed instead of positive voltages or the entire reference potential may be changed so that the two different signaling conditions or voltages may be of either polarity but of different magnitude.

Transistors may also be used as switching or gating devices. One arrangement for so connecting transistors is disclosed in a patent application of P. A. Reiling, Serial No. 410,924 filed February 17, 1954, now Patent No. 2,922,151, issued January 19, 1960. As set forth in this application with the base element of the transistor at a potential which reverse biases both the emitter and collector electrodes, the transistor or switch device has a very high impedance between its various electrodes and in particular between its collector and emitter. If on the other hand the bias on the base element is reversed so that both the emitter junction and the collector junction are forward biased then the impedance between the electrodes and particularly between the emitter and collector falls to a very low value. In addition, the voltage difference between these two elements of the transistor likewise falls to a very low value in the order of tenths of the voltage or less.

Depending upon the ratio of the emitter $\alpha$ and the collector $\alpha$ such transistor gating circuits may be made to operate as either a two-way gate or as a one-way gate.

In addition, it is sometimes desirable to bias the base element so that the gate circuit or transistor is normally maintained in its low impedance state and when it is desired to turn it off to apply a signaling voltage to its base element. Conversely it is sometimes desirable to bias the base element of the transistor switch so that it is normally turned off or has a high impedance between its emitter and collector elements and then a voltage or signaling pulse is applied to the base element to turn the transistor on whereupon the impedance between the collector and emitter falls to a relatively low value.

Figure 56:
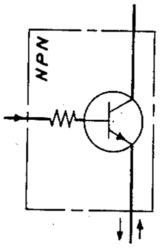

A number of different variations of gate circuits are shown in the drawings. FIG. 56 shows a single transistor gate circuit of the type described above, which employs an N-P-N junction transistor or a P type point contact transistor. If the two $\alpha$ are nearly the same, this gate will operate as a two-way gate as indicated in the symbolic showing of FIG. 56A. This type of gate circuit must have positive voltage applied to its base element for the gate to be conductive. This positive voltage may be a normally positive bias which causes the gate to be normally conducting and then turned off by a negative pulse or the gate may be normally biased to a substantial negative voltage relative to ground potential which maintains the gate normally nonconducting and then the gate may be turned on by positive voltage or pulse.

In case it is difficult to obtain such transistors having substantially the same $\alpha$ between the emitter and base and between the collector and the base, two transistors may be employed to form a gate circuit as shown in FIG. 58. These transistors are again N-P-N junction type or P type point contact transistors. In this case, the gate operates as a two-way gate as described with reference to FIG. 56 but in this case it is not necessary that the collector $\alpha$ be of the same relative magnitude as the emitter $\alpha$. The symbolic showing of this gate in other figures is shown in FIG. 58A.

FIG. 60 shows another arrangement of such a transistor gate circuit. Here the transistor is again an N-P-N junction transistor or a P type point contact transistor. In this case it is desired to have only a one-way gate. In order to insure one way conduction through such a gate circuit, it may be desirable to connect a diode such as 60–10 in series with the emitter or collector lead. As shown in FIG. 60 the diode is connected in series with the emitter.

The symbolic representation of gates of this type is shown in FIG. 60A. The gates shown in FIGS. 57, 59 and 61 are similar to the gate circuits shown in FIGS. 56, 58, and 60 except that P-N-P junction type transistors or N type point contact transistors are employed. In the case of FIG. 57, for example, if the base is normally biased negative and the transistor is normally conducting, a positive pulse applied to the base of the transistor will turn the gate off; conversely, if the base is normally biased positive above the normal potential supplied to the emitter and collector, then the gate is normally turned off and a negative pulse is required to turn it on. As before, FIGS. 57A, 59A and 61A show symbolic representations of the respective gates of FIGS. 57, 59, and 61; which symbolic representations are employed in the circuit drawings showing the exemplary embodiment of this invention described in detail herein.

The switch circuits employing diodes and transistor gates of the types described above attenuate and cause other deterioration of the signaling pulse voltages, currents and control conditions; consequently it is necessary to provide pulse amplifiers and pulse shaping and correcting networks and circuits. It is frequently necessary to provide amplifiers for signaling pulses or control pulses transmitted through two gates in series or in succession. Under some circumstances pulses may be transmitted through more than two gate circuits before it is necessary to amplify and reshape the pulses. Such amplifying and reshaping techniques are known in the prior art to which reference may be made for further details of the amplifiers regenerating and wave shaping devices that may be necessary to cause the system to operate with sufficient margin of safety. Such amplifiers are also inserted wherever they are needed and whenever the voltage level falls to too low a value for a satisfactory operation of the other elements of the system.

FIG. 62 shows one form of an amplifier circuit employing transistors. This amplifier circuit together with suitable pulse shaping and pulse correcting circuits may be employed between any or all of the gates or gating switches as may be desired and such an amplifier may also be employed in the output from the storage tubes. The herein identified patents to W. C. Williams disclose similar types of amplifiers together with suitable types of pulse shaping networks and circuits.

FIG. 62A shows a symbolic representation of an amplifier such as shown in FIG. 62 as employed in other figures of the drawing.

FIG. 63 shows a single stage transistor amplifier which is arranged for unity gain but has phase inversion with the result that this amplifier acts as a phase inverter and changes pulses of one characteristic to pulses of the opposite characteristic. Such amplifiers are employed to repeat and invert pulses of short duration in some circuits. In other circuits they are employed to repeat and invert pulses or signaling conditions of relatively long duration.

When such an amplifier is employed to repeat and invert the pulses of short duration input 63–02 is employed. Likewise, the output 63–12 will be employed when such output pulses are required. In this case the amplifier is usually arranged so that steady state input potentials and pulses of negative polarity do not appreciably change the output. The output potential remains at substantially a low or ground potential at this time. However, when positive pulses are applied to the input lead 63–02 negative pulses are obtained from the output conductor 63–12.

When it is desired to employ such a phase inverting amplifier to invert pulses of long duration or steady state signals, then the input 63–01 and the output 63–11 are employed. Under these circumstances the bias on the input conductor 63–01 may be adjusted so that the transistor is normally conducting average current, whereupon the output conductor 63–11 will be maintained at an average output voltage. When the input voltage is reduced, that is, becomes less, or more negative, the output voltage on conductor 63–11 increases. When the input voltage is increased the output voltage correspondingly decreases. The gain of such amplifiers is usually near unity so that magnitudes of the input and output voltages are substantially the same.

Of course, the direct-current level of the input and output voltages may be altered by suitably shifting all of the battery and ground connections of the amplifier as may be desired. In addition, input pulses may be applied to either type of input connection as described above and output pulses of reversed polarity obtained from either or both of the different types of output circuits.

Such amplifiers may be arranged to respond to negative input pulses and cause positive output pulses by merely changing the bias on the base of the transistor or by changing the polarity of the batteries and the type of transistor employed.

Such phase inverting amplifiers are sometimes necessary, where it is desired to change a signal of one polarity to a signal of opposite polarity to properly actuate the circuits. Such devices may be employed as part of the matching circuits as described herein.

FIG. 63A shows the symbolic representation of the inverting amplifier of the type shown in FIG. 63.

FIG. 64 shows a typical bistable circuit comprising two transistors commonly called the flip-flop circuit. The arrangement shown in FIG. 64 is an example of the type of flip-flop represented in FIG. 64A and in the various figures of the detailed showing of the exemplary embodiment of this invention described herein. The transistors employed are of the p-n-p junction type or point contact n-type, although the circuits may be readily modified so n-p-n junction type or point contact p-type transistors may also be employed when desired. The flip-flop circuit is shown to have two input leads, 64–10 and 64–11. The input lead 64–10 is the set "0" or reset lead and 64–11 is the set "1" lead. The flip-flop circuit of FIG. 64 is arranged so that one or the other of the transistors 64–14 and 64–15 is always conducting and the other nonconducting. Whichever transistor is conducting at any instant of time, remains conducting until the circuit is set or reset. Assume, for example, that the transistor 64–14 is conducting; as a result, its base is held near ground potential due to the emitter base junction and this in turn causes the collector of the transistor 64–14 to be held at a relatively low potential. Likewise, the collector current of the transistor 64–14 causes a large potential drop across the collector resistor 64–18, which in turn, is coupled through the coupling network 64–17 to the base of the transistor 64–15; as a result, the transistor 64–15 remains cut off. Consequently, only a very small current flows through the collector resistor 64–19. Thus a relatively high positive output voltage is supplied to the "0" output lead 64–12 due to the large voltage drop across the collector resistor 64–18 and only a very low positive voltage is applied to the "1" output conductor 64–13. With the flip-flop of FIG. 64 set in this condition, it is sometimes said to be set in its "0" state.

If now a positive pulse or positive potential is applied to the set "1" input lead 64–11, this voltage is coupled to the base of the transistor 64–14 and interrupts emitter current flowing through this transistor. As a result, collector current is interrupted which in turn reduces the collector voltage. This reduced voltage is coupled to the base of the transistor 64–15 thus, tending to increase the emitter current and in turn the collector current. As a result, the collector voltage of transistor 64–15 rises in potential, i.e. becomes more positive, and applies a still higher positive potential to the base of the transistor 64–14. The above process is then repeated so that upon application of a positive set one to conductor 64–11, transistor 64–14 is turned off and the transistor 64–15 turned on in a very short interval of time in the order of microseconds or a fraction thereof. As a result, the voltage of the collector of transistor 64–15 rises and applies a high positive output voltage to one output conductor 64–13, while the voltage of the collector 64–14 falls and applies a relatively low or negative voltage to the "0" output conductor 64–12. Thereafter, the flip-flop will remain in the condition described until a positive voltage is applied to the reset or set "0" conductor 64–10. This time the action of the circuit is substantially the same except that now transistor 64–15 is turned off and transistor 64–14 again becomes conductive with the result that a high positive voltage is then applied to the "0" output voltage conductor 64–12 while a low or negative voltage is applied to the "1" output conductor 64–13.

When power is first applied to such a flip-flop circuit, either side will initially become conductive after which the circuit operates as described above. When it is desired to have a circuit in a predetermined condition at the start of operation, a relay key or other type of switch may be employed to apply positive voltage to either input conductor 64–10 or 64–11 to insure that the circuit is set either in its "0" state or "1" state. The circuit may also be arranged so that power is initially applied in a predetermined manner to insure that a predetermined transistor always starts to conduct first.

In the following description, it is assumed that all of the flip-flops are initially set in their "0" state unless it appears otherwise and it is assumed that these flip-flops may be readily set in a "0" state by means of keys, relays, or other types of switches which may be either manually or automatically actuated.

FIG. 65 shows a binary counter stage which is constructed much the same as the flip-flop of FIG. 64. The binary counter stage of FIG. 65 represents a typical binary counter stage which may be employed in combination with other elements of the exemplary embodiment of this invention described herein. The binary counter stage shown in FIG. 65 comprises two similar p-n-p junction transistors or two n-type point contact transistors. When desired the binary counter circuit of FIG. 65 may be readily modified to use n-p-n junction transistors or p-type point contact transistors. This binary counter stage also includes a set "0" or reset lead or a set "1" or set lead. Positive potential applied to these leads causes binary counter stage to be set in the "0" or "1" state with one transistor conducting and the other transistor nonconducting. The binary counter stage shown in FIG. 65 is also provided with a "0" and a "1" output conductor. A high positive voltage is applied to the "0" output conductor and a low or negative voltage output is applied to the "1" output conductor when the binary counter is set in its "0" state with the transistor 65–14 conducting and the transistor 65–15 nonconducting. Likewise, when the binary counter stage is set in its "1" state a high positive voltage is applied to its "1" output and the low or negative voltage is applied to the "0" output due to the operation of the circuits therein in a manner similar to that described above with reference to FIG. 64. The binary counter stage shown in FIG. 65 has an additional input conductor 65–20 having a condenser in series therewith and extending to the diodes 65–21 and 65–22. This counter stage is so arranged that if the binary counter is set in its "0" state as is assumed above, the diode 65–22 is biased beyond cutoff since the collector of the transistor 65–14 is more positive than the collector supply voltage due to the drop across the collector resistor 65–18. On the other hand, the diode 65–21 is not so biased because the voltage drop across resistor 65–19 is very small. Consequently, upon the application of a positive pulse to the counter input lead 65–20, diode 65–21 becomes conducting and transmits a positive pulse to the collector of the off transistor 65–15 and through the cross coupling network 65–16 to the base of the "on" transistor 65–14 with the result that this transistor becomes nonconducting and the transistor 65–15 then becomes conducting, at which time the binary counter is said to be in its "1" state. Upon the application of the next positive pulse to the conductor 65–20, the opposite diode becomes conducting and applies a positive voltage to the base of the transistor 65–15, whereupon this transistor becomes nonconducting and the transistor 65–14 becomes conducting. As a result a positive pulse is applied to output conductor 65–30 which may extend to the input conductor 65–20 of a succeeding binary counter stage. Thus, the counter stage responds to each input pulse on the counting conductor 65–20 and reverses its state in response thereof. In addition, pulses are applied to the output conductor 65–30 for every two pulses received on the input conductor 65–20.

Here again either transistor 65–15 or 65–14 may become conductive when power is initiated to the system. When it is desired to have these stages set in a predetermined state when power is applied to the system, a manual or other type of switch will be operated to momentarily apply positive voltage to the input reset or set "0" or to the set "1" input lead and thus setting the binary counter to its desired state. While all of these keys or switches have not been shown, it is assumed that they are provided or needed in the various binary counter stages employed in the exemplary embodiment of this invention. It is also assumed, unless it appears otherwise, that all of the binary counter switches employed in the exemplary embodiment are initially set in their "0" state by means of key or other type of switch which may be manually or automatically actuated in order to properly condition these circuits for responding to calls through the exemplary switching system described in detail herein.

FIG. 65A shows the symbolic representation of a binary counter stage such as shown in FIG. 65 and this representation as shown in FIG. 65A is employed in many of the figures or drawings of the exemplary embodiment described herein.

Two additional gating networks are employed in the exemplary embodiment described herein. One is the auxiliary read-out network shown in FIG. 66. This network comprises two transistor gates 66–10 and 66–11 and two diodes 66–12 and 66–14 as well as a delay device or network 66–13. When it is desired to actuate such an auxiliary read-out network positive potential is applied to the No. 1 input conductor which conditions the transistor gates for conduction. It is noted that the transistor gates 66–10 and 66–11 are N-P-N junction types or P type point contact transistors. When positive potential is applied to the base of these transistors they are then in condition for conduction in response to positive pulses received over input conductors 2 or 3. If a circle or "1" had been previously stored in the cathode ray tube in the position scanned, then positive potential will be applied to input conductor 2 as well as to the "1" input conductor to cause the transistor gate 66–10 to become conductive. On the other hand, if a dot had been previously stored in this spot or position then positive potential is applied to the No. 3 input conductor of this gate and in turn transmitted through the gate 66–11. If a "1" had been recorded and the transistor gate 66–10 becomes conducting positive potential is transmitted to the emitter of this gate and over the output lead 4 to cause a "1" or circle to be rewritten in the cathode ray storage tube. Positive voltage is also transmitted through the diode 66–12 and the delay device network or 66–13 and then through diode 66–14 to the output conductor 5 and directly to the output conductor 6 thus designated 66–15.

If, however, the transistor 66–11 becomes conducting, then a positive pulse is transmitted through the delay device or network 66–13 and then through the diode 66–14 or over conductor 66–15.

The positive output on conductor 4 may be employed for other circuit control functions in addition to rewriting a circle as described above. The output on the conductors 5 and 6 are employed for control of various interconnecting circuits as is described hereinafter.

FIG. 66A shows a symbolic representation of the auxiliary read-out network of FIG. 66 as employed in various figures of the drawing of the exemplary embodiment of this invention set forth in detail herein.

FIG. 67 shows an auxiliary writing network employed for controlling the recording of information in the electrostatic cathode ray storage tubes. This network comprises a pair of diodes 67–10 and 67–11 arranged as an "and" circuit. Diodes 67–12 and 67–13 are arranged as a second "and" circuit and the diode 67–14 as a decoupling diode. Delay device or network 67–15 is also provided. When positive potential is applied to both the input conductors 1 and 2, positive potential is applied to the delay device or network 67–15 and after the delay interval of this device is applied to the No. 5 output conductor to further advance the operations of the circuit. If in addition to positive pulses being applied to a No. 1 and No. 2 input a positive voltage or pulse is also applied to the No. 3 conductor of this network, then positive voltage will be transmitted out through decoupling diode 67–14 over the output conductor No. 4 which voltage is usually employed to cause the cathode ray tube to write a circle in the spot to which the beam thereof is directed.

FIG. 67A shows a symbolic representation of the auxiliary writing network of FIG. 67 employed in other figures of the drawing of the exemplary embodiment of this invention described in detail herein.

A number of delay devices or networks are employed in the system and are usually represented in the drawing by the combination of the series resistance and a shunt condenser. The delay devices or networks employed in the system are not limited to the use of the series resistance and a shunt condenser. Instead, they may include any suitable type of delay device or network including transmission lines, flip-flops, complicated delay networks and the like. As shown in certain instances in the drawing the delay device may comprise a means for delaying the beginning of a pulse but include means for not delaying the termination thereof. Some of the delay devices such as transmission lines or transmission networks may delay both the beginning and termination of a pulse equally long and they may be arranged to apply the pulse to the output terminals, each after the pulse has terminated on its input terminals. Others of the delay devices may require that the input pulse continue to be applied to its input terminals for a pulse to be obtained on the output terminals. These delay devices may also include suitable amplifiers, threshold devices and suitable pulse and wave shaping equipment. Since the devices are known in the prior art reference is made to such prior art for further details of their construction and operation.

Figure 5:
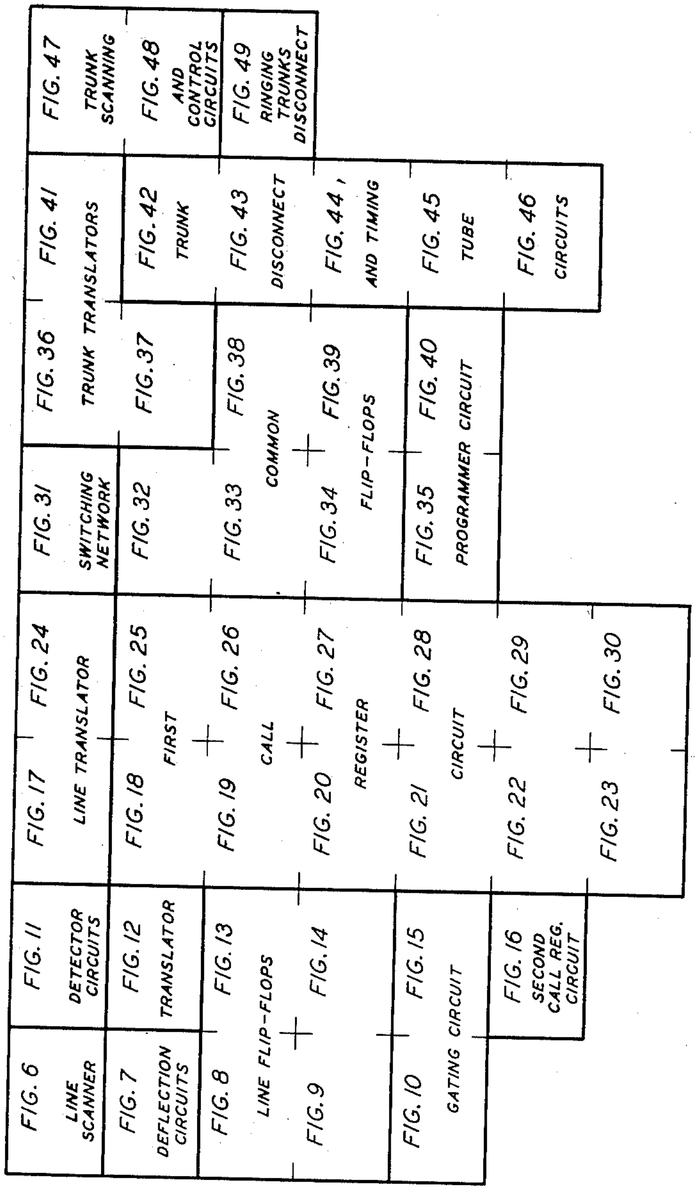
FIG. 5 shows a manner in which FIGS. 6 through 49, inclusive are positioned adjacent one another to show the circuit details of the various elements of an exemplary switching system embodying this invention.

FIGS. 6 through 49, inclusive, when arranged as shown in FIG. 5, show the circuit details of an exemplary embodiment of this invention.

Figure 6:
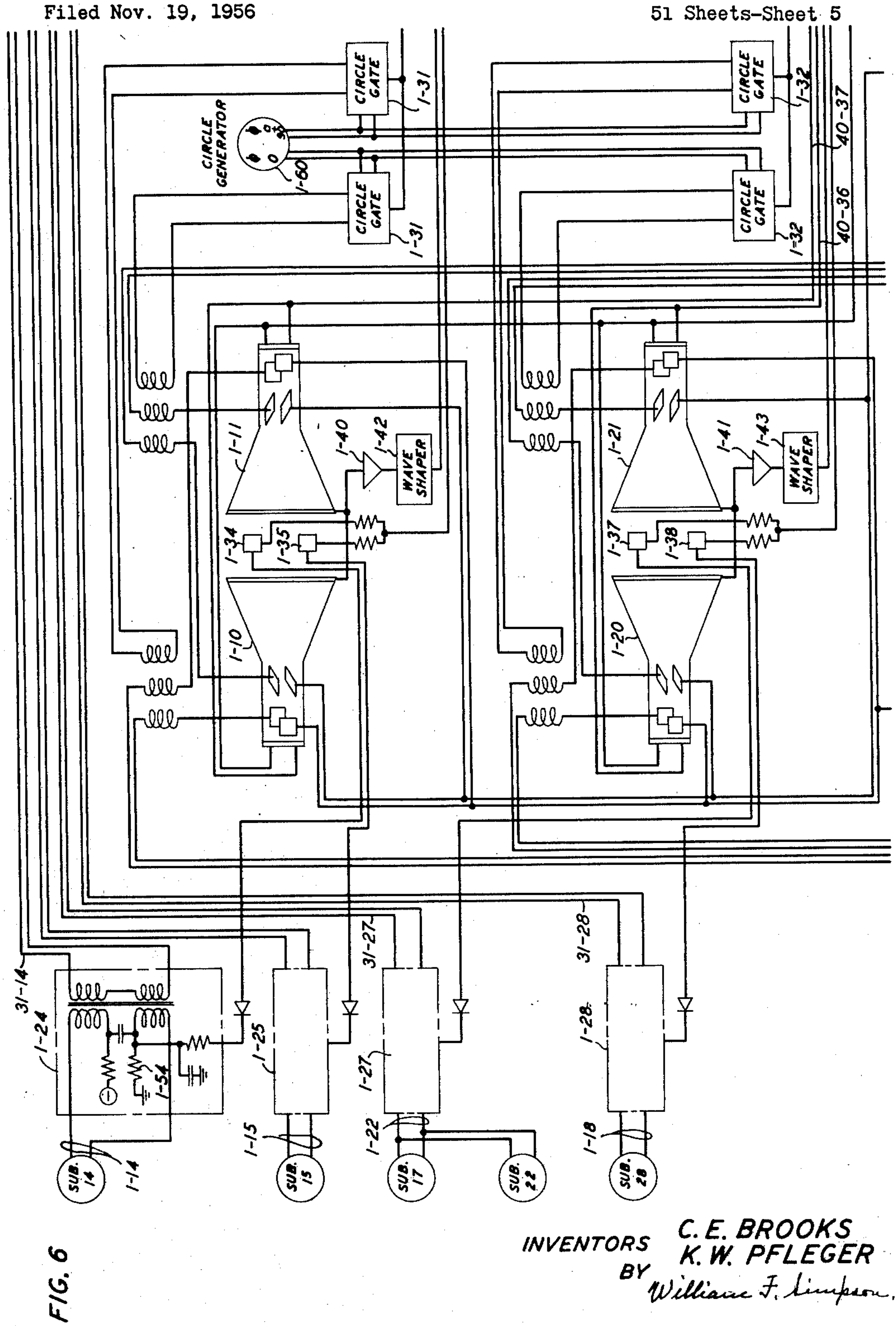
FIG. 6 shows the subscriber line terminations and scanning tubes.

FIG. 6 shows a plurality of subscribers' stations and subscribers' lines as well as the line terminations at the central switching station. FIG. 6 also shows a plurality of scanning and line storage tubes together with certain control and gate circuits.

Figure 7:
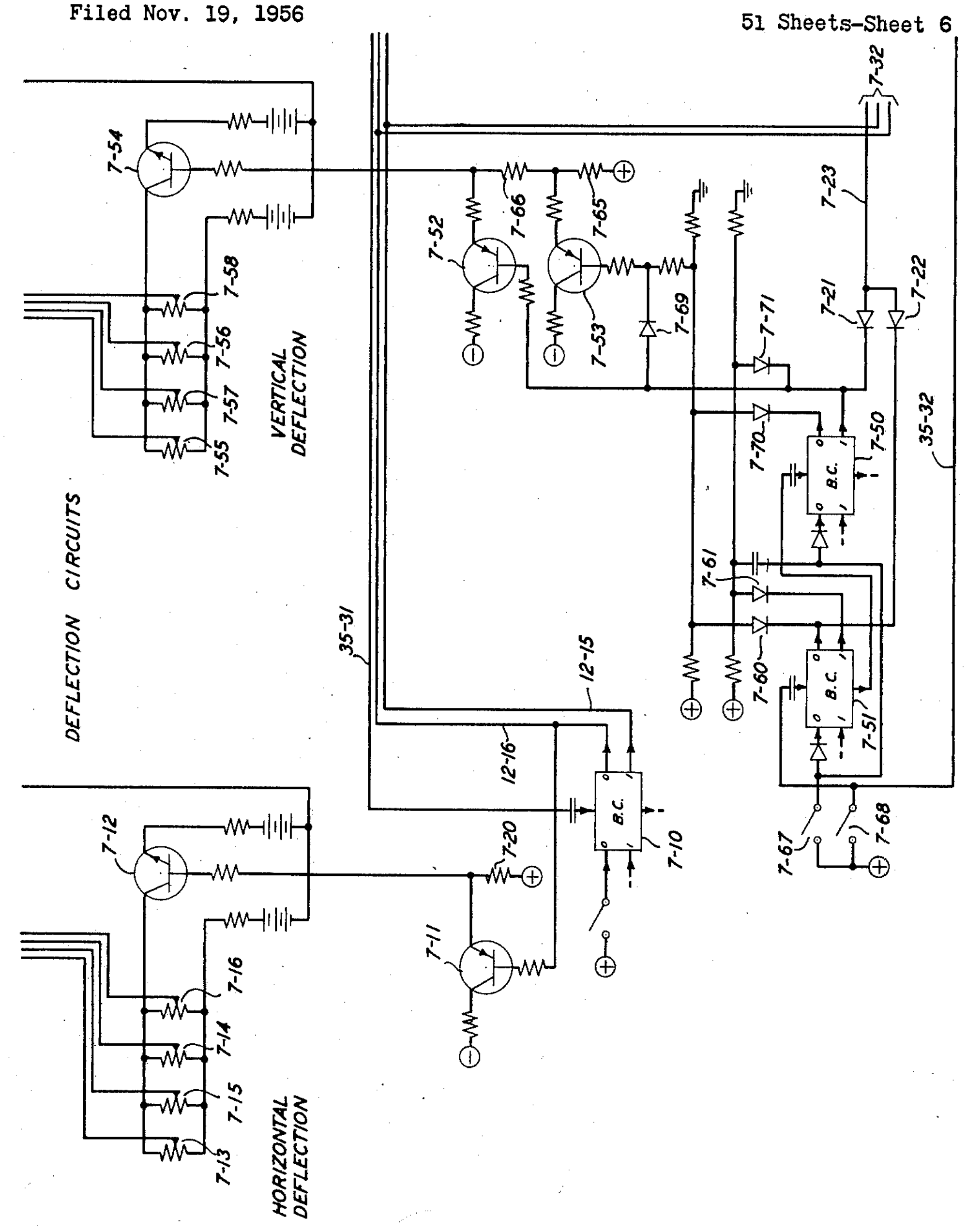
FIG. 7 shows the deflection control circuits for the scanning tubes of FIG. 6.

FIG. 7 shows deflection control circuits for controlling the deflection of the beam in the line scanning and storage tubes of FIG. 6. The deflection control circuits of FIG. 7 are in turn controlled by the timing and program circuits of FIGS. 35 and 40.

Figure 11:
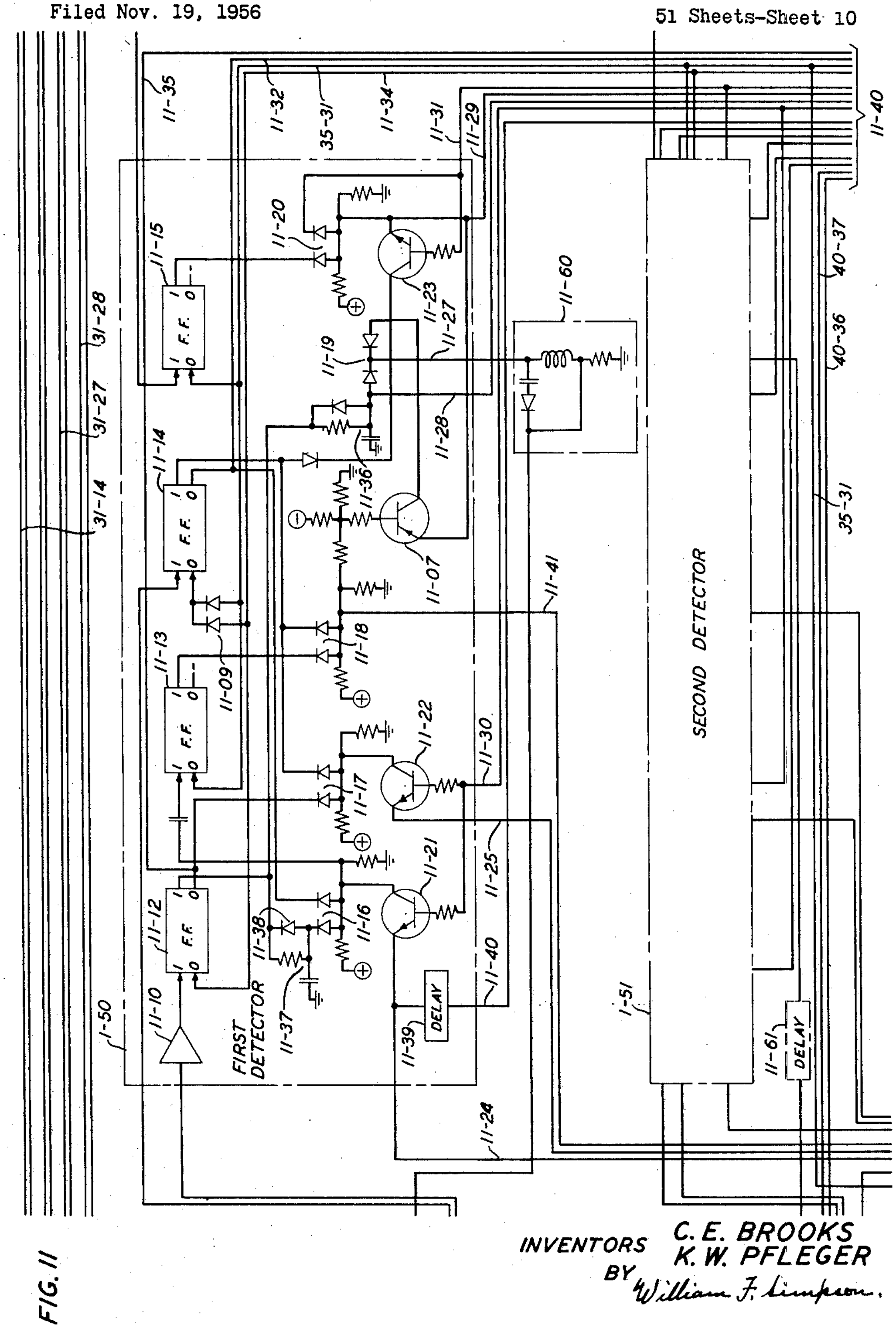
FIG. 11 shows detecting circuits for cooperating with the line scanning tubes of FIG. 6 to recognize changes in signaling conditions received from the subscribers' line.

FIG. 11 shows details on an exemplary embodiment of a detector circuit which responds to the output of the scanning and storage tubes of FIG. 6. The output of these detector circuits in turn is transmitted through the translator circuit FIG. 12. The translator circuits of FIG. 12 are in addition controlled from the deflection circuits shown in FIG. 7 so that the identity of lines from which signals are received by the detector circuits of FIG. 11 may be determined.

Figure 8:
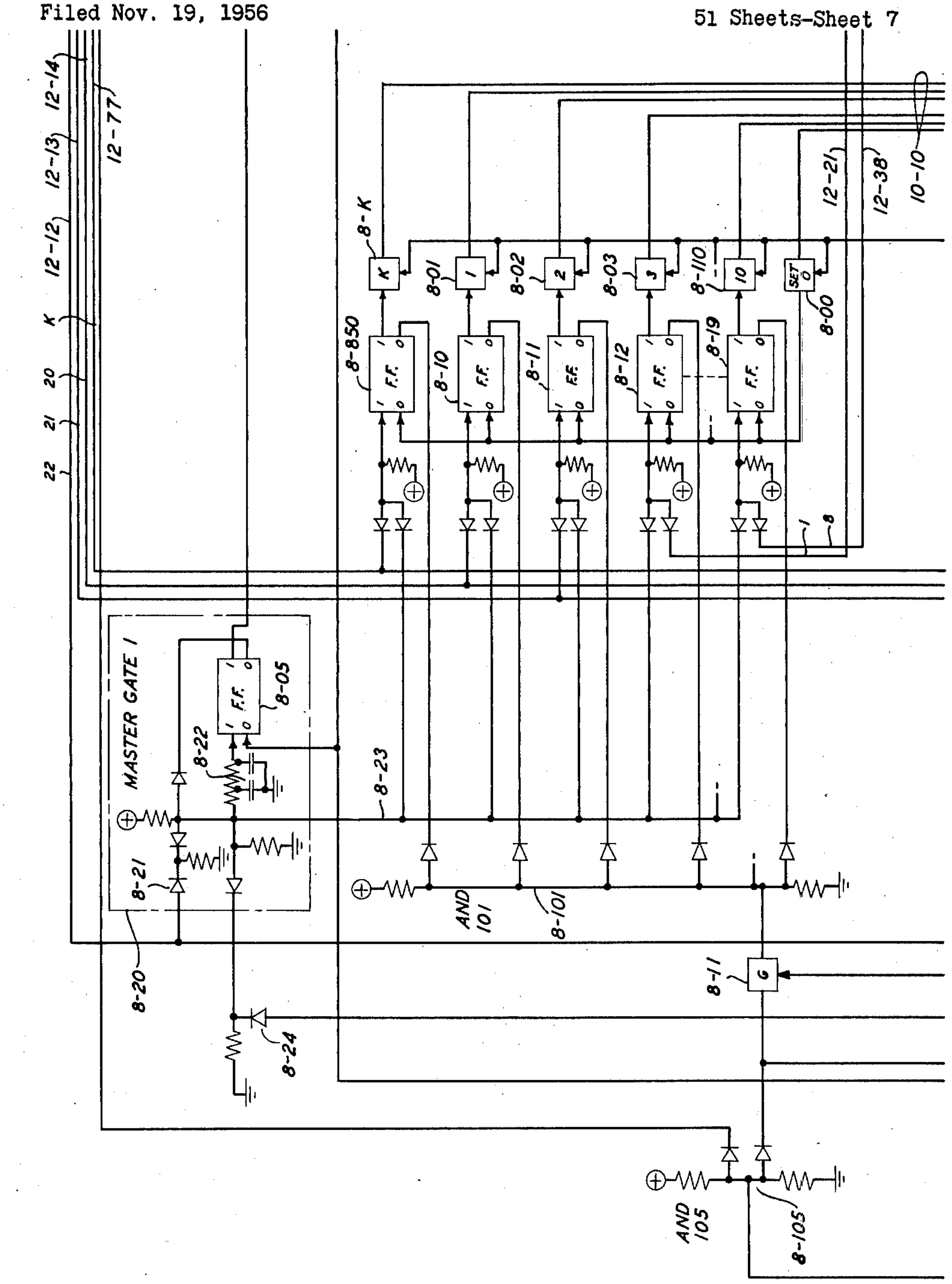
FIG. 8 shows one set of line flip-flops for temporarily storing indicia of changes in signal conditions, together with indicia identifying the line from which the change in signaling conditions has been received.
Figure 9:
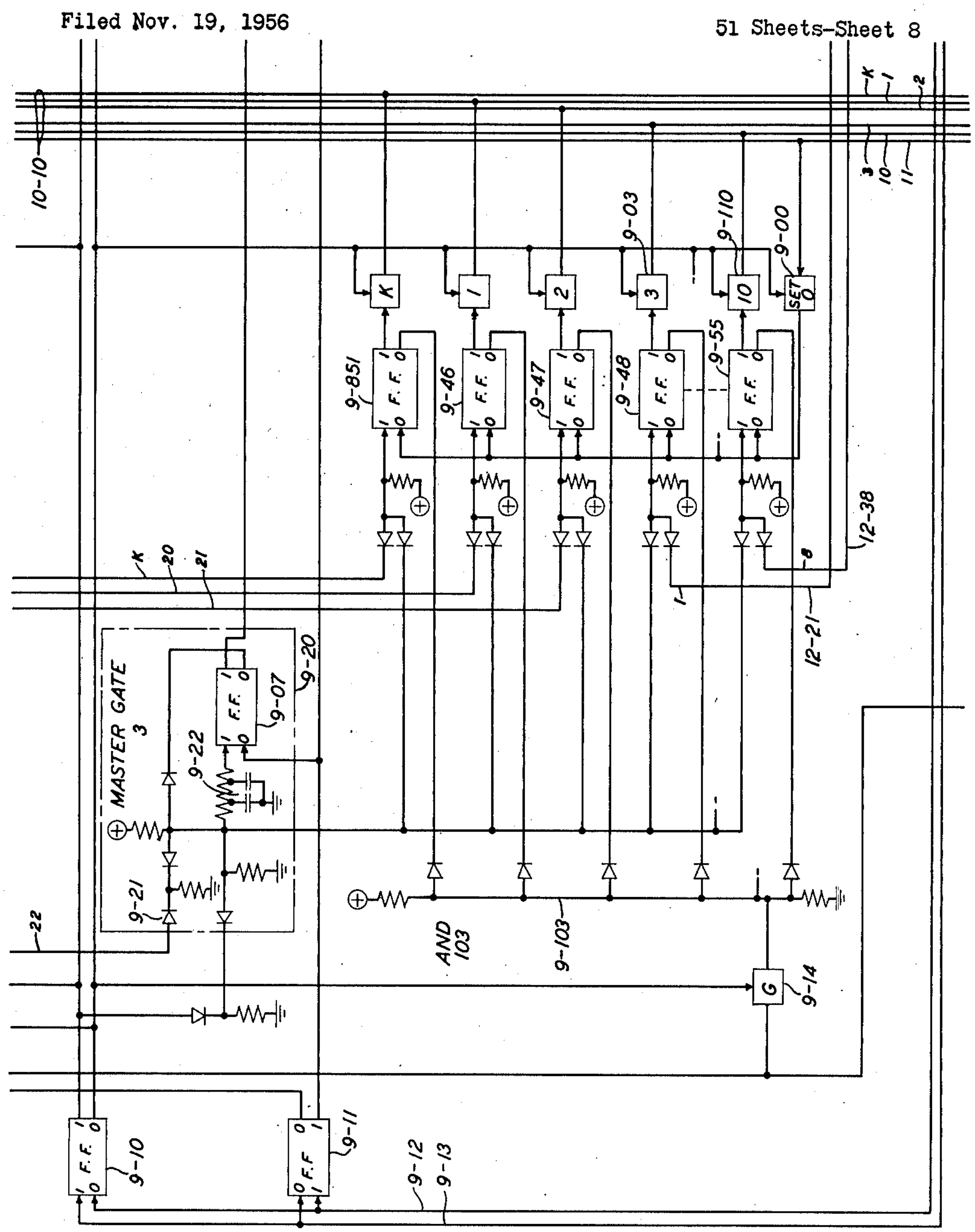
FIG. 9 shows another set of line flip-flops.

FIGS. 8, 9, 13 and 14 show a plurality of temporary storage devices, which in the exemplary embodiment described here in detail, comprise transistor bistable or flip-flop circuits. These temporary storage circuits or flip-flops are divided into two main groups, one group comprising the circuits of FIGS. 8 and 13 and the second group comprising the circuits of FIGS. 9 and 14. Each of these main groups of flip-flop circuits comprise a plurality of subgroups, one of which is shown in FIG. 8, another in FIG. 13 of the first group; and one is shown in FIG. 9 and another in FIG. 14 of the second main group.

Figure 12:
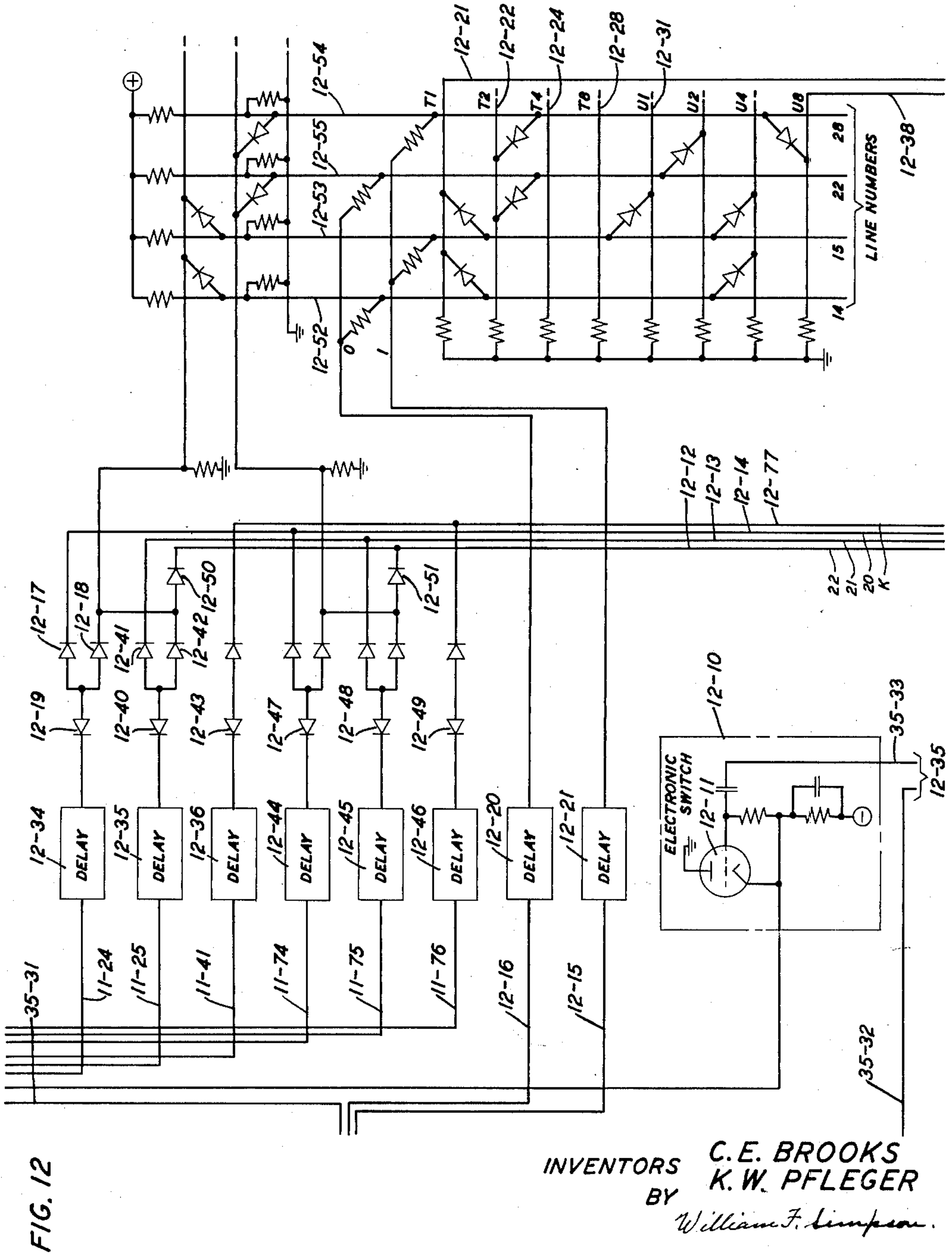
FIG. 12 shows translating means for adding line identifications to representations of changes in signaling conditions.

Each of the subgroups of flip-flop circuits are provided with a control gate which are interconnected in such a manner that during one scanning cycle signals transmitted from the detector circuits of FIG. 11 through the translator of FIG. 12 are stored on the flip-flop circuits of one main group and during the next cycle of operations corresponding signals are stored upon the flip-flop circuits of the second main group of line flip-flop circuits. In addition, during the time signals are being stored in one line of flip-flop circuits, signals previously stored in the other main group of flip-flop circuits are employed to further control the switching system or are registered in call register tubes of FIGS. 18 through 23 and 25 through 30, inclusive, or of FIG. 16.

Each of the subgroups of flip-flop circuits such as shown in FIGS. 8, 9, 13 or 14 comprises a plurality of flip-flops. Sufficient of these flip-flop circuits are provided in each subgroup for storing signals representing the identity of the respective subscribers' line circuits as well as the nature of the signals derived from such a line during the scanning cycle. In the exemplary embodiment described herein one flip-flop circuit is provided for storing a change in the signaling condition on the subscribers' line from open to closed. A second flip-flop circuit is employed to store the change in the signaling condition of the subscribers' line from closed circuit to open circuit.

A third flip-flop is employed to record the application of ringing or calling current or signals to the subscribers' line.

Another group of flip-flop circuits is employed to register the identity of the subscribers' line from which one or more of the above-identified signals has been obtained during the scanning cycle.

In the exemplary embodiment described herein the directory number of one of the subscribers' stations connected to the subscribers' line is recorded on the individual group of flip-flops together with the nature of the signaling conditions of said line. As pointed out herein output is obtained from the detector circuit of FIG. 11 only when a change in signaling condition of the subscribers' line occurs. Consequently, such signals will be applied to the individual groups of flip-flop circuits of FIGS. 8, 9, 13 or 14 only at such times.

Figure 10:
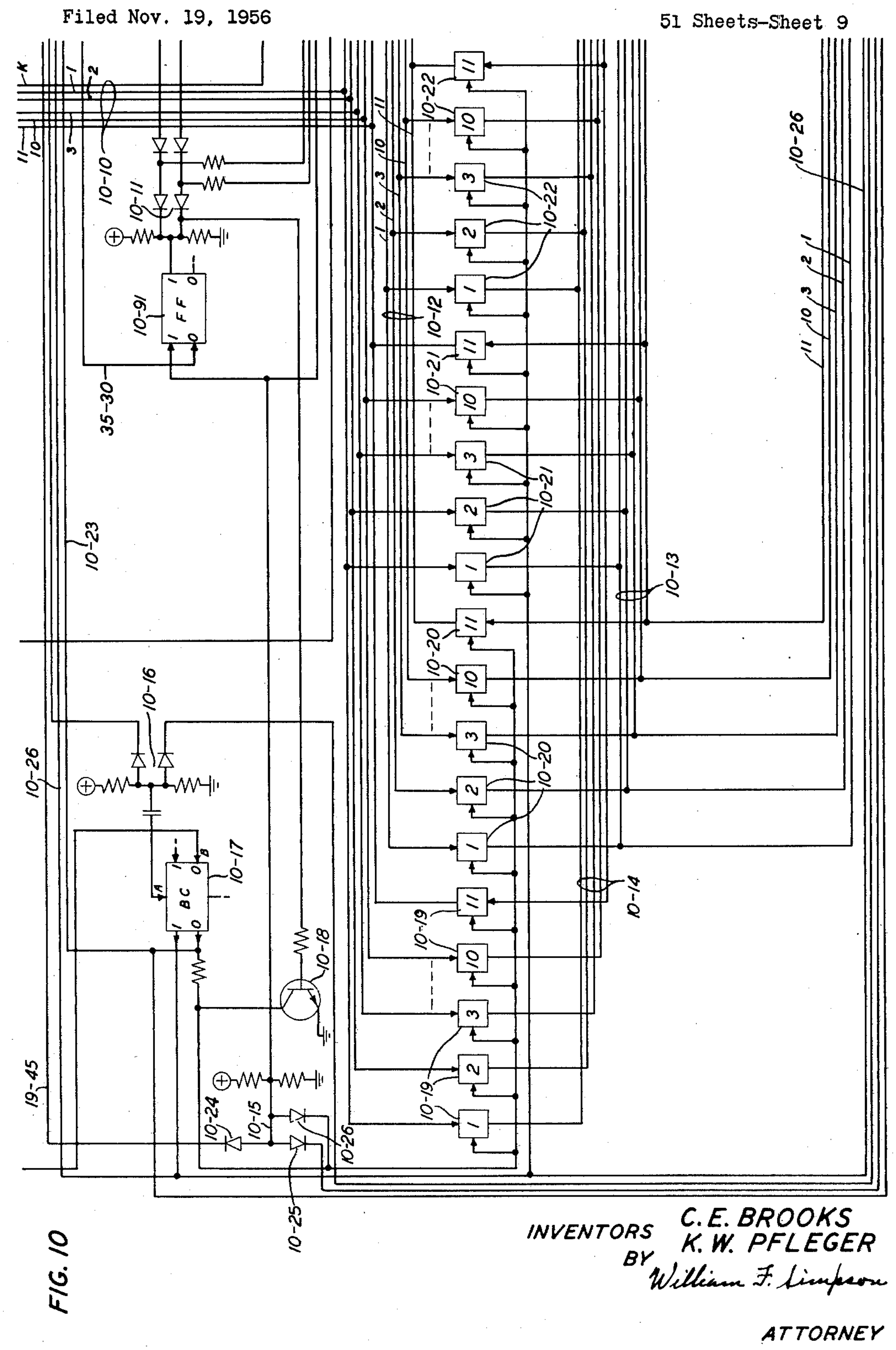
FIG. 10 shows a portion of a gating or commutating and interconnecting circuits.
Figure 14:
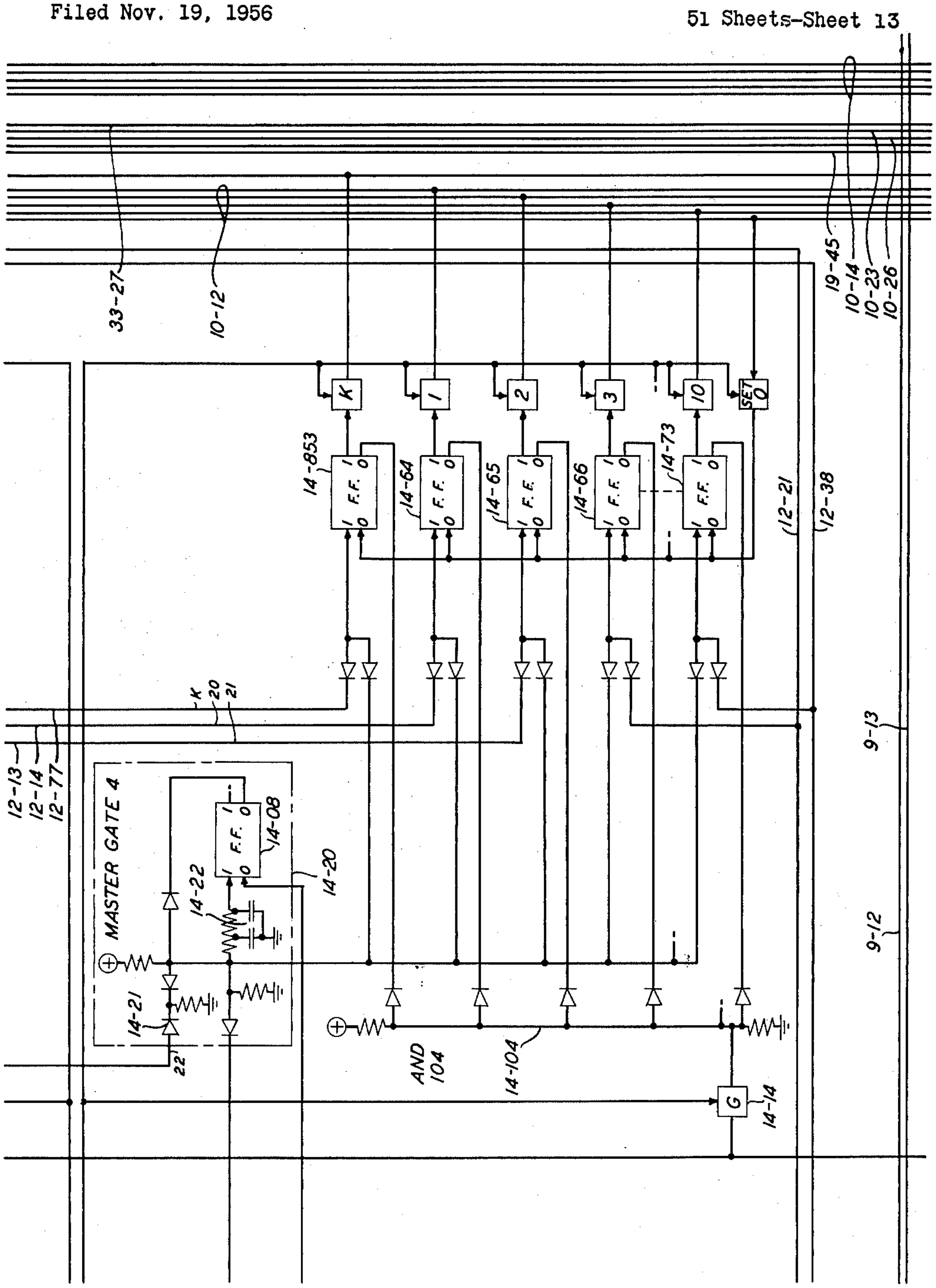
FIG. 14 shows another set of line flip-flops.
Figure 15:
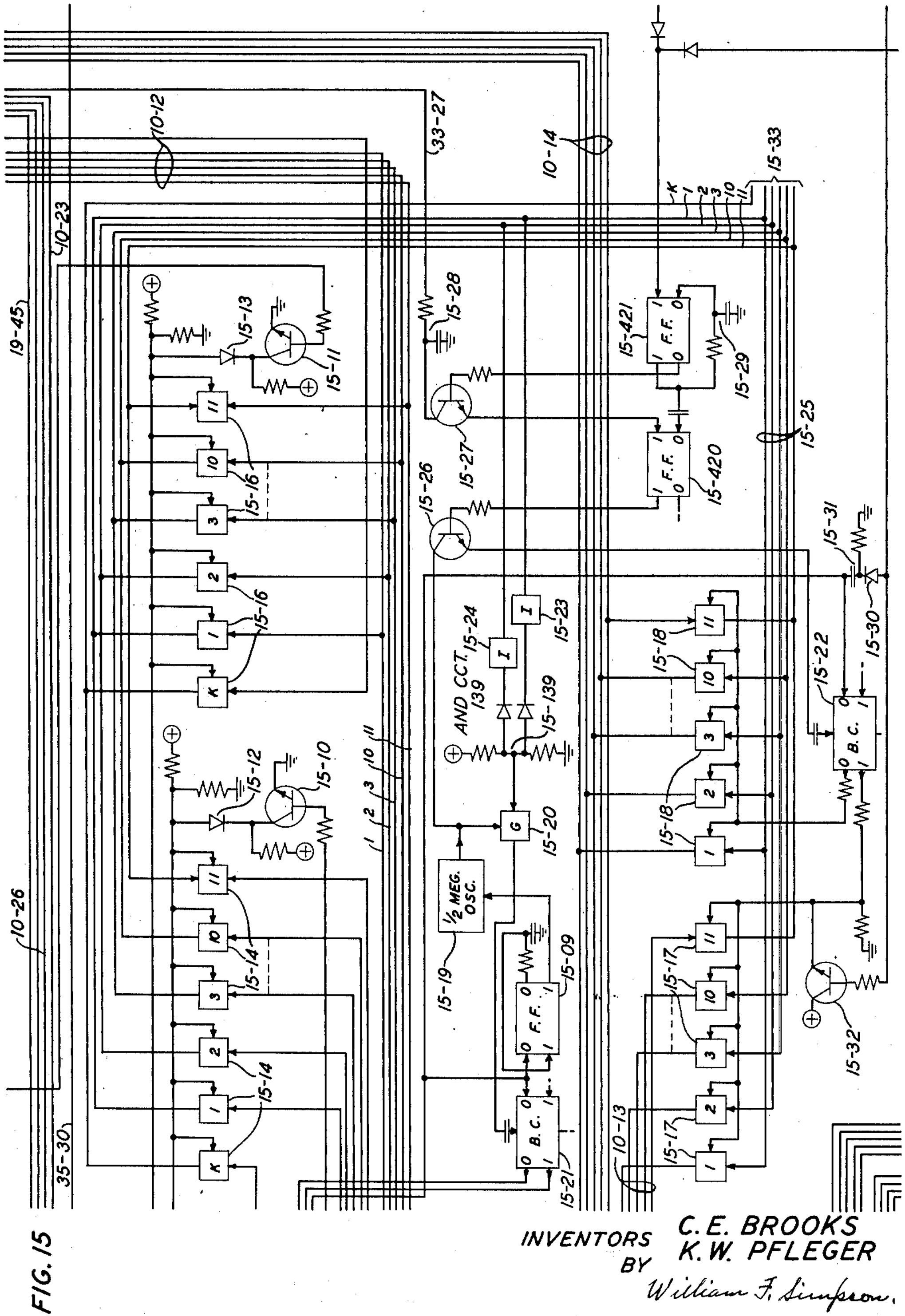
FIG. 15 shows another portion of the gating and commutating circuits shown in FIG. 10.

FIGS. 10 and 15 show gating circuits for interconnecting the various individual groups of line flip-flop circuits of FIGS. 8, 9, 13 and 14 to the call register storage tubes of FIGS. 16 and 18 or to the common flip-flop and control circuits of FIGS. 32, 33, 34, 38 and 39 as will be described hereinafter.

Figure 16:
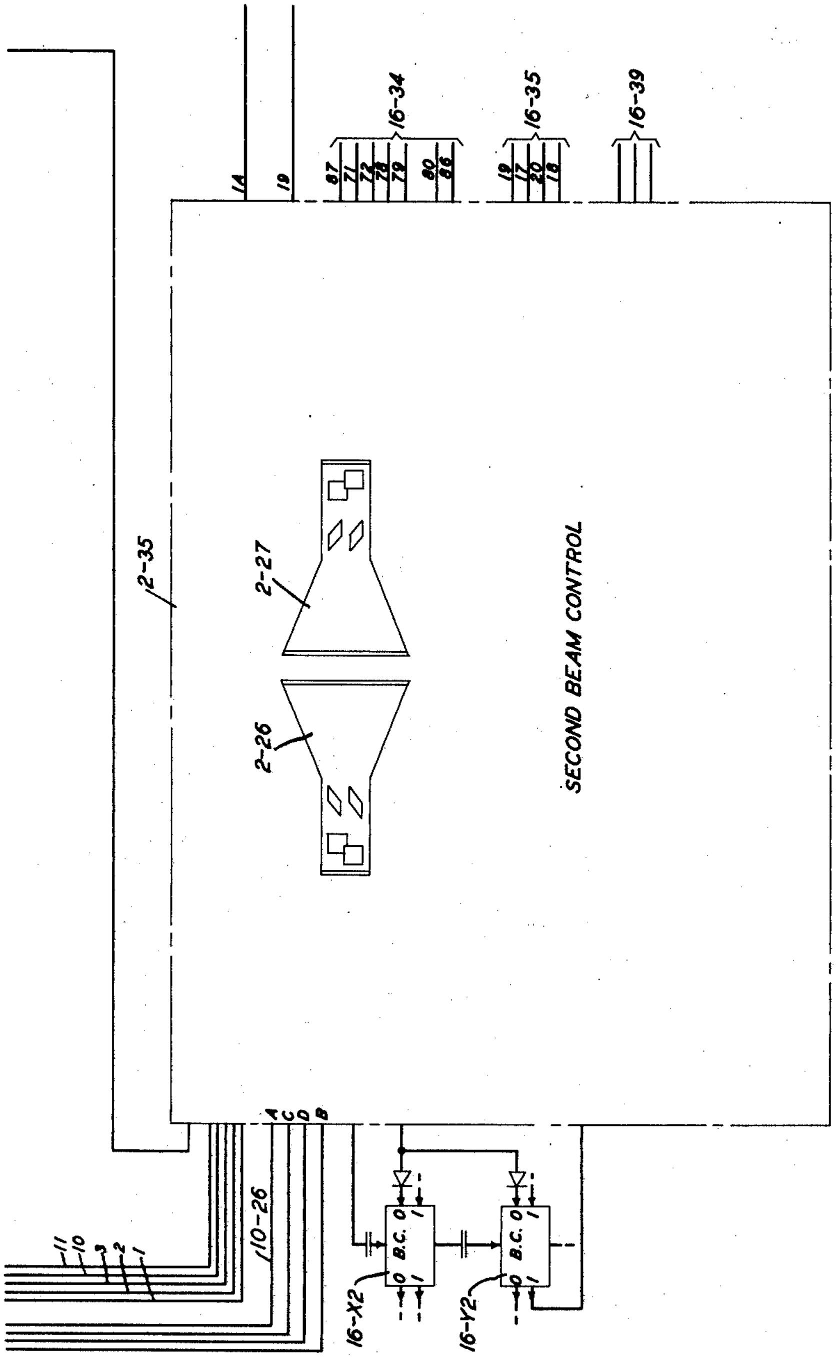
FIG. 16 shows a pair of call register tubes and the control circuits therefor which are similar to the circuits shown in detail in FIGS. 18 to 23, inclusive and FIGS. 25 through 30 inclusive.
Figure 18:
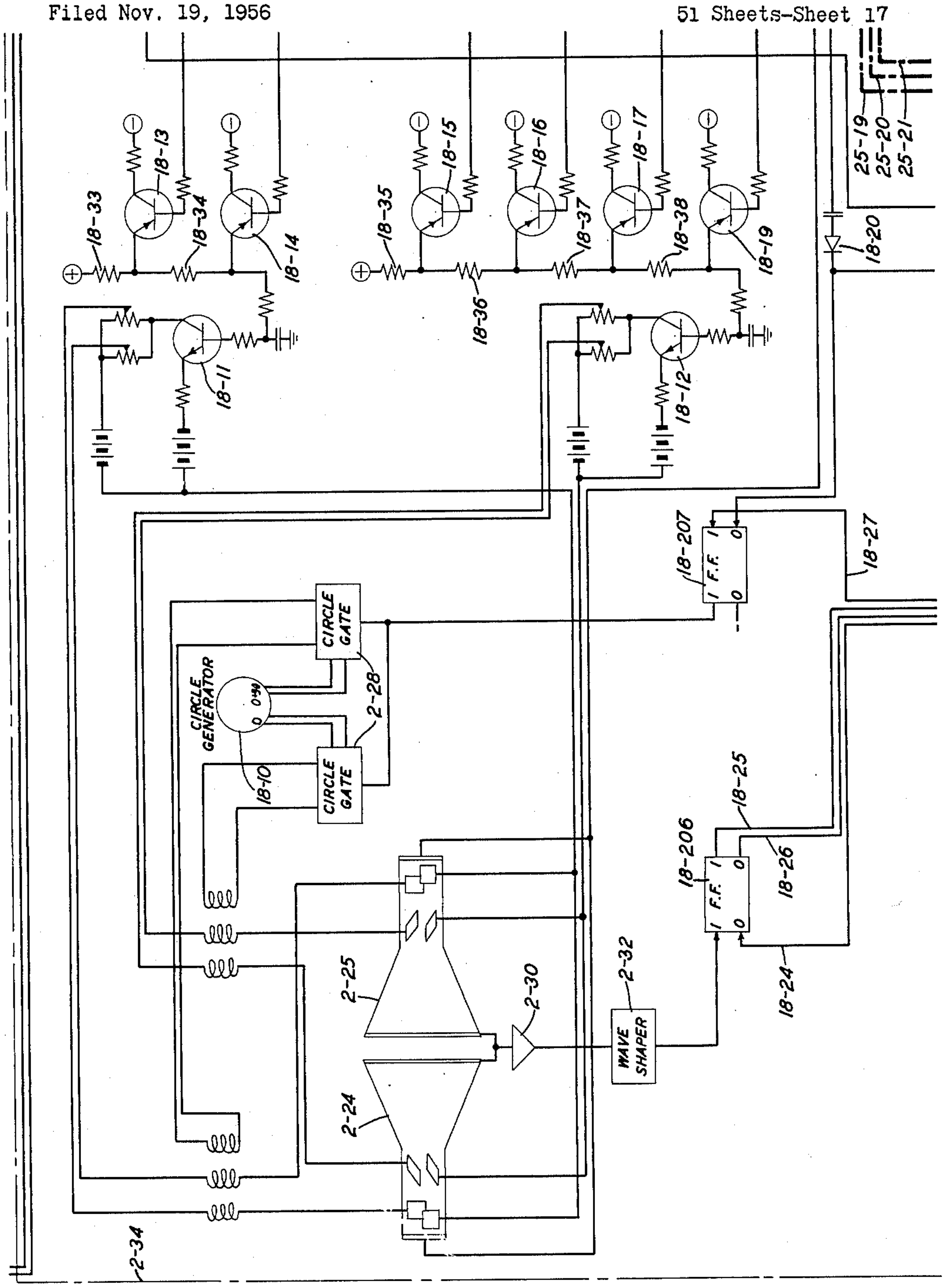
FIG. 18 shows a pair of call register tubes and a portion of the deflection control circuits therefor.
Figure 19:
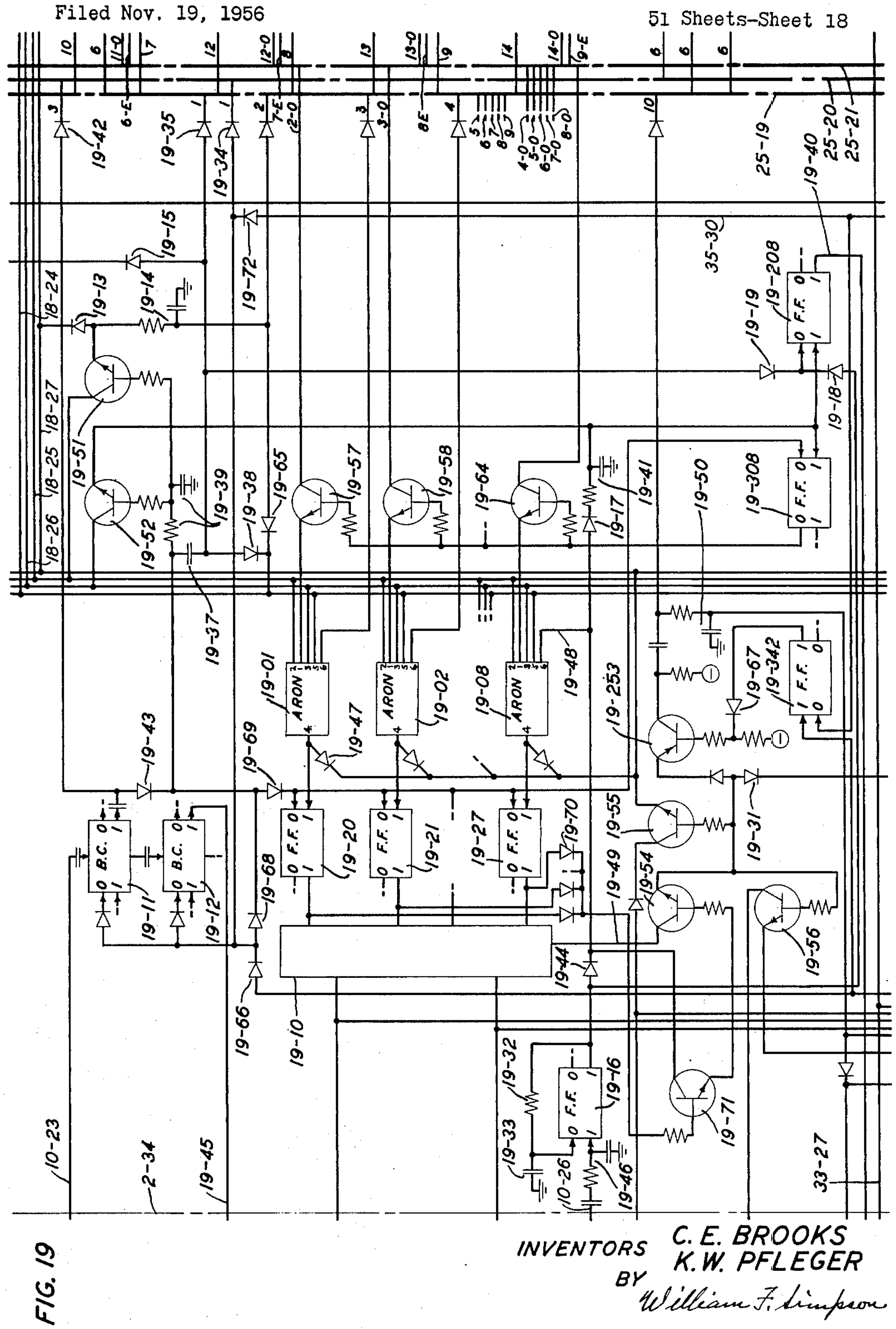
FIG. 19 shows a portion of the control circuits including the matching arrangement for the call register tubes.

FIG. 16 represents a pair of call register tubes together with control circuits therefor which are similar to the call register tubes of FIG. 18 and the control circuit therefor shown in FIGS. 19 through 23, inclusive, and FIGS. 25 through 30, inclusive. In other words two pairs of a plurality of pairs of calls registered are represented in the drawing of an exemplary embodiment of this invention described herein in detail.

Figure 17:
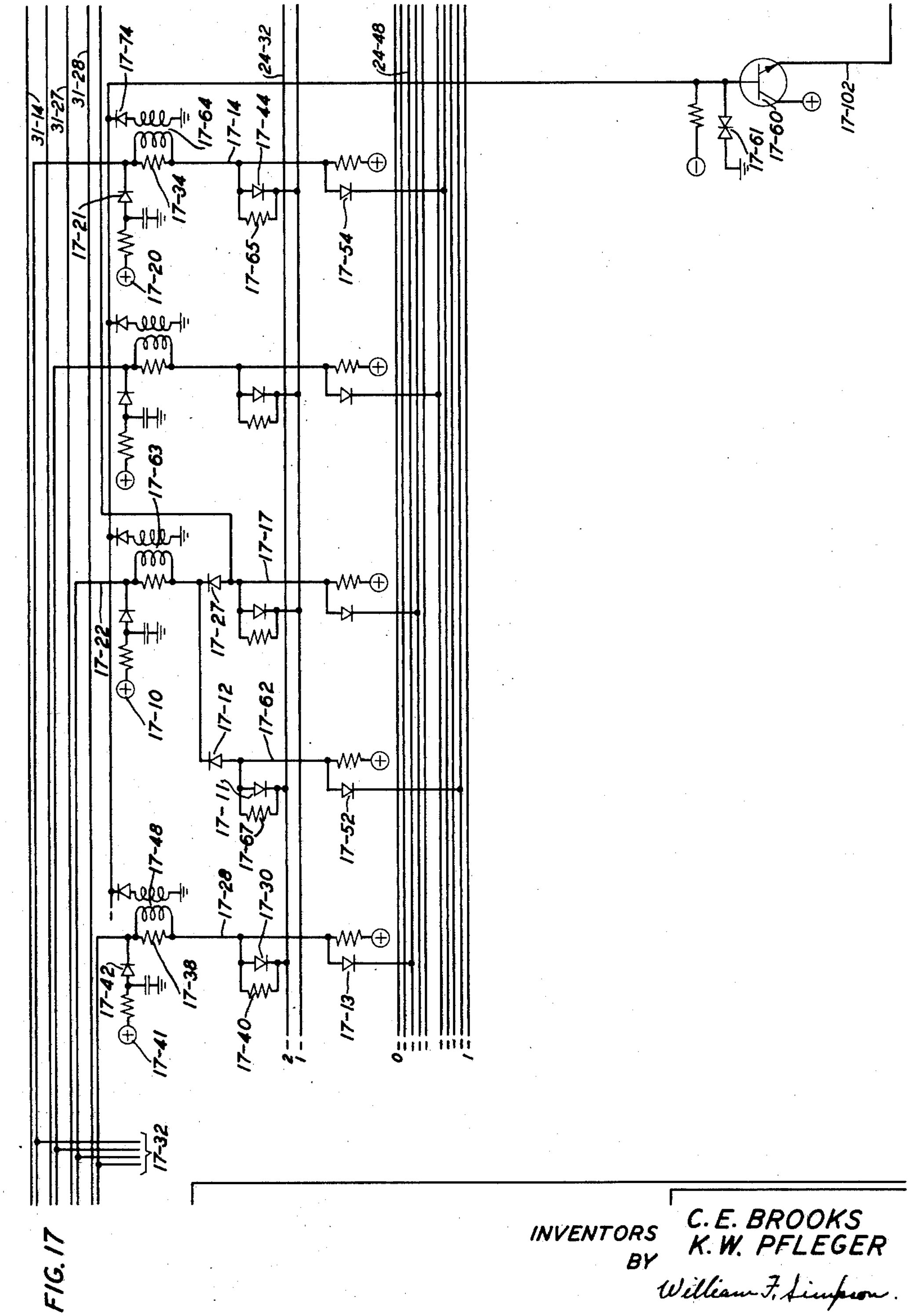
FIG. 17 shows a line number group or line translator for applying control potentials to the network side of line terminations.
Figure 24:
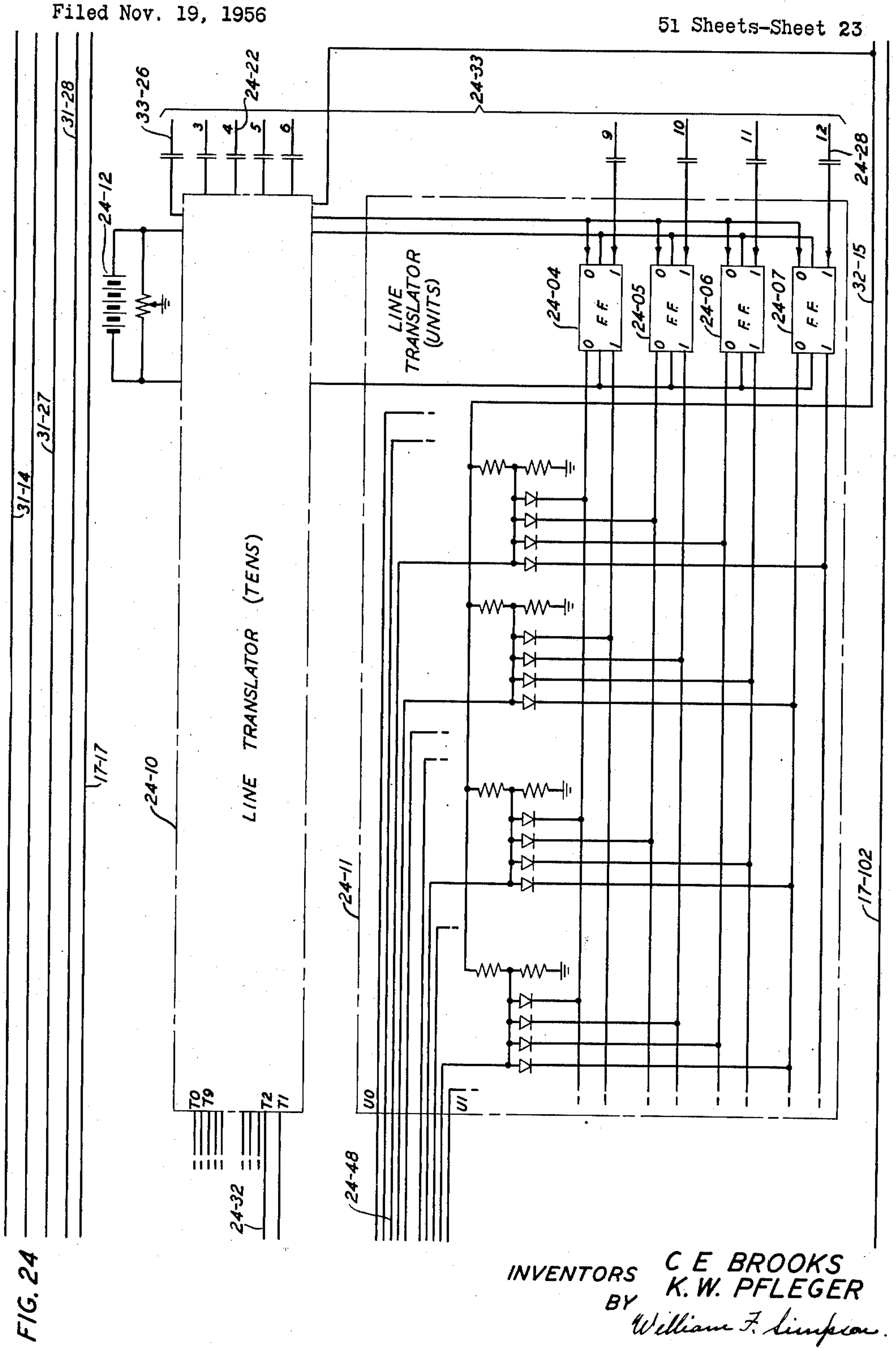
FIG. 24 shows the line translators for applying controlling potentials to the line number group of FIG. 17.

FIGS. 17 and 24 show a line translator for establishing connections between subscribers' line terminations shown in FIG. 6 and the common flip-flop circuits of FIGS. 32, 33, 34, 38 and 39.

FIGS. 18 through 23, inclusive, and 25 through 30, inclusive, show in detail one pair of call register tubes and their related control circuits.

Figure 31:
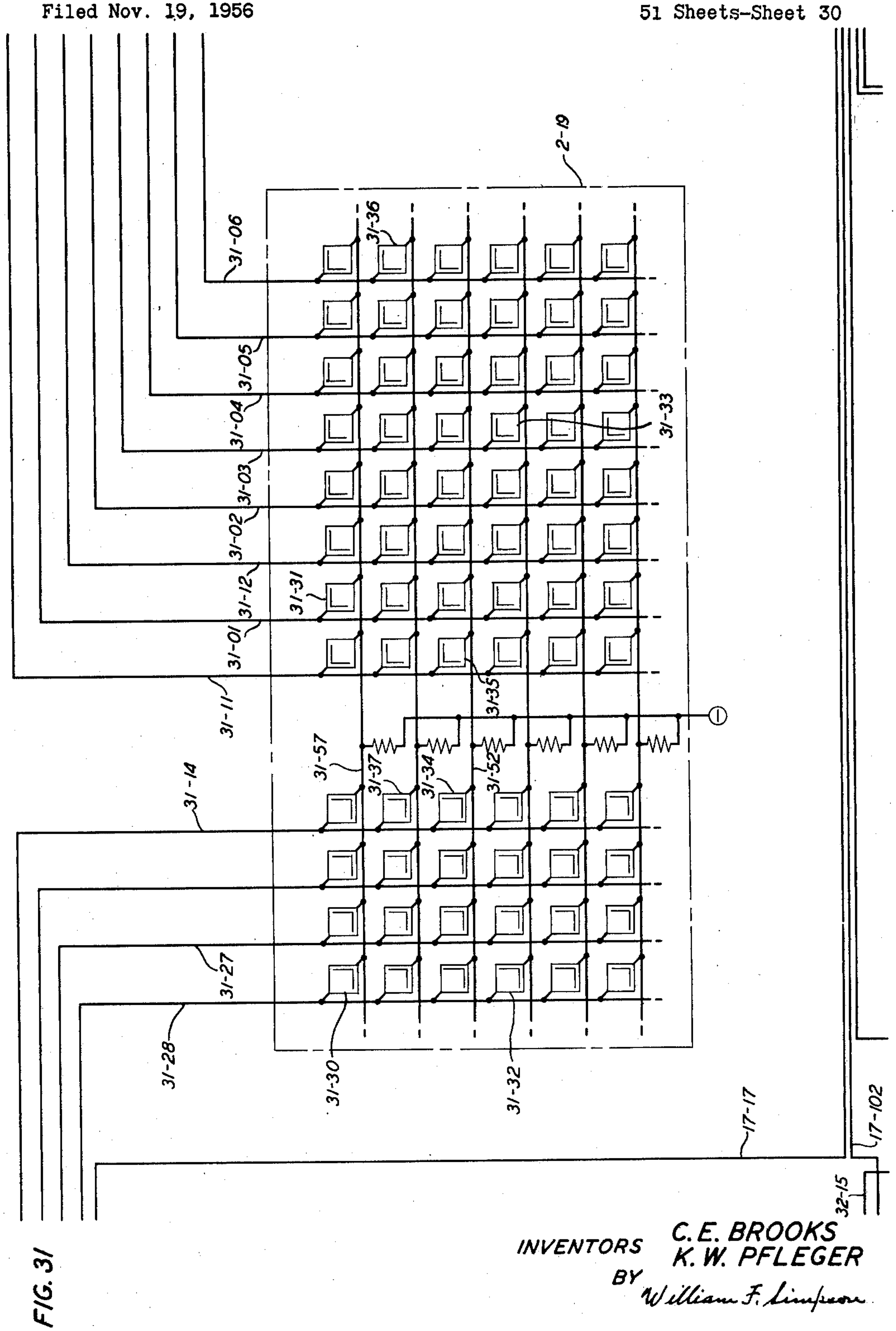
FIG. 31 shows the switching network.
Figure 32:
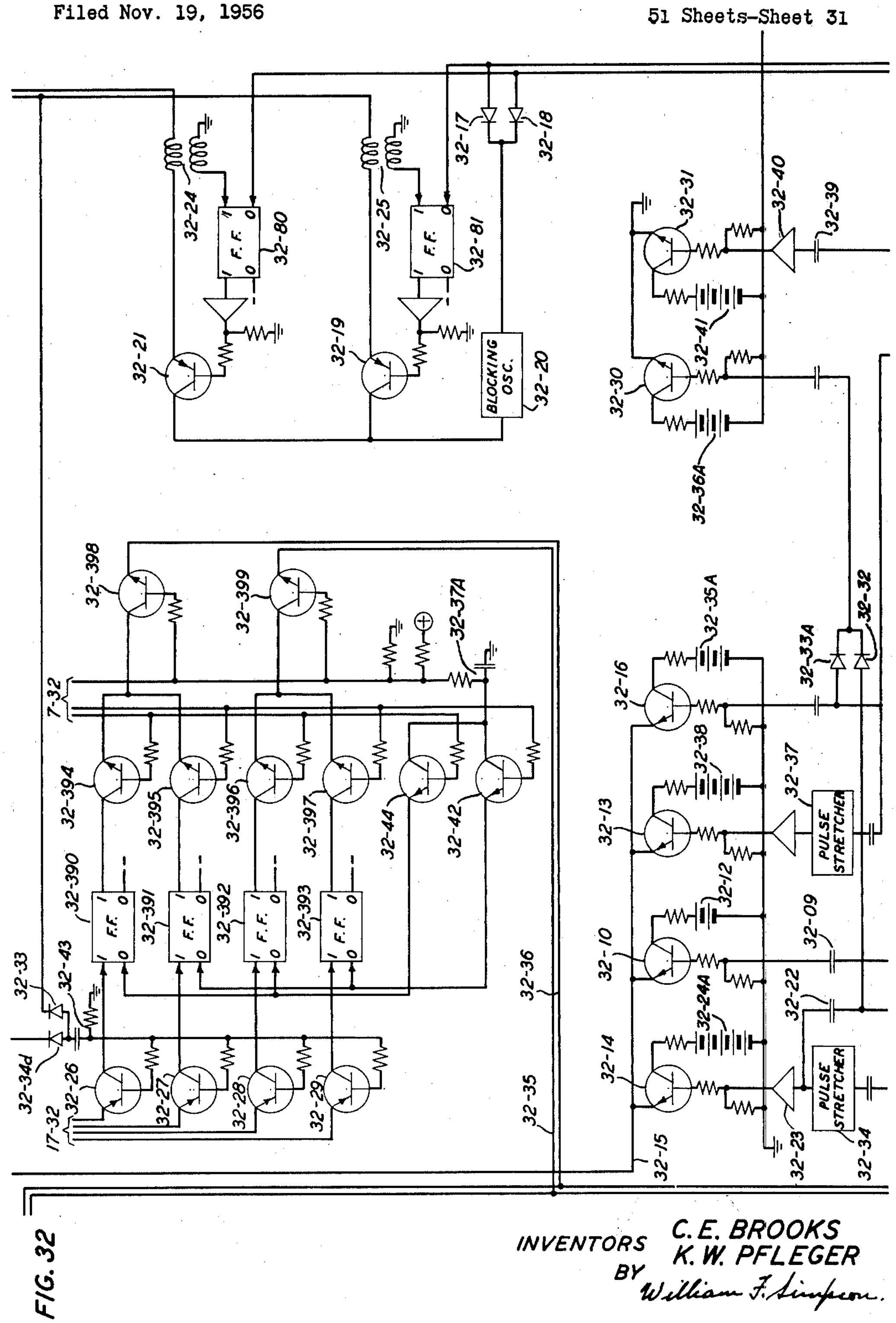
FIG. 32 shows ringing control and network control circuits.
Figure 47:
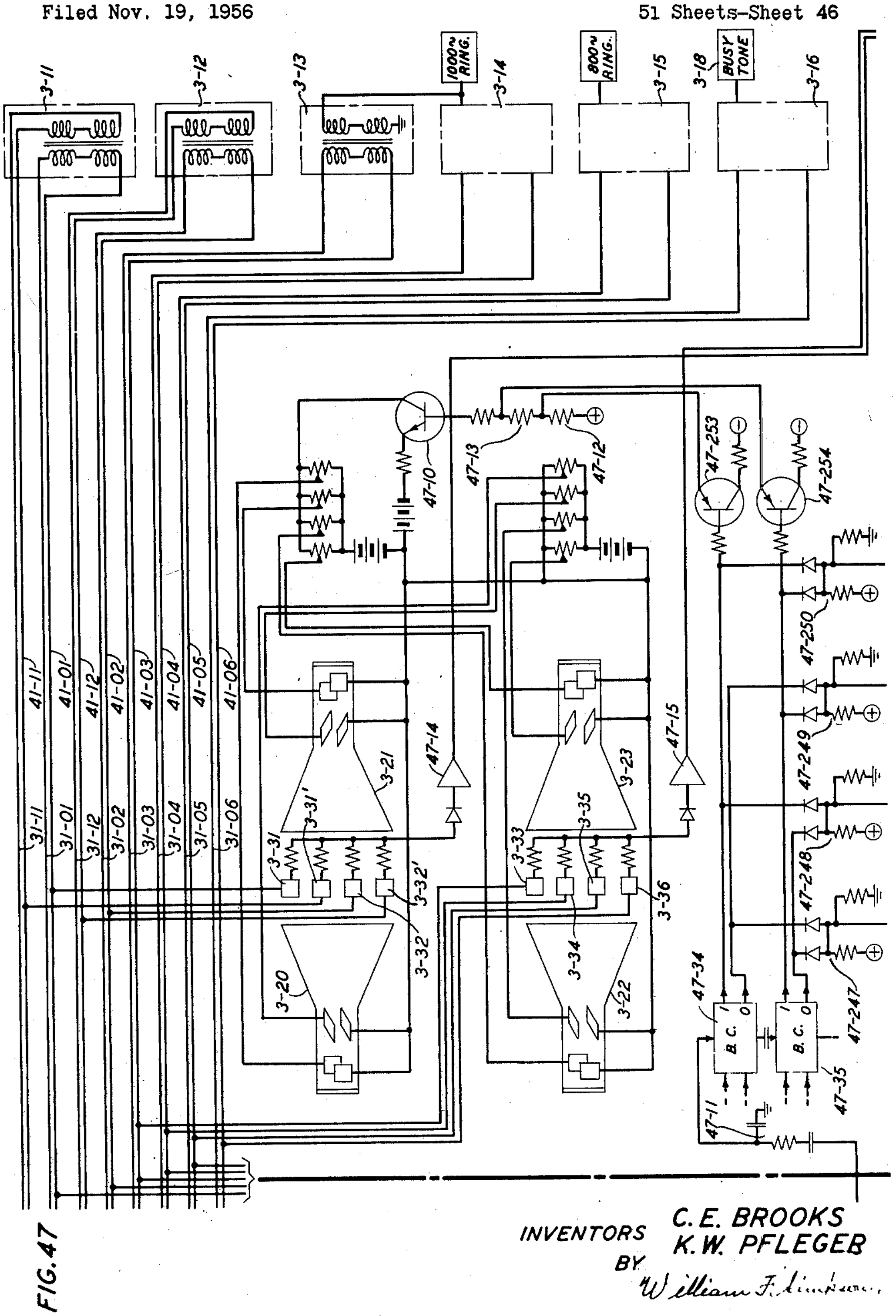
FIG. 47 shows talking, ringing and busy tone trunks and trunk scanning tubes together with the deflection control circuits therefor.

FIG. 31 shows the interconnecting network for establishing communication paths between the various subscribers' line circuits and their terminations and trunk circuits shown in FIG. 47. Thus for one subscriber to communicate with another subscriber a path is established from the line termination of that subscriber through the switching network of FIG. 31 to one of the trunk circuits shown in FIG. 44 and then from that trunk circuit again through the switching network of FIG. 31 to the line termination of the other subscriber. Interconnections are also made through the switching network shown in FIG. 31 from the busy and ringing trunks of FIG. 44 to the various subscribers' line circuits and terminations as described herein.

FIGS. 32, 33, 34, 38 and 39 show circuit details of a plurality of temporary storage gate and control circuits referred to herein as common flip-flop circuits for controlling the switching network of FIG. 31 as well as others of the circuits described herein.

Figure 35:
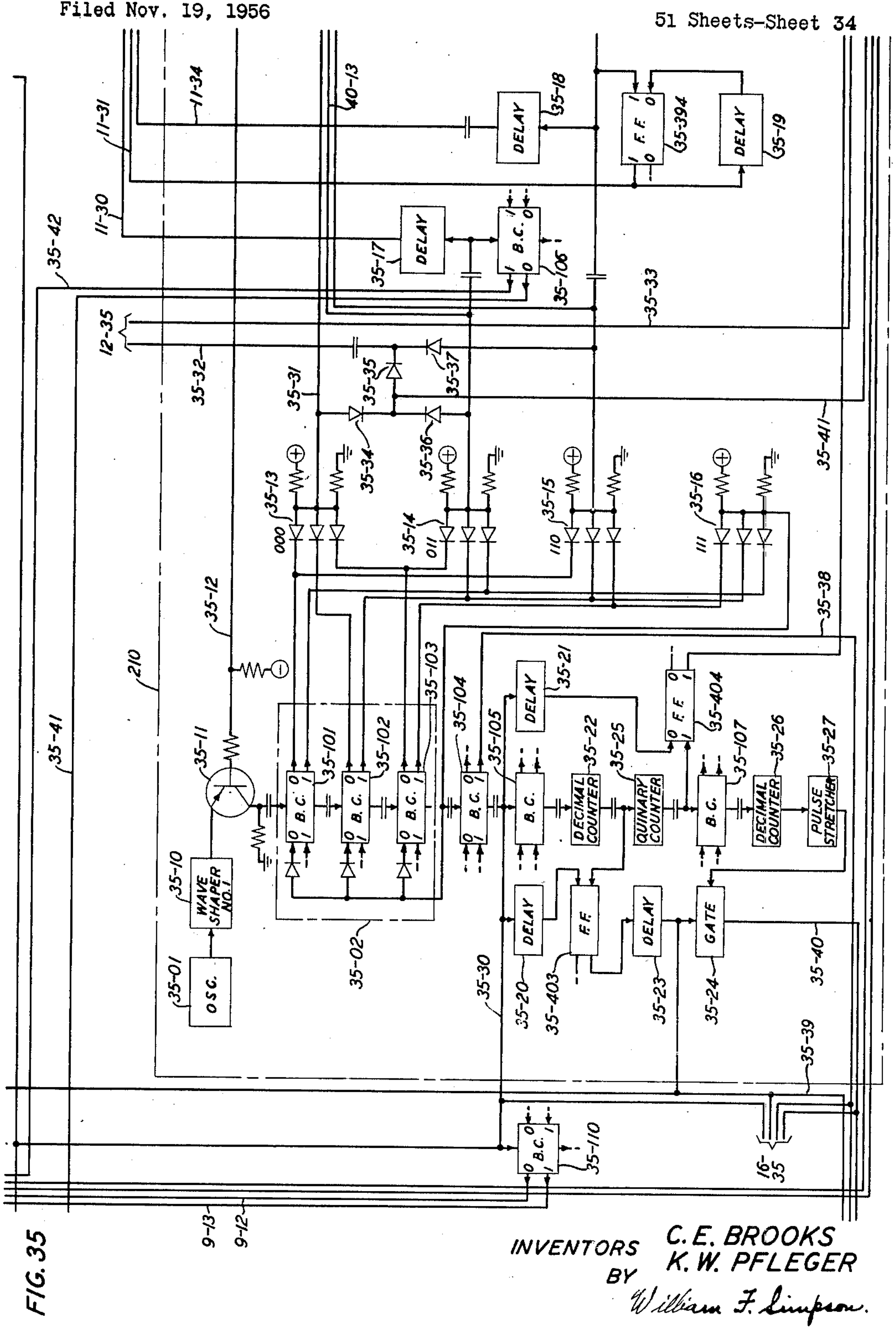
FIG. 35 shows a part of the programming circuits.
Figure 36:
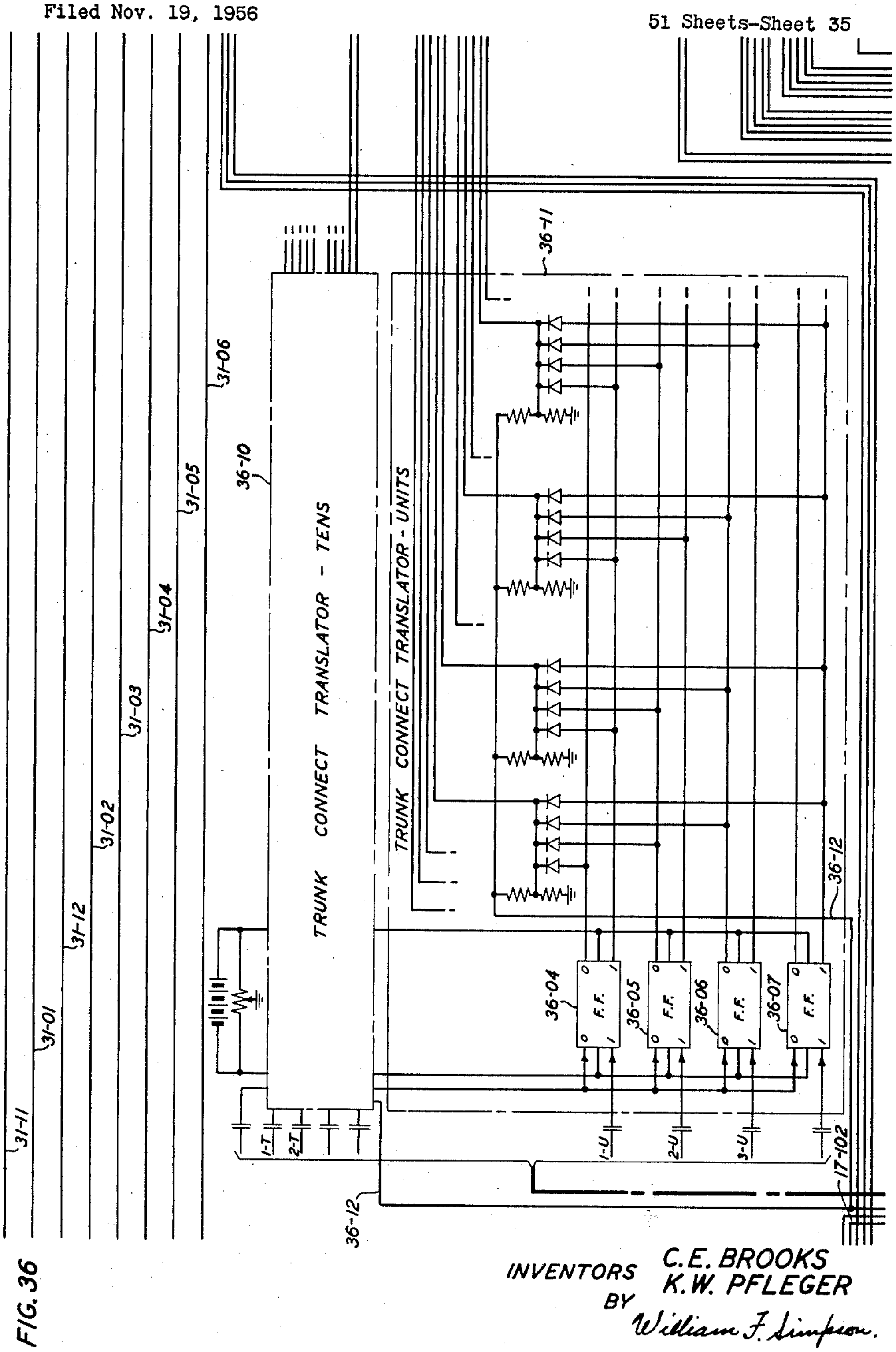
FIG. 36 shows the trunk connect translators.
Figure 37:
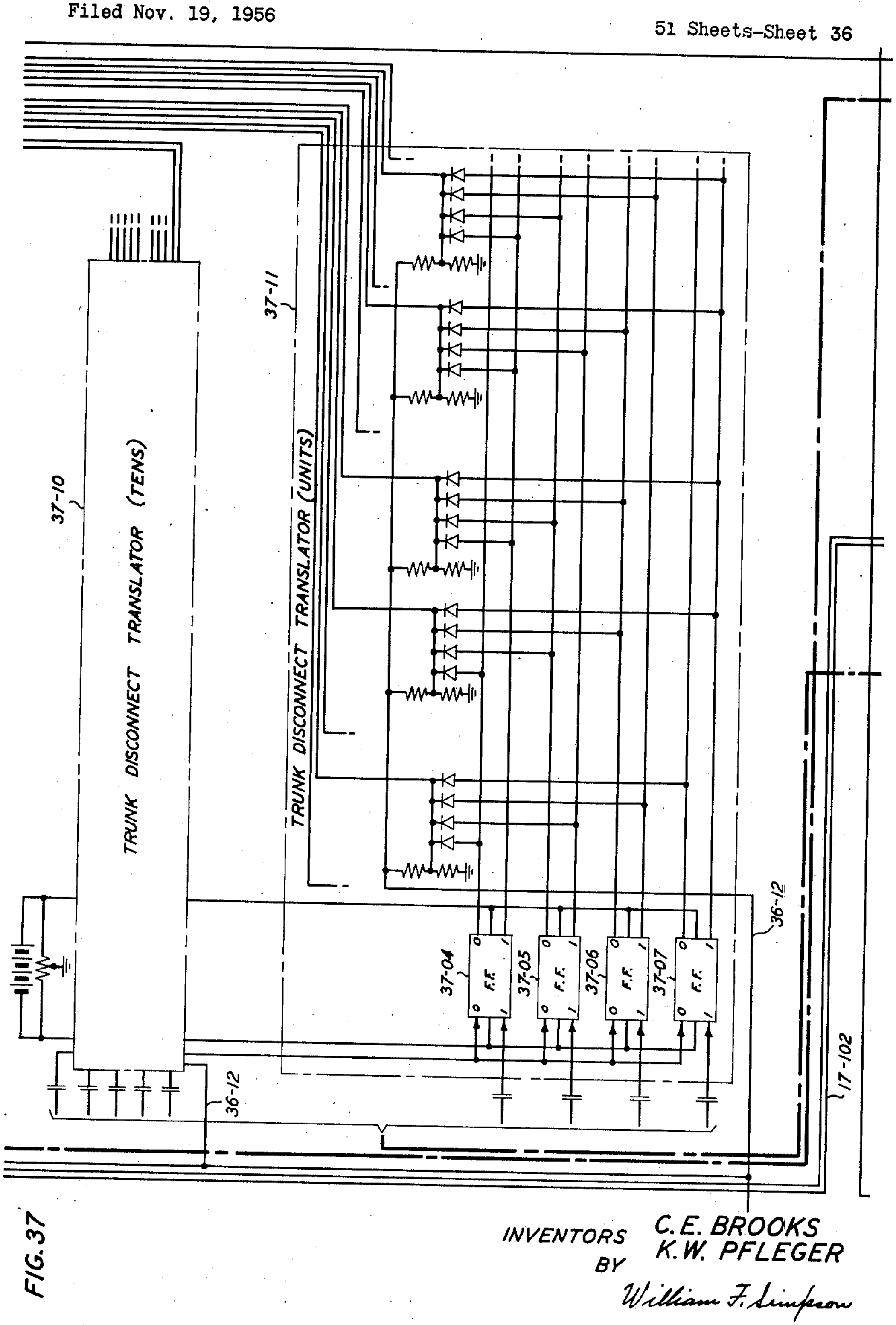
FIG. 37 shows the trunk disconnect translators.
Figure 40:
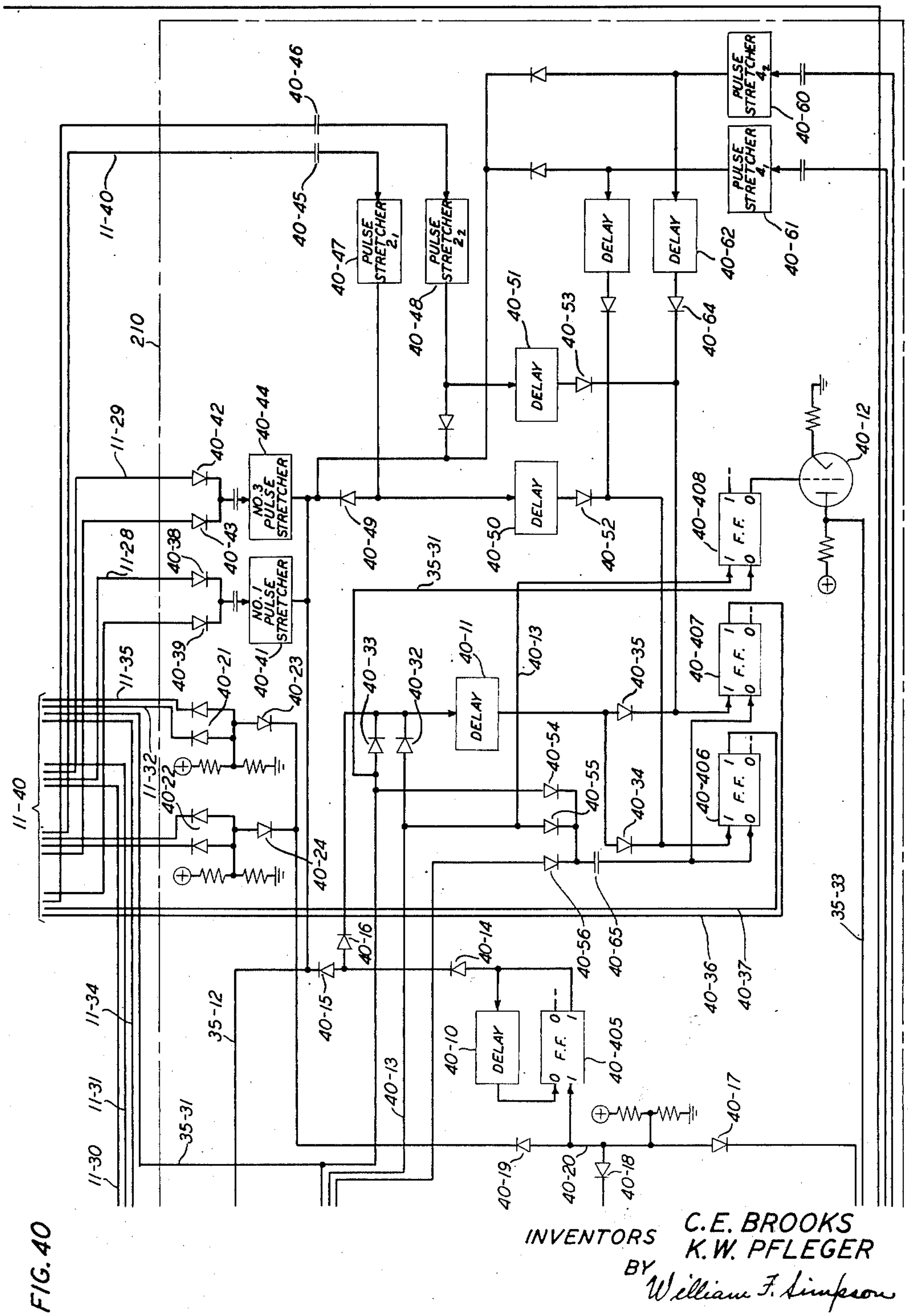
FIG. 40 shows another portion of the programming circuits.
Figure 41:
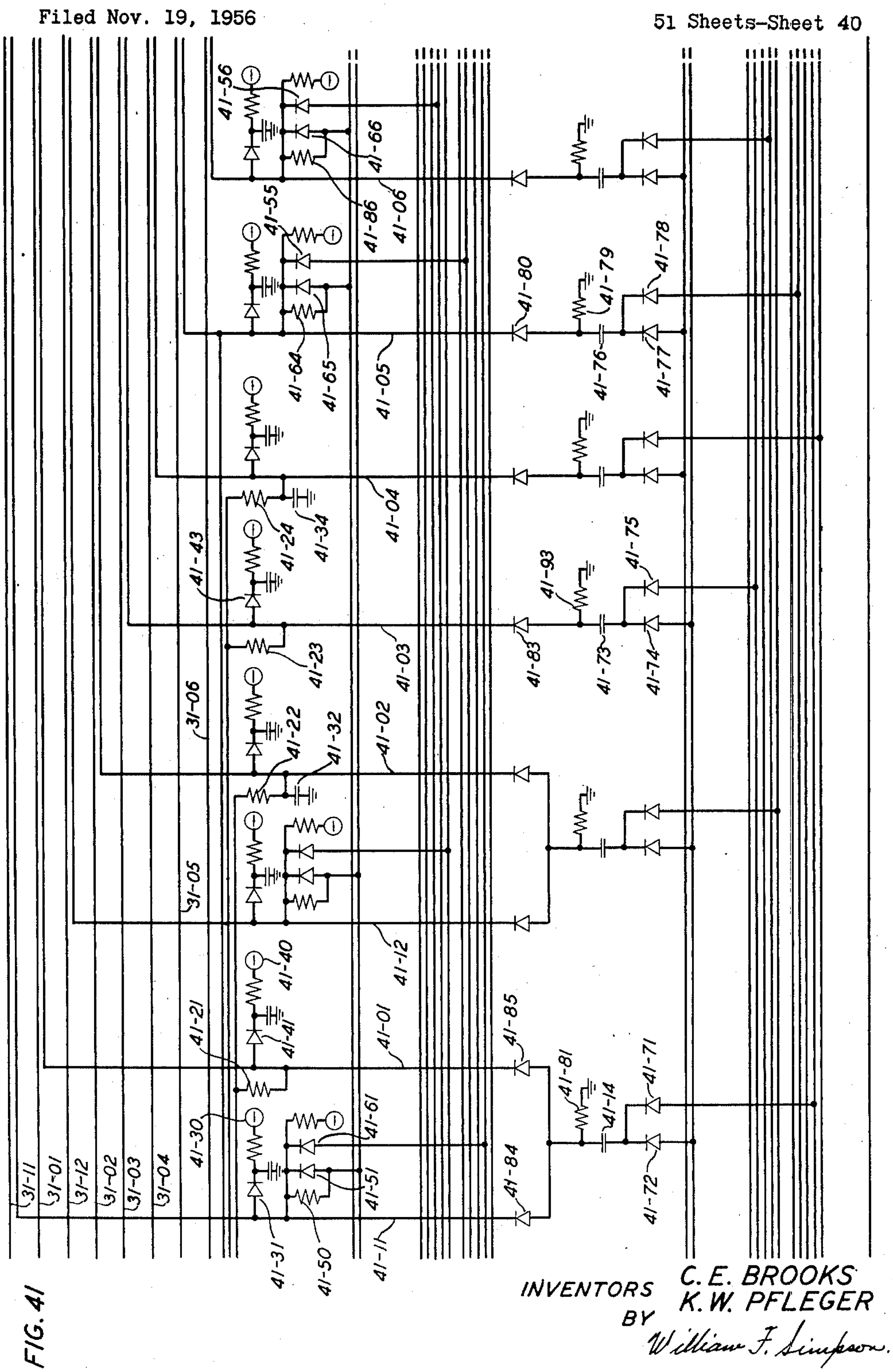
FIG. 41 shows the trunk number group circuits.
Figure 49:
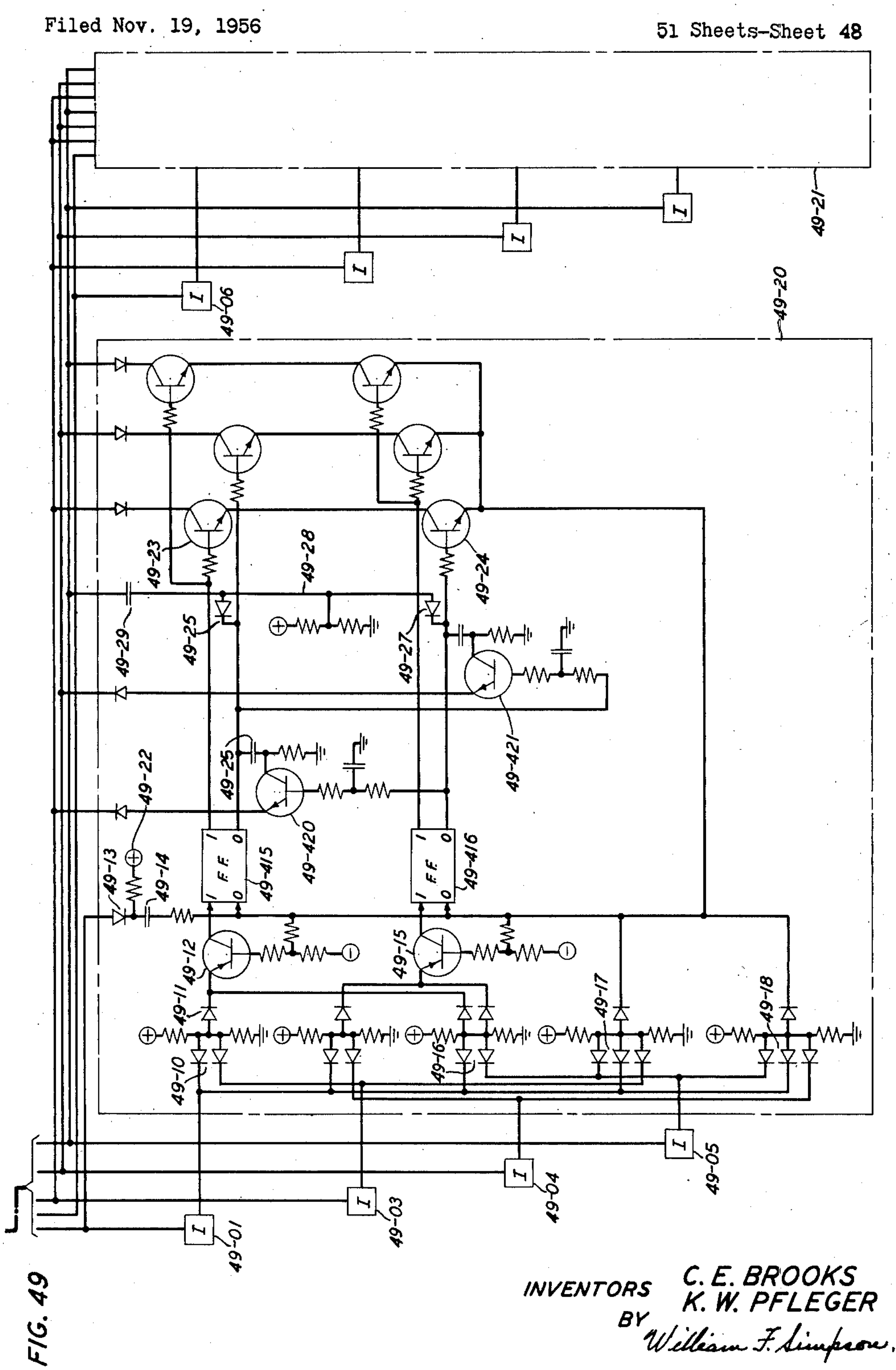
FIG. 49 shows ringing disconnect circuits.

FIGS. 35 and 40 represent the circuits of the programmer and common control circuits which coordinate the operations of the various circuits described herein. FIGS. 36, 37, 41, and 47 show details of the trunk circuits as well as the trunk scanning tubes and the trunk translators for controlling the establishment and disconnection of communication paths to and from the various trunk circuits. FIG. 49 shows details of a ringing disconnect circuit. FIGS. 42 through 46, inclusive, and 48 show in detail timing and disconnect circuits for controlling the supervision and disconnection of established calls or paths through the network.

The operation of the system is controlled by programmer 210 which is shown in detail in FIGS. 35 and 40. The programmer in turn is controlled by oscillator 35–01. This oscillator may be of any suitable type including gas tube, vacuum tube, and transistor oscillators as well as high precision crystal controlled gas tube, vacuum tube, and transistor oscillators such as disclosed in United States Patents 2,163,403, granted to L. A. Meacham, June 20, 1939 and 2,275,452, granted to L. A. Meacham, March 10, 1942. Alternatively this oscillator may be replaced by any suitable source of constant frequency voltage of a suitable frequency. The source may be supplied over transmission lines when desired. The oscillator 35–01 has a frequncy which is determined by the shortest time interval which it is desired to have accurately determined.

The output of the oscillator 35–01 is transmitted through the wave shaper 35–10 which supplies a positive pulse of predetermined duration and wave shape for each cycle of the output oscillator 35–01. A suitable wave shaping pulse generator is shown in greater detail in United States Patent 2,449,467, granted to W. M. Goodall, September 14, 1948.

The unit pulses from the wave shaper 35–10 are transmitted through a transistor gate 35–11. This gate is arranged so that it is normally conducting. Thus, a negative bias is normally maintained on its base element and the output of the wave shaper 35–10, at least during the pulse interval, is more positive than this bias so that the pulses from 35–10 are normally transmitted through the transistor gate 35–11. When it is desired to interrupt the pulses from the wave shaper 35–10, positive voltage is applied to the base of the transistor 35–11 in the manner and at the times described hereinafter.

The pulses from the gate 35–11 are transmitted to a three-stage binary counter 35–02 comprising the binary counter stages 35–101, 35–102 and 35–103.

The binary counter stage 35–101 alternates its position with successive pulses received from the gate 35–11 and alternately applies a relatively high positive output voltage on its "0" and "1" output terminals or conductors. The binary counter stage 35–102 operates in a similar fashion but changes its position only half as often as the binary counter stage 35–101. The binary counter stage 35–103 operates in a similar manner. The No. 1 output conductors of these three binary stages are connected to an "and" gate circuit 35–16 and the output of this gate circuit is connected to the input of the binary counter stage 35–104 and also to the set "0" conductors of each of the binary counter stages 35–101, 35–102 and 35–103.

Thus, in response to successive pulses from the gate circuit 35–11 the binary counter stages operate in their normal fashion to count these pulses. On the count of seven, that is in response to the seventh pulse after the counters have been set on "0," the No. 1 output of each of these counter stages becomes positive with the result that they are all reset to "0." Thereafter the counter will count the succeeding pulses from the gate 35–11 in a similar manner. In other words, the counter counts seven pulses and then is reset to "0" and is reset to "0" by each subsequent seventh pulse.

As will be explained hereinafter, each cycle of this counter is employed to scan one or one group of subscriber's lines. If the lines are idle, the counter will operate in the fashion described above. However, if the lines are busy then positive potential may be applied to the conductor 35–12 which will suppress one or more pulses from the wave shaper 35–10 to permit time for other circuits to operate as will be described.

The output of the conductors or terminals of the binary counter stages 35–101, 35–102 and 35–103 in addition to being connected to the "and" gate circuit 35–16 are also connected to the "and" gate circuits 35–13, 35–14 and 35–15. A positive pulse is obtained from the "and" gate circuit 35–13 each time all three binary counter stages 35–101, 35–102 and 35–103 are all set in their "0" position.

A positive pulse is obtained from the gate circuit 35–14 each time the binary counter 35–02 has counted three pulses from its "0" state; that is binary counter stages 35–101 and 35–102 are in their "1" state and the counter stage 35–103 is in its "0" state. Likewise, a positive pulse is obtained from the gate circuit 35–15 each time the counter 35–02 has counted six pulses from its "0" state.

In order to facilitate the understanding and description of this invention the exemplary embodiment described herein is arranged so that each of the pairs of scanning and storage tubes such as 1–10, 1–11, 1–20 and 1–21 scan two subscribers' lines. The invention is not limited to such an arrangement wherein each of the pairs of scanning tubes scan only two subscribers' lines. Instead, each of these pairs of tubes may be arranged to scan a large plurality of subscribers' lines.

As pointed out above, each time the binary counter comprising the binary counter 35–02 counts seven pulses a pulse is transmitted to the binary counter stage 35–104. This binary counter transmits a pulse to the binary counter stage 35–105 half as often, that is for each two cycles of the binary counter 35–02. In other words, a positive pulse is obtained from the binary counter 35–104 each time all of the subscriber's lines have been scanned. If more than two lines are scanned by each pair of scanning tubes then additional stages may be provided so that a positive pulse will be obtained on the output conductor 35–30 each time all the lines have been scanned, that is at the end of each complete scanning cycle.

Each of these complete scanning cycles has a time duration dependent upon the dialing or signaling speeds on the subscriber's lines and trunk circuits. In the exemplary embodiment described herein, it is assumed that this interval of time is of the order 0.005 second or shorter. In addition to the above-described unit time interval and various pulses it is desirous to obtain pulses at intervals of substantially a tenth of a second, of a half second and of ten seconds. In the exemplary embodiment described herein these pulses are obtained by counting 20 complete scanning cycles for the tenth second pulse, 100 complete scanning cycles for the half second pulses and 2,000 complete scanning cycles for the ten seconds pulses. Thus, the binary counter stage 35–105 and the decade counter 35–22 count 20 pulses from the binary counter 35–104 and thus supply an output pulse substantially every tenth of a second. The quinary counter 35–25 counts five of the pulses from the decade counter 35–22 and thus puts out a pulse every half second. Similarly binary counter stage 35–107 and the decade counter 35–26 count 20 pulses from the counter 35–25 and supply an output pulse to the pulse stretcher 35–27 every ten seconds. These various pulses are employed to control the various circuits of the system as described hereinafter.

The scanning tubes and circuits are controlled by pulses from the programmer circuit transmitted over conductors 35–31, 35–32, 35–33, 11–34 and 40–36 for example. Pulses over these conductors are supplied to the deflection control and intensity control circuit of the scanning tubes.

In order to facilitate the description and understanding of the invention it is assumed that when the power is applied to the system the source of pulses from the wave shaper 35–10 is interrupted, in any suitable manner as for example by a key, or by positive potential supplied through a key, or in any other suitable manner, to the control conductor 35–12. In addition, it is assumed that the binary counter stages 7–50 and 7–51 are set with binary counter stage 7–51 set in its "0" condition and binary counter stage 7–50 set in its "1" condition. It is also assumed that the binary counter stage 7–10 is initially set in its "1" state. These counters may be set in these conditions by first operating and then releasing key 7–67 which will set both binary counters to "0" and then momentarily actuating switch 7–68 twice which will set the counter stages in the condition described above.

Alternatively a key may be provided individual to each of these counter stages for setting them in the above-described states. Likewise, the binary counter 7–10 may be set in its "1" state by a similar key.

In addition, the binary counter stage 35–101 will be set in a "0" state and binary counter stages 35–102 and 35–103 will be set in their "1" state. Binary counter stage 35–104, as well as all of the other binary counter stages and other counters in the above-described counting chain shown in FIG. 35, will be set in their "0" states or conditions. Thereafter, the circuits are restored or conditioned so that pulses from the wave shaper 35–10 and gate 35–11 are transmitted to the binary counter stage 35–101. The first pulse thus transmitted sets the binary counter stage 35–101 in its "1" state and as a result a positive potential is obtained from the "and" circuit 35–16 which restores the three counter stages of counter 35–102 to their "0" state.

The actuating pulse for the counter 35–02 received from the wave shaper 35–10 through the gate 35–11 has a duration sufficient to actuate the counter stage 35–101 as described above. However, the actuating time of the counter stage 35–101, the "and" gate circuit 35–16 and the restoring times of the stages of counter 35–02 are such that this counter is left in its "0" state after receiving the first pulse as described above. The stages 7–51 and 7–50 are likewise left in their zero or "0" state at this time.

With the counter 35–02 in its "0" state, that is each of the stages 35–101, 35–102 and 35–103 is in its "0" state, a positive pulse is transmitted through the "and" gate 35–13 and over conductor 35–31, and a positive pulse is also transmitted through the diodes 35–34 and 35–35 and over conductor 35–32.

The positive pulse transmitted over conductor 35–31 is transmitted to the input terminal of the binary counter stage 7–10 and sets this counter in its "0" state since this stage was previously set in its "1" state in any suitable manner as described above. As a result, the "0" output of this stage becomes positive and applies a positive voltage to the base of the transistor gate 7–11 with the result that the transistor ceases to conduct so that a more positive voltage is applied to the base of the transistor 7–12 which transistor now becomes conducting. It should be noted that the transistor 7–11 is a P-N-P junction transistor or a point contact transistor having an "N" type base material while transistor 7–12 has an N-P-N junction type transistor or a point contact type transistor with "P" type semiconducting material in the base. With the transistor 7–12 conducting a greater potential drop is developed across potentiometers or voltage dividers 7–13, 7–15, 7–14 and 7–16, with a result that relatively low positive voltage is applied to the contacts of these potentiometers. The contacts of these potentiometers are connected to the horizontal deflection plates or systems of the scanning tubes 1–10, 1–11, 1–20 and 1–21 and cause the beam to be directed in a horizontal direction to the group of positions assigned to one of the subscriber's lines. It is assumed that the beams in tubes 1–10 and 1–12 are directed to the positions associated with line 1–14 (see FIG. 50) while the beams in tubes 1–20 and 1–21 are directed to the positions associated with line 1–22 which extends to stations 17 and 22 (see FIG. 51).

The voltage dividers or potentiometers 7–13, 7–15, 7–14 and 7–16 are provided so that the position of the beams in the respective tubes 1–10, 1–20, 1–11 and 1–21 may be individually and accurately positioned horizontally to the position assigned to the lines as pointed out above.

With the binary counter stages 7–51 and 7–50 set in the respective positions of "0" and "1," as described above, the application of a positive pulse to the conductor 35–32 as described above advances the counter 7–51 to its "1" position so that a more positive voltage is obtained from the "1" output of both these counter stages. Consequently, a positive voltage is obtained from the "and" circuit comprising diodes 7–61 and 7–71 which voltage immediately resets both of these counter stages to their "0" positions.

As in the case of the counter 35–02 the pulse from conductor 35–32 has a duration sufficient to actuate the counter stage 7–51. The time constant of the "and" circuit and the resetting of the counter stages, however, is such that these counters remain in their "0" state in response to this pulse transmitted over conductor 35–32 at this time.

With both counter stages 7–51 and 7–50 set in their "0" state their "0" outputs will be at a more positive voltage so that a positive voltage is obtained from the "and" circuit comprising the diodes 7–60 and 7–70 which positive voltage is applied to the base of the transistor gate 7–53. As a result, the current flowing through the transistor 7–53 is interrupted at this time. However, the No. 1 output of the binary counter 7–50 will be at a low voltage near ground potential or at a negative voltage with a result that this low potential is applied to the base of the transistor 7–52 which transistor conducts current and produces voltage drops across resistors 7–65 and 7–66 which voltage drops are applied to the base of the transistor 7–54.

Consequently, an intermediate voltage drop appears across the potentiometers 7–55, 7–57, 7–56 and 7–58. This voltage drop is applied to the vertical deflection plates or systems of the line scanning cathode ray tubes 1–10, 1–20, 1–11 and 1–21 and directs the beam of these tubes to its intermediate position (see FIGS. 50 and 51) where it illuminates the phosphor on the ends of these tubes adjacent the apertures assigned to lines 1–14 and 1–22. As a result, the light produced by the beams impinging upon this section of the phosphor illuminates the corresponding phototransistors 1–34 and 1–37.

The positive pulse from the "and" gate 35–13 in addition to being applied to conductor 35–31 and the binary counter 7–10 is also applied to the "0" input of the flip-flop 40–408 which sets this flip-flop in its "0" position if it has been set in some other position with the result that a high positive voltage is obtained from its "0" output and applied to the grid of tube 40–12 which tube in turn causes relatively low voltage to be repeated on its anode to the output conductor 35–33. This voltage is transmitted over conductor 35–33 to the amplifier and electronic switch 12–10 of FIG. 12 so that the electronic switching tube 12–11 is cut off or has its cathode potential reduced to a more negative value which is in turn connected to the cathode ray tubes 1–10, 1–11, 1–20 and 1–21 thus providing greater driving voltage for the electron beams within these tubes so that the intensity of the light obtained from the phosphors and applied to the phototransistors is increased.

The positive pulse from the "and" gate circuit 35–13 is also transmitted over conductor 35–31 to the diode 40–54 and then to the said "0" inputs of the flip-flop circuits 40–406 and 40–407 through the condenser 40–65, thus setting these flip-flops to zero if they had been previously set in their "1" state. With the flip-flops 40–406 and 40–407 set in their "0" state, a low voltage near ground potential or a negative voltage is applied to their No. 1 output terminals which voltage is transmitted over conductors 40–36 and 40–37 to the control grids of the scanning cathode ray tubes 1–10, 1–11, 1–20 and 1–21, thus turning off the beam within these tubes.

The positive pulse from the "and" gate circuit 35–13 is also transmitted over conductor 35–31 and through the diode 40–33 to the delay device 40–11 and then through the diodes 40–34 and 40–35 to the set "1" input terminals of the respective flip-flop circuits 40–406 and 40–407. The delay device 40–11 delays the voltage transmitted through it by a short interval of time which allows the various beam control circuits to be fully actuated and the proper potentials applied to the cathode of the cathode ray tubes so that when the flip-flops 40–406 and 40–407 are actuated to their "1" position and apply positive voltage to the conductors 40–36 and 40–37 to turn on the beams in the cathode ray tubes 1–10, 1–11, 1–20 and 1–21 the beams will strike the proper area at the end of the tube, namely the area employed to illuminate the phototransistors 1–34 and 1–37.

Assuming that the lines 1–14 and 1–22 are both idle at this time, no output will be obtained from the phototransistors because substantially ground potential is applied to them by the various line circuits or line terminations at the central office.

The next pulse obtained from the gate transistor 35–11 causes the binary counter 35–101 to change from its "0" to its "1" state. The next or third pulse will cause this binary counter to change from its "1" state to its "0" state which in turn causes the binary counter stage 35–102 to change from its "0" to its "1" state. Upon the reception of the next pulse, binary counter stage 35–101 again changes to its "1" state. At this time the three binary counter stages 35–02 are in their "1," "1," "0" states, respectively, with a result that a positive pulse is obtained from the output of the "and" gate 35–14. This positive pulse is transmitted over conductor 40–13 to the "1" input of the flip-flop 40–408 thus setting this flip-flop in its "1" state with the result that the high positive voltage on its "0" output is reduced to a low value near or below ground potential. Tube 40–12 thereupon ceases to conduct or conducts much less current with the result that its anode voltage rises which in turn causes a tube 12–11 to conduct more current and reduce the negative voltage applied to the cathode of the cathode ray line scanning tubes 1–10, 1–11, 1–20 and 1–21 to a value suitable for operating the storage sections of these tubes as described herein.

The positive voltage from the "and" gate 35–14 is transmitted over conductor 40–13 and through the diode 40–55 to the set "0" inputs of the flip-flops 40–406 and 40–407. These flip-flops are thus set to their "0" state and thus turn off the beams of the scanning tubes during the time these beams are being moved and repositioned to the next spot or position as described herein.

The positive output from the "and" circuit 35–14 is also transmitted through the diodes 35–36 and 35–35 to conductor 35–32 which extends to the input of binary counter stage 7–51. As a result, this counter stage changes from its "0" state to its "1" state and as a result the output of the "and" circuit comprising diodes 7–60 and 7–70 falls to a relatively low voltage whereupon the transistor 7–53 conducts current which current flows through the resistor 7–65 and produces a greater voltage drop across this resistor. As a result, a lower or more negative voltage is applied to the base of the transistor 7–54 which decreases the current flowing through this transistor and causes the voltage on the potentiometers 7–55, 7–57, 7–56 and 7–58 to rise which in turn causes the beams of cathode ray tubes to move upward and be directed to the upper storage spots of the tubes assigned to lines 14 and 22.

As in the case of the horizontal deflecting system the potentiometers 7–55, 7–57, 7–56 and 7–58 are provided so that the beams within the various scanning tubes may be individually, accurately adjusted in a vertical direction and directed to the various vertical positions in these tubes.

The positive pulse from the "and" gate circuit 35–14 is transmitted over conductor 40–13 and through the diode 40–32 to the delay device 40–11. As before the delay device 40–11 delays the pulse by an interval of time sufficient to permit the deflecting circuits to arrive at their steady-state condition with the beam directed to the new position. At the end of this interval of time a pulse is transmitted from the output of the delay device 40–11 and through the diodes 40–34 and 40–35 to the set "1" inputs of the flip-flop circuits 40–406 and 40–407 thus turning on the beams within the scanning tubes 1–10, 1–11, 1–20 and 1–21 shown in FIG. 6, and permitting the characters of the upper storage spots assigned to lines 1–14 and 1–22 to be read out or determined.

Under the assumed conditions a dot or "0" indication is stored on these spots which indication produces no effect at this time in the detector circuits in FIG. 11 as is explained herein.

Meantime the next pulse received from the transistor 35–11 causes the binary counter stages 35–101 and 35–102 to be restored to their "0" states and the binary counter 35–103 to be set in its "1" state. The next pulse sets binary counter 35–101 in its "1" state while the succeeding pulse sets the binary counter stage 35–101 to its "0" state and the binary counter stage 35–102 to its "1" state. At this time the binary counter is set with its respective stages in its "0," "1," "1" state. Consequently, a positive pulse is obtained from the output of the "and" circuit 35–15 which pulse is transmitted through the diode 40–56 and sets flip-flops 40–406 and 40–407 in their "0" state. As a result, the beams in the scanning tubes are cut off. In addition, the pulse from the "and" circuit 35–15 is transmitted through diode 35–37 to the input of the binary counter stage 7–51 and advances this stage to its "0" state and setting the binary counter stage 7–50 in its "1" state. At this time the output of the No. 1 terminal of binary counter stage 7–50 becomes more positive which more positive voltage is applied to the base of the transistor 7–52 and to the base of transistor 7–53 through the diode 7–69. As a result, both of these transistors are cut off and cause a more positive voltage to be applied to the base of the transistor 7–54. Additional current then flows through the transistor 7–54 and produces a large voltage drop across the resistance which lies between positive battery and potentiometer 7–55, 7–57, 7–56 and 7–58. As a result, the cathode ray beams in the line scanning cathode ray tubes 1–10, 1–11, 1–20 and 1–21 are directed to the lower storage spot assigned to lines 14 and 22, that is, the beams within tubes 1–10 and 1–11 are directed to the lower spots assigned to line 1–14 while the beams within tubes 1–20 and 1–21 are directed to the lower positions assigned to line 1–22. The beams in the scanning tubes 1–10, 1–11, 1–20 and 1–21 are not turned on at this time because the subscriber's lines 1–14 and 1–22 are idle at this time. In addition, under the assumed conditions, a dot will be recorded in these positions which does not actuate the detector circuits of FIG. 11.

The next pulse from the transistor 35–11 sets the binary counter stage 35–101 in its "1" state whereupon a positive pulse is obtained from the "and" gate 35–16 as described above which causes the binary counter stages of the counter 35–02 to be immediately reset in their "0" states in the manner described above and the above cycle of operation repeated. In this case, however, the binary counter 7–10 will be set in its "1" state so that a low voltage near or below ground potential will be applied to the base of the transistor 7–11 which transistor will then conduct current and produce a voltage drop across resistor 7–20 which voltage is applied to the base of the transistor 7–12 and in turn reduces the current flowing through this transistor. Thus, the voltage drop across the potentiometers 7–13, 7–15, 7–14 and 7–16 and across the resistance which lies between these potentiometers and the associated positive battery, is reduced so that the cathode ray beams within the line scanning tubes are moved in a horizontal direction so that during the succeeding cycle of operation of the counter 35–02 and the counter stages 7–51 and 7–50 the beams within the cathode ray tubes 1–10 and 1–11 will be directed to the positions assigned to lines 1–15 while the beams within tubes 1–20 and 1–21 will be directed to the positions assigned to line 1–18. As a result, the beams now are directed to the positions assigned these lines and thus scan the lines and storage elements or positions assigned to these lines.

Thus, during each cycle of operation of the counter 35–02, described above, a line assigned to each of the pairs of line scanning tubes is scanned, and during a successive cycle successive lines assigned to the respective tubes are scanned. It is noted that a line assigned to each of the pairs of tubes is simultaneously scanned.

Thus, during the time the system is idle, that is no calls are being set up or in progress, the subscribers' lines are periodically scanned in the manner described above. For each subscriber's line scanned the binary counter 35–02 goes through one complete cycle counting seven pulses or cycles from the oscillator 35–01. During each of these cycles, as explained above, a plurality of subscribers' lines are simultaneously scanned.

In addition to scanning or determining the condition of each of the subscriber's lines, at least once during a complete scanning cycle, the program circuit shown in FIGS. 35 and 40 transmits other controlling pulses to other circuits and components of the exemplary embodiment of this invention. For example, the binary counter 35–104 transmits a pulse at the completion of the scanning of all of the subscribers' lines, that is, this counter stage transmits a pulse over conductor 35–30 between each of the complete scanning cycles. The conductor 35–30 extends to the binary counter 35–110 as well as to other circuits and components of the system. The counter 35–110 responds to these pulses and changes its position so that at the end of one complete scanning cycle it will be set in its "1" condition and at the end of the next complete scanning cycle it will be set in its "0" condition. Binary counter 35–110 controls the flip-flops 9–10 and 9–11 over conductors 9–12 and 9–13. Thus, with the binary counter 35–110 set in its "0" state, positive potential is obtained on the output conductor 9–12 which sets the flip-flop 9–10 in its "0" state and flip-flop 9–11 in its "1" state. After the next complete scanning cycle, flip-flop 35–110 will be set in its "1" condition and set the flip-flop 9–10 in its "1" condition over conductor 9–13 and set the flip-flop 9–11 in its "0" state. These flip-flops 9–10 and 9–11 control the line flip-flop circuits shown in FIG. 8, 9, 13 and 14 as will be described hereinafter. However, during idle periods, when no calls are being set up through the system, the various line flip-flops shown in FIGS. 8, 9, 13 and 14 are inactive and remain set in their "0" state.

Again, during idle intervals, the program circuits shown in FIGS. 35 and 40 transmit pulses to the various detector circuits such as 1–50 and 1–51 to set the various flip-flops in these circuits in their "0" states. Inasmuch as the system is idle, these flip-flops remain in their "0" states.

The program circuit shown in FIGS. 35 and 40 also transmits other pulses for controlling various other circuits and components of the system such as the circuits and tubes comprising the register circuits, ringing trunk circuits and other circuits. Inasmuch as the operation of the system in response to these other pulses may be more readily understood with reference to the descriptions of these other portions of the system, the operation of the program circuit with reference to these other pulses is described along with the description of the operation of these other circuits.

Let us assume now that a subscriber station 14 initiates a call by picking up his telephone instrument closing the subscriber's line circuit 1–14. As a result, current flows over this line circuit and through the resistor 1–54 which causes the right-hand terminal of this resistor to become more negative. This negative voltage is applied to the phototransistor 1–34 and consequently during the next scanning cycle when the electron beams in tubes 1–10 and 1–11 are directed to the sections of the fluorescent material on the ends of the tubes 1–10 and 1–11 adjacent to phototransistor 1–34, this phototransistor is illuminated. Negative current is transmitted through the phototransistor from resistor 1–54 and through the amplifier 11–10 having a phase reversal. Therefore a positive pulse is delivered to the set "1" input of flip-flop 11–12.

As pointed out herein, the electron beams in tubes 1–10 and 1–11 will be directed to the sections of the cathode ray tubes which illuminate phototransistor 1–34 in response to an output pulse from the counter 35–02 when each of the stages of this counter assume their "0" state and cause a pulse to be transmitted over conductors 35–32. At this time, a pulse is also transmitted over conductor 35–31 and through diode 40–54 to the set "0" inputs of flip-flops 40–406 and 40–407. These flip-flops in turn are set to their "0" state and turn off the beams in the tubes 1–10, 1–11, 1–20 and 1–21. A pulse is also transmitted from conductor 35–31 to the "0" input of flip-flop 40–408 which causes this flip-flop voltage applied to the scanning tubes to be increased. A pulse is transmitted from conductor 35–31 through diode 40–33 and through the delay device 40–11 and then through the diodes 40–34 and 40–35 to the respective flip-flops 40–406 and 40–407 causing these flip-flops to be actuated to their "1" state. As a result, positive potentials are applied to their "1" output terminals which potentials are transmitted over conductors 40–36 and 40–37 to the control grids of the two pairs of scanning tubes 1–10, 1–11, 1–20 and 1–21. These pulses cause the electron beams to be turned on in these tubes after the delay interval, of the delay device 40–11, which is provided to allow sufficient time for the beam deflecting circuits to settle down to their steady state conditions so the beams or virtual beams will be accurately positioned on the appropriate areas of the phosphor in the respective tubes before the beams are turned on.

When one pair of beams is thus turned on the phototransistor 1–34 will be illuminated and cause a pulse to be transmitted to the amplifier 11–10 which actuates the flip-flop 11–12 to its "1" state.

With the flip-flop 11–12 actuated to its "1" state, positive potential is obtained from its No. 1 output lead and no such output potential is obtained from its "0" output conductor or lead. The beams are thus positioned in less than one cycle of the oscillator 35–01 and the beams are then turned on and illuminate the phototransistor which in turn positions the flip-flop 11–12 in less than two cycles of the oscillator 35–01.

Then upon the receiving of the next pulse from oscillator 35–01, i.e., the third pulse, the binary counter 35–02 advances so that the respective stages 35–101, 35–102 and 35–103 are set in their 1–1–0 states with the result that positive potential is obtained from the "and" circuit 35–14 and transmitted over conductor 40–13 and through the diode 40–55 to the set "0" inputs with the flip-flops 40–406 and 40–407. As before, these flip-flops are set in their zero positions and turn off the beams within the scanning tubes 1–10, 1–11, 1–20 and 1–21. The output from the "and" circuit 35–14 is also transmitted to the set "1" input of flip-flop 40–408 which, as previously explained, causes a change in the voltage or current of the beams of the line scanning tubes.

In addition, positive output is transmitted from the conductor 40–13 and through the diodes 35–36 and 35–35 and over the conductor 35–32 to the input of the binary counter stage 7–51. As a result, this counter stage advances from its zero state to its "1" state and causes the beams within the scanning tubes to be directed to the upper storage spots assigned to the lines being scanned. Thus the beams within the tubes 1–10 and 1–11 are directed to the upper storage spots assigned to the line 1–14.

The positive output from the "and" circuit 35–14 is also transmitted over the conductor 40–13 and through the diode 40–32 and delay device 40–11. After the delay interval of the delay device 40–11 which is of the order of one cycle from the oscillator 35–01 which interval provides ample time for accurately positioning the beams within the scanning tubes to the upper storage spots, positive voltage from the delay device 40–11 is transmitted through the diodes 40–34 and 40–35 to the respective flip-flops 40–406 and 40–407 thus setting these flip-flops in their "1" state and turning the beams on within the tubes 1–10, 1–11, 1–20 and 1–21.

At about this time the binary counter 35–02 receives another pulse so that it is advanced and its stages are now set in the 0–0–1 states respectively. During the next interval of time of the order of one cycle from the oscillator 35–01 the characters of the previously stored charges in the upper storage spots assigned to line 1–14 are read out and determined. Under the assumed conditions, wherein the subscriber's line 1–14 has changed from an open circuit condition to a closed circuit condition in the interval between the last scanning or sampling of this line and the time of the present scanning or testing of line 1–14, a dot will have been previously stored in this spot so that the flip-flop 11–14 will remain in its "0" state at this time. In addition, the binary counter 35–02 receives another pulse and advances so that its stages are now set in the 1–0–1 states, respectively.

The flip-flop 11–12 is being actuated to its "1" state as described above, applies a relatively high positive voltage to its No. 1 output terminal which voltage is transmitted through two delay devices 11–37 and 11–36 to a number of circuits. The delay interval of the delay device 11–37 is shorter than the delay interval of the delay device 11–36. In an exemplary embodiment of this invention positive voltage will be obtained from the output of the delay device 11–37 at about the time the binary counter 35–02 is advanced so its stages are set in their 1–0–1 stages, respectively as described above. As a result, with the flip-flop 11–14 remaining in its "0" state, positive voltage is applied to both of the input conductors of the "and" circuit 11–16 with the result that positive voltage is obtained from the output of this circuit and applied to the set "1" input of the flip-flop 11–13 thus setting this flip-flop in its "1" state.

A short time later and before the counter 35–02 receives another pulse from the oscillator 35–01, positive voltage will be obtained from the output of the delay device or network 11–36 and applied to the conductor 11–28 extending to the diode 40–38 of the program control circuit. This positive potential is transmitted through this diode and to the input of the pulse stretcher 40–41. The pulse stretcher 40–41 responds to the positive pulse applied to its input and repeats a positive pulse on its output which positive pulse is applied to the conductor 35–12 extending to the base of the transistor gate 35–11, thus turning off this gate. In response to a short pulse applied to its input, the pulse stretcher 40–41 is designed to maintain a positive voltage on its output for a period approximately equal to three cycles from the oscillator 35–01. One form of pulse stretcher may comprise a flip-flop circuit which is set in its "1" state in response to pulses of short duration applied to its set "1" input terminal and has a delay device or network interconnected between its No. 1 output terminal and its set "0" input terminal so that upon being set in its "1" state it will remain in the "1" state for an interval of time determined by the delay device or network and then be restored to its zero state.

Positive pulse from the delay device or network 11–36 in addition to being transmitted over conductor 11–28 as described above is also transmitted through the left-hand diode of the "or" gate 11–19 and applied to the circle gates 1–31. As a result these gates are activated and apply two phase alternating currents from the circle generator circuit 1–60 to both sets of deflection plates of the scanning tubes 1–10 and 1–11. The two phase voltages are maintained at a substantially 90-degree phase difference by the source 1–60 and as a result, the beams within these tubes are caused to move in a circle. The magnitudes of these two phase voltages applied to the deflection plates are such that the circle has a relatively small diameter and is fully within the spaces or spots assigned to the line. During the delay interval of the pulse stretcher 40–41 the beams within the scanning tubes 1–10 and 1–11 are thus caused to write circles in the upper storage spots of line 1–14 in a manner described above.

Under the above assumed conditions wherein a call is initiated over line 1–14, only the gates 1–31 are actuated so that a circle is written in the upper storage spots by the first pair of scanning tubes. However, the operation of the counter 35–01 and the pulse stretcher 40–41 maintains the beams of both pairs of tubes directed to the upper storage spots for a prolonged interval of time sufficient for a circle to be written in the upper storage spots as described. In response to simultaneous calls on lines 1–14 and 1–22 circles will be simultaneously written in the upper storage spots of both pairs of tubes 1–10, 1–11, 1–20 and 1–21 since under these conditions both gates 1–31 and 1–32 will be actuated.

The positive potential applied to the conductor 40–13 by the "and" circuit 35–14 as described above is also applied to the delay device 35–17. The delay interval of this delay device is slightly less than the time of the three cycles from the oscillator 35–01 so that shortly after the scanning tubes 1–10 and 1–11 start to write circles as described above, positive output is obtained from the delay device 35–17 and transmitted over the conductor 11–30 to transistor gates 11–21 and 11–22. This positive potential is applied to the base terminals of these transistors and conditions them for conduction.

Under the assumed conditions where the subscriber's line changes from open circuit to closed circuit, transistor 11–21 becomes conducting at this time, applies a positive output voltage to the delay devices 11–39 and 12–34. The application of the positive potential to the delay device 12–34 indicates that a change in signaling condition of the subscriber's line from open circuit to closed circuit has occurred. However, inasmuch as this signaling condition may indicate either the answer of a call, initiation of a call, or the end of the dialing pulse, it is desirable to read the signal stored in the lower storage spot to ascertain whether or not the signal represents the answering of a call.

After ample time has been provided for writing a circle in the upper storage spot and shortly after three cycles of pulses from the wave shaper 35–10 had been suppressed, the delay interval of the pulse stretcher 40–41 is terminated whereupon the output of this pulse stretcher returns to its low or negative value and the transistor gate 35–11 is again conditioned for conduction. As a result, when the next pulse is received from the wave shaper 35–10 the binary counter is advanced so that these stages are now set in their "0–1–1" states, respectively. As a result, positive voltage is obtained from the output of the "and" circuit 35–15 which positive voltage is transmitted through the diode 40–56, condenser 40–65 to the set "0" inputs of the flip-flops 40–406 and 40–407 thus setting these flip-flops in their "0" state which in turn turns off the beams within the scanning tubes 1–10, 1–11, 1–20 and 1–21 as described herein.

The output from the "and" circuit 35–15 is also transmitted through the diode 35–37 and then over conductor 35–32 to the counting input of the binary counter stage 7–51 advancing this counter stage from its "1" state to its "0" state which in turn causes the binary counter 7–50 to be advanced to its "1" state. As a result, the beams within the scanning tubes 1–10, 1–11, 1–20 and 1–21 are directed to the lower storage spot at this time as described herein.

The positive output from the "and" circuit 35–15 is also transmitted through the delay device 35–18 which has a relatively short delay to permit the above-described circuits to operate to turn off the beams within the scanning tubes as described above. After this delay interval positive voltage from the output of the delay device 35–18 is transmitted over a conductor 11–34 to the set "0" input of the flip-flop 11–12 and through the diode 11–09, to the set "0" input of the flip-flop 11–14 thus restoring both of these flip-flops to their "0" state. The restoration of the flip-flop 11–12 to its "0" state removes the high positive voltage from its "1" output whereupon the diode 11–38 rapidly discharges the delay condenser 11–37 or short circuits the delay device 11–37. In addition, the removing of the high positive potential from the "1" output of the flip-flop 11–12 removes the positive voltage transmitted through the left-hand diode of the "or" circuit 11–19 thus turning off the circle gates and interrupting the path from the two-phase circle generator source 1–60. The pulse from the delay device 35–18 is of short duration so that it does not interfere with the further operation of the flip-flop 11–14 to be described.

The positive output from the transistor gate 11–21 is applied to the delay device 11–39 as described above. After the beams within the scanning tubes have been turned off as described above positive potential is obtained on the output of the delay device 11–39 and transmitted over conductor 11–40 to the program circuits shown in FIGS. 35 and 40. This pulse is transmitted from the conductor 11–40 through condenser 40–45 to the input of the pulse stretcher circuit 40–47.

The pulse stretcher circuit 40–47 is similar to the pulse stretching circuit 40–41 described above and in response to a pulse of short duration applied to its input, applies a positive potential through the diode 40–49 to the conductor 35–12 extending to the base of the transistor gate 35–11 thus turning off this gate. The time interval of the pulse stretcher 40–47 is sufficiently long so that the gate circuit 35–11 remains turned off for approximately two of these cycles of the oscillator 35–01.

The output from the pulse stretcher 40–47 in addition to being transmitted through the diode 40–49 is also transmitted through the additional delay device or network 40–50 and then through the diode 40–52 to the set "1" input of the flip-flop 40–406 thus setting this flip-flop in its "1" state where positive voltage is applied to the conductor 40–37. This positive voltage after being transmitted to the deflection control circuits as described herein causes the beams within the scanning tubes 1–10 and 1–11 to be turned on and the character of the lower storage spot read out and determined.

If a circle had been previously recorded in the lower storage spot then the flip-flop 11–14 will be set in its "1" state due to the voltage from amplifier 1–40 and the wave shaper 1–42. However, under the assumed conditions of the transition from open to closed condition representing the initiation of a call, a dot had been previously recorded in the lower storage spot so the flip-flop 11–14 remains in its "0" state. As a result, no pulse or positive voltage is obtained over the output conductor 11–41 from the detector circuit 1–50. It should be noted however that if such a positive pulse is obtained due to the answering of a call the flip-flop 11–14 will be set in its "1" state. With both flip-flops 11–13 and 11–14 set in their "1" states a positive voltage is obtained from the output of the "and" gate circuit 11–18 which positive voltage is transmitted over the output conductor 11–41 as described herein after an interval of time approximately equal to the time of six cycles from the oscillator 35–01 after the pulse is transmitted through the transistor gate 11–21 as described above.

After pulse stretcher 40–47 has caused the suppression of two cycles or pulses by the transistor gate of 35–11 the pulse stretcher 40–47 is restored to normal and the positive potential removed from the base of the transistor gate 35–11. The next pulse from 35–10 then sets the binary counter 35–02 in its "1–1–1" state whereupon this counter is immediately advanced to its "0–0–0" state, flip-flops 11–13, 11–14, and 11–15 being restored to their "0" states if they had been actuated to their "1" state, and the remaining circuits all being restored to their initial condition as described here. Thereafter, the above-described scanning cycles are repeated until another change in signal condition on subscriber's line 1–14 is obtained.

As described above, pulses are transmitted from the gate circuit 11–21 over conductor 11–24 from the detector circuit 1–50 in response to reception of a pulse received over conductor 11–30 from the program circuit when the subscriber's line circuit changes from an open condition to a closed condition between scanning intervals. In addition, approximately six cycles of the oscillator 35–01 later the lower storage spot is read and if a circle had been previously recorded therein positive potential is transmitted from the "and" circuit 11–18 over conductor 11–41 from the detector circuit 1–50.

Under the conditions assumed above at the time the above-described outputs are obtained from the detector circuit 1–50 binary counter stage 7–10 is set in its "0" state causing the beams within the cathode ray scanning tubes 1–10, 1–11, 1–20 and 1–21 to be positioned horizontally to areas of the screens of said scanning tubes assigned to lines 1–14 and 1–22. As a result, a positive potential is applied to the conductor 12–16 extending to the translator shown in the right-hand portion of FIG. 12.

As will be explained hereinafter it is desirable that all of the pulses transmitted from the detector circuit 1–50 exist or be available at a specified instant of time. In order to have the pulses all available substantially simultaneously and for other timing purposes delay devices 12–34, 12–35 and 12–36 are connected in series with the outputs of the detector circuit 1–50. As pointed out above the pulse obtained on the output of conductor 11–41 occurs near the end of a scanning interval during which a single line is being scanned. It is desirable that this pulse be available for use at a somewhat later instant of time so that it is delayed a time which is substantially equal to the time of one cycle from the counter 35–01, since the pulse on the conductor 11–24 occurred at a time which is substantially six cycles earlier than the counter 36–01. If this pulse is delayed an interval of time substantially equal to seven cycles of the counter 35–01, then it will substantially coincide with the delayed pulse on conductor 11–41. Thus the delay devices 12–34 and 12–35 delay the positive outputs from the detector circuit 1–50 for intervals of time substantially equal to seven pulses from the counter 35–01, while the delay device 12–36 delays the pulse from conductor 11–41 for an interval of time which is substantially equal to the time of one cycle from the oscillator 35–01. From these delay devices these positive pulses are transmitted through pulse-shaping means, such as the Zener diode 12–19 then through the diodes 12–17, 12–18 and 12–50 comprising "or" circuits.

The pulses transmitted through the diodes 12–18 and 12–19 are transmitted to the gate circuits in FIGS. 8, 9, 13 and 14 to actuate some of these gate circuits as will be presently described. The pulses transmitted through the diode 12–18 are also transmitted to the translator circuits shown in the right-hand portion of FIG. 12.

The translator shown in the right-hand portion of FIG. 12 is provided to translate the potentials or currents applied to the deflecting plates or deflecting system or systems of the scanning tubes into potentials representing the directory number of the calling subscriber. When desired, these potentials may represent the location of the subscriber's line in the switching system instead of the directory number. These potentials may be arranged in any desired manner or code. In the exemplary embodiment described herein these potentials are arranged in a "binary per digit" code to represent the directory number of the calling subscriber's lines. That is, each decimal digit of the directory number of the calling party or line number is represented by a binary number code or pulses.

Thus with the positive potentials applied to the output diode 12–18 and the positive potential applied to the conductor 12–16, positive voltage or positive pulse is supplied by the translator to the T1 tens conductor 12–21 and to the U4 units conductor designating line 14.

It is desirable that these potentials together with the potentials of pulses transmitted from the delay devices 12–34 through 12–36 occur or be available substantially simultaneously. In order to insure that these pulses occur as desired additional delay devices 12–20 and 12–21 are connected in series with the output from the binary counter stage 7–10 and are arranged to provide a delay interval substantially equal to the seven pulses of the oscillator 35–01. Thus the potentials applied to the "or" circuits in the upper center of FIG. 12 and to the translator in the right-hand portion of this figure are all applied substantially simultaneously. Thus positive potential is applied from the output of the diode 12–18 and the positive potential applied from the delay device 12–20 so that a positive pulse or voltage is applied to the T1 tens conductor 12–21 of the tens translator and to the U4 units conductor at this time. These positive potentials together with the positive potentials or pulses from conductors 12–77, 12–14, 12–13 and 12–12 are transmitted to the circuits of FIGS. 8, 9, 13 and 14.

Under the assumed conditions wherein a call is originated only over the subscriber's line 1–14, the detector circuit 1–50 will be the only detector circuit to cause the transmission of such pulses during the line scanning interval described above. If, however, the subscribers at stations 14 and 22 for example, substantially simultaneously initiate calls then the detector circuit 1–51 will operate in substantially the same manner as described above with respect to detector circuit 1–50 and cause a positive pulse to be transmitted over conductor 11–74 at substantially the same time as a pulse is transmitted over conductor 11–24. The pulses transmitted over the conductor 11–74, and over the conductors 11–75 and 11–76 are all delayed so that the pulses from the various detector circuits do not interfere. In case only two pairs of line scanning tubes and two detector circuits are provided as shown in the drawings the delay interval of the delay devices 12–44, 12–45 and 12–46 may have a delay interval of the order of half the time required to scan an individual subscriber's line plus the delay interval of the other delay devices 12–34 through 12–36 as described above. In case more pairs of scanning tubes and/or more detector circuits are provided the output of various detector circuits will be delayed by progressively greater intervals of time with the delay intervals being such that the output after delay from the respective detectors will follow one another with substantially uniform intervals between them. As a result, a succession of simultaneous pulses are obtained from the translator circuits of FIG. 12, each representing the character of the change in the signaling condition of the subscriber's line circuit together with pulses uniquely identifying the subscriber's line on which the change has occurred.

The pulses thus obtained from the translating circuits of FIG. 12 are stored temporarily on line flip-flop circuits shown in FIGS. 8, 9, 13 and 14. The temporary storage is necessitated by the fact that these pulses are of short duration and must be stored in some manner while it is determined where they should be transmitted, accumulated or otherwise employed to control the switching circuits as described herein.

Figure 13:
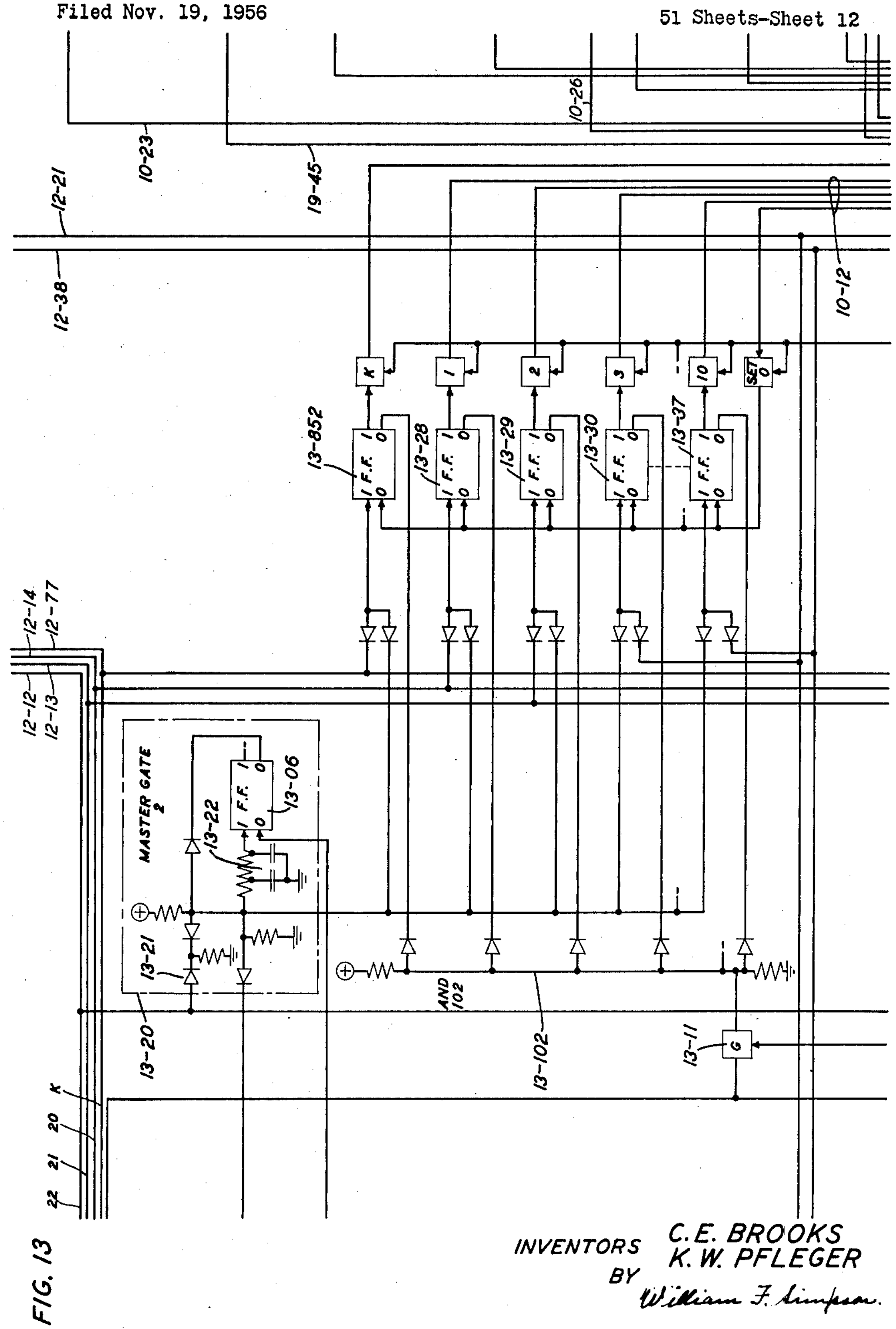
FIG. 13 shows another set of line flip-flops.

The line flip-flop circuits shown in FIGS. 8, 9, 13 and 14 are arranged in two groups, one group comprising the circuits shown in FIGS. 8 and 13 and a second group shown in FIGS. 9 and 14. These two groups of line flip-flops are employed alternately to record the pulses from FIG. 12. While one group is recording pulses from FIG. 12, pulses previously recorded in the other group are employed to further control the operation of the system.

Each of the main groups of flip-flops comprises a plurality of subgroups, each subgroup comprising 11 individual flip-flops and a master gate circuit. Each of these subgroups is employed to store one calling subscriber's line designation and the character of the change in the line condition as determined by the scanning tubes and circuits. The master gate circuits, individual to the subgroups of flip-flops, are employed to control the recording of the signals or pulses from FIG. 12 in the respective subgroups of the flip-flops. In addition, various other control and gate circuits are provided individual to each of the subgroups of flip-flops for controlling the transmission of the recorded information to the other circuits and apparatus of the system as described herein.

The control of the recording of pulses on the line flip-flops is effected by the two flip-flop circuits 9–10 and 9–11. As described above, these flip-flop circuits are controlled from the program circuits shown in FIGS. 35 and 40 over conductors 9–12 and 9–13. When the flip-flop circuit 9–10 is set in its "0" state the flip-flop 9–11 will be set in its "1" state. Furthermore, as described above, these flip-flop circuits are actuated first to one state after one complete line scanning interval during which all of the lines are scanned and then to the other state after the next complete line scanning interval or cycle.

With the flip-flop 9–11 set in its "0" position all of the flip-flop circuits 8–05, 13–06, etc., are all positioned to their "0" states. When flip-flop 9–11 is set in its "1" state it applies a high positive potential to its "1" output terminal or conductor which sets flip-flops 9–07, 14–08, etc., to their "0" states.

Assume now that, during the cycle of operation of counter 35–02 following the cycle described above during which a signal designating the change in the subscriber's line circuit 1–14 changed from an open circuit condition to a closed circuit condition, the flop-flop 9–10 is set in its "0" state and flip-flop 9–11 is set in its "1" state. During the previous cycle of operation of the counter 35–02 the flip-flops 8–05 and 13–06 were set in their "0" state. Then upon the actuation of the flip-flop 9–10 to its "0" state positive potential is obtained on its "0" output terminal and transmitted through the diode 8–24 to the master gate circuit 8–20.

With positive potential supplied through the diode 8–23 and the flip-flop 8–05 set in its "0" state positive potential is applied to all of the inputs to the "and" circuits of a master gate circuit 8–20 except the input through the diode 8–21.

The diode 8–21, together with diodes 13–21, 9–21, and 14–21 comprise an "or" circuit supplying the respective master gate circuit 8–20, 13–20, 9–20, 14–20. With flip-flops 9–10 and 9–07 in their "0" state as assumed above the low potentials from the "1" output conductors of these flip-flop circuits are applied to the lower left-hand inputs to the "and" circuits in master gate circuits 9–20 and 14—20 respectively so that these gate circuits are not effective at this time. Likewise, due to the fact that the flip-flop 8–05 is in its "0" state, its "1" output terminal will be at a low voltage and thus prevent the operation of gate circuit 13–20. Consequently, upon the application of a positive pulse to conductor 11–24, as described above, by the detector circuit 1–50 and after the delay interval of the delay device 12–34 a positive potential is transmitted through the Zener diode 12–19, diodes 12–18 and 8–21 to the output of the master gate circuit 8–20 and over conductor 8–23 and then to one of the inputs of the "and" circuits connected to the "1" inputs to the flip-flops 8–850, 8–10, 8–11, 8–12 through 8–19 thus conditioning these "and" circuits to respond to pulses received from the translator circuit shown in FIG. 12 and the detector circuit 1–50. Thus, under the assumed conditions upon the transmission of a positive pulse over conductor 11–24, a pulse is transmitted over conductor 12–12 which conditions the master gate circuit 8–20, and a pulse is transmitted over conductor 12–14 to the upper terminal of the input of the "and" circuit of flip-flop 8–10 thus setting this flip-flop in its No. 1 state. Likewise, positive pulses are obtained on the T1 output conductor 12–21 and the U4 output conductor of the translator shown in FIG. 12. These conductors extend through the respective "and" gate circuits to the "1" terminals of corresponding flip-flops 8–12 through 8–19 and set the corresponding flip-flops in their "1" position. Thus, the T1 of the tens flip-flops is set in its "1" state while the U4 of the units flip-flops is also set in its "1" state representing or designating line 1–14 as the line, and the flip-flop 8–10 is set in its "1" state representing that the signaling condition on the line 1–14 has changed from an open circuit condition to a closed circuit condition.

As indicated herein, eight flip-flops are provided in each subgroup to register and temporarily store signals representing the designation of the calling line. Thus, in FIG. 8 the first of this group of eight flip-flops is represented by flip-flop 8–12 and the last one of these flip-flops is designated 8–19. The first four of the flip-flops are employed to register in binary number code the tens digit or designation of the calling subscriber's line while the last four are employed to register in binary number code the units digit of the subscriber's line in question.

The application of a positive potential to the conductor 8–23, in addition to conditioning the input gate circuits of the subgroup of line flip-flops shown in FIG. 8, also supplies a positive potential to the "1" input of flip-flop 8–05 through the delay network 8—22. The delay of the delay network 8–22 is a small fraction of the time of a cycle from oscillator 35–01, but of sufficient duration to permit the complete actuation of the line flip-flops of FIG. 8 in response to the positive pulses from the translator shown in FIG. 12. At the end the delay interval of the delay network 8–22, the flip-flop 8–05 is actuated to its "1" state where it applies a low or negative voltage to the upper right-hand diode of the master gate circuit 8–20 and thus renders this gate circuit inoperative and reduces the voltage applied to the conductor 8–23 so that the input gate circuits of the respective line flip-flops of FIG. 8 are rendered inactive.

The actuation of the flip-flop 8–05 to its "1" state, in addition causes a high positive voltage to be applied to its "1" output terminal which voltage is applied to the lower left-hand input of the master gate circuit 13–20, thus conditioning this gate circuit.

If it is assumed that a call had simultaneously been initiated over line 1–22, then a positive pulse would likewise have been transmitted over conductor 11–74 substantially simultaneously with the positive pulse transmitted over conductor 11–24. The pulse transmitted over conductor 11–74 is delayed by the delay device 12–44 until after the flip-flops shown in FIG. 8 have been actuated as described above in response to the positive pulse transmitted over conductor 11–24. Thereafter, the positive pulse, after being delayed by delay device 12–44, will be transmitted through the translator circuits of FIG. 12 to actuate the line flip-flops of FIG. 13 in a manner similar to the manner in which the line flip-flops of FIG. 8 were actuated. In this case, flip-flop 13–28 may be actuated to its "1" state and the flip-flops 13–30 to 13–37 actuated to represent line 1–22. In other words, the T2 flip-flop will be actuated together with the U2 flip-flop representing the number 22.

The actuation of the master gate circuit 13–20 at this time is similar to the operation of the master gate circuit 8–20 described above; and after the line flip-flops of FIG. 13 have been fully actuated, the flip-flop 13–06 is actuated to its "1" state which deactivates the master gate 13–20 and conditions, a succeeding master gate, if others are provided, in the manner described herein.

Thus, during the cycle of operation of the counter 35–02 as described, any changes in line conditions of the particular lines scanned at this time by the various pairs of scanning tubes, is transferred to subgroups of line flip-flops together with signals representing the identity of the respective lines.

After all of the subscriber's lines have been scanned in the manner described above, line 1–14 will be again scanned. Assume now that on this scan the line is still closed, in which case the circuits operate in the following manner. The flip-flops 11–12, 11–13, 11–14 and 11–15 are all positioned to their "0" state either before or upon the scanning of line 1–14. In addition, the beams within the tubes 1–10, 1–11, 1–20 and 1–21 are all directed to areas assigned to the lines 1–14 and 1–22 in the manner described above. Likewise the beams will be turned on and high voltage applied to the cathodes of the tubes so that the phototransistors 1–34 and 1–37 will be amply illuminated. As a result, current will flow through the transistor 1–34 because the line circuit 1–14 is closed so flip-flop 11–12 is again set in its "1" state. As a result, positive potential is applied to the one output terminal of this flip-flop and in turn applied to the delay lines or devices 11–36 and 11–37.

Meantime, the counter 35–02 counts pulses from the wave shaper 35–10. When the third pulse is counted so that the counter stages are set in their "0," "1," "1" positions, respectively, reading from bottom to top, the beams within the scanning tubes 1–10, 1–11, 1–20 and 1–21 are turned off and the beam control circuits actuated to direct the beams to the upper storage spots assigned to lines 1–14 and 1–22. After a suitable delay interval, the beam within these scanning tubes is turned on and the upper storage spots scanned. Under the assumed conditions a circle will have been previously stored in this upper storage spot representing the fact that the subscriber's line 1–14 was closed at the time of the previous scanning of the subscriber's line 1–14. Consequently, the flip-flop 11–14 is also actuated to its "1" position. As a result, the high positive voltage on the "0" output of the flip-flop 11–14 is removed or reduced to a low value so that after the delay interval of delay device 11–37 the output of the "and" gate 11–16 is not permitted to rise with the result that the flip-flop 11–13 remains positioned in its "0" state. Meantime, the counter 35–02 counts two additional pulses in controlling the circuits as described above and then at the end of the delay interval of the delay device 11–36 a positive pulse is transmitted over conductor 11–28 to FIG. 40 and then through the diode 40–38 to the pulse stretcher 40–41. As a result, a prolonged positive pulse is applied to the base of the transistor gate 35–11 which interrupts the supply of pulses from the wave shaper 35–10 to the binary counter 35–02. This prolonged pulse from the pulse stretcher 40–41 persists for an interval of time sufficiently long to suppress three pulses from the wave shaper 35–10.

At the end of the delay interval of the delay device 11–36, positive potential in addition to being applied to conductor 11–28 is also applied to a conductor 11–27, which extends through network 11–60 described below, to the circle gate circuits 1–31 and actuates these gate circuits so that they will apply the two-phase alternating current from the source or generator 1–60 to the deflecting plates or deflecting system of the cathode ray beam scanning tubes and cause the beam to rewrite circles in the upper storage spots associated with line 1–14.

Whenever circles are written upon memory spots of tubes such as 1–10, 1–11, 1–20, 1–21, etc., it is necessary to keep the circle gates such as 1–31, 1–32, etc. turned on at least until the beams have been extinguished at the end of writing. This prevents undesired erasure of circles which would occur if circle gates were turned off prior to extinguishing the beams. In order to insure that circle gates are kept turned on long enough to achieve the above-mentioned purpose it may be desirable to design them for rapid turn on and slow turning off. If ordinary gates are employed instead, then one may insert networks such as 11–60 and 11–61 in series with the control conductors of the circle gates. These networks allow rapid build up of control voltage but produce slow decay. An example of such network includes a series condenser and diode as shown in the box 11–60, which quickly pass the build-up transient from wire 11–27. Subsequently the current builds up through the series inductance before the condenser current has died out. When the voltage on input wire 11–27 suddenly vanishes, the inductance keeps up the control current for a little while. The diode prevents the inductive kick from discharging through the condenser. Therefore an appreciable amount of control potential remains on the circle gate a little while after decay of voltage on conductor 11–27.

If a dot or zero indicating an open line is still stored in the upper storage spot associated with line 1–22 the deflection system of tubes 1–20 and 1–21 will not be connected through the gate circuits 1–32 to the source of two-phase alternating current 1–60. The beams within the tubes 1–20 and 1–21 remain directed to these upper storage spots during the interval during which circles are written in the upper storage spots in tubes 1–10 and 1–11. During this time, since the flip-flop 11–13 is not actuated and the "and" gate circuit 11–16 is not actuated at this time, no pulse will be transmitted over the conductor 11–24 to the translator of FIG. 12 when positive potential is applied to conductor 11–30 from the program control circuits of FIGS. 35 and 40 as described above. Likewise, no pulse is transmitted over conductor 11–25 because the "and" circuit 11–17 is not actuated since a flip-flop 11–12 is actuated to its "1" state.

Upon the termination of the pulse from the pulse stretcher 40–41, negative potential is restored to the base of the transistor gate 35–11 thus conditioning this gate to transmit further pulses to the binary counter 35–02. The next pulse counted by this counter will be set at stages in the "1," "1," "0" states reading from the bottom up with the result that positive output is obtained from the "and" gate 35–15 which turns off the beams within the scanning tubes and transmits a pulse to the beam control circuits of the scanning tubes to cause them to direct the beams within the respective tubes to the lower storage spots assigned to lines 1–14 and 1–22. A pulse is also transmitted through the delay device 35–18 and over conductor 11–34 to reset the flip-flops 11–12 and 11–14 to their "0" state at this time. Likewise, the pulse from the delay device 11–36 is terminated at this time when the flip-flop 11–12 is reset to its "0" state. At this time, since no pulse is transmitted through the gate 11–21 over conductor 11–24 during this scanning interval, no pulse is transmitted over conductor 11–40 to the program circuits. Consequently, the beams within the storage tubes 1–10, 1–11, 1–20 and 1–21 are not again turned on and neither is any positive potential applied to the base of the gate transistor 35–11. Consequently, upon the reception of the next pulse from the pulse shaper 35–10 the binary counter 35–02 is actuated to its "1," "1," "1" states and then reset to "0" and the above-described cycle of scanning a succeeding line is repeated. The flip-flops 11–13, 11–14 and 11–15 are all positioned in their "0" states so that they may properly record the next signals transmitted to them from the phototransistors and the cathode ray storage tubes in the manner described above.

Thereafter, the circuits operate in substantially the above-described manner so long as the subscriber's line 1–14 remains closed. Should a call originate on any of the other subscribers' lines, these line circuits, scanning tube circuits, and equipment respond to such call initiation in the manner described above.

As described above, the identity of line 1–14 together with the character of the change in signaling conditions on this line i.e., change from open to closed circuit, was recorded or stored in the subgroup of line flip-flops 8–850, 8–10, 8–11, 8–12 through 8–19, inclusive, during the complete line scanning interval described above. At the end of this line scanning cycle or interval, the binary counter 35–02 transmits a pulse to the binary counter stage 35–104 which in turn transmits a pulse to the binary counter stages 35–105 and 35–110. The binary counter stage 35–110 responds to this pulse and causes the flip-flops 9–10 and 9–11 to change positions, that is, flip-flop 9–10 is actuated to its "1" position and flip-flop 9–11 is operated to its "0" position.

Flip-flop 9–11 in its "0" position restores the flip-flops 8–05 and 13–06 to their "0" positions. Flip-flop 9–10 in assuming its "1" state prevents the operation of the master gates 8–20 and 13–20 so that the upper group of line flip-flops are not available for recording other line changes during the subsequent complete line scanning cycle or interval. In addition, a relatively high positive voltage from the No. 1 output of the flip-flop 9–10 is applied to the lower left-hand input of master gate 9–20 which is associated with the line flip-flops so that they will respond to any line changes during this subsequent scanning interval.

In addition, the flip-flop 9–10 in assuming its "1" state applies positive potential to the lower inputs of the gates 8–K, 8–02, 8–03 through 8–110, and 8–00. A positive potential is also similarly supplied to the lower inputs of the corresponding gates associated with the line flip-flops of FIG. 13. This positive potential conditions these gates so that positive potential is applied to the output of these gate circuits in accordance with the setting of the respective line flip-flops. These positive potentials are transmitted through gate circuits shown in FIGS. 10 and 15. From FIG. 10 and FIG. 15 these potentials may be transmitted to any of the pairs of register tubes or to some other common control or common flip-flop circuits, as will be presently described.

Two pairs of register tubes are represented in the drawing of the exemplary embodiment described herein. A first pair of register tubes 2–24 and 2–25 is shown in FIG. 18 and details of their control circuits are shown in FIGS. 18 through 23 and 25 through 30, inclusive. A second set of register tubes 2–26 and 2–27 is shown in FIG. 16. The rectangle 2–35 shown in FIG. 16 represents a second set of control circuits substantially the same as those shown in FIGS. 18 through 23 and 25 through 30. Other pairs of register tubes may be provided when required or desired.

As pointed out herein, with reference to FIGS. 1, 2 and 3, the register tubes are provided in duplicate so that if trouble develops in one tube of the pair, the operation of the system will not be impaired since the other tube adequately controls the various circuits. This arrangement of providing a pair of similar tubes is similar to the corresponding arrangement shown for the line scanning tubes as described herein.

Inasmuch as the control circuits for the respective pairs of register tubes are substantially identical and operate in substantially the same manner, the circuits of the first pair 2–24 and 2–25 only are shown in detail herein.

The control circuits for the call register tubes comprise beam deflecting circuits, output circuits and a plurality of gate and control circuits for responding to information recorded in the call register tubes and for controlling the recording of information in the call register tubes.

Figure 55:
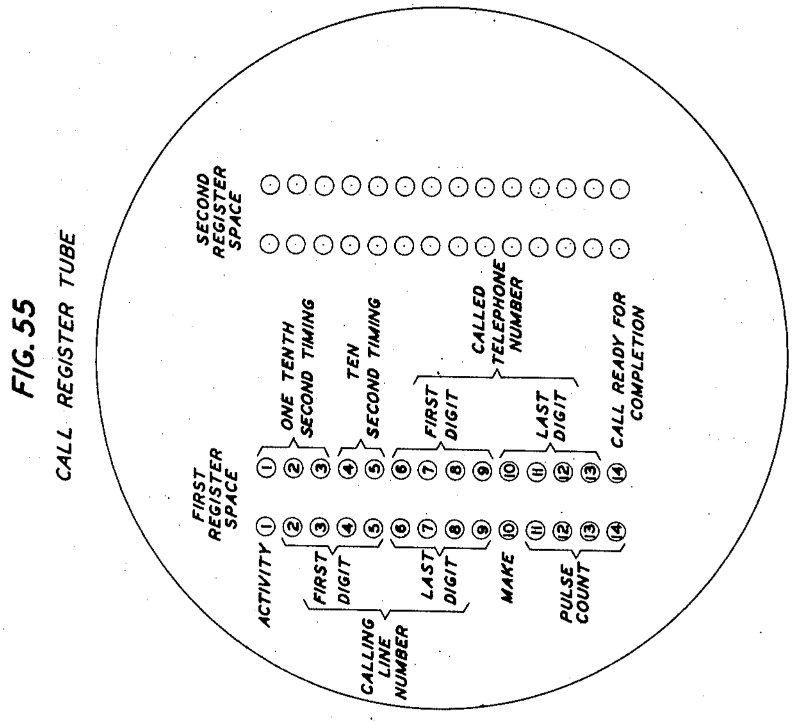
FIG. 55 shows the arrangement of storage spots in the call register tubes.

In the exemplary embodiment described herein, each of the call register tubes or each of the pairs of call register tubes is provided with two register spaces, i.e., is arranged to record and store information relative to two calls. FIG. 55 shows the arrangements of the storage spots in each of these tubes. Each call or each register space requires 28 spots arranged in two vertical rows of 14 spots each. The first spot in the first row is called an activity spot and has a dot representing the "0" stored therein when the register space, that is all the remaining spots, have dots in them indicating that the register or register area is idle and available for recording a call. When information relative to a call is recorded in one of the registers or register spaces, or is being assembled, recorded and stored in one of these register spaces, a circle representing a "1" is recorded or store din the activity position or spot. The next eight spots of the first column represent the first and last digits of the calling line number. The tenth spot is designated a make spot which temporarily records the character of the last transition received from the line and the last four spots of the first column are employed to store and count dial pulses received from the calling line which dial pulses represent or identify the called subscriber's line or station. The first five spots in the second column are employed for timing purposes for timing various intervals as described herein. The next eight spots are employed to record or store signals representing the called subscriber's telephone number and the last spot in the second column is employed to indicate when dialing has been completed or that the call is to be completed.

Figure 25:
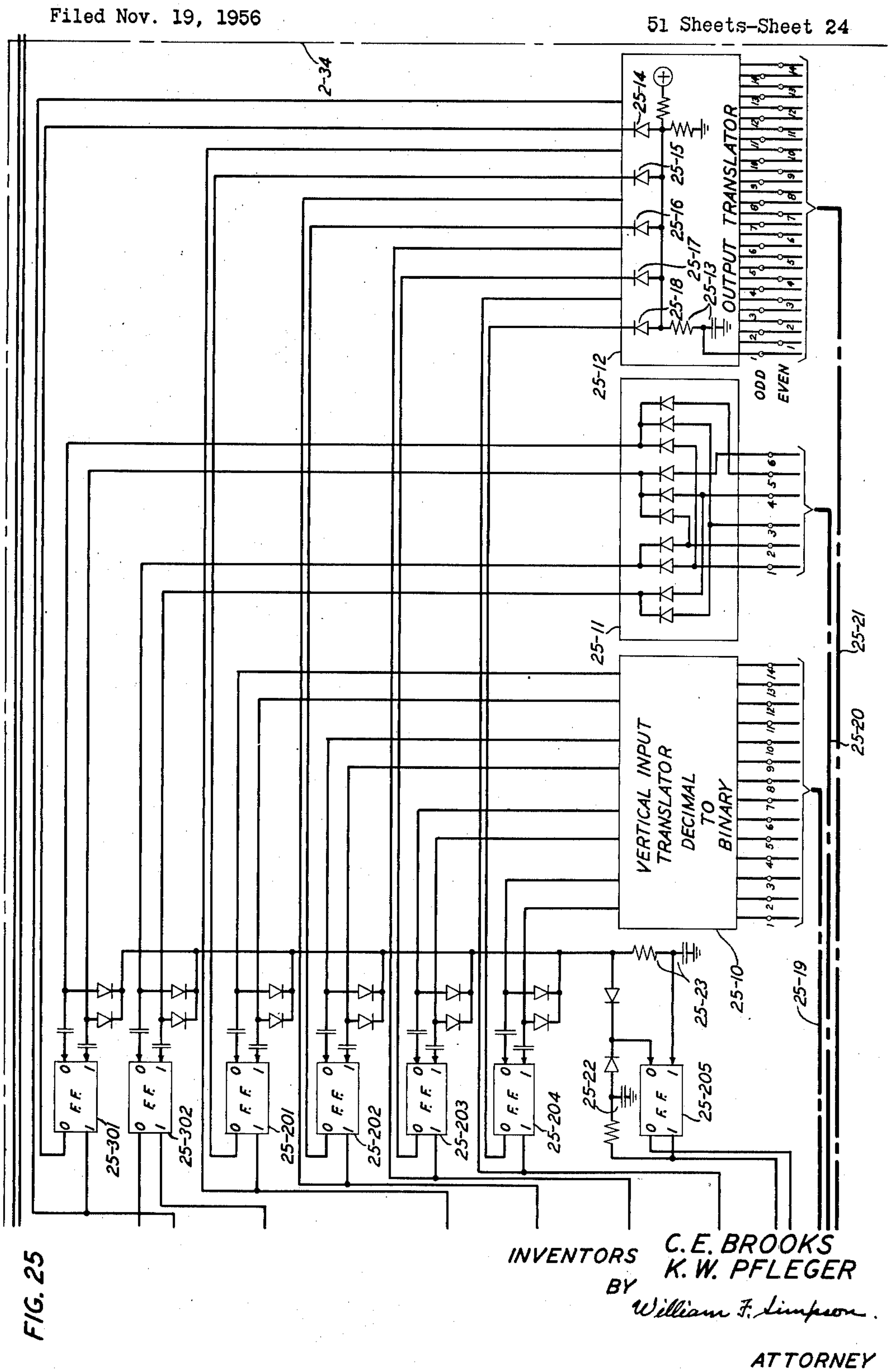
FIG. 25 shows another portion of the deflection control circuits for the call register tubes of FIG. 18.
Figure 26:
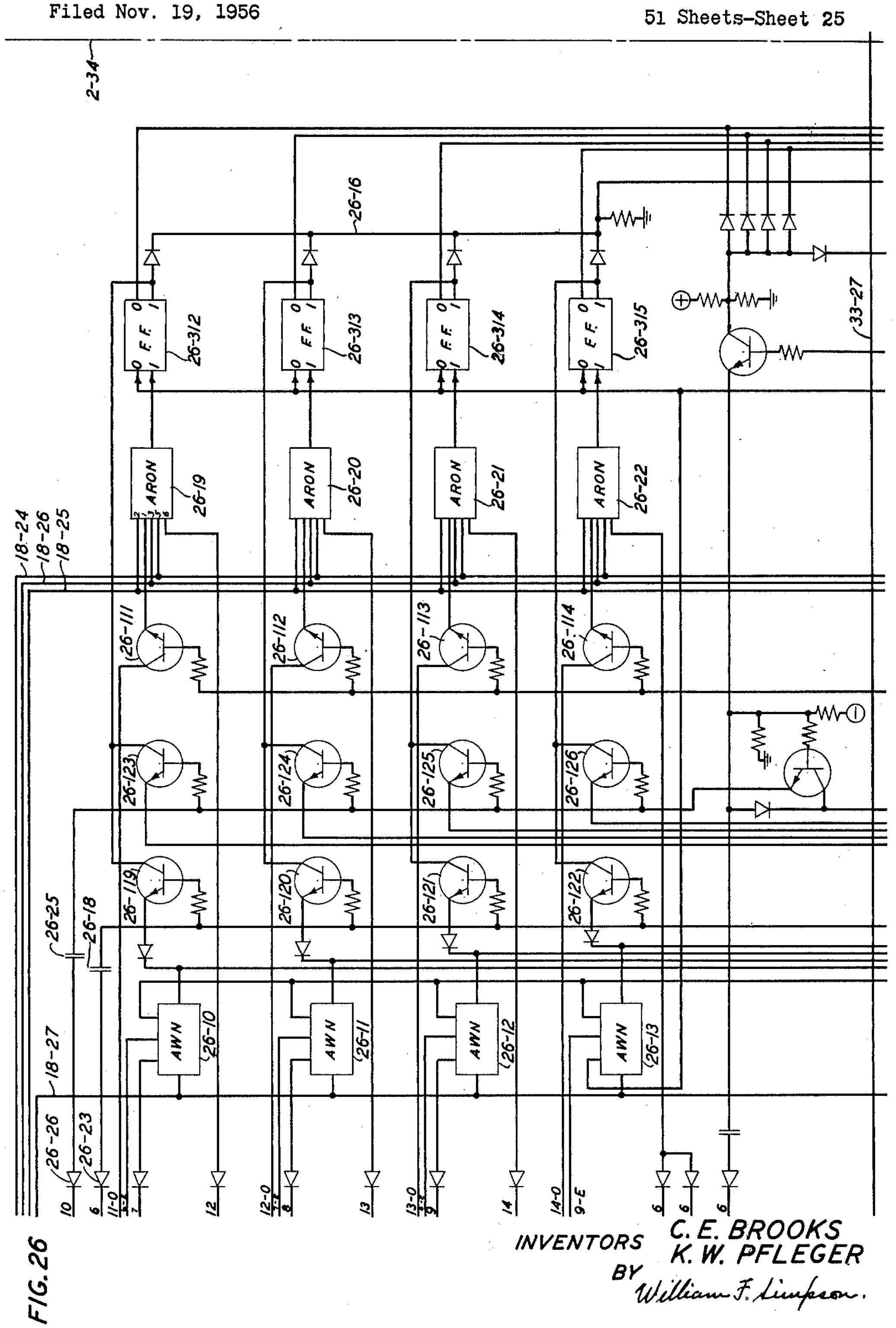
FIG. 26 shows the circuits for transferring a portion of the dialed number in the call register tubes.

In order to direct the electron beams within the tubes 2–24 and 2–25, a plurality of flip-flops and translators are employed as shown in FIG. 25. Flip-flops 25–301 and 25–302 are employed to control the horizontal positions of the electron beams while the flip-flops 25–201, 25–202, 25–203 and 25–204 are employed to control the vertical positions of the electron beams. The flip-flop 25–205 is employed to control the turning on and off of the beams or beams' current. The flip-flops 25-301 and 25-302 are controlled by horizontal input translator 25-11. This translator is provided with six input leads and it is so arranged that application of a positive potential to any one of these leads will direct or deflect the electron beams horizontally to a corresponding one of the columns of spots shown in FIG. 55. The application of a positive potential to any one of the first four input conductors will direct the beams in a horizontal direction to corresponding columns of spots. The two extra input conductors are employed to shift the beams from either the odd column to the associated even column of a particular register, or vice versa.

The vertical control flip-flops 25-201 through 25-204 are similarly controlled through a vertical input translator 25-10 having 14 input leads. The application of a positive potential or pulse to any one of these 14 input leads will direct the beams to the corresponding one of the 14 spots in any one of the columns shown in FIG. 55. The voltages applied to the input leads of the translator need be only long enough to be transmitted to the translators and to actuate or set the correspondent flip-flops. Thereafter, the flip-flops will remain in the position to which they are thus set until reset by application of other potentials or pulses to the input conductors. Consequently, the beams or the virtual beams remain directed each to some one of the spots at all times.

The translators 25-10 and 25-11 comprise a plurality of resistors and diodes arranged in well understood fashion similar to the translators shown in the right-hand portion of FIG. 12. The translators are arranged to transmit positive potentials from the input conductors to the desired ones of the input control leads to the respective flip-flop circuits. The outputs of these flip-flops are connected to a group of transistor amplifiers 18-13 through 18-19, shown in FIG. 18, and also to an output translator 25-12.

The transistor amplifiers 18-13 and 18-14 are connected to the horizontal control flip-flops 25-301 and 25-302. The output of these transistors are connected through a summing circuit comprising resistors 18-33 and 18-34 which develop different control voltages or potentials in response to various code settings of the flip-flops 25-301 and 25-302. The output circuits of the transistors 18-15 through 18-19 are connected to a similar summing circuit comprising resistors 18-35 through 18-38 which develop different deflecting control voltages for each of the different possible permutations of the settings of the various vertical flip-flops 25-201 through 25-204. The output of the horizontal summing circuits is connected through an amplifier represented by transistor 18-11 to the horizontal deflecting plates and the output of the vertical summing circuit is connected through an amplifier represented by transistor 18-12 to the vertical deflecting plates or deflecting system of the call register tubes 2-24 and 2-25.

The operations of the beam positioning flip-flop circuits, transistor amplifiers, summing circuits, etc., are similar to the operations of the corresponding circuits employed in the line scanning tubes as described herein. In this case, however, the beams may be directed to a greater plurality of positions and in response to input potenitals applied to the input conductors to the vertical translator 25-10 and the horizontal translator 25-11.

The outputs of the beam control flip-flops,which correspond to the control binary counters for the control of the beams in the line scanning tubes, are also applied to an output translator 25-12. This translator comprises a plurality of transistors and diodes similar to the translators 25-10 and 25-11. In this case, the translation is in the reverse direction, however, so that the code or combinational settings for the various beam deflecting flip-flops cause the application of a positive potential to one and only one of the 28 different output conductors corresponding to the spot to which the beam of a tube is directed.

The input and output conductors of these translators are arranged in multi-conductor cables 25-19, 25-20 and 25-21 as shown in the drawing and extend to the various control circuits in FIGS. 19 through 23 and 26 through 30, inclusive. These cables are assumed to comprise all of the respective input and output conductors and have connected to them various conductors in the respective figures. The particular conductors connected in the respective figures are designated on the conductors in these figures.

The output plates or terminals of the call register tubes are connected to the amplifier 2-30 and the wave shaper 2-32 to a reading flip-flop 18-206. A recording flip-flop 18-207 is also arranged to control the circle gate circuits 2-28. The outputs from the flip-flop 18-206, as well as the "0" input of this flip-flop and the "1" input of the flip-flop 18-207, are connected to conductors which extend to the control circuits in FIGS. 19 through 23 and 26 through 30, inclusive.

The operation of the call register tubes is initiated by the program circuits shown in FIGS. 35 and 40 and is jointly controlled by this program circuit as well as by the gate circuits shown in FIGS. 10 and 15 and by information and signals received from the various subscriber lines in the manner described herein.

The information stored in the line flip-flops during one cycle of operation, that is during a scanning interval during which all of the subscribers' lines are scanned, is utilized during succeeding scanning intervals. Each of the scanning intervals is divided into four principal parts for controlling the call register tubes. During each of these intervals the call register tubes and control circuits perform various functions. These four intervals are of any suitable duration which are not necessarily equal but may be made equal when desired. In the first part of the period, the beam control and detector circuits of all of the call register tubes cooperate in matching calling line number information stored in the call register tubes with similar information temporarily stored in the line flip-flops and in recording the change in line conditions for calls already in progress during dialing of the called subscriber's directory number.

In the second part of the period, new calls are recorded in idle register spaces in the call register tubes. In the third part of the period, timer spots are advanced and brought up to date and the signals or information recorded in the memory spots regenerated at such intervals as may be necessary or desired. In the fourth part of the period, the call ready for completion spots will be scanned or read and the connections and transmission necessary for completion of the call set up. The initiation of each of these intervals is under control of the program control circuit shown in FIGS. 35 and 40 as described herein.

Normally, before a call is initiated, the programming circuit transmits a positive pulse over conductor 35-30 as described herein at the beginning of each complete line scanning interval which positive pulse is applied to a number of circuits including the "0" inputs of the binary counters 19-11 and 19-12 through diode 19-72 and to the "0" inputs of the flip-flops 19-342 and 10-91 causing all of these circuits to be set in their "0" state or condition if they had been previously set in their "1" state. If they were previously in their "0" state these circuits remain in their "0" state.

In addition, the positive pulse applied to the conductor 35-30, is transmitted through diodes 19-72 and 19-34 to the No. 1 conductor of the horizontal input translator 25-11, which actuates the horizontal control flip-flops 25-301 and 25-302 to turn both of these flip-flops off and thus position the beam on the first column of the first register space. In addition, a positive pulse is transmitted through diodes 19-72, 19-68, condenser 19-37 and diodes 19-15, 19-19, 19-35 and 19-38. The potential applied to the diode 19-15 is transmitted to the "0" input of the flip-flop 18-207, which sets this flip-flop in its "0" state.

and in turn deactivates the circle gate 2–28 thus preventing the writing of circles by the call register tubes. The application of a positive pulse to the diode 19–38 sets the reading flip-flop 18–206 in its "0" state or maintains it in its "0" state if it had been previously left in its "0" state. The application of a positive pulse to diode 19–19 sets flip-flop 19–208 to its zero state. Positive potential from diode 19–68 is also transmitted through diode 19–69 and employed to set flip-flop 19–20, 19–21 through 19–27 and 19–308 all in their zero state. With flip-flop 19–308 set in its "0" state a high positive voltage is obtained from its "0" output and applied to the base terminal of transistors 19–57 and 19–58 through 19–64 thus conditioning these transistor gate circuits for conduction.

The positive pulse applied to diode 19–35 is transmitted over the No. 1 input conductor, of cable 25–19 to the vertical input translator 25–10. Thus, the beam within the cathode ray tube is directed to the first or uppermost spot in the first column. In addition, the application of a positive potential to any of the deflecting flip-flops 25–301, 25–302, 25–201 through 25–204 is transmitted through corresponding ones of a plurality of diodes comprising an "or" circuit to the "0" input of flip-flop 25–205. This pulse sets flip-flop 25–205 in its "0" state or maintains it in its "0" state so that a low voltage is applied to its "1" output which turns off or maintains the beams off in the tubes 2–24 and 2–25. In addition, this positive pulse from the inputs of the deflection control flip-flops is transmitted through the delay device or network 25–23 to the "1" input of the flip-flop 25–205. After the delay interval of this delay device, flip-flop 25–205 is set in its "1" state and applies a relatively high positive voltage to its "1" output terminal which voltage is applied to the control grids in the electron guns of the tubes 2–24 and 2–25 and turns the beams on in these tubes. The delay of the delay device 25–23 is of the order of one to two microseconds or such other time as may be necessary to accurately position the beam within these tubes so that it will be accurately directed to the activity spots of the first call register spaces in the tubes. The positive output from the "1" terminal of the flip-flop 25–205 also is transmitted through the delay device 25–22 to the "0" input of the flip-flop 25–205. The delay interval of this delay device is sufficient to permit the character of the information recorded in the activity spots to be read out and regenerated or rewritten when desired before the positive pulse is applied to the "0" input of the flip-flop 25–205. At the end of this interval, the flip-flop is restored to its "0" state and turns the beams off.

However, during the time the beam is turned on, the character of the information recorded in the activity spots is read out. If a circle representing a "1" had been previously recorded in these spots then a pulse is transmitted through the amplifier 2–30 and wave shaper 2–32 to the No. 1 input of reading flip-flop 18–206 and sets this flip-flop in its "1" state. If on the other hand the dot had been previously stored in these activity spots indicating a "0," then the flip-flop 18–206 will remain in its "0" state. Under the assumed conditions with no calls in progress a dot or "0" will be read out of the call register tubes at this time and thus the reading flip-flop 18–206 remains in its "0" condition.

The positive potential applied to the conductor 35–30 is also transmitted through the diodes 19–72 and 19–68 and the delay network 19–39 to the base of the transistor gates 19–51 and 19–52. The delay interval of the delay network 19–39 is such that a positive pulse is not applied to the base of the transistors 19–51 and 19–52 until ample time is provided for flip-flop 18–206 to be set in its "1" position in response to a circle stored in the activity spot. Under the assumed conditions, of course, this flip-flop is not actuated. Thereafter, after this interval of time the gates 19–51 and 19–52 will be conditioned for conduction. Under the assumed conditions, with flip-flop 18–206 in its "0" state, a positive output is obtained from the "0" terminal of this flip-flop and transmitted through the transistor gate 19–52 which actuates flip-flops 19–208 and 19–308 to their "1" states. Flip-flop 19–308 in being actuated to its "1" state removes the high positive voltage from its "0" output and thus deactivates or prevents conduction through the transistor gates 19–57 and 19–58 through 19–64.

Flip-flop 19–208 in its "1" state applies a positive potential to conductor 19–40 to the upper terminal of the "and" circuit 10–16.

In a similar manner, the circuits of the second pair of register tubes are actuated and operate in substantially the same manner, assuming that no calls are in progress in the system. As a result, a dot representing the "0" is recorded in the activity spot of the first register space in each of the register tubes 2–26 and 2–27 and causes positive potential to be applied to the lower input of the "and" circuit 10–16. Under these circumstances, a positive voltage is obtained on the output of this "and" circuit and applied to the upper input of the binary counter stage 10–17. Binary counter stage 10–17 is either initially set in its "0" state or reset to this state previously as described herein; it is now actuated to its "1" state where it applies a positive voltage to its No. 1 output. This positive voltage is applied to the "1" input of the flip-flop 19–16 thus setting this flip-flop in its "1" position. As a result, a positive voltage is applied to the "1" output of the flip-flop 19–16. This voltage is transmitted through a delay network, a device represented by the resistor 19–32 and condenser 19–33 and applied to the "0" input of the flip-flop 19–16. Thus, the flip-flop is maintained in its "1" state during the delay interval of this delay device represented by resistor 19–32 and condensor 19–33.

During the time flip-flop 19–16 is in its "1" position, a high positive potential is applied to its No. 1 output terminal which potential is transmitted through the diode 19–18 to the "0" input of the flip-flop 19–208 and resets this flip-flop to its "0" condition.

The positive potential from the No. 1 output of flip-flop 19–16 is also transmitted through the diode 19–44 and the delay device 19–41 to the No. 1 input terminals of flip-flops 19–208 and 19–308. Flip-flop 19–308 remains in its "1" state and flip-flop 19–208 is then reoperated to its "1" condition at the end of the delay interval of the delay device 19–41. The purpose and length of the delay interval of the delay device 19–41 is described hereinafter. Operation of the flip-flop 19–208, at this time, again applies a positive potential to the No. 1 output 19–40 and thus to the upper terminal of the "and" circuit 10–16. The circuits of the second pair of register tubes operate in a similar manner and again apply positive potential to the lower input of "and" circuit 10–16. As a result, a second pulse is obtained from the output of this "and" circuit and applied to the upper input of the binary counter stage 10–17, whereupon this binary counter stage is operated to its "0" state where it applies a positive potential to its "0" output terminal which positive potential is transmitted over conductor 10–23 to the upper input of the binary counter stage 19–11. This counter stage is thus actuated to its "1" position where a positive potential is applied to its No. 1 output terminal. This positive potential is transmitted through diode 19–42 to the No. 3 input of the horizontal input translator over the cable conductor 25–20 and thus moving the beams to the first columns of the second register spaces in the first pair of register tubes 2–24 and 2–25. The positive output potential from the No. 1 output of the binary counter stage 19–11 is also transmitter through diode 19–43 and condenser 19–37 to diodes 19–15, 19–38 and 19–35. The positive voltage from diode 19–43 is transmitted through the diode 19–69 to the set "0" inputs of flip-flops 19–20, 19–21, through 19–27 and 19–308 thus insuring that these flip-flops are set in their "0" state. Flip-flop 19–308 in turn conditions the transistor gate circuits 19–57 and 19–58 through 19–64 for conduction. The positive potential transmitted through diode 19–15 is applied to the "0" input of the flip-flop 18–207 thus maintaining this flip-flop in its "0" state. The positive potential transmitted through diode 19–38 is applied to the "0" input of the flip-flop 18–206, thus maintaining this flip-flop in its "0" state and the potential applied to diode 19–35 is transmitted over cable 25–19 to the "1" input vertical lead of the vertical input translator 25–10. Thus, the cathode ray beams within the register tubes 2–24 and 2–25 are positioned on the activity spots on the second register spaces within these tubes.

The actuation of the deflection control flip-flops to position the beams, in the manner described above, first applies a positive voltage to the set "0" input of the flip-flop 25–205 and thus makes certain that this flip-flop is is in its "0" state which in turn insures that the beams are turned off during the times they are being moved. Then flip-flop 25–205, through the delay device 25–23, is again set to its "1" state whereupon the beam is turned back on again and reads the character of the information recorded in the No. 1 or activity spots in the second register spaces. After sufficient time has elapsed to read these spots and regenerate them, as described hereinafter, flip-flop 25–205 is again set in its "0" state due to a positive potential being transmitted from its No. 1 output terminal through the delay device 25–22 to its set "0" input terminal.

The positive potential from the "1" output terminal of the binary counter stage 19–11 is also transmitted through diode 19–43 and the delay device 19–39 to the base of the transistor gates 19–51 and 19–52. As described above, the delay interval of the delay device 19–39 is sufficiently long that the beams within the tubes 2–24 and 2–25 are turned off, repositioned, and turned on for a sufficient interval of time to read out the character of the activity spots and set the flip-flop 18–206 in its "1" state if circles each representing a "1" had been previously stored in the activity spots of the second register spaces. However. under the assumed conditions, dots each representing a "0" are recorded in the activity spots of the second register spaces so that the flip-flop 18–206 remains in its "0" state. Consequently, at the end of the delay interval of the delay device 19–39, a positive potential is transmitted from the "0" output of flip-flop 18–206, the transistor gate circuit 19–52 to the "1" inputs of flip-flops 19–208 and 19–308. The flip-flop 19–308 in its "1" state deactivates the transistor gates 19–57 and 19–58 through 19–64. Flip-flop 19–208 is also actuated to its "1" state where it applies positive potential to conductor 19–40 extending to the upper input terminal of "and" gate 10–16.

The second pair of register tubes 2–26 and 2–27, shown in FIG. 16, are actuated in a similar manner and cause positive potential to be applied to the lower input terminal of the "and" gate 10–16 whereupon a positive output voltage is applied from this "and" gate to the upper input terminal of the binary counter stage 10–17 thus actuating this counter to its "1" state at this time. As a result, positive potential from the "1" output of the binary counter stage 10–17 is again applied to the "1" input terminal of flip-flop 19–16 thus actuating this flip-flop to its "1" state whereupon a positive pulse is transmitted from its "1" output through the delay device comprising resistor 19–32 and condenser 19–33 to its "0" input, thus restoring the flip-flop to its "0" state after a short interval of time determined by the delay interval of the delay network device 19–32, 19–33. As described above, during the time flip-flop 19–16 is in its "1" state, positive potential is applied from its No. 1 output through diode 19–18 to the "0" input of flip-flop 19–208 restoring this flip-flop to its "0" state. Positive potential from the "1" output of flip-flop 19–16 is also transmitted through diode 19–44 and delay device 19–41 to the "1" input terminal of the flip-flops 19–208 and 19–308 thus then again actuating flip-flop 10–208 to its "1" position and making certain that flip-flop 19–308 is in its "1" state. As a result, positive potential from the "1" output of flip-flop 19–208 is transmitted over conductor 19–40 to the upper terminal of the "and" gate 10–16.

In a similar manner, positive potential from the "1" output of the binary counter stage 10–17 is transmitted to the second pair of call register tubes shown in FIG. 16 and their control circuits respond in the manner described above with reference to tubes 2–24 and 2–25 and cause positive potential to be applied to the lower input terminal of the "and" circuit 10–16. As a result, this circuit again applies a positive pulse to the binary counter stage 10–17 and actuates this counter stage to its "0" state at this time. Positive potential from the "0" output of this counter is then transmitted over conductor 10–23 to the upper input terminal of the binary counter stage 19–11. Binary counter stage 19–11 is again actuated in response to this positive potential from its "1" state to its "0" state and applies a positive pulse from its lower output terminal to the upper input terminal of the binary counter stage 19–12. The binary counter stage 19–12 is actuated to its "1" state at this time where it applies positive potential over conductor 19–45 to the diode 10–24 of the "and" gate 10–15. The second set of call register tubes shown in FIG. 16 and their related circuits respond in similar manner and apply positive potential through diode 10–25 of the "and" gate 10–15.

Positive potential from the "0" output of binary counter 10–17 is also applied to the diode 10–26 of "and" gate 10–15 at this time with the result that a positive potential is applied by this "and" gate to the "1" input terminal of flip-flop 10–91 actuating this flip-flop to its "1" state. A positive potential is also applied to the "0" input terminals of flip-flop 15–09 and of binary counters 15–21 and 15–22 setting these circuits to "0."

With the system idle, all of the line flip-flops shown in FIGS. 8 and 13 and also in FIGS. 9 and 14 are set in their "0" states so that positive potential is obtained from the "and" circuits 8–101, 13–102, 9–103 and 14–104. As a result, either the gates 8–11 and 13–11 or gates 9–14 and 14–14 are actuated and apply positive potential to the base of the transistors 15–10 and 15–11. These transistors act as phase inverting amplifiers and maintain their output at a low voltage or potential at this time so that the gate circuits 15–14 and 15–16 are maintained inactive at this time. Consequently, the actuation of the flip-flop 10–91 to its "1" state is ineffective at this time.

So long as the system remains idle the call register tubes operate as described above during the first portion of each complete scanning cycle. During the other portions of the scanning cycles these circuits operate as described hereinafter.

Return now to the call assumed above and the information from the calling line 1–14 recorded which is stored by the line flip-flops 8–850, 8–10, 8–11 and 8–12 through 8–19. On a succeeding scanning cycle, the flip-flops 9–10 and 9–11 are actuated to their "1" and "0" states, respectively, and the gates 8–K and 8–01 through 8–10 and 8–00 are energized or conditioned so that the "1" outputs of the line flip-flops 8–850 and 8–10 through 8–19 are connected to the cable conductors 10–10. In a similar manner the corresponding gates and "1" output terminals from the line flip-flops of FIG. 13 are connected to the set of cable conductors 10–12.

At this time the binary counter 10–17 is set in its "0" state so that a relatively low or negative potential is applied to its "1" output terminal which potential is applied to the gate circuits 10–21 and 10–22 and maintains these gates inactive at this time. A high positive potential is applied to the "0" output terminal of the binary counter stage 10–17, which potential is applied to the gate circuits 10–19 and 10–20, thus activating these gates and causing the potentials from the No. 1 output terminals of the line flip-flops of FIG. 8 to be transmitted over cable conductors 10–10 and over the cable conductors 10–14 to the matching circuit 19–10 of the first pair of call register tubes. In addition, the No. 1 output terminals of the line flip-flops shown in FIG. 13 are connected over the cable conductors 10–12 and gates 10–20 to the cable conductors 10–13 extending to the matching and other control circuits of the second pair of call register tubes shown in FIG. 16.

At this time, the call register control circuits are actuated as described above. A dot or "0" is recorded in the activity spot, under the assumed conditions, because no calls are recorded in these registers. As a result no match is obtained between information recorded in the register spots and the information in the line flip-flops. However, positive potentials are applied to the input terminals of the "and" gate 10–16 in the manner described above which cause the binary counter stage 10–17 to be actuated to its "1" state whereupon the gate circuits 10–19 and 10–20 are rendered inactive and the gate circuits 10–21 and 10–22 are rendered active. Under these circumstances, the No. 1 output terminals of the line flip-flops of FIG. 8 are connected over cables 10–10 and gate circuits 10–21 and cable conductors 10–13 to the matching circuits of the second pair of call register tubes. The No. 1 output terminals of the line flip-flops of FIG. 13 are connected over cable conductors 10–12 and gate circuits 10–22 and cable conductors 10–14 to the match circuit 19–10 of the first pair of call register tubes. Since no calls are registered in the first register spaces of either pairs of call register tubes, no match is obtained, but positive potential is again applied to the input of "and" circuit 10–16 and binary counter 10–17 is restored to its "0" state. With the binary counter stage 10–17 set in its "0" state the line flip-flops of FIG. 8 are again interconnected with the matching circuit 19–10 of the first pair of call register tubes and the flip-flop circuits of FIG. 13 are interconnected with the corresponding matching circuits of a second pair of call register tubes shown in FIG. 16. In addition, a positive voltage or pulse from the "0" output, from the binary counter stage 10–17 is applied to the binary counter stage 19–11 actuating this counter to its "1" state. The circuits of FIG. 16 advance in a similar manner, and as a result, the beams within both pairs of call register tubes are shifted to the second call register spaces within these tubes and read out the characters of the activity spots. Since no calls are registered in these register spaces under the assumed conditions, no match can be obtained, but a positive pulse is again applied to the input circuits of the "and" circuit 10–16. As a result, the binary counter stage 10–17 is again actuated to its "1" state whereupon the line flip-flops of FIG. 8 are interconnected with the matching circuit of the second pair of call register tubes and the line flip-flops shown in FIG. 13 are interconnected with the matching circuit 19–10 of FIG. 19. Here again no match will be obtained since no calls are registered in the call register tubes. Nevertheless, positive pulses are again applied to the input of the "and" circuit 10–16 in the manner described above and binary counter stage 10–17 again actuated to its "0" state. At this time, another pulse is applied to binary counter stages 19–11 and 19–12 so that positive potential is applied to diode 10–24 by the first pair of call register tubes' circuits and a similar potential applied to diode 10–25 by the second pair of call register tubes' circuits. Positive potential is also applied to diode 10–26 so that positive potential is obtained on the output conductor of the "and" circuit 10–15, which potential actuates the flip-flop 10–91 to its "1" state.

In the above-described operation, the setting of the line flip-flops 8–12 through 8–19, inclusive, which are set in accordance with the subscriber's line 1–14, have been compared with information recorded in the first register space in the register tubes 2–24 and 2–25, then with the information recorded in the first register space of the tubes 2–26 and 2–27, then with the information recorded in the second register space of tubes 2–24 and 2–25 and finally with the information recorded in the second register space of tubes 2–26 and 2–27. Under the assumed conditions, no informaiton was recorded in any of these register spaces so that the setting of the line flip-flops did not correspond. On the initiation of a call a match is not obtained because the calling line number is not registered in these tubes at that time. As a result, at this time the flip-flops 8–850, 8–10 through 8–19 still remain in their actuated position representing the identity of the line 1–14 as well as the fact that this line circuit has changed from an open circuit condition to a closed circuit condition. Consequently, the output of the "and" circuit 8–101 is maintained at a relatively low or negative potential so that the output of the phase inverter transistor 15–10 is at a relatively high positive voltage. Thus, the diode 15–12 does not short-circuit the activating voltage for the gate circuits 15–14. With the flip-flop 10–91 actuated to its "1" state, the gate circuit 10–11 is rendered ineffective and with the binary counter 15–21 in its "0" state the gates 15–16 would be actuated except for the fact that the diode 15–13 shunts the actuating potential because the line flip-flops in FIG. 13 are all set in their "0" state so that positive potential from the "and" gate circuit 13–102 is transmitted through the gate circuit 13–11 to the phase inverting transistor 15–11. Consequently a low or negative voltage is applied to diode 15–13 so this diode prevents build up of a conditioning voltage to the gates 15–16.

At this time, a corresponding low or negative potential is applied to the inputs of the phase inverting circuits 15–23 and 15–24 because they are not connected to any of the line flip-flops so no voltage source is connected to their inputs. As a result, a relatively high positive voltage is obtained from these circuits and applied to the input of the "and" circuit 15–139. Consequently, a positive output voltage is applied to actuate the gate circuit 15–20 which thus transmits a cycle of current from the oscillator 15–19 to binary counter 15–21. Binary counter 15–21 is actuated to its "1" state in response to this current where it applies positive potential to its "1" output terminal and conditions the control conductor of gates 15–14. At this time, the potential of this conductor is allowed to rise to a relatively high positive voltage and activate the gates 15–14. As a result, these gates operatively interconnect the output of the line flip-flops of FIG. 8 over cable 10–10 and the gate circuits 15–14 to the cable conductor 15–25 extending to the common flip-flops 33–601 to 33–610 and 33–612. In addition, under the assumed conditions, with flip-flop 8–10 actuated to its "1" state, a positive potential is now applied to the input of the inverting circuit 15–23 with a result that a lower or negative voltage is applied by this inverting circuit to "and" circuit 15–139 so that the gate circuit 15–20 is rendered inactive, thus cutting off the alternating currents from the oscillator 15–19 to the binary counter 15–21. Consequently, this binary counter stage is maintained in its "1" state at this time and as a result the gate circuits 15–14 are maintained activated. The setting of the line flip-flops of FIG. 8 is thus transferred to the common flip-flops of FIG. 33. In other words, the fact that the line flip-flop 8–10 is positioned in its "1" state causes the line flip-flop 33–601 to be similarly actuated. Likewise, the common flip-flops 33–601 through 33–610 are actuated to the same conditions as the corresponding line flip-flops 8–10 through 8–19. Consequently, these common flip-flops 33–601 through 33–610 and 33–612 which are set in the same condition as the flip-flop 8–850, and 8–10 through 8–19 now record the identity of the subscriber's line 1–14 and the fact that the signaling condition on this line changed from an open circuit condition to a closed circuit condition.

The actuation of one or more of the common flip-flops

33–603 through 33–610 applies a positive voltage through corresponding ones of the diodes of the "or" circuit 33–10 to the delay device or network 33–11. The delay device or network 33–11 provides a short delay sufficiently long to allow all of the common flip-flops 33–601 through 33–610 and 33–612 to be actuated. At the end of the delay interval a positive pulse is transmitted over conductor 33–12 and through the right-hand gate 15–14 and gate 8–00 to the "0" inputs of all of the line flip-flops of FIG. 8 thus restoring these flip-flops to their "0" states. Positive voltage is then applied to all of the inputs of the "and" circuit 8–101. A positive voltage is then transmitted through the gate circuit 8–11 to the base of the phase inverting transistor 15–10. This transistor then applies a negative voltage to the diode 15–12 which in turn prevents the conditioning of the gate circuits 15–14. The restoration of the flip-flop 8–10 and the restoration of gates 15–14 removes the positive potential from the input of the phase inverting circuit 15–24 so that a positive potential is applied to all of the inputs of the "and" circuit 15–139, thus activating the gate 15–20. Binary counter 15–21 is then actuated so that if other subgroups of line flip-flops still have information stored in them, tihs information may be transmitted to the common flip-flops as described herein. Under the assumed conditions, however, all of the line flip-flops will now be set on "0" so that a positive potential is applied to all of the inputs of the "and" circuit 8–105 which in turn restores the binary counter 10–17 to its "0" state. The circuits are now in condition to respond in a similar manner to the setting of the second groups of line flip-flops shown in FIGS. 9 and 14 during the succeeding line scanning interval.

At the time the signals are stored in the flip-flops 33–601, 33–602 through 33–610 and 33–612, as described above, flip-flop 33–400 is set in its "0" state. Flip-flops 38–401 and 33–403 are also set in their "0" states and flip-flop 33–402 is set in its "1" state. Initially, these flip-flops may be set in the above-described states by operation of suitable starting keys or circuits and they are returned to the above-described states after various operations of the circuits as described herein. For example, each time a pulse is obtained from the "and" circuit 35–14 a portion of this pulse is transmitted to the binary counter stage 35–106 and changes the state of this binary counter. Each time the binary counter stage 35–106 is set in its "1" state a pulse is transmitted to the transistor gate 33–613. The transistor gate 33–613 is conditioned for conducting at this time, since the flip-flops 33–400 and 38–401 are both in their "0" states. As a result, a low or negative voltage is applied to the base of the transistor 33–613. Consequently, under the assumed conditions this transistor transmits the pulse from the "1" output of the binary counter stage 35–106 to the "1" input of the flip-flop 33–402. This pulse sets this flip-flop in its "1" state if it was previously in its "0" state or maintains it in its "1" state if it was previously in its '1" state.

It is also assumed that the binary counter 35–106 is actuated to its "0" state the first time during each complete line cycling period that a pulse is obtained from the "and" circuit 35–14. Consequently, the flip-flop 33–402 will be positioned in its "1" state under the assumed conditions when the signals representing the identity of the calling line and the fact that it has changed from an open circuit condition to a closed circuit condition are stored in the flip-flops 33–601 through 33–610 and 33–612.

At the time a pulse is transmitted back over the conductor 33–12 to reset the line flip-flops to their "0" state as described above the flip-flop 33–403 is positioned in its "0" state as pointed out above so that the gate circuit 33–611 is not active or conductive. Consequently the pulse transmitted over conductor 33–12 is not transmitted through the gate circuit 33–611.

At this time, it is necessary to determine whether the subscriber's line, assumed to be 1–14 from which the signals are obtained, is initiating a call or whether the signal received was the termination of a flashing signal or other supervisory signal received from this line. In order to determine this, the information recorded in the flip-flops 33–601 through 33–610 and 33–612 designating this line, is employed to determine whether or not a connection is established to this line through the switching network.

With the flip-flop 33–402 in its "1" state at this time as described above, a positive voltage is applied to its No. 1 output lead which conditions the transistor gate circuits 33–631 through 33–640 and 33–642. As a result, these gate circuits transmit voltages or positive pulses from the "1" outputs of those flip-flops 33–601 through 33–610 and 33–612 which are set in their "1" state. Under the assumed conditions, the flip-flop 33–601 is so set so that a positive voltage will be transmitted through the transistor gate circuit 33–631 and the diode 33–18 to the conductor 33–20. This positive pulse is transmitted from conductor 33–20 through the condenser 33–21 to the "0" input of a flip-flop 33–381, thus insuring that this flip-flop is set in its "0" state. The positive potential from the conductor 33–20 is also transmitted through the diode 33–19 to the transistor gate circuit 32–10, thus rendering this gate circuit active. When the transistor gate circuit 32–10 becomes active, it connects the battery or potential source 32–12 to the conductor 32–15 extending to the line translators 24–10 and 24–11. The voltage of the source 32–12 is sufficient in magnitude to apply a busy test voltage to the calling subscriber's line termination circuit as described herein.

In addition, the application of a positive voltage to the conductor 33–20 conditions the transistor gate circuits 33–290 through 33–299 for conduction. As a result, the positive voltages from the No. 1 output terminals of the flip-flops 33–603 through 33–610 are transmitted through the transistor gates 33–633 through 33–640 and through transistor gates 33–290 through 33–297 to the corresponding network line translator flip-flops of FIG. 24. These voltages represent the designation of the calling subscriber's line 1–14 in binary code for each of the decimal digits identifying the calling subscriber's line or station. In the exemplary embodiment described herein, these voltages represent the directory number of the subscriber's line. Thus the voltages applied to the translator 24–10 represent the number 1 for 10's digit so the first flip-flop is set in its "1" state. The voltages applied to the units translator 24–11 represents the number 4 so that the third flip-flop 24–06 only will be set in its "1" state.

The flip-flops of these translators are supplied from the high voltage source 24–12 which is at least as high as or higher than the maximum voltage it is desired to obtain from these translators. Consequently, the output conductors from these flip-flops are either at a high voltage substantially equal to the voltage of source 24–12 or they are at relatively low voltages which may be either near ground potential or negative. Thus, when the flip-flops are set in their "0" state, high positive voltage is obtained from their "0" output and low voltage from their "1" outputs. When the flip-flops are set in their "1" state, high positive voltage is obtained on their "1" output terminals and a low or negative voltage from their "0" output terminals.

Each of the translators 24–10 and 24–11 has ten output leads, one for each of the ten different values of the particular denominational order. Each of these output conductors is connected to the output of an "and" circuit having four input diodes or similar devices. The input conductors to each of the "and" circuits are connected to either one or the other of the output conductors of each of the flip-flops. These connections are so arranged that for any setting of the input flip-flops one and only one of the ten output leads will have a high voltage connected to it. All of the other output conductors will have at least one diode connected between it and some one or more outputs from the flips-flops which are at a low or negative voltage. One of the conductors, however, will have all of the diodes connected to output conductors from the input flip-flops which are at the high positive voltage substantially equal to the voltage of source 24–12. The magnitude of the output voltage, however, is equal to or less than the voltage of source 24–12 and is determined by the magnitude of the voltage received from source 32–12 through the activated transistor gate circuit 32–10. When the voltage applied to any of the diodes of the "and" circuits interconnect with the flip-flops which have the high positive voltage of source 24–12 applied to it, it becomes back-biased so that its impedance becomes high. When all of the diodes of one of the "and" circuits are thus back-biased, the output of the "and" circuit will rise to a voltage determined by the voltage of conductor 32–15 which under the aforementioned conditions will be the voltage of source 32–12 transmitted through the transistor switch 32–10.

The voltages on the output conductors from the translators of FIG. 24 are transmitted to the diode matrix circuits of FIG. 17. These circuits are sometimes called number group circuits. These circuits comprise a plurality of diodes interconnected between the various output conductors from the translator and the conductors extending to the subscriber's line circuit terminations. Thus, under the aforementioned conditions with high voltage applied to the No. 1 conductor from the tens translator 24–10 and to the No. 4 conductor from the units translator 24–11, such high voltages are transmitted through the respective diodes 17–44 and 17–54 and resistor 17–65 to the conductor 17–14 extending to the termination of the subscriber's line 1–14. Since all of the other output conductors from the translators of FIG. 24 are at a relatively low voltage, the higher voltage is applied only to the one subscriber's line termination.

If this line circuit is connected to a trunk or other line through the switching network of FIG. 31, this increased voltage will increase the current flowing over the conductor 17–14 and through the switching network of FIG. 31 over circuits described herein and in particular will cause an increased voltage drop across the resistor 17–34 connected in series with the conductor 17–14. This voltage is applied through an input transformer 17–64 and diode 17–74 to the protective device 17–61 and to the input of an amplifier represented by transistor 17–60. If the subscriber's line is connected to some other circuit, a positive voltage will be obtained on the output conductor 17–102, which positive voltage is transmitted over this conductor to the "1" input of the flip-flop 33–381 and in turn sets this flip-flop in its "1" state. Such circuit operations indicate that the signal received from the subscriber's line represented termination of some supervisory signal or pulse.

However, under the assumed conditions, the signal represents the initiation of a call or the request for service so that the subscriber's line 1–14 is not connected to any other line or trunk circuit at this time. Consequently, an increased current does not flow through the resistor 17–34 nor over conductor 17–14 so that no positive potential is applied to the conductor 17–102 at this time and as a result the flip-flop 33–381 remains in its "0" state at this time.

With flip-flop 33–381 set in its "0" position and the transistor gate 33–298 conditioned for conduction as described above, condenser 33–22 starts to have its upper terminal charged to a positive potential from a high positive voltage from the "0" output terminal of the flip-flop circuit 33–381. It requires appreciable time for this condenser to receive a sufficiently positive charge to cause operation of the circuits as will now be described. If the subscriber's line 1–14 had been connected through the network flip-flop 33–381 would be actuated to its "1" state, and interrupt the charging before the charge on the condenser 33–22 could have become sufficient to actuate the circuits to be described.

However, under the assumed conditions, flip-flop 33–381 is not actuated to its "1" state because the subscriber's line 1–14 is assumed to be not connected through the network. Consequently, after a short interval of time during which the condenser 33–22 becomes charged a positive potential is relayed to the diode 33–16. Since a positive potential is already connected to the upper terminal of diode 33–15 from the "1" output of the flip-flop 33–601 through the transistor gate 33–631, the output of the "and" circuit comprising the two diodes 33–15 and 33–16 becomes positive and applies a positive voltage to the "1" terminal of the flip-flop 33–403, thus setting this flip-flop in its "1" state.

In addition, the positive potential from the condenser 33–22 is transmitted through the diode 33–23 and the delay device or network 33–24 to the "0" input of the flip-flop 33–400. Since this flip-flop was assumed to be in its "0" state, this pulse produces no effect upon this circuit. However, the pulse from the delay network 33–24 is transmitted through the diode 33–25 and conductor 33–26 to the tens and units line translators 24–10 and 24–11 where it sets all of the flip-flops of these translators to their "0" condition, thus restoring the circuits in FIG. 24 to their original inactive condition.

The positive potential or pulse from the "and" circuit comprising the diodes 33–15 and 33–16 is transmitted over conductor 33–27 to the gate circuits shown in FIGS. 10 and 15 and to the call register tubes shown in FIG. 16 and in FIGS. 18 through 23 and 25 through 30, inclusive. The positive potential transmitted over the lead 33–27 is transmitted through the delay network 15–28 of FIG. 15.

The flip-flops 15–420 and 15–421 are set at "0" at this time. If these flip-flops initially start in their "1" condition when power is applied to the system, a positive potential is transmitted from the "1" output of flip-flop 15–421 to the "0" input of flip-flop 15–420 thus setting this flip-flop in its "0" state. Likewise, a positive pulse is transmitted from the "1" output of a flip-flop 15–421 through the delay network 15–29 to the "0" input of the flip-flop 15–421 thus setting the flip-flop 15–421 in its "0" state. Consequently, when a pulse is transmitted through the delay network 15–28, the transistor gate 15–27 will be conditioned for conduction since a positive voltage is connected to its base from the "0" output of the flip-flop 15–421. The positive voltage transmitted through the gate circuit 15–27 sets the flip-flop 15–420 in its "1" state and this flip-flop in turn then applies positive voltage to the base of the transistor gate 15–26, thus conditioning this gate for conduction. As a result, alternating current from the oscillator 15–19 is transmitted through the gate 15–26 to the input of the binary counter stage 15–22. Binary counter 15–22 is initially set in its "0" state at this time due to the positive voltage received from the "and" gate 10–15 as described above. This counter takes one step on each cycle of current from the oscillator 15–19. The counter 15–22 alternately energizes the gate circuits 15–17 and 15–18 and interconnects the line flip-flops of FIG. 33 alternately with the control circuits of the storage register tubes of FIGS. 18 through 23 and 25 through 30 and the register tubes and control circuits of FIG. 16.

The positive potential over start conductor 33–27 is also applied to the "0" inputs of the binary counters 20–X1 and 16–X2 and 16–Y2, thus setting all of these counter stages to zero. As described above the binary counter 15–22 is set in its "0" state at this time.

A positive potential on the start lead 33–27 is also transmitted through the diodes 20–17 and 20–18 to the set "0" lead of the flip-flop 18–206, thus insuring that this flip-flop will be in its "0" state. The positive pulse from the start conductor 33–27 is also transmitted through the delay network 20–19 and also through diodes to the input conductors of both cables 25–19 and 25–20 to the No. 1 input terminals of the vertical input translator 25–10 and the horizontal input translator 25–11. Thus, the beams within the call register tubes are directed to the No. 1 spots in the No. 1 columns; that is to the activity spots within these tubes. After the beams are directed to these spots, the beams are turned on to read the information or charge stored therein. If a circle was previously stored in these spots then the flip-flop 18–206 would be set in its "1" state. If on the other hand dots had been previously stored on these spots, then the flip-flop 18–206 will remain in its "0" state.

Assuming first that the flip-flop 18–206 is actuated to its "1" state at this time, then the positive potential on its "1" output terminal is applied to the collector electrode of the transistor gate 20–100. At about the same time, the positive potential applied to the delay network 20–19 has been transmitted through this delay network and actuated a flip-flop 20–310 to its "1" state where a positive conditioning potential is applied to the base of the transistor gate circuits 20–100 and 20–101.

If as assumed above a circle has been written in the first or activity spot of the first call register space, indicating that this space is busy and has other information stored in it, then the positive pulse from the "1" output of the flip-flop 18–206 is transmitted through the transistor gate circuit 20–100 and through one of the diodes of the "or" gate circuit 20–15 and over the conductor 18–27 which sets the flip-flop 18–207 in its "1" state and turns on the circle gates 20–28 which cause circles to be rewritten in the No. 1 or activity spots of these register spaces.

Figure 20:
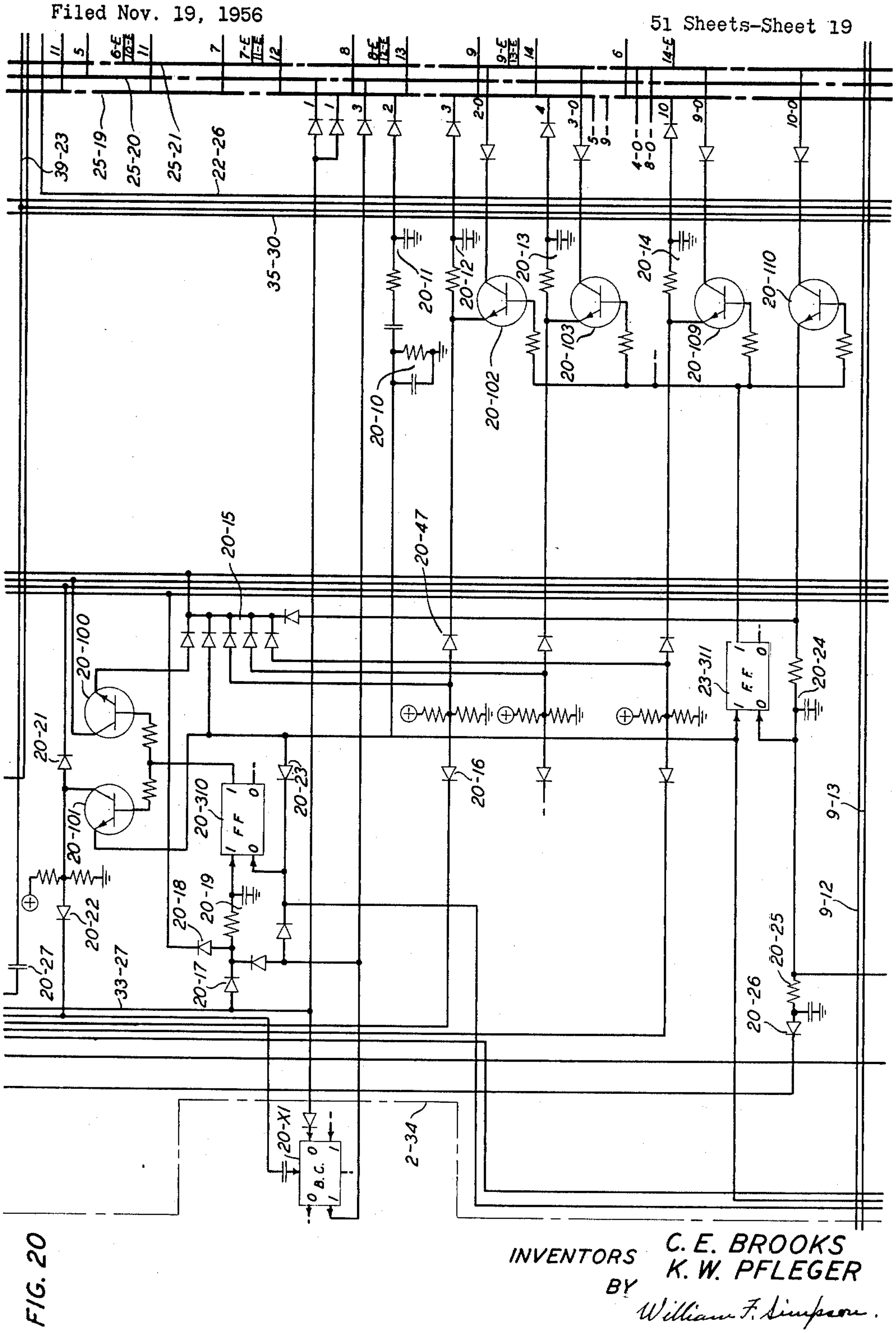
FIG. 20 shows a portion of the control circuits for the call register tubes for entering or storing information relative to calls in said call register tubes.
Figure 33:
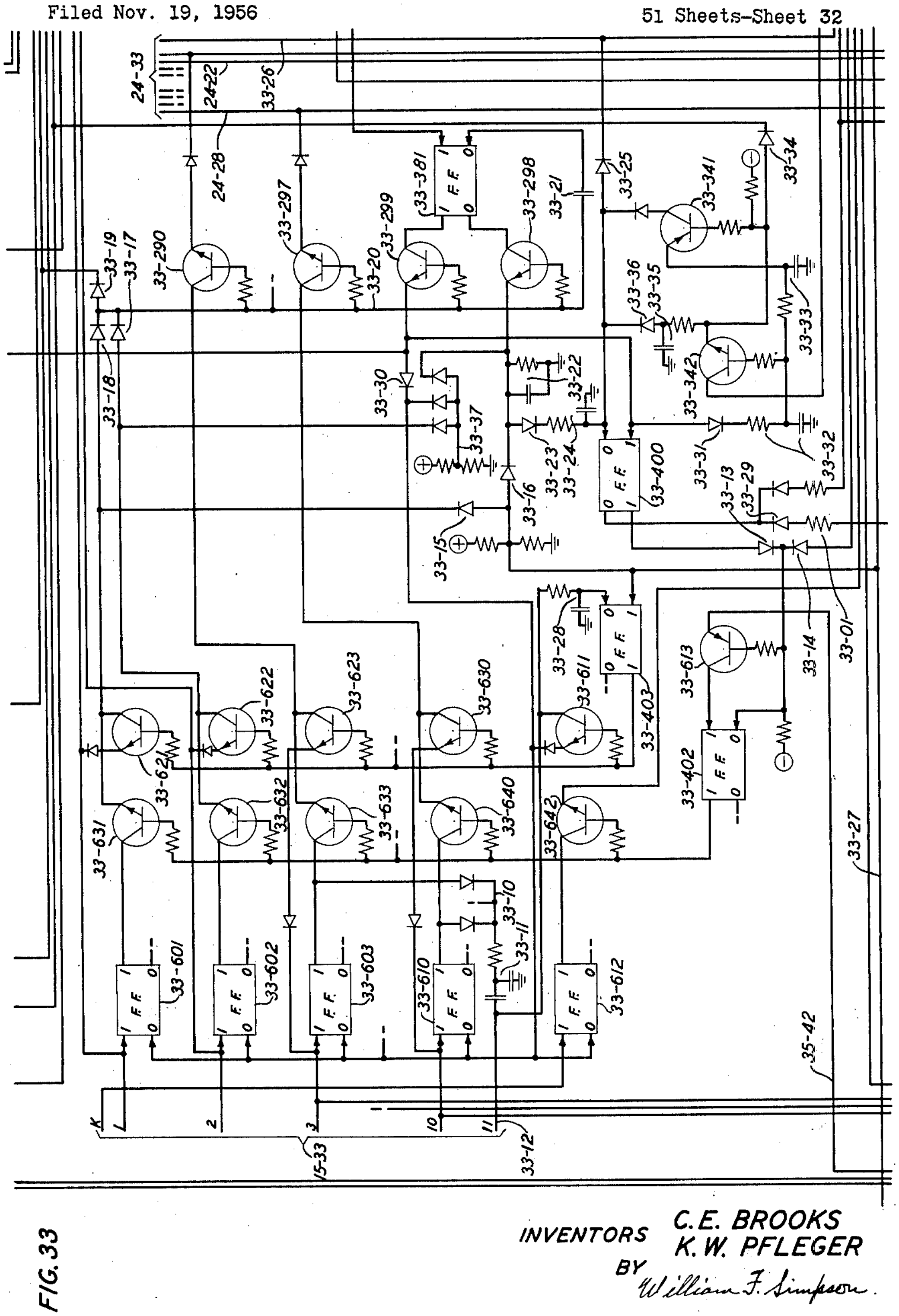
FIG. 33 is a part of the common control or common flip-flop circuits employed for making busy tests.

Substantially simultaneous with the above-described operation of the circuits of FIGS. 18 and 20, the circuits of the second set of call register tubes, represented at 2–35, are actuated in a substantially similar manner. If it is assumed that the binary counter 15–22 is initially set in its "0" state at this time, then the outputs from the common flip-flops of FIG. 33 are transmitted over the cable 15–25 and the gate circuit 15–18 and over the cable conductors 10–14 to the circuits of the first set of call register tubes 2–24 and 2–25. Then, upon the next cycle of the oscillator 15–19, the circuits of the call register tubes 2–26 and 2–27 are interconnected through the gate circuits 15–17 to the common flip-flop circuits.

Upon the establishment of the connection from the line flip-flops to the control circuits of the register tubes shown in FIG. 16, a positive potential is applied over the No. 1 conductor from the No. 1 terminal of flip-flop 33–601 and transistor gates 33–631 and 33–621 to the input terminal of the binary counter 16–X2, thus causing this counter to advance and be set in its "1" state. If dots are recorded in the activity spots of the first register spaces in the second set of call register tubes 2–26 and 2–27 then the circuits of these tubes operate in the manner described hereinafter. If, however, circles are stored in these activity spots then the circles will be rewritten in the spots as described above and the binary counter stage 15–22 allowed to take a second step in response to a second cycle or pulse from the oscillator 15–19. As a result, the gate circuits 15–17 are deactivated and the gate circuits 15–18 are again activated and reconnect outputs of the common flip-flops of FIG. 33 to the control circuits of the call register tubes 2–24 and 2–25. As a result, a positive voltage is again connected to the No. 1 conductor of the cable 10–14, which voltage is applied to the input of the binary counter 20–X1, thus advancing this counter to its "1" state where a positive potential is applied to the No. 3 conductor of the cable 15–20 and thus to the No. 3 conductor of the vertical input translator 25–11. As a result, the beams within these tubes are caused to be directed to the activity spots of the second or succeeding register spaces in these tubes. If these spaces are likewise busy, then the circuits act as described above and cause circles to be rewritten in these spots in the manner described herein. Thereafter, the binary counter 15–22 takes another step in response to the next cycle from the oscillator 15–19, whereupon the gates 15–18 are deactivated while the gates 15–17 again become conducting and cause the control circuits of the call register tubes 2–24 and 2–25 to be disconnected from the common flip-flops while the control circuits of tubes 2–26 and 2–27 are reconnected to the common flip-flops of FIG. 33. As a result, a second positive voltage potential or pulse is applied to the No. 1 conductor of cables 10–13, which voltage is transmitted to the control circuits of FIG. 16 where this pulse is applied to the input of the binary counter 16–X2 causing this counter to change from its "1" state to its "0" state which in turn causes the binary counter 16–Y2 to be shifted to its "1" state. With the binary counter 16–Y2 actuated to its "1" state, a positive potential will be applied to the control circuits of FIG. 16 to move the beams in tubes 2–26 and 2–27 to the next succeeding call register spaces. If these spaces are busy, then circles will be stored in the activity spots and these circles will later be rewritten in the manner similar to that described above and the circuits again advanced.

In this fashion a search is made through all of the call register spaces of all of the call register tubes for a pair of idle call register spaces. In the specific embodiment of this invention described herein sufficient call register spaces are provided in the call register tubes so that one such pair of spaces will substantially always be available for registering a new call.

We will now assume that the system is idle so that dots are stored in the activity spots of the first call register tubes 2–24 and 2–25. Under these circumstances, as pointed out above, when the beam is directed to these activity spots and turned on, the flip-flop 18–206 remains in its "0" state because dots were previously stored in the associated activity spots of the first call register spaces. Under these circumstances, when the flip-flop 20–310 is actuated to its "1" state and positive potential applied to the base elements of the transistor gates 20–100 and 20–101, current does not flow through the transistor gate circuit 20–100. Instead, since a positive potential is applied to the diode 20–21 from the "0" output of the flip-flop circuit 18–206, in addition, positive potential from No. 1 conductor of cable 10–14 is applied to the diode 20–22. Consequently, the output of this "and" circuit becomes positive and causes a positive voltage to be transmitted through the gate circuit 20–101.

The positive potential from the gate circuit 20–101 is applied to a number of circuits and diodes as will now be described. In the first place, positive potential from the output of the gate circuit 20–101 is applied through one of the diodes of the "or" circuit 20–15 to the "1" input of the flip-flop 18–207 which is set in its "1" state and actuates the circle gates 20–28. As a result, a circle is now written in the No. 1 or activity spot of the first register space in each of the call register tubes 2–24 and 2–25 indicating that this space is busy and engaged in recording and storing information relative to a call.

In addition, the positive potential from the transistor 20–101 is applied to the No. 1 input of the flip-flop 15–421 and thus actuates this flip-flop to its "1" state. This flip-flop then resets the flip-flop 15–420 to its "0" state and turns off the gate 15–26, thus turning off the supply of current or pulses from the oscillator 15–19. Consequently, binary counter 15–22 remains in its "0" state and maintains the gate circuits 15–18 active and the gate circuits 15–17 inactive.

The output from the gate circuit 20–101 is also applied to the set "1" input of the flip-flop 20–311 actuating this flip-flop to its "1" state so that positive potential from its "1" output activities the gates 20–101 through 20–110.

The output from the gate device 20–101 is also applied to the condenser network 20–10 and charges this condenser network so that the positive potential is obtained on the output of the gate 20–101 for a sufficiently long interval of time to insure the reliable operation of the various flip-flops and other circuits as described herein.

The output from the gate 20–101 is also applied through the diode 20–23 to the "0" input of the flip-flop 20–310 restoring this flip-flop to its "0" state which in turn deactivates the gate circuit 20–101. However, as explained above, the condenser 20–10 maintains a positive output on the output terminal of the gate 20–101 for a sufficiently long interval of time to reliably actuate the various circuits and in addition to send a pulse through the delay device 20–11 to the No. 2 conductor of cable 25–19. A positive pulse applied to this conductor is translated by the vertical input translator so that the appropriate deflecting flip-flops 25–201 through 25–204 are properly actuated to move the cathode ray beams from the first register spots in the first register spaces to the second register spots in these register areas. As described above, upon the actuation of these vertical deflection flip-flops, flip-flop 25–205 is also actuated, which insures that the beams are turned off during the time they are being repositioned and then turned on for a brief interval of time while directed to the second spots of the register spaces or areas being employed.

The actuation of the deflecting flip-flops in turn applies potentials to the output translator 25–12 and after the delay interval determined by the respective delay devices, such as 25–13, a positive pulse or voltage is applied to the No. 2 odd output conductor of cable 25–21. This voltage is applied to this conductor at about the same time or a very short interval of time after the electron beam has been directed to the second spot and turned on. This voltage is transmitted over the No. 2 odd conductor of cable 25–21 to the gate circuit 20–102. This gate circuit is active at this time since the flip-flop 20–311 is in its "1" state. Consequently, a positive pulse or voltage from the output of the gate circuit 20–102 is applied to the delay network or delay device 20–12 and also to the diode 20–47.

If the flip-flop 33–603 is set in its "1" state at this time, a positive potential from its No. 1 output terminal is transmitted through transistor gates 33–633 and 33–623 over the No. 3 conductor of cable 15–33 and then through the No. 3 gate of gates 15–18 and over cable 10–14 to the diode 20–16. The diodes 20–16 and 20–47 comprise an "and" gate and when both inputs are positive, a positive voltage or pulse is applied through a diode of the "or" gate 20–15 to the No. 1 input of the flip-flop 18–207, thus setting this flip-flop in its "1" state and activating the circle gates 2–28. As a result, circles are written in the No. 2 spots of these register spaces.

If the flip-flop 33–603 had not been actuated to its "1" state then a positive potential would not have been applied to the diode 20–16 at this time so that dots would be written in the No. 2 spots of the register space.

After a sufficient interval of time to permit the circuits to operate as described above and write circles in the second spots in the register spaces, the positive potential from the transistor gate circuit 20–102 will be transmitted through the delay device or delay network 20–12 to the No. 3 conductor of cable 25–19. As a result, the deflecting circuits are again actuated to turn off the beam within the register tubes 2–24 and 2–25 and reset the flip-flop 18–207 to its "0" state and direct the beams to the next lower or No. 3 spots and again turn on the beams. In addition, upon the application of a positive voltage to the No. 3 conductor of cable 25–19 and the actuation of the deflecting flip-flops, the positive voltage applied to the No. 2 odd output conductor from the output translator 25–12 is removed. Then, when the beams have been redirected and turned on, on the next storage spots of the register spaces, a positive voltage or pulse is applied to the No. 3 odd output terminal of the translator 25–12 and transmitted to the gate circuit 20–103. The circuits then operate to write either a dot or circle in the No. 3 spot of the register space in substantially the same manner as described above. In this fashion, charges or signals or information representing the setting of the flip-flops 33–603 through 33–610 of FIG. 33 are stored or recorded in the spots 2 through 9 of these register spaces. In addition, after recording either dots or circles in the No. 9 spots of these register spaces, a pulse will be transmitted through the gate circuit 20–109 and through the delay device 20–14 to the No. 10 conductor of cable 25–19 and cause the beams to be directed to the tenth or "make" spots. Thereafter, the output from the transistor gate 20–110 causes a positive pulse to be transmitted through the "or" circuit 20–15 which in turn causes circles to be written in the tenth or "make" spots. In addition, after the circles are thus written in the "make" spots, a positive output from the transistor gate 20–110 is transmitted through the delay device 20–24 to the "0" input of a flip-flop 20–311, thus restoring this flip-flop to its "0" state and deactivating the transistor gate circuits 20–102 through 20–110.

A positive pulse is also transmitted through the delay device or network 20–25 and diode 20–26 over conductor 11 in the cable 10–14 and gate circuits 15–18 to conductor 33–12 of FIG. 33 and then through the gate circuit 33–611 to the set "0" input of the flip-flops 33–601 through 33–610 and 33–612, thus restoring all these flip-flops to their "0" states. In addition, the positive potential received over conductor 33–12 at this time is also transmitted through the delay device 33–28 to the "0" input of the flip-flop 33–403, thus restoring this flip-flop to its "0" state and deactivating the transistor gates 33–621 through 33–630 and 33–611. The delay device 33–28 delays the resetting of the flip-flop 33–403 to its "0" state until after all of the line flip-flops 33–601 through 33–610 and 33–612 have been restored to their "0" state.

At this time, the identity of the calling line 1–14 has been recorded in the first register spaces of the call register tubes 2–24 and 2–25 together with the circles in the activity spots of these register spaces and circles in the "make" spots of these register spaces indicating that the subscriber's line 1–14 when last tested or scanned was closed.

The circuits now resumed their normal cycle of operations substantially as described. Following the above-described scanning cycle during which the circuits in FIG. 11 recognize the change in the subscriber's line condition from an open circuit to a closed circuit condition representing the initiation of a call or request for service, the deflecting circuits of the scanning tubes 1–10 and 1–11, 1–20 and 1–21 are again actuated so that the beams within the tubes are deflected and directed to the spaces assigned to lines 1–14 and 1–22. At this time, the beams in tubes 1–10 and 1–11 will be first directed to the area adjacent to the phototransistor 1–34. Inasmuch as, under the assumed conditions, the subscriber's line is now closed, current will flow through this transistor and amplifier 11–10 and actuate the flip-flop 11–12 to its "1" state in the manner described above. The beams within these tubes are turned off while being positioned and turned on to illuminate the transistor after which the flip-flop 11–12 is actuated. This action takes place during the time between the pulses from oscillator 35–01 setting all the stages of the binary counter 35–02 to their "0" states and the time when the binary counter stages are set in their "1," "1," and "0" states reading from top down. After the next pulse from the oscillator 35–01, a pulse is obtained from the "and" circuit 35–14. The beams are then turned off and moved to the upper spots and subsequently turned on so that the characters of these spots will be employed to actuate the flip-flop 11–14 in the manner described above. Inasmuch as, under the assumed conditions, the flip-flop 11–14 is actuated, at this time to its "1" state, its "0" output will be at a low voltage so that when the output from the flip-flop 11–12 is transmitted through the delay device 11–37 the "and" circuit 11–16 does not have a high positive output, voltage or pulse at this time.

As described herein, the output from the "1" terminal of the flip-flop 11–12 is also transmitted through the delay device 11–36 to the conductor 11–28. This pulse is transmitted to this conductor shortly after the stages of the counter 35–02 are set in their "1," "0," "1" states. This pulse is transmitted through the diode 40–38 and the pulse stretcher 40–41 to the base of the transistor gate 35–11, thus deactivating this gate. A positive output is obtained from the pulse stretcher 40–41 for an interval of time sufficiently long to suppress three cycles or three pulses from the oscillator 35–01.

Meantime, the positive output from the "1" terminal of the flip-flop 11–12 after being transmitted through the delay network 11–36 is also transmitted through the "or" circuit 11–19 to the circle gates 1–31. As a result, these gates are turned on and the supply of quadrature currents to the deflecting plates of the tubes 1–10 and 1–11 cause a circle to be rewritten in the upper storage spot associated with line 1–14. After sufficient time has been provided for writing this circle, the positive output pulse from the pulse stretcher 40–41 terminates and causes another pulse to be transmitted to the counter 35–02 with the result that a positive pulse is obtained from the output of the "and" circuit 35–15. This pulse turns off the beams within the scanning tubes and causes the deflecting circuits to direct the beams to the lower storage spots. However, since the subscriber's line is now closed and was closed on the previous scanning cycle, it is unnecessary to read the character of the signals stored in the lower storage spots of line 1–14 because with the line closed on two successive scanning cycles, as assumed, a ringing current will not be transmitted over the subscriber's line and circles will not be stored in the lower spots. Inasmuch as the flip-flop 11–14 is not reoperated to its "1" state, since the lower spot is not read at this time, the gate circuit 35–11 remains activated and transmits the succeeding pulse from the oscillator 35–01 to the counter 35–02, which causes this counter to be reset to its "0" state in the manner described above. Then, the beams are again deflected to areas assigned in other lines and the above cycle of operations repeated.

Each succeeding time the beams are directed to the areas assigned to line circuit 1–14 as above-described, operations as above described take place so long as the line circuit 1–14 remains closed.

Meantime, during each of the complete scanning cycles during which all of the subscribers' lines are scanned, the storage register tubes and control circuits operate to compare the information stored in the call register tubes with any information which may be received from line flip-flops through the gate circuits shown in FIGS. 10 and 15. However, so long as the subscriber's line 1–14 remains closed and the circuit conditions of all of the other subscribers' lines do not change, no pulse or information is transmitted to the line flip-flops so that no information is transmitted through the gate circuits of FIGS. 10 and 15 to the call register tubes and control circuits.

However, at the beginning of each complete scanning cycle a positive pulse is obtained from the binary counter stage 35–104 and transmitted over conductor 35–30 to set the flip-flop 10–91 on "0." This pulse also sets the binary counter stages 19–11 and 19–12 in their "0" states and is transmitted through the diode 19–68 to set the flip-flops 19–20, and 19–21 through 19–27 to their "0" states. It also sets the flip-flop 19–308 in its "0" state which activates the transistor gate circuits 19–57 through 19–64. The positive pulse transmitted through the diode 19–68 is also transmitted through the condenser 19–37 and diode 19–38 to the set "0" input of flip-flop 18–206, thus insuring that this flip-flop is set in its "0" state. The positive pulse transmitted through the condenser 19–37 is also transmitted through the diode 19–15 to the set "0" input of flip-flop 18–207, thus insuring that this flip-flop is then set in its "0" state.

The positive pulse transmitted through the diode 19–68 is transmitted through condenser 19–37 and diode 19–35 to the No. 1 conductor of the vertical input translator. The pulse transmitted over conductor 35–30 is applied through diodes 19–72 and 19–34 to the No. 1 conductor of cable 25–20 of the horizontal input translator. As a result, the beams within the tubes 2–24 and 2–25 are directed to the first register spots in the first register areas in these tubes, due to the operation of the flip-flops shown in FIG. 25, and the transistor amplifiers shown in the right-hand portion of FIG. 18. Here again, as described herein, the beams are turned off during the time they are being positioned and then turned on for a short interval of time to read the characters of the charges representing the information stored in these first storage spots. Under the assumed conditions, when the beams are turned on after being positioned on the No. 1 spots of the first register areas they will find a circle recorded there which causes a positive output voltage to be obtained and transmitted through tthe amplifier 2–30 and wave shaping device 2–32 to the set "1" input of the flip-flop 18–206. Thus, when the positive pulse from the diode 19–68 is transmitted through the delay network 19–39 to the base elements of transistor gates 19–51 and 19–52, a positive pulse is transmitted through the transistor gate 19–51 at this time instead of through transistor gate 19–52 as described above. The positive pulse obtained from the gate 19–51 is transmitted through diode 19–13 to the set "1" input of the flip-flop 18–207 actuating this flip-flop to its "1" state where it in turn activates the circle gates 2–28 and connects the sources of quadrature current from the circle generator 18–10 to the deflecting elements or plates of the storage tubes 2–24 and 2–25 causing the circles to be rewritten in the No. 1 spots of the first storage areas in these tubes.

In addition, the positive output from the gate 19–51 is transmitted to the delay network 19–14. After ample time has been allowed for the circles to be rewritten in the No. 1 or activity spots of the first register areas or spaces in the call register tubes 2–24 and 2–25, a positive pulse is obtained from the delay device 19–14 which pulse is transmitted over the No. 2 conductor of cable 25–19 to the vertical input translator. The resulting output from the vertical translator actuates the control flip-flops, sets flip-flop 18–207 in its "0" state and turns off the beams within the tubes 2–24 and 2–25 and activates the control circuits to direct the beams to the second spots in the first call register areas. In addition, the positive voltage output from the delay device 19–14 is transmitted through the diode 19–65 to the set "0" input of the flip-flop 18–206, thus restoring this flip-flop to its "0" state.

After the beams have been directed to the second spots in the first columns in the call register tubes 2–24 and 2–25 the beams are again turned on in the manner described herein and the flip-flop 18–206 actuated to its "1" state if a circle had been previously recorded in this spot. If a dot had been previously recorded in this spot flip-flop 18–206 remains in its "0" state. At about this same time a positive output is obtained from the output translator on the No. 2 odd output conductor of cable 25–21 which positive pulse is transmitted through the transistor gate 19–57 to the auxiliary read-out network 19–01. As described above, the transistor gates 19–57 through 19–64 are in condition for conduction at this time because the flip-flop 19–308 is in its "0" state so that a relatively high positive potential is applied from its "0" output terminal to the base elements of these transistors.

Network 19–01 is an auxiliary read-out network shown in FIG. 66. The auxiliary read-out network as shown in FIG. 66 comprises transistors 66–10 and 66–11 and diodes 66–12 and 66–14. This network also includes a delay network or device 66–13.

The output from the transistor gate 19–57 is applied to the base elements of the transistor gates 66–10 and 66–11 in the auxiliary read-out network 19–01 and conditions these gates for conduction.

Assuming now that circles had been previously recorded in the second spots in the first register areas. As a result, the flip-flop 18–206 is actuated to its "1" state so that a relatively high positive potential is applied to conductor 18–25, which is connected to the upper transistor gate in the auxiliary read-out network 19–01 corresponding to the transistor 66–10 of FIG. 66. Consequently, a positive voltage is transmitted through this gate to the set "1" input of flip-flop 19–20, thus setting this flip-flop in its "1" state. A positive voltage is also transmitted through the diode 19–47 to conductor 18–27 which sets the flip-flop 18–207 in its "1" state and in turn causes circles to be rerecorded in the second spots in these register spaces.

The output from the transistor gate 66–10 is also transmitted through the diode 66–12, delay network 66–13 and the diode 66–14 and over conductor 18–24 to the set "0" input of the flip-flop 18–206, thus restoring this flip-flop to its "0" state. The output from the delay network 66–13 is also transmitted through the lower right-hand output of the auxiliary read-out network 19–01 to the No. 3 conductor of cable 25–19 and to the vertical input translator 25–10.

Instead of assuming that circles had been previously recorded in the No. 2 spots of the first register spaces of the tubes 2–24 and 2–25, assume now that a dot had been previously recorded therein. Then the flip-flop 18–206 will remain in its "0" state when the beams are first turned on these second spots as described above. Consequently, a positive potential remains applied to conductor 18–26 while a low or negative voltage is applied to the conductor 18–25. Under these circumstances a positive voltage will be transmitted through the lower transistor of the auxiliary read-out network 19–01 instead of through the upper transistor of this network. Thus, in FIG. 66, current is transmitted under these assumed conditions through the transistor 66–11. This current or pulse will not be transmitted through the diode 66–12 because it is opposed by the high resistance of this diode. A positive potential, however, is transmitted through the delay network 66–13 and the diode 66–14 to the set "0" conductor or terminal of flip-flop 18–206, thus insuring that this flip-flop is set in its "0" state. A positive pulse is also transmitted through the delay network 66–13 and over the No. 3 conductor of cable 25–19 to the vertical input translator.

Thus, if a circle had been recorded in this second spot of the first register space, a flip-flop 19–20 is set in its "1" state, a circle rewritten in this spot and a positive potential applied to the No. 3 conductor of cable 25–19. On the other hand, if a dot had been previously recorded in this second spot, then the flip-flop 19–20 remains in its "0" state. A circle is not written in the second spot in the first register space, but a positive potential is applied to the No. 3 conductor of cable 25–19. The positive potenital applied to this conductor No. 3 of cable 25–19 is delayed in both cases for a sufficiently long interval of time to permit the above-described operations to take place.

The potential applied to the No. 3 conductor of cable 25–19 is transmitted to the No. 3 input terminal of the vertical input translator 25–10. As a result, the deflection control flip-flops of FIG. 25 are actuated and turn off the beams within the call register tubes 2–24 and 2–25, reset the flip-flop 18–207 to its "0" state and cause the beams to be directed to the No. 3 spots in the first call register spaces. The beams are then turned on as described above and the above cycle of operation is repeated. At this time, however, the auxiliary reading network 19–02 is actuated and the flip-flop 19–21 conditioned in its "1" state, if circles had been previously recorded in the third spots of the first columns of the first register spaces. In addition, circles are rewritten in these third spots, in the manner described above, with reference to the auxiliary read-out network 19–01 and the second spots in the first register spaces.

If dots had been previously recorded in the third spots of the first register spaces, then the flip-flop 19–21 remains in its "0" state. Thereafter, the above cycle of operation is repeated successively with respect to the fourth, fifth, sixth, seventh, eighth and ninth spots in the first register spaces.

During the time the beams within the tubes 2–24 and 2–25 are directed to the ninth spots in the first columns of the first register spaces, the auxiliary reading network 19–08 is employed in the manner described above with reference to the auxiliary read-out network 19–01. The flip-flop 19–27 is set in its "1" state if circles had been previously recorded in the No. 9 spots and circles are rewritten in these spots. If dots had been previously recorded in these spots, then the flip-flop 19–27 remains in its "0" state. At the end of this interval of time, the beams within the tubes 2–24 and 2–25 will be turned off, due to the restoring of the flip-flop 25–205 to its "0" state, by a positive pulse transmitted from its "1" output through the delay device or network 25–22 to its set "0" input.

At this time, the flip-flops 19–20 through 19–27 are set in accordance with the signals stored in the first register space of the call register tubes 2–24 and 2–25 representing the identity of the subscriber's line 1–14. The "1" outputs from these flip-flops are connected to a match circuit 19–10.

As described above, at this time, the outputs from the line flip-flops shown in FIG. 9 are connected over cable 10–10, the gate circuits 10–19 and cable 10–14 to the input circuit of the call register tubes 2–24 and 2–25. As described above, the conductors of this cable extend to FIG. 19 and FIG. 20. The conductors carrying signals representing the identity of the calling subscriber's line extends to the match circuit 19–10. Under the assumed conditions, the flip-flops of FIG. 9 will all be set in their "0" state so that no match will be obtained by the match circuit 19–10 and so that no output pulse will be obtained on conductor 19–49.

After the No. 9 storage spots have been read out a positive output voltage is obtained from the auxiliary read-out network 19–08 on conductor 19–48. The positive voltage output from the auxiliary read-out network 19–08 at this time is transmitted over conductor 19–48 and through delay network 19–41 to the set "1" inputs of flip-flops 19–308 and 19–208. In its "1" state flip-flop 19–308 deactivates the transistor gates or switches 19–57 through 19–64. As described above, the actuation of the flip-flop 19–208 applies a positive pulse on its No. 1 output terminal and over conductor 19–40 to the "and" circuit 10–16.

At this time, the circuits of FIG. 16 have also applied positive potential to the other input conductor of "and" circuit 10–16. These positive potentials are applied, as described above, under the assumed conditions that the system is idle or else in the manner described above due to the operation of the corresponding auxiliary read-out networks. As a result, the gate circuits of FIGS. 10 and 15 are advanced and cause the outputs of the line flip-flops of FIG. 14 to be connected to the match circuit 19–10 while the outputs of the line flip-flops in FIG. 9 are connected to the call register tubes 2–26 and 2–27. Under the assumed conditions, these circuits all operate in a manner similar to that described above since no match will be obtained. As a result, the binary counter 19–11 is actuated which causes the flip-flops 19–20 through 19–21 to be restored to their "0" conditions and the circuits operate to advance the beams within the call register tubes to the second call register spaces and cause their activity spots to be read out. If these spots have dots in them the circuits advance as described above under idle conditions and if these spots have circles recorded in them then the circles are rewritten and the information recorded in the calling line identification spots is read out into the flip-flops where it is matched with the line number information contained in FIGS. 9 and 14.

As pointed out above, each of the complete scanning intervals is divided into four parts for controlling the call register tubes. During the first part, the information temporarily stored in the line flip-flops is compared with the information stored in the call register tubes and if a match is found the additional information is recorded in the call register tubes. If no match is found, then during the second part of the interval the condition of the calling line is checked and if signals in the line flip-flops represent a request for service, i.e., the initiation of a call, the calling line number together with the fact that the line is closed is recorded in idle register spaces in one of the pairs of call register tubes.

During the third of the intervals the storing and registering of information in timing spots within the call register tubes takes place.

As shown in FIG. 55 the first three spots in the second column of each of the call register spaces in the call register tubes are employed as a one-tenth second timer. The next two spots in the second column are employed as a ten second timer.

At about the middle of each of the scanning intervals, the binary counter 35–104 is advanced from its "0" condition to its "1" state. At this time, positive potential is applied by this binary counter stage to its "1" output terminal which is transmitted over conductor 35–38 to one of the inputs of gate circuit 23–03, through the delay device or network 23–10 to the gate circuit 23–04, and to the set "0" input of flip-flop 23–306. The gate circuit 23–03 controls the tenth second timer while the gate circuit 23–04 controls the ten second timer. The gate circuit 23–03 also receives positive pulses over conductor 35–39 from the program control circuit shown in FIGS. 35 and 40. A positive pulse is applied to this conductor at intervals of approximately a tenth of a second and this pulse is maintained at its positive value for an interval of time equal to or slightly shorter than the time required to scan all of the subscribers' lines once. Likewise, the gate circuit 23–04 is supplied with similar pulses over conductor 35–40 and through the delay device or network 23–11 approximately every ten seconds which pulse likewise has a duration of a time interval equal to or slightly shorter than the time required to scan all of the lines once. The pulses applied to the conductor 35–38 at approximately the middle of each of the complete scanning intervals do not produce any effect on the circuits unless the tenth second timing pulses and the ten second timing pulses are also applied to the respective gate circuits 23–03 and 23–04.

The pulses are applied to the gate circuit 23–04 through a delay device or networks 23–10 and 23–11 which delay the pulses for an interval of time sufficiently long to insure that flip-flop 23–306 is set in its "0" state.

Assume now that a pulse is applied to the conductors 35–39 and 35–40. The application of the ten second pulse to the conductor 35–40 is delayed for a short interval of time by the delay device or network 23–11. The delay interval of this network is of the same order as the delay of the network 23–10. Thus, the pulse on conductor 35–38 first sets the flip-flop 23–306 to "0" and then at the end of the delay interval of delay device 23–10 it is applied to the gate circuit 23–04.

Assume also that a tenth second timing pulse is also applied to the conductor 35–39 at this time so that the gate circuit 23–03 is rendered active and causes a positive pulse to be delivered to its output terminal. This output pulse is transmitted through diode 23–01, conductor 23–02, diode 22–17 and conductor 18–24 to the "0" input of the flip-flop 18–206, thus insuring that this flip-flop is set in its "0" state at this time. The positive pulse from the gate circuit 23–03 is also transmitted through diodes to the set "0" input of the binary counter stages 22–27, 22–28, 22–29, 23–30, and 23–31, and to the set "0" inputs of the flip-flops 22–305, 22–300, 22–304, and 23–307, thus insuring that all of these circuits are set in their "0" states.

The output from the gate circuit 23–03 is also transmitted through diode 22–18 over the "1" conductor of cable 25–19 and thus to the "1" input of the vertical input translator 25–10.

The positive output from the gate circuit 23–03 is also transmitted through the transistor gate 22–83 and over the "1" conductor of cable 25–20 to the "1" input terminal of the horizontal input translator 25–11. The gate circuit 22–83 is normally conducting at this time due to the negative bias voltage normally applied to its base circuit from the "1" output of flip-flop 23–300 which is in its "0" condition due to the pulse from gate 23–03.

The application of positive potential to the No. 1 input terminals of both the vertical and horizontal input translators actuates the flip-flop circuits of FIG. 25 as described herein and causes the circuits to function to insure that the flip-flop 18–207 is set in its "0" position. The beams within the tubes 2–24 and 2–25 are turned off and directed to the activity spots of the first register spaces, and then turned on. If dots had been previously recorded in these activity spots, the flip-flop 18–206 remains in its "0" state. If circles had been previously recorded in the activity spots of the first register spaces in these tubes, then the flip-flop 18–206 is actuated to its "1" state.

Assuming first that dots had been previously recorded in the activity spots of these register spaces so that the flip-flop 18–206 remains in its "0" state.

After sufficient time has been allowed for the flip-flop 18–206 to be actuated to its "1" state a positive pulse from the gate circuit 23–03 is transmitted through the delay device or network 23–09 to the base circuits of the transistor gates 23–69 and 23–70. Under the assumed conditions, with flip-flop 18–206 in its "0" state the transistor 23–70 becomes active and causes a positive output pulse to be applied to the base of the transistor gate 24–83 thus rendering this gate circuit inactive. Part of the energy from transistor 23–70 flows over transistor gate 22–84 now enabled by positive potential on its base from the "0" output of flip-flop 25–302. From gate 22–84 a pulse enters delay network 22–25. A short interval of time later as determined by the delay interval of the delay device 22–25 a positive pulse from the delay device or network 22–25 is applied to the No. 3 conductor of cable 25–20 which extends to the No. 3 input of the horizontal input translator 25–11. As a result, the beam circuits within tubes 2–24 and 2–25 are again cut off and the beams directed to the No. 1 activity spots in the third columns which are the first columns of the second register spaces in these tubes. If dots had been previously recorded in these spots, as assumed herein, then the flip-flop 18–206 remains in its "0" state and the circuits remain otherwise in substantially the same state as described above until the beams are employed for some other purpose.

The beams within the call register tubes 2–26 and 2–27 are actuated in a similar manner by the corresponding control circuits 2–35 under the assumed conditions.

Thus, with the call register spaces idle, nothing is recorded in the timer spots within the call register tubes even though both the timing pulses and the control pulses from the program control circuits are applied to the gate circuits 23–03 and 23–04 and flip-flop circuit 23–306.

Assume now that, as described above, a circle is recorded in the activity or first spots in the first columns of the first register spaces within the call register tubes 2–24 and 2–25. Thus, when the beams are directed to these spots, as described above, the flip-flop 18–206 is actuated to its "1" condition instead of remaining in its "0" state. As a result, when the positive pulse from the gate circuit 23–03 is transmitted through the delay device 23–09 and applied to the base of the transistor gate circuits 23–69 and 23–70, gate circuit 23–69 becomes active instead of the gate circuit 23–70 as described above.

The positive output from the gate circuit 23–69 is applied, at this time, through diode 23–12 to conductor 18–27 which sets the flip-flop 18–207 in its "1" condition. The circle gates 2–28 are in turn rendered active and cause circles to be regenerated or rewritten in the No. 1 activity spots of these register spaces.

After ample time has been provided for rewriting circles in these activity spots, a positive pulse from the output of the transistor gate circuit 23–69 is transmitted through the delay device or delay network 23–13 and diode 23–14, over conductor 18–24 to the set "0" input on the flip-flop 18–206, thus restoring this flip-flop to its "0" state. In addition, a positive voltage is applied at this time through diode 23–15 to the No. 6 conductor of cable 25–20, thus applying a positive pulse to the No. 6 input of the vertical translator 25–11. As a result, the beams within the call register tubes 2–24 and 2–25 are turned off and flip-flop 18–207 set in its "0" state, thus deactivating the circle gates 2–28. The beams are then directed to the next highest even-numbered vertical columns of memory spots within these tubes which will be the No. 2 or second columns, and since the vertical deflection is not changed it will be directed to the No. 1 spots in the even or second columns which are the first of the tenth second timer spots. After the beams have been directed toward these spots they are then turned on and if circles had been previously recorded in these spots, flip-flop 18–206 is set in its "1" state whereas if dots had been previously recorded in these spots flip-flop 18–206 remains in its "0" state. Under the assumed conditions with dots having been previously recorded in these time spaces the flip-flop 18–206 remains in its "0" state.

With the flip-flop 22–304 set in its "0" state, as described above, a high positive voltage is obtained from its "0" output terminal which voltage conditions the gate circuits 22–71, 22–72, 22–73 and 22–74 for conduction. As a result, after sufficient time has been provided for flip-flop 18–206 to be actuated in its "1" state if circles had been previously recorded in these spots, a positive potential is applied by the delay network similar to delay network 25–13 to the No. 1 even output terminal of the output translator 25–12. This positive potential is conducted over corresponding conductor of cable 25–21 to the gate circuit 22–71 and then to the auxiliary read-out network 22–13. This network is thereby conditioned for operation and if the flip-flop 18–206 had been set in its "1" state in response to circles previously recorded in this timer spot, then the auxiliary read-out network 22–13 applies a positive pulse to the input of the binary counter stage 22–27 and sets this stage in its "1" state. On the other hand, if as assumed above flip-flop 18–206 remains in its "0" state, then no such pulse is applied to the binary counter stage 22–27. It should be noted that no pulse is applied to the "1" input of the flip-flop 18–207 so that circles are not rewritten in these spots at this time even though circles had been previously written therein and read out as described above. After a delay interval, as described above, positve output is obtained from the auxiliary read-out network 22–13 and applied to the conductor 18–24 which resets the flip-flop 18–206 in its "0" state which had been previously actuated to its "1" state.

In addition, a positive pulse is transmitted over diode 22–19 to the No. 2 conductor of cable 25–19 and then over the No. 2 input of the vertical translator 25–10. As a result, the circuits operate as described above and turn off the beam within the tubes 2–24 and 2–25. This insures that the flip-flop 18–207 is set in its "0" state and directs the beams within the tubes 2–24 and 2–25 to the second spots in second columns of the first call register spaces. After the beams have been accurately thus positioned, they are again turned on and cause the flip-flop 18–206 to be set in its "1" state if circles had been previously recorded in these spots or to remain in its "0" state if dots had been previously recorded therein.

After the beam has been turned on, positive voltage is obtained on the No. 2 even output conductor from the output translator 25–12. This voltage is transmitted through the transistor gate 22–72 to the auxiliary read-out network 22–14. If the flip-flop 18–206 was positioned in its "1" state due to circles having previously been recorded in the No. 2 spots, binary counter stage 22–28 is set in its "1" state. However, as assumed herein, the flip-flop 18–206 will remain in its "0" state at this time because dots had been previously recorded in the No. 2 spots. After a delay interval, due to the delay network in the auxiliary read-out network 22–14, a positive potential is applied through diode 22–21 to the "3" input lead of the vertical translator 25–10, over the cable 25–19 which causes the beams to be turned off and positioned to the No. 3 spots in the second columns and the above cycle of operations repeated in the binary counter 22–29 in accordance with the information previously recorded in this spot. After an interval of time, determined in part by the delay network within the auxiliary read-out network 22–15, a positive output pulse is obtained from the lower right-hand output conductor of this network 22–15. This positive pulse is applied to the input to the binary counter stage 22–27 and adds one to the count recorded in the binary counter stages 22–27, 22–28 and 22–29. Thus, under the assumed conditions, the binary counter stage 22–27 will be set in its "1" state and the remaining counter stages 22–28 and 22–29 remain in their "0" states. The positive pulse obtained from the auxiliary read-out network 22–15 is also applied to the set "1" input conductor of the flip-flop 22–304, thus actuating this flip-flop to its "1" state.

With flip-flop 22–304 in its "1" state, positive potential is removed from the "0" output of this flip-flop which deactivates the gate circuits 22–71, 22–72 and 22–73. The gate circuit 22–74 is also deactivated after a delay interval determined by the delay network or device 22–20. This delay interval is sufficiently long to permit the gate circuit 22–74 to remain active while the next spots which are the "make" spots, are read out, as described below.

When the flip-flop 22–304 is actuated to its "1" state, a positive potential is applied to its "1" output terminal and transmitted through the transistor gate 22–95. This transistor gate is normally conditioned for conduction due to the bias potential normally applied to its base. The output of the transistor gate 22–95 applies positive potential to the No. 1 input conductor of the auxiliary writing networks 22–05, 22–06, 22–07 and also applies positive potential to the No. 10 conductor of cable 25–19 and the No. 5 conductor of cable 25–20. As a result, the beams are positioned to the No. 10 vertical spots and the odd rows in the call register spaces with the result that the beams are directed to the "make" spots. If dots had been previously recorded therein, then the flip-flop 18–206 remains in its "0" state. On the other hand, if, as assumed above, circles were previously recorded in these spots, then the flip-flop 18–206 is actuated to its "1" state. A short interval of time later, a positive potential is applied to the No. 10 odd output conductor of the output translator 25–12. This positive potential is transmitted through the gate circuit 22–74 which is still maintained active due to the operation of the delay network or device 22–20. As a result, the auxiliary read-out network 22–16 is rendered active. Since the flip-flop 18–206 is assumed to be in its "1" state at this time, a positive output is obtained from the auxiliary read-out network 22–16 and applied to the "1" input of the flip-flop 22–305. As a result, positive potential is removed from its "0" output which renders the "and" gate circuit 22–11 inactive so that this gate circuit cannot be actuated at this time. Positive output potential from the No. 1 output terminal of the flip-flop 22–305 is applied to the diode 22–22, thus partially conditioning the "and" gate circuit 22–10.

The positive potential from the "1" output of the flip-flop 22–305 is also transmitted through the diode 22–23 and conductor 18–27 to the "1" input of the flip-flop 18–207, thus setting this flip-flop in its "1" state which in turn activates the circle gates 2–28 and causes circles to be rewritten in the "make" spots. In addition, as described above, positive potential from the auxiliary read-out network 22–16 is applied to conductor 18–24 which resets the flip-flop 18–206 to its "0" state after the circles have been rewritten. With the flip-flop 23–307 set in its "0" state, as described above, positive potential is obtained on the "0" output of this flip-flop and is applied to the base electrodes of the transistor gates 23–86 and 23–91, thus conditioning these gate circuits for conduction.

In addition, positive output potential is obtained from the lower right-hand output of the auxiliary read-out network 22–16 and applied to the base of the transistor gates 23–92 and 23–93. One or the other of these gate circuits will thereupon become active or conducting and transmit an output pulse. If the flip-flop 23–306 is in its "0" state, indicating that no 10 second timing pulse has been received during this scanning interval, then an output pulse is obtained from the transistor gate 23–93. If on the other hand the flip-flop 23–306 is in its "1" state, indicating that a 10 second timing pulse has been received, then the gate circuit 23–92 will be rendered active. If no 10 second timing pulse has been received, then the circuits operate as described hereinafter except that the 10 second timing control circuits and related control equipment do not operate. Instead, the beam is immediately positioned to the No. 1 spot in the second column and the circuits of the tenth cycle counter respond as described hereinafter.

However, when a 10 second timing pulse has been received, the gate circuit 23–92 is rendered active and causes a positive output pulse to be transmitted to the No. 4 conductor of cable 25–19 and conductor 6 of cable 25–20, thus positioning the beams to the No. 4 spots in the second columns which are the first 10 second timer spots and as a result the characters of the charges previously recorded in these spots are read out. If circles have been previously recorded therein, then the flip-flop 18–206 is actuated to its "1" state. If dots had been previously recorded in these spots then the flip-flop 18–206 remains in its "0" state. A short interval of time later, positive potential is obtained from the No. 4 even output terminal of the output translator 25–12 which is transmitted through the transistor gate 23–86 and conditions the auxiliary read-out network 23–17. As previously mentioned the transistor gates 23–86 and 23–91 are conditioned for conduction by a flip-flop 23–307 which is in its "0" state. As a result, the auxiliary read-out network 23–17 is conditioned for operation and if circles had been previously stored in these spots, the binary counter stage 23–30 is actuated. If dots had been previously stored, as assumed herein, then this counter stage remains in its "0" state. The No. 5 output from the auxiliary readout network in either event applies positive potential to the set "0" input terminal of flip-flop 18–206, thus insuring that this flip-flop is then in its "0" state and the No. 6 output from this auxiliary read-out network also applies positive potential to the No. 5 conductor of cable 25–19 which is transmitted to the vertical input translator and causes the beams to be advanced to the No. 5 spots in the second columns and the above cycles of operations repeated, this time employing the transistor gate 23–91, the auxiliary read-out network 23–18 and the binary counter stage 23–31. If, as assumed herein, dots had been previously recorded in these No. 5 spots, then the binary counter stage 23–31 remains in its "0" state. The No. 5 output from the auxiliary read-out network 23–18 is applied to the set "0" input of the read-out flip-flop 18–206, thus insuring that this flip-flop is set in its "0" state. In addition, the positive pulse from the No. 6 output of the read-out network 23–18 is applied to the input of the binary counter stage 23–30, thus causing "1" to be added to the count recorded in the binary counter stages 23–30 and 23–31. As a result, the binary counter stage 23–30 is set in its "1" state while the binary counter stage 23–31 remains in its "0" state under the assumed conditions.

In addition, the positive potential obtained from the output of the auxiliary read-out network 23–18 is applied to the set "1" input of the flip-flop 23–307 which sets this flip-flop in its "1" state. As a result, positive potential is removed from the "0" output of this flip-flop, thus deactivating the transistor gates 23–86 and 23–91. In addition, positive output is applied to the No. 1 output terminal of the flip-flop 23–307 which is transmitted through the delay device or network 23–16 to the "1" inputs of the auxiliary writing networks 23–08 and 23–09. A positive pulse is also transmitted through the condenser 23–07 to the No. 4 conductor of cable 25–19 and the No. 6 conductor of cable 25–20, thus causing the beams within the tubes to be again directed to the No. 4 spots in the second column. After the beams are again turned on, in the manner described herein, a positive voltage is applied to the No. 4 even output terminal of the output translator 25–12 which voltage is transmitted to the input of the auxiliary writing network 23–08 and conditions this network for operation. If the binary counter stage 23–30 is in its "1" state, as assumed above, positive potential is applied to its "1" output terminal, which potential is transmitted to auxiliary writing network 23–08, which network in turn transmits a positive voltage over conductor 18–27, thus setting the flip-flop 18–207 in its "1" state and causing circles to be written in the No. 4 spots of the second columns of the register spaces.

A short interval of time later after the circle has been fully written, a positive output is obtained from the auxiliary writing network 23–08 and applied to the No. 5 conductor of cable 25–19 with the result that the beam is turned off and directed to the No. 5 spot of the second column and the above cycle of operation repeated, this time employing the auxiliary writing network 23–09 and the binary counter stage 23–31. Inasmuch as this binary counter stage was assumed to be in its "0" state, positive output is not obtained on its No. 1 output terminal so that positive potential is not transmitted by the auxiliary writing network 23–09 over conductor 18–27. Consequently, circles are not written in the No. 5 spots at this time. A short interval of time later, positive output is obtained from the auxiliary writing network 23–09 and applied to the No. 1 conductor of cable 25–19, thus directing the beams in tubes 2–24 and 2–25 to the No. 1 spots in the second columns of the register spaces. As a result, the above-described cycle of writing operations is again repeated, this time employing the auxiliary writing network 22–05 and binary counter 22–27. Since this binary counter stage was assumed to be in its "1" state, circles are written in the No. 1 spots of the second columns.

The above writing cycle is again repeated for the second and third spots in these columns which employ the respective auxiliary writing networks 22–06 and 22–07 and the respective binary counter stages 22–28 and 22–29.

Thus, when circles have been previously written in the activity spots of the call register spaces and either a tenth second timing pulse or a tenth second timing pulse and a 10 second timing pulse received during a scanning cycle, then the corresponding timing spots are read out and the timers advanced by a count of one and the new count of these timing counters recorded in the corresponding timing spots in the call register spaces.

The tenth second binary counter stages are provided with three output "and" circuits 22–10, 22–11 and 22–12. The operation of these circuits together with the output "and" circuit from the binary counter stages 22–30 and 22–31 will be described hereinafter.

Upon the completion of the above-described writing operations, positive potential is obtained on the output conductor 22–24 which is transmitted through the gate circuit 22–85 which is conditioned for conduction at this time by the negative bias voltage applied to its base circuit from the "1" output of flip-flop 22–300 which is in its "0" state at this time. At this time there is no output from the "and" circuit 22–10 under the conditions assumed above.

The output from the transistor gate 22–85 is transmitted through the gate circuit 22–84 and through the delay network 22–25. The transistor gate 22–84 is conditioned for conduction at this time because of the high positive potential applied to its base circuit from the "0" output of the flip-flop 25–302. Since the beams within the tubes 2–24 and 2–25 are assumed to be directed to the No. 1 storage spaces within these tubes, the flip-flop 25–302 is in its "0" state at this time.

The output from the transistor gate 22–84 is transmitted through the delay network or device 22–25 and the diode 22–30 to the No. 3 conductor of cable 25–20 extending to the horizontal input translator 25–11.

From the delay network 22–25, positive potential is also transmitted through the diode 22–18 to the "1" conductor of cable 25–19 extending to the vertical input translator. The application of positive potential to the No. 1 vertical input conductor and to the No. 3 horizontal input conductor, which conductors extend to the respective translators, interrupts the beams within the call register tubes, restores the flip-flop 18–207 to its "0" state and directs the beams within these tubes to the second or succeeding call register spaces within these tubes.

The output from the delay device 22–25 is also transmitted over wire 23–02 and through the delay device 23–09 to the bases of the transistor gates 23–69 and 23–70 at about the same time that the beams within these call register tubes have positioned a flip-flop 18–206 in its "1" state if circles had been previously recorded in the activity spots of the second or succeeding call register spaces. Thereafter the circuits operate in substantially the same manner as described herein. If dots had been previously recorded in the activity spots in these register spaces then the circuits are advanced and the activity spots of succeeding register spaces read out. If on the other hand circles had been previously recorded in this activity spot then the circuits operate as described above and cause the information recorded in the tenth second timer spots to be read out and the count increased by "1". Likewise, the information recorded in the 10 second timing spots is read out and the count advanced by "1".

After either dots have been read out of the activity spots of the second or last register spaces or after the timing spots have been advanced as described above and if circles are read out of the activity spots of the second register spaces, positive potential will be applied to the collector of the transistor gate 22–84. The base of this transistor gate, however, will now be at a relatively low or negative voltage so that this gate will be inactive and unable to transmit the positive voltage applied to its collector. As pointed out above, the base of this transistor gate is connected to the "0" output of the deflection control flip-flop 25–302. Since this flip-flop is in its one state at this time to cause the beam to be directed to the second or last register space, a low or negative voltage is applied to its "0" output thus preventing conduction through the transistor gate 22–84. Consequently the beams within the call register tubes 2–24 and 2–25 are inactive until actuated as described above during the same or a subsequent scanning cycle.

The beams within the second pair of call register tubes 2–26 and 2–27 are actuated in a similar manner to advance the timing spots in the various register spaces in these tubes concurrently with the advancing of the timing spots in the first pair of register tubes 2–24 and 2–25 as described above.

Thereafter, during succeeding cycles of operations of the program control circuits the subscriber's line is scanned in a manner described above and if the signaling condition on none of the lines changes then the information recorded in the register spaces in the call register tubes remains unchanged. If on the other hand the signal condition on any of the lines changes then the circuit responds as described herein.

Figure 22:
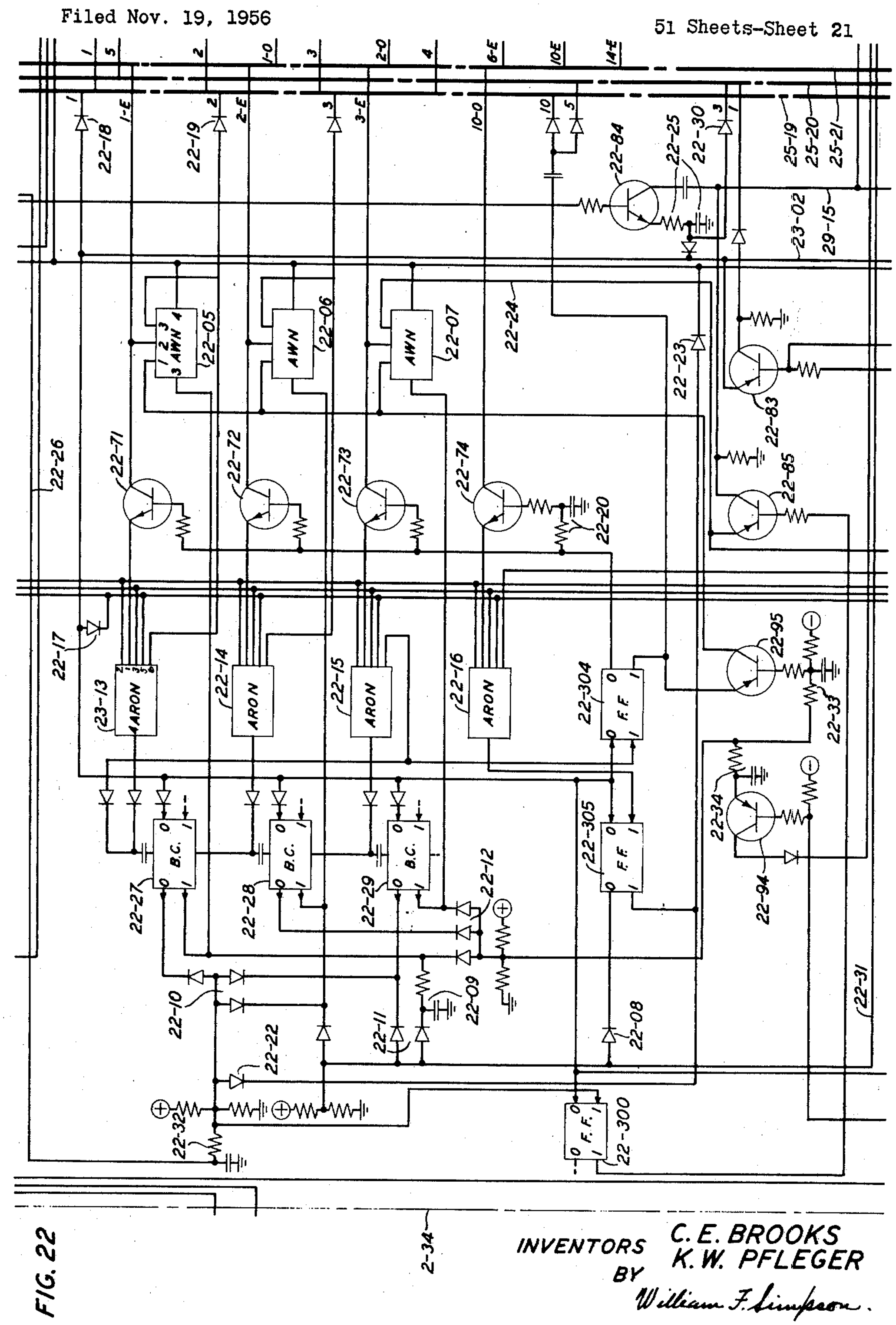
FIG. 22 shows a portion of the control circuits for the call register tubes for timing operations.
Figure 23:
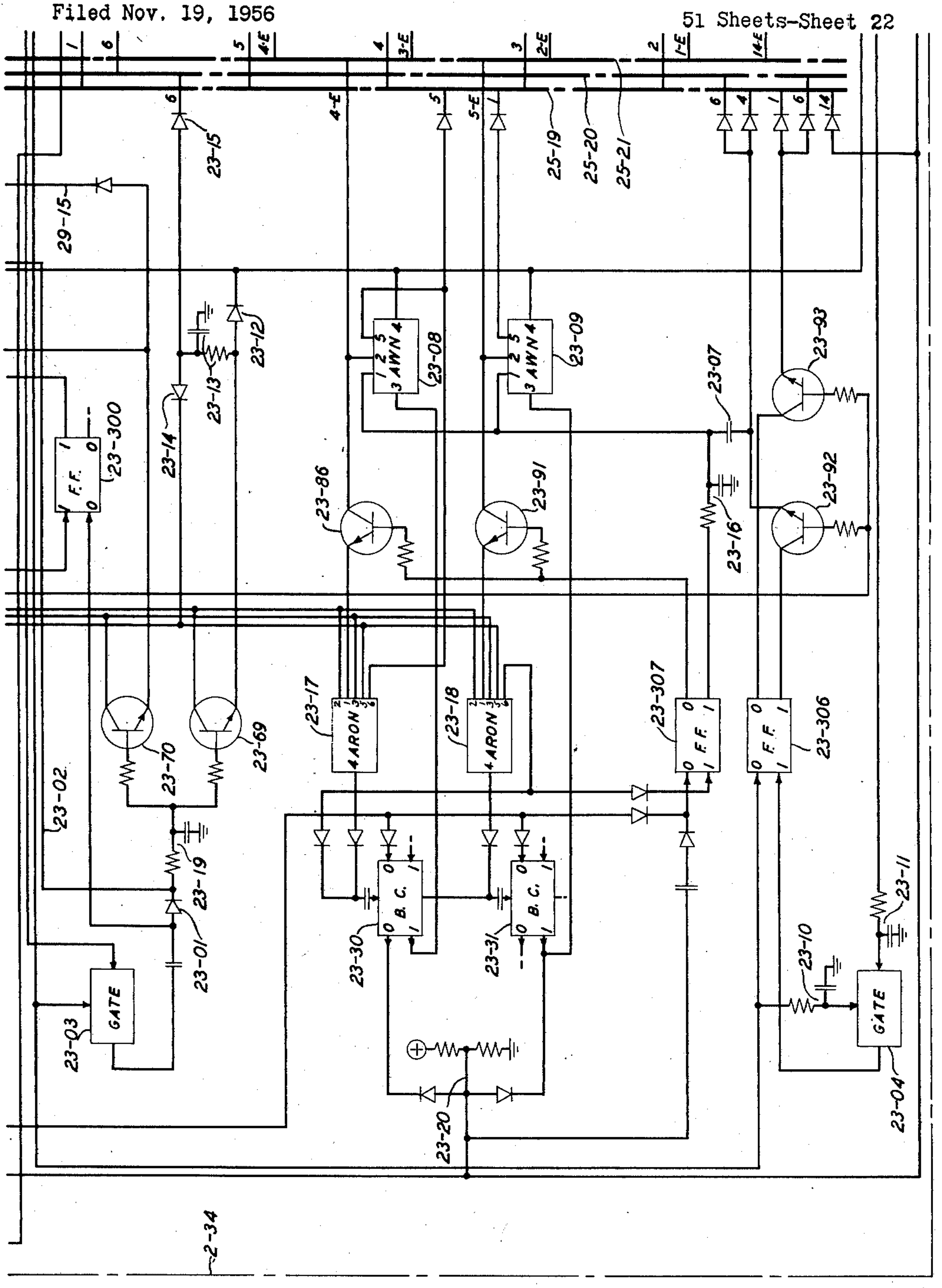
FIG. 23 shows another portion of the control circuits of the call register tube for timing operations.

After the elapse of tenth of a second, a pulse will be applied to the conductor 35–39 during one of the scanning cycles and the gate circuit 23–03 again initiates the operation of the timing circuits of FIGS. 22 and 23. As a result, the tenth cycle timer spots are read out into the binary counters 22–27, 22–28 and 22–29 and the count advanced by "1."

Under the conditions assumed above the binary counter 22–27 is restored to its "0" state and the binary counter 22–28 advanced to its "1" state. Inasmuch as the line circuit has remained closed and circles remain recorded in the make spots, the flip-flop 22–305 is actuated to its "1" state, so a positive potential is applied to all of the inputs of the "and" circuit 22–10 at this time and a positive potential is obtained from the output of this "and" circuit. This positive potential is applied to a transfer circuit which attempts to transfer the information recorded in the pulse count spots 11, 12, 13 and 14 of the first columns to the spots for recording the digits of the called telephone number. However, under the assumed conditions, no circles are recorded in the pulse count spots so that no information is recorded which may be transferred. Consequently, the description of the operation of the transfer circuits will be deferred until after the first digit is dialed.

Assuming the line circuit still remains closed, the scanning circuits function, as described herein, as well as the control circuits for the tubes 2–24 and 2–25 which function as described herein. Upon the reception of the next tenth second pulse the count in the tenth cycle timing spots is read out and advanced by "1". At this time, flip-flop 22–305 will be in its "1" state so that the "and" circuit 22–11 is not actuated at this time. This "and" circuit is only actuated if the last signal received from the line represented the change from a closed circuit to an open circuit. Under these circumstances, a positive output would be obtained on the output of "and" circuit 22–11 indicating a disconnection or termination of a call. The further operation of the circuits in response to the output from the "and" circuit 22–11 will be described at the termination of a call.

After the count of five tenth second pulses, the output of the "and" circuit 22–12 is actuated and employed to regenerate the circles recorded in the various call register spaces. However, since circles have been recorded in the activity spots only, description of the regeneration is deferred until after at least a portion of the dialing of the called subscriber's directory number.

Likewise, after the elapse of 10 seconds, the output of the "and" circuit 23–20 is employed to connect the subscriber's line to a tone trunk indicating to the subscriber that he should dial the number again. Such operation of the system is described hereinafter.

The circuits of the second pair of call register tubes 2–26 and 2–27 indicated in FIG. 16 responded in substantially the same manner as described herein with reference to the control circuits 2–24 and 2–25.

Assume now that the subscriber at station 14 starts to dial after lifting the telephone instrument from its support and before two ten second timing pulses are received from the program circuit. Thus, the 10 second timer has not timed out and the circuits have functioned otherwise as described above during this interval. Also assume that the subscriber at station 14 wishes to call a subscriber at station 28 so that the subscriber at station 14 will dial the digit 2 followed by the digit 8. Upon dialing the digit 2, the subscriber's line is opened briefly and reclosed two times. When the subscriber's line goes open at the beginning of the first of two pulses, current ceases to flow over the subscriber's line so that the voltage drop across resistor 1–54 falls to substantially zero. As a result, the voltage applied to the phototransistor 1–34 also falls to substantially zero. Consequently, during the immediately succeeding scanning interval when the beams within the scanning tubes 1–10 and 1–11 are directed to the phototransistor 1–34 and related storage spots assigned to the line 1–14 the circuits respond in the following manner to register an open circuit signal, that is a signal condition wherein the subscriber's line changes from a closed to an open circuit.

The beams within the tubes 1–10 and 1–11 are first directed to the phototransistor 1–34 in the manner described above. Inasmuch as substantially no voltage is applied to this phototransistor at this time, no current flows through this phototransistor and as a result the flip-flop 11–12 remains in its "0" state. It will be recalled that this flip-flop will be set in its "0" state by a pulse over the conductor 11–34 from the program circuit during the interval during which the previous line was being scanned. After the phototransistor 1–34 has been illuminated for a sufficiently long interval of time to operate the flip-flop 11–12, had the line 1–14 been closed, the beams within the tubes 1–10 and 1–11 are moved to the upper storage spots in the manner described herein. Since the line was closed the previous time the beams were directed to the areas assigned to this line, circles were previously recorded or written in these upper storage spots. Consequently, when the beams are directed to these spots again during this scanning interval or cycle the flip-flop 11–14 will be set in its "1" state.

Inasmuch as the flip-flop 11–12 remains in its "0" state, the flip-flop 11–12 in its "0" state and the flip-flop 11–14 the flip-flop 11–13 is not operated to its "1" state. With operated to its "1" state, positive output is obtained from the "and" circuit 11–17.

Inasmuch as the line is now open, it is unnecessary to rewrite circles in the upper storage spots. Instead, the beams in reading out the previously recorded circles in these spots leave dots recorded therein. Thus, it is unnecessary to further direct the beams to these spots. Consequently, potential is not applied to conductor 11–23 extending to FIG. 40 so that positive potential is not applied to the conductor 35–12 in the program circuits shown in FIGS. 35 and 40. Thus, the pulses from the oscillator 35–01 are not interrupted during this scanning cycle due to the operation of the tubes 1–10 and 1–11.

If the tubes 1–20 and 1–21 should be scanning a line at this time which is closed, then the circuits of these tubes will cause a positive potential to be applied to the conductor 35–12 and interrupt the flow of pulses from the oscillator 35–01 to the binary counter 35–02 as described herein. Such operations of these tube circuits do not in any way affect or interfere with the proper operation of circuits of tubes 1–10 and 1–11 except to delay the advance of the beams and circuits while circles are being rewritten by the tubes 1–20 and 1–21.

In addition, under the assumed conditions, dots will have been previously recorded in the lower storage spots assigned to line 1–14 indicating that ringing current is not being applied to the line circuit 1–14. Consequently, the beams in the scanning tubes 1–10 and 1–11 will be momentarily directed to the lower storage spots but will not be turned on at this time. Here again, if it is necessary or desirable to scan the lower storage spots of the line being scanned by tubes 1–20 and 1–21 at this time, the control circuits of these tubes will cause an interruption of the flow of pulses from the oscillator 35–01 to the counter circuit 35–02 in the manner described herein. Meantime the circuits of tubes 1–10 and 1–11 are maintained inactive until the circuits are advanced as described herein.

When a positive pulse is applied to the conductor 11–30 by the program control circuit, in the manner described herein, the gate circuit 11–22 will become conducting because the output of the "and" circuit 11–17 is positive while the output of the "and" circuit 11–16 is at or near ground potential or negative. As a result, positive potential is applied to the output conductor 11–25 at this time indicating a change in the signaling condition of the line 1–14 from a closed circuit to an open circuit condition. In addition, voltages are transmitted over conductors 12–15 and 12–16 to the translating network to represent the calling subscriber's directory line 1–14. Output pulses from this translator representing this information are then transmitted to the line flip-flops shown in FIGS. 8, 9, 13 and 14 where they are temporarily stored on one set of the line flip-flops. Assume for the purpose of illustration that flip-flop 9–11 is set in its "0" state and that flip-flop 9–10 is set in its "1" state. At this time the flip-flop 9–07 is in its "0" state due to previous operation of flip-flop 9–11 to its "1" state. As a result, and as explained in greater detail herein, the set of line flip-flops 9–851 and 9–46 through 9–55 are set to designate line 1–14 and the fact that the signaling condition on this line has changed from a closed circuit condition to an open circuit condition.

During a succeeding scanning cycle the output of the flip-flops of FIG. 9 are connected through the gate circuits of FIGS. 10 and 15 to the control circuits of the call register tubes 2–24 and 2–25, and 2–26 and 2–27, as described herein.

Also described herein at the beginning of this succeeding complete scanning interval the flip-flops 19–20 and 19–21 through 19–27 are set at "0." In addition, the flip-flops 18–206 and 18–207 are also set on "0" and the beams within the call register tubes 2–24 and 2–25 are directed to the No. 1 or activity spots of the first call register spaces. Upon finding circles recorded therein the beams rewrite the circles and then read out the characters of the charges in the succeeding spots in the first columns of the call register spaces within these tubes. At this time the circuits employed for reading out the characters of the charges stored in the calling line number spots and for rewriting the circles when found, operate in substantially the same manner as described above. The auxiliary read-out networks 19–01, 19–02 through 19–08 are successively energized and cause the corresponding flip-flops 19–20 and 19–21 through 19–27 to be set in accordance with signals designating the subscriber's line 1–14.

The outputs of these flip-flop circuits are connected to one set of inputs to the matching circuit 19–10. The other (left hand) set of input leads of the matching circuit are interconnected with the conductors of cable 10–14 which extend to the line flip-flops of FIG. 9 through the corresponding gate circuits of FIG. 10.

After the last of the calling line number digits has been fully read out and recorded in the flip-flop circuits 19–20 through 19–27 the matching circuit will receive positive potentials applied to its right-hand input conductors in accordance with the settings of the corresponding flip-flops 19–20, 19–21 and 19–27.

Likewise, the left-hand input conductors to the matching circuit will have potentials applied thereto in accordance with the settings of the line flip-flops.

The matching circuit is so arranged that it has a low or negative output current or voltage at all times except when the signals applied to the two sets of input conductors represent the same number. Suitable forms of this matching circuit are disclosed in a United States patent application of Mr. H. A. Henning and Mr. O. J. Murphy, filed December 29, 1955, Serial No. 556,261, now Patent No. 2,811,707, and in a United States patent application of Mr. H. A. Henning, Mr. E. Jacobitti and Mr. B. F. Lewis, Serial No. 418,508, filed March 25, 1954, now Patent No. 3,011,029. This matching circuit 19–10 is also assumed to include the necessary inverting circuits, stabilizing and threshold circuits as may be required to properly respond to the two sets of input signals applied thereto. In addition, the proper set of output terminals of the flip-flops 19–20 through 19–27 may be selected. Thus, if the "1" outputs of these flip-flops are selected and interconnected with the matching circuit 19–10 the signals applied to the matching circuits substantially correspond to the information derived from the call register tubes 2–24 and 2–25. On the other hand, if the "0" outputs of these flip-flops 19–20 through 19–27 are connected to the matching circuit 19–10 then the signals derived from the corresponding leads described above will be inverted. Such signal inversion may be employed when necessary as described in the above patent applications.

When the last calling line number spots, spots No. 9, are read out the auxiliary read-out network 19–08 is employed and causes the flip-flop 19–27 to be set in its "1" state if these spots had circles recorded therein. Under the assumed conditions of line 1–14 calling, these spots will have dots previously recorded therein so that the flip-flop 19–27 will remain in its "0" state. After sufficient time has been allowed to read out these spots and regenerate them, if circles had been previously recorded therein, positive output is obtained on conductor 19–48 from the auxiliary read-out network 19–08. This positive potential is employed to initiate a number of operations.

In the first place, the positive potential obtained on this lead conditions or primes gate circuits connected in the output 19–49 of the match circuit 19–10. The output from the auxiliary read-out network 19–08 is also employed to reset the line flip-flops to "0" and to initiate operation of pulse count circuits and timing spot erase circuits as will be presently described. At this time, under the assumed conditions a match should be obtained from the match circuit because the potentials applied to this match circuit from the flip-flops 19–20 through 19–27 of FIG. 19 correspond with the potentials from the flip-flops 9–48 through 9–55 applied to the match circuit over the circuit paths previously described, viz: the gates 9–03 through 9–10, cable conductors 10–10, gate circuits 10–19 to the left-hand inputs of the match circuit 19–10. During the delay interval of the auxiliary read-out network 19–08, as described herein, ample time is provided for the match circuit to function and apply positive voltage to its output conductor 19–49. The output from the match circuit 19–10 is transmitted to the transistor gate or switch 19–54. This gate or switch circuit is conditioned for conduction by positive potential applied to its base circuit by the transistor gate 19–71. The transistor gate 19–71 is in turn conditioned from the "or" circuit 19–70 by positive voltage from the "1" output from one or more of the flip-flops 19–20 through 19–27. Thus the transistor gate 19–54 transmits the positive voltage from the match circuit output so long as some signals other than all "0" are applied to this match circuit. From the transistor gate 19–54 the positive output from the match circuit is transmitted to the bases of the transistor gate circuits 19–56 and 19–55 and to the transistor gate circuit 19–253. This voltage is transmitted through the transistor gate 19–253 which is now active since the flip-flop 19–342 is positioned in its "0" state as described herein. As a result, brief positive voltage is applied to the No. 10 conductor of cable 25–19 extending to the vertical input translator. Consequently, the beams within the tubes 2–24 and 2–25 are now directed to the No. 10 or "make" spots. Inasmuch as the transition or change in signaling conditions recorded from the line 1–14 at this time is a change from a closed circuit condition to an open circuit condition the flip-flop 9–47 instead of 9–46 is set in its "1" state while the flip-flop 9–46 remains in its "0" state. Under these circumstances the gate circuit 19–55 is not rendered active so that circles are not written on the "make" spots at this time. Instead, the circles previously written are canceled and dots are left stored on these spots.

Figure 21:
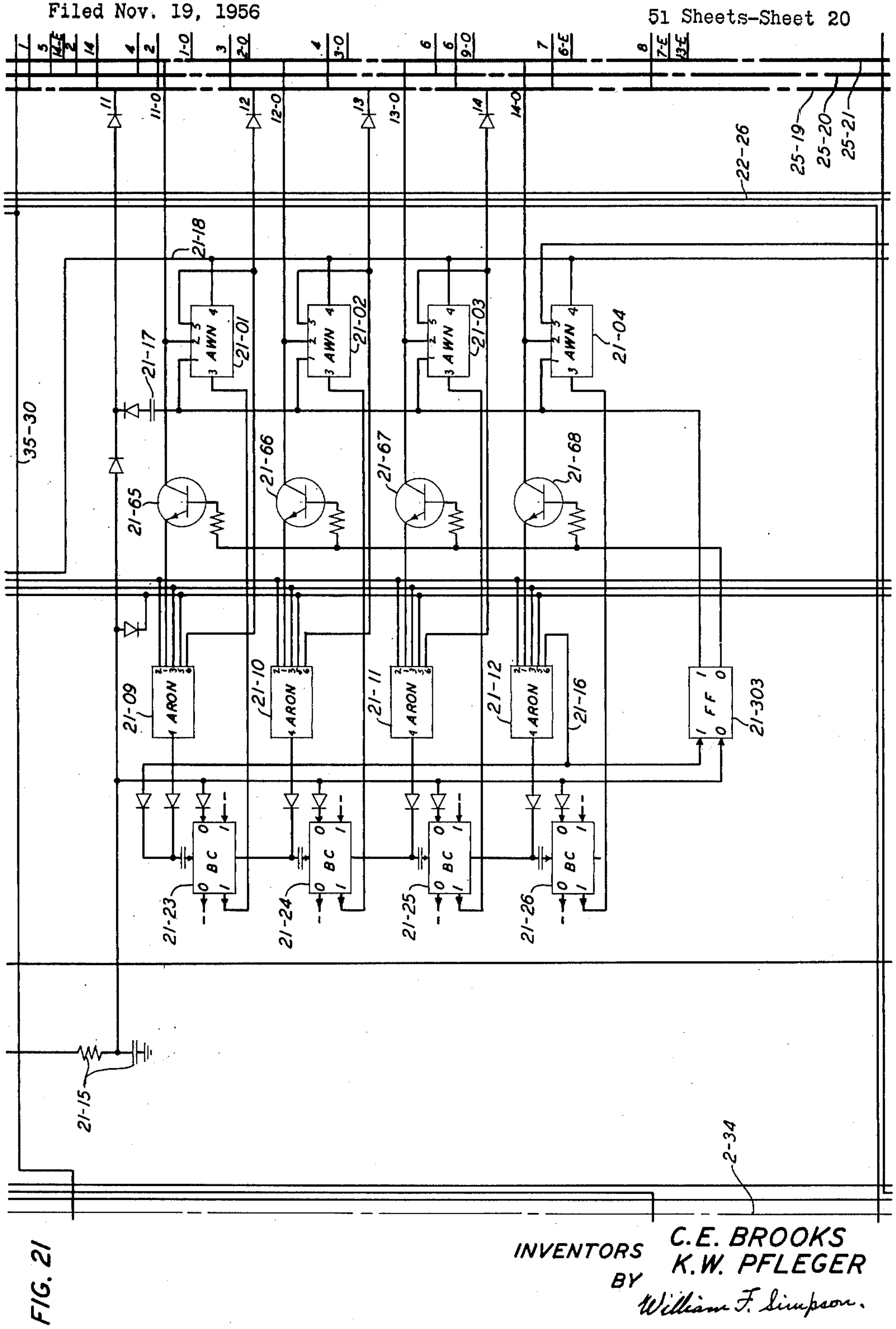
FIG. 21 shows a portion of the control circuits for call register tubes for counting dial pulses.

Since the flip-flop 9–47 is set in its "1" state, positive potential is transmitted from this flip-flop and through the now active gate 19–56 to the delay device or network 21–15 to the circuit shown in FIG. 21 which is employed to advance the pulse count.

The positive potential from the gate 19–56 is delayed by the delay network or device 21–15 so that ample time is allowed for the beam within the tubes 2–24 and 2–25 to be directed to the "make" spots as described above. At the end of this interval of time positive output from the delay device 21–15 is employed to set the binary counter stages 21–23 through 21–26, respectively, and flip-flop 21–303 to the "0" state. In addition, positive potential from the delay device or network 21–15 is employed to insure that the flip-flop 18–206 is set or reset to its "0" state. The output from the delay device or network 21–15 is also applied to the No. 11 conductor, cable 25–19 extending to the vertical input translator. As a result, the beams within the tubes 2–24 and 2–25 are directed to the No. 11 vertical spots in the first columns. With flip-flop 21–303 set in its "0" state, the transistor switches 21–65 through 21–68 are conditioned to transmit positive pulses through them if and when such pulses are applied to them.

After the beams within the tubes 2–24 and 2–25 have been directed to the No. 11 spots, turned on, and the flip-flop 18–206 set in its "1" state in response to circles previously recorded in the No. 11 spots, or left in its "0" state in response to dots previously recorded in these spots, positive potential will be applied to the No. 11 odd output conductor from the output translator 25–12. This positive potential is applied to the auxiliary writing network 21–01 and to the transistor gate 21–65. The auxiliary writing network 21–01 is not rendered active at this time since the flip-flop 21–303 is set in its "0" state. Instead, the transistor gate 21–65 transmits a pulse to render the auxiliary read-out network 21–09 active which in turn sets the binary counter stage 21–23 in its "1" state if circles had been previously recorded in these spots or leaves this binary counter in its "0" state if dots had been previously recorded in the No. 11 spots. Thereafter, the outputs from the auxiliary read-out network 21–09 reset the flip-flop 18–206 to its "0" state and apply positive potential to the No. 12 conductor of cable 25–19 extending to the vertical input translator 25–10. As a result, the beams are now turned off and deflected to the No. 12 spots and the information previously recorded therein is read out and employed to position the binary counter stage 21–24 in the same manner as described above. The succeeding two spots are similarly read out and the binary counter stages 21–25 and 21–26 similarly positioned in accordance with the respective No. 13 and No. 14 spots.

Thereafter, positive potential is obtained on the output conductor 21–16 from the auxiliary read-out network 21–12. In addition, a positive pulse is applied to the input of the binary counter stage 21–23 to advance the count of these stages by one. Positive output from the auxiliary read-out network 21–12 is also applied to the set "1" input of the flip-flop 21–303, thus setting this flip-flop in its "1" state. As a result, the transistor gates 21–65 through 21–68, respectively, are rendered inactive while the auxiliary writing networks 21–01 through 21–04 are conditioned to respond as described herein. In addition, a positive a pulse is transmitted through condenser 21–17 to the No. 11 conductor of the cable 25–19 which causes the beams within the tubes 2–24 and 2–25 to be turned off and again directed to the No. 11 spots in the first vertical columns of the first call register space. After the beams have been directed to these spots and turned on, positive potential is obtained over the No. 11 odd output conductor from the output translator 25–12 which positive potential is transmitted over cable 25–21 to the auxiliary writing network 21–01 and to the transistor gate 21–65. At this time, the transistor gate 21–65 is inactive while the auxiliary writing network 21–01 is primed because flip-flop 21–303 is now in its "1" state. As a result, if the binary counter stage 21–23 is now set in its "1" state then the flip-flop 18–207 is set in its "1" state where it activates the circle gates 2–28 and causes circles to be written in the No. 11 pulse count spots of the same register spaces now under consideration. If the binary counter stage 21–23 is set in its "0" state then the flip-flop 18–207 remains in its "0" state and circles are not written on these No. 11 spots. After sufficient time has elapsed to write the circles, positive output is obtained on the output conductor 21–18 from the auxiliary writing network 21–01 and applied to the No. 12 conductor of cable 25–19. As a result, the beams within the tubes 2–24 and 2–25 are now directed to the No. 12 spots of the first columns. The above cycle of operations is repeated and circles are written in the spots No. 12 if the binary counter 21–24 is set in its "1" state or dots are left in these spots if the binary counter 21–24 is in its "0" state. The beams are then subsequently successively directed to the No. 13 and No. 14 spots of the first columns and cause either circles or dots to be recorded in these spots depending upon the condition of the binary counter stages 21–25 and 21–26. At this time the settings of these binary counter stages represent the number of dialed digits received. Under the assumed conditions, since the transition being described was the first open of the dial, a "1" will be now recorded by these binary stages. In other words, binary counter stage 21–23 is set in its "1" state while the remaining stages 21–24 through 21–26, inclusive, are set in their "0" states and a circle is recorded in spots No. 11 and dots in spots Nos. 12, 13, and 14 of the first columns of the first register spaces in tubes 2–24 and 2–25.

The positive output from the transistor gate 19–54 which was transmitted through the transistor gate 19–253 as described above is transmitted through the delay device or network 19–50 and over the No. 11 conductor of cable 10–14 and through the No. 11 gate in group 10–19 and over set "0" gate 9–00 to the set "0" input of the line flip-flops 9–851 and 9–45 through 9–55, thus restoring these flip-flops to their "0" states and applying a positive voltage to each of the inputs of the "and" gate 9–103.

The positive output from the delay device 19–50 is also transmitted through the delay device 30–08. The delay device 30–08 and the delay device 19–50 together have sufficient delay time so that positive output from the delay device 30–08 is transmitted to the set "0" input of the flip-flop 30–309 after the pulse count spots have been advanced in the manner described above. The application of positive potential to the set "0" input of the flip-flop 30–309 sets this flip-flop in its "0" state which applies positive potential to the base electrodes of the transistor gates 30–96 through 30–99, thus conditioning these gates for operation as described below.

The positive output from the delay device or network 30–08 is also applied to the No. 1 conductor of cable 25–19 and the No. 6 conductor of cable 25–20. As a result, the beams within the tubes 2–24 and 2–25 are directed to the No. 1 spots of the even columns of the same call register spaces. Inasmuch as the flip-flop 18–207 remains in its "0" state at this time, dots are recorded in the first spots of these second columns independently of whether circles or dots had been previously stored therein. After the beams have been directed to these spots and turned on, a positive output is transmitted over the No. 1 even output conductor of the output translator 25–12 through the delay device 30–11 to the transistor gate 30–99. The delay device 30–11 allows the beams to be directed to these spots for a sufficiently long interval of time to erase any circles previously stored therein and to record dots in these spots. Thereafter, a positive pulse is transmitted through the transistor gate 30–99 and applied to the No. 2 conductor of cable 25–19. As a result, the beams within tubes 2–24 and 2–25 are turned off and then directed to the No. 2 spots in the second even columns and the above process repeated. In this manner the beams are directed to each of the first five spots in the second columns of these call register spaces and any circles recorded in these spots are erased and dots are recorded in these spots.

The positive output on conductor 19–48 is also transmitted through the delay device or network 19–41. The delay interval of the delay device or network 19–41 is sufficiently long so that the above-described operations of advancing the pulse count recorded in the pulse count spots 11 through 14 of the first columns and the erasing of the timing spots in the second columns have been completed before positive output is obtained from the delay device 19–41. After a time interval sufficiently long for the above-described operations, a positive pulse from the output of the delay device 19–41 is applied to the set "1" input terminals of the flip-flops 19–208 and 19–308. As a result, the gate crcuits 19–57 through 19–64 are rendered inactive. In addition, positive potential is obtained from the No. 1 output of the flip-flop 19–208 and transmitted over conductor 19–40 to the upper terminal of the "and" circuit 10–15, thus indicating that the circuits of the call register tubes 2–24 and 2–25 have completed their operations with respect to the flip-flops of FIG. 8 and the information recorded in the first register space of these tubes. When the circuits of the call register tubes 2–26 and 2–27 have been similarly advanced, as described herein with respect to the circuits of tubes 2–24 and 2–25, then the gate circuits of FIGS. 10 and 15 are advanced as described herein. Thereafter, no further match is obtained between the information set on the flip-flops 19–20 through 19–27, inclusive, when they are compared with the setting of flip-flops of FIG. 14. Then, the circuits operate as in the manner described herein with respect to the second call register spaces in the call register tubes. During the remaining portions of the scanning cycle the circuits operate in the manner described hereinafter.

Assume that during the next scanning cycle of the line scanning equipment the line is open so that dots will have been previously recorded in the line storage spots and so that no output will be obtained from the detector circuit 1–50. These circuits operate at this time in substantially the same manner as described above when the line is open during idle periods. Consequently, no information is stored in any of the line flip-flops of FIGS. 8, 9, 13 and 14 and no information from this line is transmitted through the gate circuits of FIGS. 10 and 15 to the control circuits of the register tubes 2–24 and 2–25. The above-described manner of operation of these circuits continues so long as the subscriber's line circuit 1–14 remains open. As described above, circles have been written in the activity spots of the first call register spaces in the tubes 2–24 and 2–25 as well as the identity of the calling line and the number of pulses received and the condition of the subscriber's line. Consequently, each time a tenth second timing pulse is received the lapsed time is recorded in the tenth second timing spots. Likewise, each time a ten second timing pulse is received this is recorded in the ten second timing spots in the manner described herein. Inasmuch as the line is open dots are recorded in the "make" spots so that each time a pulse is received the flip-flop 22–305 is not actuated to its "1" state. Instead, it remains in its "0" state and as a result the "and" circuit 22–10 is maintained inactive due to conduction through diode 22–22.

If the line remains open for three-tenths of a second under these circumstances then the "and" circuit 22–11 will be actuated to indicate an abandoned call after which these circuits respond as described hereinafter.

Figure 30:
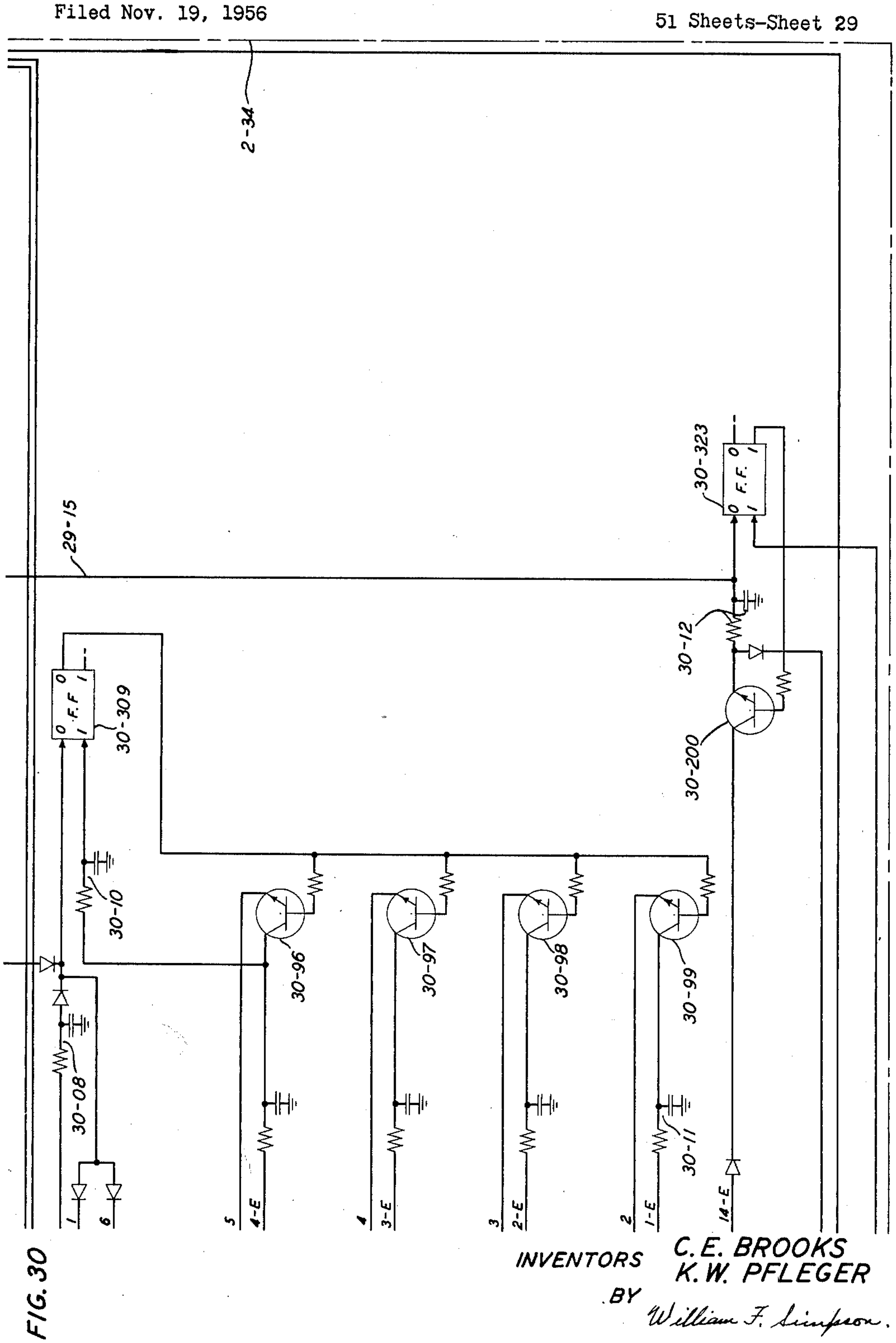
FIG. 30 shows the circuits for erasing information stored in timing sections in the call register tubes.

Under the assumed conditions of a subscriber dialing, the calling subscriber's line will not remain open for more than several scanning cycles so that the three-tenths second timing "and" gate 22–11 does not become active. Instead, the subscriber line again closes at the end of the first pulse, which closure causes the positive pulse to be applied to the output conductor 11–24 in the manner described above and this pulse together with pulses identifying the subscriber's line are transmitted to the line flip-flops and recorded in one group of the line flip-flops in the manner described above. During the succeeding scanning cycle the setting or condition of these flip-flops is compared with calling line numbers stored in the call register tubes 2–24 and 2–25. Upon obtaining a match at this time the gate circuit 19–55 is rendered active and not the transistor gate circuit 19–56 as on the previous match. As a result, a circle is written in the "make" spot. In addition, the circuit of FIG. 30 is actuated in the manner described above and erases the circles stored in the timing spots. At this time since it is the end of the first pulse of the pulse count spots, the latter are not changed, a binary one having already been recorded therein in the manner described above.

On the succeeding scanning cycles the circuits operate in substantially the same manner as described above when the subscriber's line is closed. The operation of the timing circuits continues so that these circuits again start timing from the closure of the subscriber's line 1–14. Under the assumed conditions, the first digit dialed will be a "2" so that before the lapse of 0.2 second the beginning of the second dial pulse will be received as an open line indication. This transition from the closed-to-open line causes the line scanning circuits to operate in the manner described above and store the necessary information relative thereto in the line flip-flops. This calling line number information is then compared with the calling line numbers stored in the call register tubes and when a match is obtained a one is added to the number represented by the pulse count spots and the timing spots are again erased. At the end of the second pulse the subscriber's line 1–14 is reclosed whereupon a pulse is again obtained from conductor 11–24 and transmitted to the call register tubes through the line flip-flops and gate circuits in the manner described herein. As a result, circles are recorded in the "make" spots of the appropriate registers and the timing spots are erased. Thereafter, the circuits operate in substantially the same manner as described here on succeeding scanning cycles. The timing pulses from the tenth cycle timer are received and stored in the one-tenth second timing spots in the manner described herein. Upon the reception of a second one of these tenth cycle timing spots, after the second pulse has been fully received, it causes a positive pulse to be obtained from the "and" circuit 22–10. At this time, due to the previous recording of circles in the "make" spots, the flip-flop 22–305 is actuated to its "1" state, thus permitting the "and" circuit 22–10 to apply a high positive voltage to its output circuit. This output voltage is employed as described hereinafter to transfer the pulse count in the pulse count spots to called number spots. At least two tenths second timing pulses will be received between dialed digits and thus at the completion of the reception of the two dial pulses. Additional tenth cycle pulses may be received at this time. Upon the reception of the next or third tenth cycle timing pulse the binary counter stages 22–27, 22–28 and 22–29 are set in the condition required to actuate the "and" circuit 22–11. However, the application of the "1" output from the binary counter stage 22–27 is delayed by the delay network 22–09 until after the "make" spots have been read out and set the flip-flop 22–305 in its "1" state. At this time the diode 22–08 prevents a positive pulse from being applied to the output of the "and" circuit 22–11.

During each succeeding scanning cycle the circuits work in substantially the same manner as described herein. During the particular scanning cycle that a tenth second timing pulse is received the circuits of FIGS. 22 and 23 operate as described and cause the tenth second pulse to be recorded in the tenth second timing spots of the call register tubes. In a similar manner the circuits respond to a ten cycle timing pulse as described herein.

After the completion of the first dialed digit, comprising two pulses representing "2" as assumed above the subscriber's line will remain closed for an interval of time at least as long as two-tenths of a second and may remain closed much longer depending upon the magnitude of the next digit dialed and the speed at which the subscriber actuates the dial.

Upon the occurrence of the second tenth second timing pulse the binary counter stage 22–27 is set in its "0" state and stage 22–28 of FIG. 22 is set in its "1" state and the flip-flop 22–305 is also set in its "1" state due to circles being recorded in the "make" spots of the call register spaces. The binary counter 22–29, however, remains in its "0" state at this time with the result that a positive pulse or output is obtained from the "and" circuit 22–10. This positive voltage is applied to the set "1" input of flip-flop 22–300 which changes to "1." The resulting high positive potential from the No. 1 output of this flip-flop now disables transistor gate 22–85 and prevents the further advance of the circuits of FIGS. 22 and 23. The positive pulse from "and" circuit 22–10 is also applied over delay device 22–32 and conductor 22–26 which extends through FIGS. 21 and 20, to condenser 27–09 of the transfer circuit of FIG. 27. The condenser 27–09 in effect differentiates the positive potential applied to the conductor 22–26 and transmits a positive pulse of short duration to the set "1" input of the flip-flop 27–320 and the set "0" input of flip-flop 27–20 thus setting flip-flop 27–320 in its "1" state and the flip-flop 27–20 in its "0" state. With flip-flop 27–20 in its "0" state the transistor gate 27–10 is rendered inactive and the transistor gate 27–11 is conditioned so that it will further respond to pulses as described hereinafter.

The setting of flip-flop 27–320 in its "1" state renders the transistor gates 27–131, 27–132, 27–133 and 27–12 inactive.

With flip-flop 27–320 set in its "1" state the transistor gates 26–111 through 26–114, inclusive, and 27–115 through 27–118, are conditioned so that they will become active or conducting upon the application of pulses to their collector terminals as will be described presently.

The positive pulse from the condenser 27–09 is also transmitted through the diode 27–08 to the set "0" input of the flip-flop 18–206 and to the No. 11 conductor of vertical input cable 25–19 and the No. 5 conductor of the horizontal input cable 25–20. The application of positive potential to the No. 11 conductor of cable 25–19 and to the No. 5 conductor of cable 25–20 positions the beams within the tubes 2–24 and 2–25 to the No. 11 spots in the odd or first columns of the first register spaces in these tubes which are the first pulse count spots. As described herein the beams within the call register tubes are first turned off, then directed to the desired spots, and then turned on for a short interval of time in response to the operation of the beam deflecting and control circuits of FIGS. 18 and 25 in response to the application of positive potentials to one of the input conductors of either or both the vertical input translator and the horizontal input translator. When the beam is turned back on an output is obtained from the call register tubes and transmitted through the amplifier 2–30 and wave shaping device 2–32 to the set "1" input of the flip-flop circuit 18–206 if circles had been previously stored or recorded in these No. 11 spots which are the first pulse count spots.

Alternatively, if dots had been previously recorded in these spots then the flip-flop 18–206 remains in its "0" state.

After ample time has been allowed for the beams to be directed to the desired spots, turned on, and the flip-flop 18–206 positioned in its "1" state, if circles had been previously recorded in these spots, positive output potential is applied through the output translator and delay incorporated therein to the No. 11 odd output conductor of cable 25–21. Since the transistor gate 26–111 has a positive potential applied to its base from the "1" output of flip-flop 27–320 at this time the positive potential from the eleven odd output of the output translator 25–12 is transmitted through the transistor gate 26–111 to the auxiliary read-out network 26–19. If circles had been previously stored in these spots then the flip-flop 26–312 is set in its "1" state whereas if dots had been previously stored therein flip-flop 26–312 remains in its "0" state. It should be noted that independently of whether or not dots or circles had been previously recorded in these pulse count spots, data are left recorded therein at this time since circles are not rewritten therein. After sufficient time interval for the setting of the flip-flop 26–312, in the manner described above, a positive pulse is obtained from the auxiliary read-out network 26–19 which resets the flip-flop 18–206 to its "0" state if it had been previously set in its "1" state. In addition, a second voltage is obtained from the auxiliary read-out network 26–19 which voltage is applied to the No. 12 conductor of cable 25–19 extending to the vertical input translator 25–10. As a result, the beams within the tubes 2–24 and 2–25 are turned off if they had not been previously turned off and the beams are directed to the No. 12 spots in the first columns and are then turned on again after which the circuits respond in substantially the same manner as described above except that flip-flop 26–313 is now set in its "1" state if circles had been previously recorded in the No. 12 spots on the first columns. If dots had been previously recorded therein the flip-flop 26–313 will remain in its "0" state.

In a similar manner, the flip-flops 26–314 and 26–315 are similarly positioned in accordance with the previous recordings in spots 13 and 14 of the first columns. All of the pulse count spots which are spots 11, 12, 13 and 14 of the first columns are left with dots recorded in them at this time.

After the flip-flop 26–315 has had ample time to be positioned in its "1" state, if circles had been previously recorded in the fourteenth spot of the first column, positive potential is obtained from the output of the auxiliary read-out network 26–22 which resets the flip-flop 18–206 to its "0" state if it had been previously set in its "1" state due to circles being previously recorded in the No. 14 spots in the first columns of the register space. In addition, a second positive output is obtained from the auxiliary read-out network 26–22 and applied to the No. 6 conductor of cable 25–19 and the No. 6 conductor of cable 25–20. As a result, the beams within tubes 2–24 and 2–25 are moved to the No. 6 spot in the even or second columns of the first register spaces which are the first spots for recording the first or tens digit of the called subscribers' identification or directory number. After the beams have thus been positioned and the character of these spots read out to the flip-flop 18–206, a positive potential is obtained from the No. 6 even conductors or terminal of the output translator 25–12 which potential is transmitted through the transistor gate 27–115 and renders the auxiliary read-out network 27–23 active. As a result, the flip-flop 27–316 is set in its "1" state if circles are read out of these No. 6 spots of the second columns. If dots are read out of these spots then the flip-flop 27–316 remains in its "0" state. Independently of whether dots or circles are read out of these spots, dots are left recorded therein because the flip-flop 18–207 is not actuated to its "1" state and the circle gates 2–28 are maintained inactive.

After the flip-flop 27–316 is set in its "1" state positive output is obtained from the No. 5 terminal of auxiliary read-out network 27–23 and applied to the set "0" input of flip-flop 18–206 to insure that this flip-flop will thereafter be in its "0" state and ready to respond to the character of the information read out from the next spots of the call register tube. In addition, a second positive output pulse is obtained from the auxiliary read-out network 27–23 and applied to the No. 7 conductor of cable 25–19 extending to the vertical input translator. As a result, the beams within the call register tubes 2–24 and 2–25 are then directed to the No. 7 spots in the even or second columns of these call register spaces. The circuits then thereafter respond in the manner similar to that described above and cause the flip-flop 27–317 to be set in its "1" state if circles are read out of these seventh spots in the second columns, or to remain in its "0" state of dots are read out therefrom. In a similar manner the flip-flops 27–318 and 27–319 are set under control of the information read out from the eighth and ninth spots, respectively, of the second columns of the call register tubes.

After the flip-flop 27–319 has had ample time to be thus conditioned, positive output from the No. 5 terminal of the auxiliary read-out network 27–26 is employed to reset the flip-flop 18–206 to its "0" state. In addition, another positive pulse is obtained from terminal No. 6 of the auxiliary read-out network 27–26 and applied to the set "0" input of the flip-flop 27–320. This flip-flop is thus reset to its "0" state.

If dots are read out of all the pulse count spots and all of the first digit register spots, that is spots 11, 12, 13 and 14 of columns 1 and spots 6, 7, 8 and 9 of columns 2, all the flip-flops 26–312 through 26–315, inclusive, and flip-flops 27–316 through 27–319, inclusive, are all set in their "0" states. As a result, a positive output potential will be obtained from the "and" circuit 27–13.

Inasmuch as the flip-flop 27–320 is now set in its "0" state, the transistor gate circuits 27–131, 27–132, 27–133 and 27–12 are all conditioned to be conductive upon the application of pulses upon their other electrodes. Consequently, the positive potential or pulse from the output of the "and" circuit 27–13 is now transmitted through the transistor gates 27–11 and 27–12 and through the transistor gate 22–84 to advance the operation of the circuits for controlling the timing registers shown in FIGS. 22 and 23. This is the manner in which the circuits operate when positive potential is obtained from the two-tenth second "and" gate 22–10 after the subscriber's line is closed upon the initiation of a call by the subscriber.

However, under the assumed conditions where the first digit has been dialed, one or more of the flip-flops 26–312 through 26–315, inclusive, will be set in its "1" state. Where the digit "2" has been dialed, as assumed above, then the flip-flop 26–313 will be set in its "1" state while the flip-flops 26–312, 26–314 and 26–315 will all be set in their "0" states. In addition, inasmuch as "2" is assumed to be the first digit or tens digit dialed, the flip-flops 27–316 through 27–319, inclusive, will all be set in their "0" state. When the first one of the flip-flops 26–312 through 26–315 is set in its "1" state, positive potential will be obtained on the output of the "or" circuit 26–16 and transmitted to the set "1" input of the flip-flop 27–20 setting this flip-flop in its "1" state. In changing from its "0" to its "1" state flip-flop 27–20 prevents conduction through gate 27–11 and conditions gate circuit 27–10 for conduction. This positive potential obtained on the output of the "or" circuit 26–16 is also transmitted through the diode 27–18 to "and" circuit 27–27. With the flip-flops 27–316 through 27–319 all set in their "0" state and positive potential applied to the diode 27–18, a positive output is obtained on the output of the "and" circuit 27–27. The positive output from the "and" circuit 27–27 at this time is transmitted to the transistor gate 27–131. Flip-flop 27–320 is in its "1" state at this time so the gate circuit 27–131 cannot become conducting at this time.

Then the remainder of the flip-flops 26–312 through 26–315 are set in accordance with the signals recorded in the pulse count spots 11 through 14 of the first columns as described above.

Next the signals stored in the spots 6 through 9 inclusive of the second columns, representing the tens dialed digit are read out and employed to control the setting of the flip-flops 27–316 through 27–319 as described above. After the spot No. 9, is read out flip-flop 27–320 is reset to "0" as described above. Under the assumed conditions all of the flip-flops 27–316 through 27–319 remain in their "0" state so a positive voltage will be transmitted through gate circuit 27–131 when it is conditioned for conduction by the resetting of flip-flop 27–320 to its "0" state. Thus the positive voltage from the gate 27–131 is applied to the base of the transistor gates 26–119 through 26–122, inclusive. In addition, this positive potential is transmitted through the diode 27–07 and applied to the No. 1 input terminals of the auxiliary writing networks 26–10 through 26–13, inclusive, thus rendering these networks active when potentials are applied to their other conductors as described herein. In addition, a positive pulse of short duration is transmitted through condenser 26–18 and diode 26–23 to the No. 6 conductor of cable 25–19 extending to the vertical input translator 25–10. As a result, the beams within the call register tubes 2–24 and 2–25 are again directed to the No. 6 spots in the second columns of the call register spaces.

After the beams have been directed to these spots and turned on, a positive output is obtained from the No. 6 even conductor from the output translator 25–12 and applied to the No. 2 input terminal of the auxiliary writing network 26–10. If the flip-flop 26–312 is set in its "1" condition, positive potential will be transmitted through the transistor gate 26–119 to the No. 3 input of the auxiliary writing network 26–10. As a result, positive potential will be obtained on the No. 4 output of this network which is applied to the set "1" input of the flip-flop 18–207 which is set in its "1" state and activates the circle gates 2–28 to cause circles to be inscribed on these No. 6 spots. If the flip-flop 26–312 is set in its "0" state than a positive potential will not be transmitted through the transistor 26–119 so that the flip-flop 18–207 remains in its "0" state and dots are written in these spots.

After ample time has been provided for writing circles in these spots, should the flip-flop 26–312 be set in its "1" state, a positive potential is obtained on the No. 5 output conductor of the auxiliary writing network 26–10 and applied to the No. 7 conductor of vertical input cable 25–19. This positive potential causes the beams to be turned off in tubes 2–24 and 2–25 and directed to the No. 7 spots of the second columns and then turned on again. Thereafter, positive potential is obtained on the No. 7 even conductor in the output translator 25–12 which potential activates the auxiliary writing network 26–11. If the flip-flop 26–313 is in its "1" state flip-flop 18–207 is actuated to its "1" state due to positive potential from the No. 1 output of the flip-flop 26–313, transistor gate 26–120, auxiliary writing network 26–11 and then over conductor 18–27 to the "1" input of the flip-flop 18–207. As a result, circles are written in these spots. If the flip-flop 26–313 is in its "0" state then the No. 1 output of this flip-flop will be at a relatively low or negative potential so that flip-flop 18–207 remains in its "0" state and as a result dots are left in these No. 7 spots.

After ample time has been provided for writing circles in these spots, in the manner described above, positive potential is obtained from the No. 5 output of the auxiliary writing network 26–11 and applied to the No. 8 conductor of vertical input cable 25–19. Thereupon the above-described operations are repeated and circles are written in the No. 8 spots in the second columns if the corresponding flip-flop 26–314 is in its "1" state. Otherwise, dots are written in these spots.

In a similar manner circles are written in the next spots, No. 9 of the second columns, if the flip-flop 26–315 is in its "1" state. Otherwise, dots are written in these spots.

Thus, at this time, the pulse count, which was previously stored in the pulse count spots 11, 12, 13 and 14 of the first columns of the register spaces, has now been recorded in the spots 6, 7, 8 and 9 in the second columns of the call register spaces while the signals representing this digit previously stored in the pulse count spots 11, 12, 13 and 14 have been erased. In other words under the assumed conditions wherein the first digit is a "2", circles are recorded in the No. 7 spots of the second columns and dots are recorded in the Nos. 6, 8 and 9 spots of these columns.

After ample time has been provided to write circles in the No. 9 spots of the second columns, if the flip-flop 26–315 had been previously set in its "1" state, positive output is obtained from the auxiliary writing network 26–13 and applied to the set "0" input of all of the flip-flops 26–312 through 26–315, inclusive, and 27–316 through 27–319, inclusive. As a result, all of these flip-flops are reset to their "0" state. Consequently, a relatively high positive potential is obtained from the "0" output terminals of these flip-flops which in turn causes a relatively high positive potential to be applied to the output of the "and" gate 27–13, as described above. With flip-flop 27–20 set in its "1" state and with flip-flop 27–320 set in its "0" state the transistor gates 27–10, 27–12, 27–131, 27–132 and 27–133 are all conditioned for transmission. As a result, the positive output from the "and" circuit 27–13 is transmitted through the transistor gates 27–10, 27–133 and the differentiating condenser 27–21 and over conductor 27–22 to the regeneration circuit shown in FIG. 29. This positive potential causes all of the spots in the first register spaces to be read out and regenerated at this time. Prior to the application of positive potential to the conductor 27–22, as described above, the flip-flops 29–321, 29–322 and 29–10 have all been previously set and left in their "0" state either initially or at the end of a previous erasing or regenerating cycle in the manner described herein. Then, upon the application of positive pulse to the conductor 27–22 a positive potential is applied to the set "1" inputs of the flip-flops 29–321 and 29–322 setting these flip-flops in their "1" state. As a result, the flip-flop 29–321 conditions the transistor gate 29–198 for operation and the flip-flop 29–322 conditions transistor gates 29–162, 29–163, 29–164, and 29–161, etc., before operation.

Figure 29:
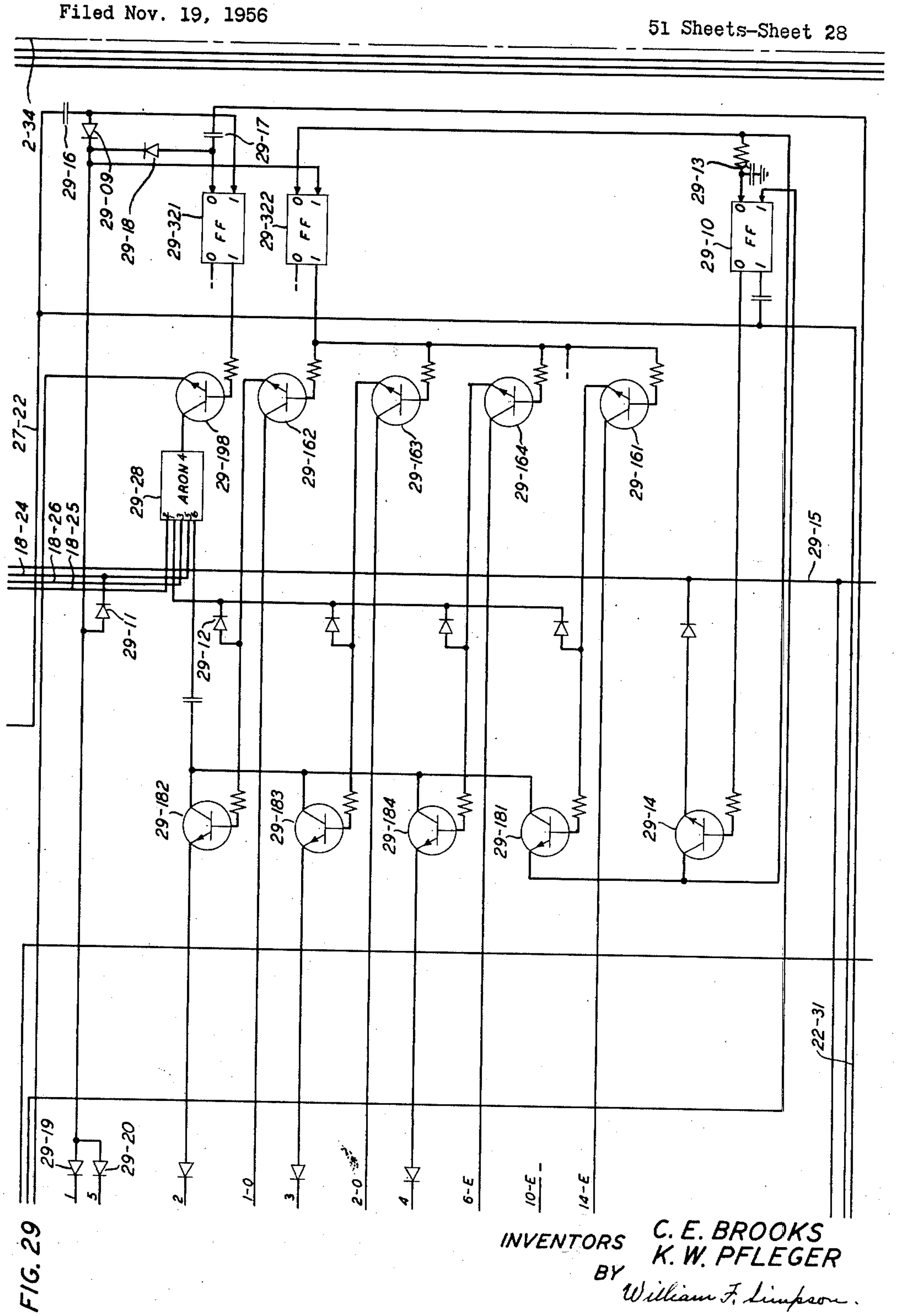
FIG. 29 shows the circuits for regenerating or alternatively erasing the stored information of the call register tubes.

The transistor gates 29–161, 29–162, 29–163 and 29–164 shown in FIG. 29 represent a large plurality of transistor gates all conditioned for transmission by the flip-flop 29–322. One of these gates will be provided for each pair of spots to be regenerated. While all of the spots of the call register spaces may be regenerated at this time, it is usually unnecessary to regenerate the activity spot, the pulse count spots and the timing spots. However, it is assumed that all of these spots will be regenerated at this time. As a result, positive potential from the conductor 27–22 is also transmitted through condenser 29–16 and through the diodes 29–09, 29–19, 29–20, and 29–11 and over conductor 18–24. The potential over conductor 18–24 ensures that the flip-flop 18–206 is set in its "0" state. In addition, positive potential is applied from diode 29–19 to the No. 1 conductor of cable 25–19 extending to the vertical input translator and from diode 29–20 to the No. 5 conductor of cable 25–20 to extending the horizontal input translator 25–11. As a result, the beams within the tubes 2–24 and 2–25 are directed to the first or activity spots of the first or odd columns of the register spaces. The beams are then turned on, and then, where circles have been recorded in these spots, as under the assumed conditions, the flip-flop 18–206 is set in its "1" state. A short interval of time later, positive potential is obtained on the No. 1 odd output terminal from the output translator 25–12 which potential is transmitted through the gate circuit 29–162 and diode 29–12 to the auxiliary read-out network 29–28. As a result, with the flip-flop 18–206 in its "1" state positive potential is obtained from the No. 4 output terminal of this auxiliary read-out network and transmitted through the gate circuit 29–198 and then over conductor 18–27 to the set "1" input of the flip-flop 18–207. This flip-flop in being set to its "1" state activates the circle gates 2–28 and causes circles to be recorded in these activity spots. A short interval of time later positive potential is obtained from the No. 5 output of the auxiliary read-out network 29–28 and applied to conductor 18–24 which resets the flip-flop 18–206 to its "0" state at about the same time positive potential is also obtained from the No. 6 output of the auxiliary read-out network 29–28 and transmitted through the transistor gate 29–182. It should be noted that the transistor gate 29–182 is conditioned by the positive output from the one odd conductor through the transistor gate 29–162. The other transistor gates 29–183, 29–184 and 29–181 are not yet similarly conditioned. Consequently, the output from the auxiliary read-out network 29–28 at this time is transmitted through the transistor gate 29–182 only at this time. This positive potential is applied to the No. 2 conductor of cable 25–19 whereupon the beams within the tubes 2–24 and 2–25 are directed to the second register spots of the first columns. These spots are then read out and regenerated in the manner described above; thus, by properly connecting the collector elements of the transistor gates represented by the transistor gates 29–162, 29–163, 29–164, 29–161 and others not shown to the various output terminals of the output translator 25–12 and the various emitters of the transistor gates 29–182, 29–183, 29–184 and others not shown to the appropriate conductors of the input cables 25–19 and 25–20 the beams within the tubes 2–24 and 2–25 may be caused to read out each pair of the spots in the register spaces in succession and have circles rewritten in the spots which had had circles previously written in them. In other words, the signals stored in these spots are regenerated. When it is desired to shift from the first column to the second column of spots then the output from the transistor gate corresponding to the transistor gates 29–182, 29–183, 29–184 and 29–181 is connected through diodes to the No. 1 conductor of cable 25–19 and to the No. 6 conductor of cable 25–20, thus directing the beams to the first spots of the even columns if it is desired to regenerate these spots. Thus, it is possible to properly interconnect these cable conductors and transistor gates of FIG. 29 so that the desired ones of the register spots in the register spaces will be regenerated in the desired order.

After the last one of the pairs of spots, which is assumed to be the fourteenth spots of the second or even columns, has thus been regenerated, positive potential is obtained from the No. 6 terminal of the auxiliary read-out network 29–28 and transmitted through the transistor gate circuit 29–181 which potential is applied to the set "0" input of the flip-flop circuit 29–322, thus restoring this circuit to its "0" state and rendering the transistor circuits 29–161, 29–162, 29–163, 29–164, etc., inoperative. This positive potential is also applied through the delay device or network 29–13 to the set "0" input of the flip-flop 29–10. Since this flip-flop was assumed to be on its "0" state this delayed pulse merely insures that this flip-flop remains in its "0" state at this time.

The positive output from the transistor gate 29–181 as described above is also transmitted through the transistor gate 29–14 which is activated at this time due to the fact that the flip-flop 29–10 is set in its "0" state. The positive pulse transmitted through the transistor gate 19–14 is transmitted over conductor 29–15 and through the transistor gate 22–84, if the beam is directed to the first register spaces, and then through the delay device or network 22–25 to the start conductor 23–02 of the timing control circuits of FIGS. 22 and 23, thus restoring the control of the beams within the tubes 2–24 and 2–25 to the circuits controlling the timing spots. The beams will then move to the corresponding timing spots of the next or second register spaces and above-described operations will be repeated.

Thus, at the end of the scanning cycle, when the second tenth second timing pulse is received from the program circuits of FIGS. 35 and 40, after the subscriber's line 1–14 closed at the end of the second pulse terminating the first digit, the pulse count spots 11 through 14 of the first columns have been erased and have dots recorded in them while the character of the first called digit namely "2", under the assumed conditions, is stored in the first digit spaces, that is spots 6 through 9 of the second columns. In addition, all spots of the same call register spaces have been regenerated as desired. Under the assumed conditions the subscriber's line 1–14 will remain closed for an appreciably longer interval of time. It is assumed that the next digit will be an "8" and on the average the subscriber may pause for an appreciable length of time before dialing the "8".

So long as the subscriber's line thus remains closed the circuits operate in substantially the same manner as described above. The scanning tubes and related circuits and equipment shown in FIGS. 6, 7, 11 and 12 operate as described above under closed line conditions. So long as the line remains closed, no signals are transmitted from the detector circuit 1–50 of FIG. 11 and as a result no additional signals are transmitted to the call register tubes at this time. The circuits of these tubes thus do not cause any additional information or signals to be registered in the call register tubes. In addition, every tenth of a second a timing signal is received from the program control circuits of FIGS. 35 and 40 and every ten seconds a similar signal is received and employed to advance the tenth second timer and also the ten second timer. The circuits of FIGS. 22 and 23 respond to these signals as described above. Each time a tenth second timing pulse is received, the signals stored in the first three spots of column 2 are read out into the binary counter stages 22–27, 22–28 and 22–29 and an additional pulse signal is applied to these counters to advance the count by one unit. The setting of these counter stages is then written back in the proper space in the call register tubes. After five of the tenth second pulses have been received, the binary counter stage 22–27 is set in its "1" state. The binary counter stage 22–28 is set in its "0" state and the binary counter stage 22–29 is set in its "1" state. As a result, a positive output voltage or pulse is obtained from the output of the "and" circuit 22–12. Except when the ten second timer has timed out as described hereinafter the transistor gate 22–94 is primed for conduction by the negative bias normally applied to its base electrode. As a result, the positive potential from the output of the "and" circuit 22–12 is transmitted through delay network 22–34, then over the transistor gate 22–94 and over conductor 27–22 through the condenser 29–16 and then to the set "1" inputs of the flip-flops 29–321 and 29–322 actuating these flip-flops to their "1" states. The flip-flop 29–321 in its "1" state conditions the transistor gate circuits 29–198 for conduction while the flip-flop 29–322 conditions the transistor gate circuits 29–161, 29–162, 29–163, 29–164, etc., for transmission as described above. The positive potential on the conductor 27–22 is also transmitted through the diode 29–11 to the set "0" input of the flip-flop 18–206 and also to the No. 1 conductor of the vertical input cable 25–19 and the No. 5 input conductor of the horizontal input cable 25–20, thus directing the beam within the call register tubes 2–24 and 2–25 to the first spots in the first columns of the register spaces. Thereafter, the regeneration circuit of FIG. 29 responds in the manner described above.

The positive output from the output of the "and" circuit 22–12 at the end of the five-tenths interval as described above in addition to being transmitted through the transistor gate circuit 22–94 is also applied to the base of the transistor gate circuit 22–95, thus rendering this gate circuit inactive. Consequently, the positive potential obtained from the No. 1 output of the flip-flop 22–304 is not transmitted to the auxiliary writing networks at this time so the settings of the binary counter stages 22–27, 22–28 and 22–29 are not read back into the first three spots of the second columns as described above. Instead, these spots have dots recorded in them and have the dots recorded in them at the time all of the register spots are regenerated as described above.

At the end of the regeneration of these spots, positive potential is applied to the conductor 29–15 by the regeneration circuit of FIG. 29 as described above. This potential is transmitted over conductor 29–15 and through the transistor gate circuit 22–84 if the beams within the call register tubes have been previously directed to the first call register spaces, whereupon the beams will be directed to the second call register spaces and will advance the timing spots of these spaces in the manner described above. Meantime, the dots are left recorded in the tenth cycle timing spaces which in effect resets the tenth cycle timer. Consequently, when the next tenth cycle timing pulse is received, the count of these pulses is started over and when five additional tenth second pulses have been received the above-described regeneration cycle is repeated due to positive potential being again obtained on the output of the "and" circuit 22–12.

In this manner, the information recorded in the various storage spots of a register space is regenerated every half second so long as the subscriber's line remains closed assuming of course that the ten second timer does not time out at the end of 20 seconds.

In order to further describe the operation of the system it is assumed that the subscriber will start to dial the next digit before the ten second timer times out.

Upon the dialing of the next digit, which is assumed to be "8," the subscriber's line or dial will send eight open pulses. That is, the line will open for a brief interval of time and then reclose eight times. Upon the first opening of the line the scanning circuits of FIGS. 6, 7, 11 and 12 operate in the manner described above and pulses representing this change in signaling condition, together with pulses representing the identity of the calling line, are transmitted through FIG. 12 to one set of the line flip-flops in the manner described above. During the first part of a succeeding scanning cycle the signals represented by the states of these flip-flops are compared with calling line signals stored in the call register tubes and are recorded in the call register spaces of the call register tubes which have the same calling line identification signals stored therein as are stored in the group of line flip-flops. The "make" spots are changed from circles to dots, then the signals stored in the pulse count spots are read out into the binary counter stages 21–23 through 21–26, inclusive, and then one is added to these numbers represented by the binary settings of these stages and the signals representing these stages are read back into these pulse count spots 11 through 14 of the first columns in the pair of register spaces. In addition, after the setting of the binary stages 21–23 through 21–26 is read into the pulse count spots then the timing spots of both the tenth cycle timer and the ten cycle timer, namely spots 1 through 5, inclusive, of the second column, are erased, all having dots recorded in them whereupon the timing starts over as described herein.

During succeeding scanning cycles the circuits operate in substantially the same manner as described herein so long as the subscriber's line remains open. During a pulse interval the line will not remain sufficiently long for the three-tenths second "and" circuit 22–11 to have a positive output applied to its output circuit. When the line recloses the above-described process is repeated in that a signal representing this transition, together with the signals representing the identity of the line, are again stored on a group of line flip-flops and then compared with calling line signals stored in the call register spaces of the call register tubes. When a match is obtained between the two sets of signals representing calling lines the "make" spots are changed from dots to circles and the circles recorded in the tenth second timer spots and then the ten second timer spots are erased and replaced with dots. At this time no change is made in the pulse count spots since they have already been advanced to record the additional pulse.

The circuits then respond in the above-described manner so long as the line remains closed so that no signals are transmitted to the line flip-flops or the call register tubes during the succeeding cycles of the scanning circuits and apparatus. During dialing, the pulse or the next signal transition is received before the two-tenths cycle timer times out and causes a positive potential to be applied to the output of the "and" circuit 22–10. The circuits then respond in the above-described manner to each of the succeeding dial pulses and cause these pulses to be counted and stored or recorded in the pulse count spots 11 through 14 of the first columns in the call register tubes.

After the line has reclosed at the end of the last pulse of the digit, that is at the end of the eighth pulse under the assumed conditions, the "make" spot has a circle recorded in it and the tenth second timer and the ten second timer are recycled and reset at "0".

Thereafter, the subscriber's line will remain closed for an indefinite and relatively long period of time so that the succeeding tenth second timing pulses are counted by the tenth second timer and tenth second timing spots, spots Nos. 1, 2 and 3 of the second columns in the manner described above. As described above, the tenth second timing pulses are counted and recorded during the third portion of the scanning cycle during which they are received by the control circuits of the call register tubes as described herein. Upon the reception of the second of these tenth cycle timing pulses a positive output is obtained from the two-tenths second "and" gate 22–10 and applied to the set "1" input of flip-flop 22–300. This flip-flop assumes the "1" condition and applies positive potential from its No. 1 output to the base of the transistor 22–85 which renders this transistor gate inactive. The settings of the binary counter stages 22–27 through 22–29 are nevertheless transferred to the tenth second timing spots Nos. 1, 2 and 3 of the second columns. In addition, positive voltage is applied over the conductor 22–26 from the output of the "and" circuit 22–10. The potential applied to the conductor 22–26 is transmitted through the differentiating condenser 27–09 to start the transfer circuits shown in FIGS. 26 and 27. As described herein, application of positive pulse to this conductor causes the signals stored in the pulse count spots of spots Nos. 11 through 14 of the first columns to be read out and stored in the corresponding flip-flops 26–312 through 26–315, inclusive. In addition, the signals stored in the spots for recording the first digit of the called subscriber's identification are read out of these spots Nos. 6 through 9, inclusive, of the second columns and stored in the corresponding flip-flops 27–316 through 27–319.

In this case some one or more of the flip-flops 26–312 through 26–315 will be set in its "1" state and also one or more of the flip-flops 27–316 through 27–319 will also be set in its "1" state. As a result, positive output is not obtained from the "and" circuit 27–13, as described above; instead positive output is obtained from both of the "or" circuits 26–16 and 27–19 and applied to the "and" circuit 27–32 with a result that a positive output is obtained from this "and" circuit.

As before, positive potential from the output of the "or" circuit 26–16 sets the flip-flop 27–20 in its "1" state. In addition, positive potential through the condenser 27-09 initially sets the flip-flop 27-320 in its "1" state and activates the gate circuits 26-111 through 26-114 and the transistor gates 27-115 through 27-118 so that these gates will conduct in succession when pulses or potentials are applied to them during the reading out of the signals stored in the pulse count spots 11 through 14 of columns 1 and the first called digit spots 6 through 9 of the second columns. Upon the completion of the reading out of the last pair of these spots, positive potential is obtained from the No. 6 output of the auxiliary read-out network 27-26 and employed to set the flip-flop 27-320 in its "0" state. As a result, the transistor gate circuits 27-131, 27-132, 27-133 and 27-12 are all conditioned so that they will conduct or transmit signals or potentials applied to them as described hereinafter.

With the transistor gate 27-133 conditioned for conduction and a positive potential applied to the collector of this transistor from the output of the "and" circuit 27-32 the gate circuit 27-132 becomes conducting and conditions the auxiliary writing networks 27-14 through 27-17. The conduction of the gate 27-132 or the positive output therefrom also conditions the transistor gates 27-199, 26-123 through 26-126 and 27-127 through 27-130 for conduction. Positive potential is also transmitted from the output of the transistor gate 27-132 through diode 27-06 and conditions the auxiliary writing networks 26-10 through 26-13 for operation. Positive output from the transistor gate 27-132 is also transmitted through the condenser 26-25 and diode 26-26 to the No. 10 conductor of the vertical input cable 25-19 of the vertical input translator 25-10. Application of positive potential to this conductor causes the beams within the call register tubes 2-24 and 2-25 to be directed to the No. 10 spots in the second columns and then turned on in the manner described herein. The flip-flop 18-206 remains in its "0" state at this time since dots are recorded in all of the called number's second digit spots 10 through 13 of the second column. A short interval of time after the beam is turned on, positive potential is obtained on the No. 10 even output terminal from the output translator 25-12 and transmitted over the output cable 25-21 to the No. 2 terminal of the auxiliary writing network 27-14. The No. 3 terminal of this writing network is connected through the gate circuit 26-123 to the "1" output of the flip-flop 26-312. If this flip-flop is set in its "1" state then positive potential is obtained from the No. 4 output of the auxiliary writing network 27-14 which sets the flip-flop 18-207 in its "1" state and activates the circle gates, thus causing circles to be recorded in the No. 10 spots of the second columns. A short interval of time thereafter positive output is obtained from the No. 5 terminal of the auxiliary writing network 27-14 and applied to the No. 11 conductor of the input cable 25-19 which turns the beams off and directs them to the No. 11 spots of the second columns. Thereafter, the beams are turned on and the above-described series of operations repeated; this time the auxiliary writing network 27-15 is actuated causing circles to be written in the eleventh spots if the flip-flop 26-313 is in its "1" state. If the flip-flop 26-313 is in its "0" state then dots are written in the eleventh spot. In this fashion, the settings of the flip-flops 26-312 through 26-315 are read into the second called digit spots 10 through 13 of the second columns. At the end of the writing in spots No. 13 in this column the settings of the flip-flops 26-312 through 26-315 have been transferred to the spots 10 through 13 of the second column of the call register space. It will be recalled that the flip-flops 26-312 through 26-315 were set in accordance with the pulses recorded in the pulse count spots 11 through 14 of the first columns. Thus, the spots 10 through 13 of the second column now have recorded in them signals representing the second dialed digit. Under the assumed conditions, the No. 13 spots will have circles recorded in them and the other spots 10, 11, and 12 will have dots recorded in them representing the digit "8". After ample time has been provided for writing circles in the thirteenth spots of the second columns, if the flip-flop 26-315 had been set in its "1" state, positive potential is obtained from the No. 5 terminal of the auxiliary writing network 27-17 and applied to the No. 14 conductor of the input cable 25-19. As a result, the beams within the call register tubes 2-24 and 2-25 are directed to the No. 14 spots of the second columns. After the beams are turned on, positive potential is obtained on the No. 14 even output terminal of the output translator 25-12 and transmitted over cable 25-21 to the transistor gate 27-199. Since positive voltage is applied to the base of this transistor from the gate 27-132 transistor 27-199 becomes conducting. From this transistor, positive potential is applied through diode 27-30 to the set "1" input of the flip-flop 18-207 which when being actuated to its "1" state activates the gates 2-28 and causes circles to be recorded in the No. 14 spots. After a sufficiently long interval of time to write circles in the fourteenth spots of the second columns, positive potential is transmitted through the delay device 27-31 from the transistor gate 27-199 to the No. 6 conductor of the input cable 25-19. As a result, the beams in the call register tubes 2-24 and 2-25 are directed to the No. 6 spots of the second columns and after these beams have been turned on positive potential is obtained on the No. 6 even output terminal from the translator 25-12 and transmitted over the output cable 25-21 to the No. 2 terminal of the auxiliary writing network 26-10.

If the flip-flop 27-316 is set in its "1" state, positive potential will be transmitted from its No. 1 output terminal through the conditioned gate circuit 27-127 to the No. 3 input terminal of the auxiliary writing network 26-10, and as a result positive potential will be obtained from the No. 4 terminal of this network and applied to the set "1" input terminal of flip-flop 18-207. Flip-flop 18-207 is then set in its "1" state and conditions the circle gates 2-28 to write circles in the No. 6 spots. If flip-flop 27-316 was set in its "0" state at this time then circles are not written in the No. 6 spots of the second columns, instead dots are left in these spots.

After ample time has been provided for writing circles in the No. 6 spots, as described above, positive potential is obtained from the No. 5 output of the auxiliary writing network 26-10 and applied to the No. 7 input conductor of the input cable 25-19. As a result, the beams within the call register tubes are moved to the No. 7 spots and the above-described process of writing a circle in this spot is repeated when the flip-flop 27-317 is set in its "1" state. If the flip-flop 27-317 is set in its "0" state then dots are left in the No. 7 spots of the second columns. In the above-described manner the beam is moved successivly to spots 8 and 9 and circles are written in these spots when the respective flip-flops 27-318 and 27-319 are set in their "1" states. If these flip-flops are set in their "0" states then dots are left in these spots. Thus, settings of the flip-flops 27-316 through 27-319 are employed to control the writing of the circles in the first called digit spots 6 through 9. It will be recalled that these flip-flops were originally set in accordance with the signals previously stored in the first called digit spots 6 through 9. Consequently, after the recording has been completed in the No. 9 spots, spots 6 through 9 record the character of the first dialed digit and the signals recorded in the spots 10 through 13, inclusive, record the character of the second called digit identifying the called subscriber's line or station. In addition, circles have been written in the call ready for completion spots which are the No. 14 spots of the second columns. The circles in these spots indicate that the dialing has been completed and that the call is ready to be completed through the switching system. The completion of the call is initiated during the fourth portion of the scanning cycle as will be described hereinafter.

Upon the completion of the writing of the signal in the No. 9 spots of the second columns, positive potential is obtained from the No. 5 output of the auxiliary writing network 26–13 and applied to the set "0" inputs of flip-flops 26–312 through 26–315 and 27–316 through 27–319, thus setting all of these flip-flops to their "0" states.

With the flip-flops 26–312 through 26–315 and 27–316 through 27–319 all set in their "0" states, positive potential is obtained from the output of the "and" circuit 27–13 as described above. At this time, as described above, the flip-flop 27–20 is set in its "1" state, thus activating the transistor gate 27–10. In addition, the flip-flop 27–320 is now set in its "0" state so that the transistor gate 27–133 is conditioned for transmission. As a result, the positive potential from the output of the "and" circuit 27–13 is transmitted through the transistor gates 27–10 and 27–133 to conductor 27–22. Positive potential applied to the conductor 27–22 sets the regeneration circuit of FIG. 29 into operation and regenerates all of the spots in the call register space to which the beam has thus been directed as discussed above. Thereafter, the circuits are advanced to the next call register space as described herein.

If at any time before or during dialing of the called party's directory number, as described, the subscriber abandons the call, or if the subscriber line goes open for any other reason, then the circuts operate as described above and the change in signaling condition from open to closed is recorded in the call register tubes 2–24 and 2–25. In addition, the tenth-second timing pulses are received and recorded in the timing spots, that is spots 1, 2 and 3, in the second columns in the call register spaces employed to register the call. Upon the reception of the third of the tenth second timing spots from the program circuits of FIGS. 35 and 40 as described herein, the binary counter stage 22–27 will be set in its "1" state, the binary counter stage 22–28 will be set in its "1" state and the binary counter stage 22–29 will be set in its "0" state. In addition, since a dot is recorded in the make or tenth spot in the first column, the flip-flop 22–305 remains in its "0" state. As a result, positive potential is obtained on the output of the "and" circuit 22–11. The output positive potential from this "and" circuit is transmitted over conductor 22–31 to the circuit of FIG. 29. This positive potential is transmitted through a differentiating condenser 29–17 to the set "0" input of the flip-flop 29–321 thus setting this flip-flop in its "0" state. This positive potential is also transmitted from the condenser 29–17 through diode 29–18 to the set "1" input of flip-flop 29–322. Positive potential is also applied through the diode 29–11 to the set "0" input of flip-flop 18–206 thus insuring that this flip-flop is in its "0" state. A positive potential from the diode 29–18 is also transmitted through the diodes 29–19 and 29–20 to the "1" conductor of the input cable 25–19 and the "5" conductor of the input cable 25–20. This in turn causes the beams within the call register tubes 2–24 and 2–25 to be directed to the first or activity spots of the call register spaces. Thereafter, circuits of FIG. 29 operate in substantially the same manner as described above when the spots in the call register space are regenerated, except that the flip-flop 29–321 is now set in its "0" state instead of the "1" state as it is during regeneration. With the flip-flop 29–321 set in its "0" state, the transistor gate 29–198 is rendered inactive, consequently the path to the No. 4 output of the auxiliary read-out network 29–28 is interrupted. Thus, the beam merely writes dots on the spots, thus effectively erasing all of the circles or other signals previously recorded in the spots. In this fashion the register space is returned to its idle or normal condition and the request for service and the previously dialed portions of the call erased from the system. The subscriber may thereafter initiate another call in which case the system works in the same manner as described herein.

If, during dialing, the subscriber's line remains closed for an abnormally long interval of time without any dial pulse being received, two of the ten-second timing pulses will be received from the program circuit of FIGS. 35 and 40, as described herein. These pulses will be recorded in the ten-second timing spots. Due to the positive potential received from the auxiliary read-out network 23–18 upon the reception of the second of these ten-second timing pulses, the binary counter stage 23–30 is advanced to its "0" state and in turn advances binary counter stage 23–31 to its "1" state. Consequently, a positive output is obtained from the output of the "and" circuit 23–20. This potential is transmitted to the base of the transistor gate 22–94 before the end of the delay interval of delay device 22–34 thus disabling this gate and preventing the start pulse from being transmitted to the regeneration circuit of FIG. 29. (The five-tenths second timing interval timer times out on the same cycle as the ten-second timer.) In addition, the output from the "and" circuit 23–18 is applied to the set "1" input of the flip-flop 30–323 thus setting this flip-flop in its "1" state. With flip-flop 30–323 set is its "1" state, the transistor gate 30–200 is conditioned for operation as described herein. The output from the "and" circuit 23–18 is also applied to the set "0" input of flip-flop 23–307 thus restoring this circuit to its "0" state.

The output from the "and" gate 23–20 is also applied to the No. 14 conductor of the input cable 25–19 which extends to the No. 14 input terminal of the vertical input translator 25–10. As a result, the beams within the call register tubes 2–24 and 2–25 are directed to the No. 14 spots. Inasmuch as the beams were previously directed to the spots in the second columns, the beams will now be directed to the last spots of the second columns of the call register spaces employed to record the call. After the beams are directed to these spots and then turned on, a positive pulse is obtained on the No. 14 even output from the output translator 25–12 and transmitted over the output cable 25–21 to the transistor gate 30–200. This gate is conditioned for transmission at this time so that the positive potential is transmitted through the gate and applied to the set "1" input of flip-flop 18–207. With the flip-flop 18–207 set in its "1" state, the circle gates 2–28 are rendered active so that circles are then written by the beams in the No. 14 spots of corresponding register spaces in the call register tubes 2–24 and 2–25. A short interval of time later, after ample time had been provided for writing these circles, the positive potential from transistor gate 30–200 is transmitted through the delay device or network 30–12 and then through the gate circuit 22–84 to advance the control circuits of the call register tubes 2–24 and 2–25 as described hereinafter which these circuits then operate. However, circles have now been written in the No. 14 spots of the second columns which indicate that the dialing is completed and a call is ready to be established. Inasmuch as the dial number register does not have information recorded for all of the digits, the circuits will respond as described hereinafter to connect the subscriber's line to a tone trunk, indicating that the subscriber should hang up and start to dial over again.

Thus either at the end of dialing or after an abnormally long line closure before completion of dialing, circles are written in the No. 14 spots of the second columns in the corresponding register spaces recording the calling line number and such other information as is dialed by the calling party. The circuits operate in a similar manner for each call and for each register space.

As described herein each of the scanning cycles is divided into four parts for control of the call register tubes 2–24 and 2–25. At the beginning of each of these cycles, a positive pulse is transmitted from the program circuits of FIGS. 35 and 40 over the conductor 35–30 to the control circuits of tubes 2–24 and 2–25, which positive pulse is also transmitted to the flip-flop 10–91 and sets this flip-flop in its "0" state. The pulse over this conductor initiates the first portion of the cycle for control of the call register tubes and causes auxiliary reading out networks of FIG. 19 to read out into the flip-flops 19–20 through 19–27 the calling line identification stored in one of the call register spaces. These identifying signals are then compared with identifying signals stored in the line flip-flops.

A short interval of time later a positive pulse is obtained from the "and" circuit 35–14 and transmitted to the binary counter 35–106, which pulse changes this counter from its "0" state to a "1" state, whereupon a positive pulse is transmitted over conductor 35–42 to the transistor gate 33–613 of the common flip-flops to prepare them for the second portion of the scanning cycle. Consequently, when the matching circuit has compared the calling line identifying signals or numbers with the calling line identification recorded in the call register spaces, the common flip-flops are conditioned to begin the second period of the scanning cycle, during which new calls are entered in the call register spaces.

The third period of each cycle is initiated by a positive pulse over conductor 35–38 which sets the timing circuits of FIGS. 22 and 23 into operation to advance the timing spots as described herein.

The fourth period is initiated by a positive pulse from the circuit 35–14 changing the binary counter stage 35–106 from its "1" state back to its "0" state. As a result, a positive pulse is obtained over the conductor 35–41 extending to the transistor gate 28–10. If the common flip-flops are idle, positive potential will be applied to the base of the transistor gate 28–10 at this time so that the positive potential from the conductor 35–41 will be transmitted through the transistor gate 28–10 and initiate the fourth period of each cycle wherein the calls awaiting completion, that is calls in which the called subscriber's station identification has been completely received or on which calls are waiting completion for other reasons, are completed as described herein.

Figure 34:
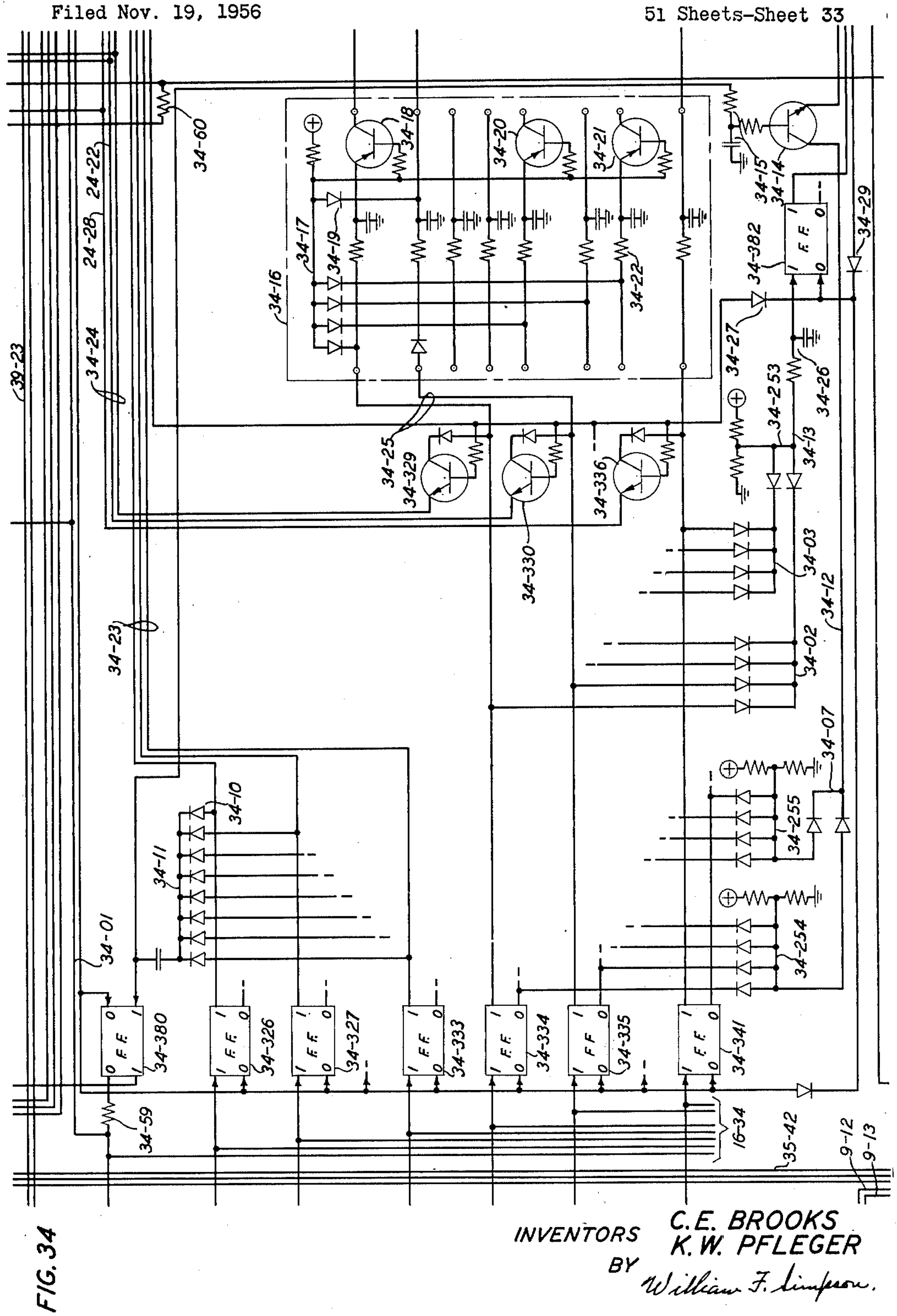
FIG. 34 shows the part of the common control circuits for recording, calling and called line numbers.

The transistor gate 28–10 will be conditioned for conduction at this time provided the common flip-flops of FIG. 34 are all idle. Under these circumstances the common flip-flops of FIG. 34 are either initially set on "0" or are returned to "0." As described hereinafter the "busy" flip-flop 34–380 is also set in its "0" state indicating that these common flip-flop circuits are all in their idle condition. As a result, a relatively high positive voltage is obtained from the "0" output of the flip-flop 34–380 and applied to the base of the transistor gate 28–10 thus conditioning this gate for transmission. Consequently, when a pulse is received over the conductor 35–41 this pulse will be transmitted through the transistor gate 28–10 and through the condenser 28–11. Condenser 28–11 has a value such that it, together with the circuit in which it is connected, has a small or short time constant so this condenser causes a short pulse to be transmitted through it each time the voltage applied to it changes. Condensers operating in this manner are sometimes said to differentiate the applied voltage or signals or are said to be differentiating condensers. In addition, both of the flip-flops 28–324 and 28–325 will be initially set on their "0" state in the manner described herein or they will be returned to their "0" state after being actuated during a previous call.

From condenser 28–11 the postive pulse is transmitted to a number of places. The first place this pulse is transmitted through is the diode 28–12 to the set "0" input of the flip-flop 18–206, thus insuring that this flip-flop is set in its "0" state. The positive potential from the condenser 28–11 is also applied to the set "1" input of the flip-flop 28–324, thus setting this flip-flop in its "1" state. As a result, a high positive voltage is obtained on this No. 1 output terminal, which voltage is applied to the bases of the transistor gates 28–201 and 28–202 through 28–218, inclusive, thus conditioning all of these gates for transmission as described presently. The gates 28–203, 28–204 and 28–210 represent the gates required to transmit the calling party's line identifying number. As indicated in the drawing described herein, eight such gates are required while only three are actually shown in the drawing, it being understood that the ones not shown are actually present in the system and are merely duplications of the gates actually shown. In a similar manner the transistor gates 28–211, 28–212 and 28–218 represent the gates for transmitting the dialed station identification. Here again it has been assumed for purpose of description that eight of these gates are required, namely 28–211 through 28–218, inclusive. All of these gates, as pointed out above, are conditioned for transmission by the positive potential obtained from the "1" output of the flip-flop 28–324.

The positive potential from the condenser 28–11 is also transmitted to the set "0" input terminals of the binary counter stages 28–32 and 28–33, thus insuring that these binary counter stages are set in their "0" state. Positive voltage from the "0" output of stage 28–33 is then applied through resistor 28–16 and diode 28–15 to the base of transistor 28–201A.

The positive potential obtained from the condenser 28–11 is also transmitted to the No. 14 conductor of the vertical input transistor 25–10 and also to the No. 2 conductor of the horizontal input cable 25–20 extending to the horizontal input translator 25–11. As a result, the beams within the call register tubes 2–24 and 2–25 are directed to the call ready for completion spots, namely spots No. 14 in columns 2 of the first register spaces at the beginning of the fourth portion of each scanning cycle when these circuits are idle. The beams are turned on and read the characters of the charges stored in these spots. If circles are stored therein the flip-flop 18–206 is set in its "1" state. If dots are stored in these spots then the read out flip-flop 18–206 remains in its "0" state.

Assuming first, for purpose of illustration, that dots are recorded in these spots so that the flip-flop 18–206 remains in its "0" state. After ample time has been provided to read out the characters of these spots, positive potential is obtained from the 14 even output terminal of the output translator 25–12, which potential is transmitted over the 14 even conductor of cable 25–21, to the transistor gate 28–201A and then to the transistor gate 28–201. As pointed out above, gate 28–201 is conditioned for transmission at this time by the positive potential from the "1" output terminal of flip-flop 28–324. The transistor gate 28–201A is also normally conditioned for transmission by the positive potential obtained from the "0" output of the flip-flop 28–324A and the "0" output of binary counter 28–33 as described herein. Positive potential from the transistor gate 28–201 is transmitted to the base of the transistor flip-flop 28–219 and conditions this gate for transmission if and when a positive potential is applied to its collector electrode, as described herein. The positive output from transistor gate 28–201 is also transmitted through the diode 28–13 to the "1" input terminal of the auxiliary read-out network 28–27, thus conditioning this network for transmission. If the flip-flop 18–206 is set in its "1" state then positive potential will be obtained from the fourth output of the auxiliary read-out network 28–27 which potential is transmitted through the transistor gate 28–219 as will be described herein. If on the other hand, as assumed above, the read out flip-flop 18–206 remains in its "0" state, then no positive potential is obtained on the No. 4 output of the auxiliary read-out network 28–27. Positive output is obtained, however, on the No. 5 terminal of this network and applied to the set "0" input of the read out flip-flop 18–206, thus setting this flip-flop to "0" or maintaining it in its "0" state. In addition, positive voltage is obtained from the No. 6 output of the auxiliary read-out network 28–27 and transmitted through the gate circuit 28–236. The gate circuit 28–236 has been previously conditioned for conduction by the positive potential obtained from the "0" output of the flip-flop 28–325. Consequently, positive potential is transmitted through the gate circuit 28–236 at this time to the binary counter stage 28–32, thus advancing this stage from its "0" state to its "1" state.

The positive pulse is also applied from the output of the transistor gate 28–236 to the No. 14 conductor of the vertical input cable 25–19 extending to the vertical input translator 25–10 and also to the No. 4 horizontal cable conductor of cable 25–20 extending to the horizontal input translator 25–11. As a result, the beams within the tubes 2–24 and 2–25 are directed to the No. 14 spot of the fourth column, that is the call ready for completion spot of the second or next call register space. In addition, positive potential from the transistor switch 28–236 is applied to the set "1" input terminal of the flip-flip 28–324A which sets this flip-flop in its "1" state. As a result, positive potential is removed from its "0" output so that the transistor gate 28–201A is rendered nonconducting. Consequently the auxiliary read-out network 28–27 is deactivated and positive potential removed from its output terminals and circuits described above. Positive potential from the transistor gate 28–236 is also transmitted through the delay network 28–14 to the set "0" input of the flip-flop 28–324A. After the delay interval of the delay network 28–14 the flip-flop 28–324A is again set in its "0" state where it again conditions the transistor gate 28–201A for conduction. The delay interval of the delay device 28–14 is about equal to the interval required to directing the beams to a desired spot of the call register tubes, to turn on the beams and read out the character of that spot.

If circles had been previously recorded in these call ready for completion spots of said next call register spaces then the read-out flip-flop 18–206 will be actuated to its "1" state. If, however, we assume that dots had been previously recorded in these spots, then read-out flip-flop 18–206 remains in its "0" state.

Inasmuch as the vertical flip-flops and the units horizontal flip-flop 25–301 remain in the conditions they were previously set in, positive potential continues to be supplied over the No. 14 even output terminal of the output translator 25–12. This potential is transmitted over the 14 even conductor of cable 25–21 to the transistor gate 28–201A. After ample time has been allowed for the flip-flop 18–206 to respond to the characters of charges stored in this ready for completion spot the transistor gate 28–201A is conditioned for conduction by the positive potential from the "0" output of the flip-flop 28–324A. This positive potential is then transmitted through the transistor gate 28–201 to the "1" input of the auxiliary read-out network 28–27 and again conditions this network. If circles had beed recorded in these call ready for completion spots, then positive potential is obtained on the No. 4 output of this network and transmitted to the transistor gate 28–219. If we assume for purpose of illustration that dots were previously recorded in these spots, then positive potential is not obtained from the No. 4 output of the auxilitry read-out network 28–27. Positive potential, however, is obtained from the No. 5 output and applied to the set "0" input of the read-out flip-flop 18–206, thus insuring that this flip-flop is returned to or maintained in its "0" state. A short interval of time later positive potential is again obtained from the No. 6 output of the auxiliary read-out network 28–27 and transmitted through the transistor gate 28–236 to the No. 14 conductor of cable 25–19 and No. 4 conductor 25–20. Since this is the same potential as was previously applied to these conductors of this cable, the control flip-flops of FIG. 25 are not changed so that the beams within the tubes 2–24 and 2–25 remain turned off. The output from the transistor gate 28–236 also first actuates the flip-flop 28–324A to its "1" state and then to its "0" state as described above.

The positive potential from the transistor gate 28–236 is also again applied to binary counter 28–32, thus advancing this counter stage from its "1" state back to its "0" state and at the same time advancing the binary counter 28–33 to its "1" state. As a result, positive potential is obtained from the No. 1 output of binary counter stage 28–33 and transmitted to the input start lead of the corresponding circuits of the second pair of call register tubes 2–26 and 2–27 where the character of the signals recorded in the call ready for completion spots in the two register spaces in these tubes is read out in the manner similar to the manner described herein with reference to the cell register tubes 2–24 and 2–25.

Assume now that circles have been written in the call ready for completion spots of the first register spaces in tubes 2–24 and 2–25 during the third portion of one of the scanning cycles as described above. Then at the beginning of the fourth portion of this scanning cycle positive potential will be obtained over conductor 35–41 as described above and assuming also that the common flip-flops on FIG. 34 are idle and all set on "0" then positive potential is applied to the base of the transistor gate 28–10. As a result, a positive pulse is transmitted through the transistor gate 28–10 and condenser 28–11 then through the diode 28–12 to the set "0" input of the read-out flip-flop 18–206, thus insuring that this flip-flop is set on "0." The positive pulse from the condenser 28–11 is also applied to the set "1" input of the flip-flop 28–324, thus setting this flip-flop in its "1" state where positive potential is obtained from its "1" output and employed to activate the transistor gate circuits 28–201 through 28–218. In addition, the positive pulse from condenser 28–11 is transmitted to the set "0" inputs of the binary counter stages 28–32 and 28–33, thus setting these binary counter stages in their "0" states. With binary counter stage 82–33 set in its "0" states, positive potential is obtained from its "0" output and transmitted through resistor 28–16 and diode 28–15 to the base resistor 28–17 of the transistor gate 28–201A. As a result, the positive potential from the "0" output of the flip-flop 28–324A together with the positive potential through the diode 28–15 causes the transistor gate 28–201A to be conditioned for transmission when a positive voltage is applied to its collector electrode.

The positive voltage from condenser 28–11 is transmitted over the No. 14 conductor of the input vertcial cable 25–19 and the No. 2 conductor of the horizontal input cable 25–20, thus moving the beams to the last spots of the second columns on the first register spaces. In other words, the beams are directed to the call ready for completion spots of the first register. After the beams have been directed to thees spots they are turned on and the characters of the spots read out. Under the assumed conditions where circles had been previously recorded in these spots the flip-flop 18–206 is set in its "1" state in response to reading out the circles. At about the time the flip-flop 18–206 is thus set in its "1" state, positive output voltage is applied to the No. 14 even output terminal of the output translator 25–12 and transmitted through the transistor gates 28–201A and 28–201 since both of these transistor gates are conditioned for transmission as described above.

The output of the transistor gate 28–201 is applied to the base of the transistor gate 28–219 which conditions this transistor for conduction. In addition, the output from the transistor gate 28–201 is transmitted through the diode 28–13 to the No. "1" input lead of the auxiliary readout network 28–27, thus conditioning this network for operation. At this time, the read-out flip-flop 18–206 is set in its "1" state under the conditions assumed herein so that a positive potential is obtained from the No. 4 output of the auxiliary read-out network 28–27 and transmitted through the conditioned transistor gate 28–219 to the set "1" input of the flip-flop 28–325. With the flip-flop 18–325 in its "1" state, positive potential is removed from its "0" output, thus deactivating transistor gate 28–236 so that the positive voltage obtained on the No. 6 terminal of the auxiliary readout network 28–27 is not employed at this time. In addition, the positive voltage obtained on the No. 5 output of the auxiliary read-out network 28–27 at this time is applied to the set "0" input of the read-out flip-flop 18–206, thus restoring this flip-flop to its "0" state.

Flip-flop 28–325 in assuming its "1" state applies positive potential to its "1" output which potential, in turn, is applied to the No. 1 conductor of the vertical input cable 25–19 and to the No. 5 conductor of the horizontal input cable 25–20, thus moving the beam to the first spot of the No. 1 or odd column. The beams are thus directed to the first or activity spots of these call register spaces and the circuits previously stored therein are changed to dots since the circles are not rewritten in these spots at this time. Likewise, circles were not rewritten in the call ready for completion spots when the beams were directed to these spots so that the circles previously recorded therein have been erased and dots are in their places.

A short interval of time after the beams within the tubes 2–24 and 2–25 have been directed to the activity spots, positive potential is obtained on the "1" odd output terminal and conductor from the output translator 25–12 and transmitted over the output cable to the transistor gate 28–202. This gate has been previously conditioned for conduction as described above so that after an interval of time sufficiently long to completely erase the circles previously written in the activity spots and write dots therein, a positive pulse is transmitted through the delay network 28–18 and diode 28–19 to the set "0" input of the read-out flip-flop 18–206, thus restoring the read-out flip-flop to its "0" state.

In addition, the positive pulse obtained from the delay network 28–18 is applied to the No. 2 conductor of the vertical input cable 25–19, thus causing the beams within the call register tubes 2–24 and 2–25 to be directed to the No. 2 spots in the first columns. After the beams have been properly directed to these spots they are turned on and read out the characters of the signals previously stored in these spots. If circles had been previously stored, then flip-flop 18–206 is actuated to its "1" state whereas if dots had been previously stored in these spots the read-out flip-flop 18–206 remains in its "0" state.

After flip-flop 18–206 has been positioned under control of the second spot in the manner described above, a positive output voltage is obtained on the No. 2 odd output terminal of the output translator 25–12 and transmitted over the No. 2 odd output conductor of the output cable 25–21 to the transistor gate 28–203. Inasmuch as the transistor gate 28–203 was previously conditioned for transmission, positive potential from the No. 2 odd conductor of cable 25–21 is transmitted through the transistor gate 28–203 to the bases of the transistor gates 28–220 and 28–237, thus conditioning these transistor gates for transmission. In addition, the positive output from the transistor gate 28–203 is transmitted through diode 28–20 to the No. 1 input of the auxiliary read-out network 28–27, thus conditioning this network for operation. If circles had been recorded in the No. 2 spots and the read-out flip-flop 18–206 actuated to its "1" state in response thereto, then positive potential is obtained on the No. 4 output terminal of the auxiliary read-out network 28–27 and transmitted through the transistor gate 28–220 to the set "1" input of the flip-flop 34–326, thus setting this flip-flop in its "1" state. If on the other hand dots had been previously recorded in the No. 2 spots, then the read-out flip-flop 18–206 remains in its "0" state so that no positive voltage is obtained on the No. 4 output of the auxiliary read-out network 28–27. Consequently, positive voltage is not transmitted through the transistor gate 28–220 at any time so that the flip-flop 34–326 remains in its "0" state. Thus, flip-flop 34–326 is set under control of the characters of the signals recorded in the second spots of the first columns.

With flip-flop 34–326 in its "1" state, positive potential is transmitted through the diode 34–10 of the "or" circuit 34–11 to the set "1" input of the flip-flop 34–380. With the "busy" flip-flop 34–380 set in its "1" state, positive potential is removed from its "0" output and thus from the base of the transistor 28–10. As a result, the common flip-flops remain busy and start pulses at the beginning of the fourth portion of succeeding scanning cycles received over conductor 35–41 are not transmitted through the transistor gate 28–10. When the call in process of being completed is completed the flip-flops will be restored to their "0" state and a positive potential again applied to the base electrode of the transistor gate 28–10 so that another call may be completed in substantially the same manner as described herein.

After the No. 2 spots are read out as described above, positive output is obtained from the No. 5 terminal to the auxiliary read-out network 28–27 and employed to reset the read-out flip-flop 18–206. In addition, positive potential is obtained on the No. 6 output of this network and transmitted through the previously conditioned transistor gate 28–237 to the No. 3 conductor of the vertical input cable 25–19, thus moving the beams in the call register tubes 2–24 and 2–25 to the No. 3 spots.

The above-described sequence of operations is then repeated and the beams within the tubes 2–24 and 2–25 are turned off. The output potential is removed from the No. 2 conductor of the output cable 25–21. The beams are positioned to the No. 3 spots and turned on. The output flip-flop 18–206 is then actuated to its "1" state if circles had been recorded in the No. 3 spots, or remains in its "0" state if dots were previously recorded therein. Thereafter, positive potential is obtained on the No. 3 odd output terminal of the output translator 25–12 and transmitted to the transistor gate 28–204. The positive potential is transmitted through this gate and applied to the auxiliary read-out network 28–27 and also employed to condition the transistor gates 28–221 and 28–238. Thereafter, positive potential is transmitted to the set "1" input of the common flip-flop 34–327, if circles had been recorded in these spots, and, if dots had been previously recorded in these spots, then the flip-flop 34–327 remains in its "0" state. Thereafter, the circuits are advanced to read out the succeeding spots in the first column. Subsequent to reading out each of the spots, the circles recorded in any of the spots are not rewritten, instead, dots are written in all of these spots. In this fashion the information recorded in the second through the ninth spots of the first column identifying the calling subscriber's line is transmitted to and employed to set the common flip-flops 34–326 through 34–333 in accordance therewith. After the signals recorded in the ninth spot are thus employed to control the flip-flop 34–333, the calling line spots 2 through 9 of the first columns have dots written in them while the line flip-flops 34–326 through 34–333 now record the identity of the calling subscriber's line.

In addition, the output from the No. 6 terminal of the auxiliary read-out network 28–27 is transmitted through the transistor gate 28–244 at this time to the No. 6 input conductor of the vertical input cable 25–19 and to the No. 6 input conductor of the horizontal input cable 25–20, which causes the beam to be moved to the No. 6 spot in the second column where the identity of the called station is read out and conveyed to the common flip-flops 34–334 through 34–341 in a similar manner. The calling line identifying spots 6 through 13 of the second columns, which previously had signals written in them, are left with dots written in them. In addition, the positive output from the No. 6 terminal of the auxiliary read-out network 28–27 is transmitted through the transistor gate 28–252 at this time to the set "0" input of the flip-flop 28–325, thus restoring this flip-flop to its "0" state where it reconditions transistor gate 28–236 for subsequent conduction. Thereafter, the beams within the tubes 2–24 and 2–25 remain at rest until employed during the next scanning cycle in the manner described herein.

After the calling and called party station or line identifications are read out of the call register tubes and stored in the common flip-flops of FIG. 34, as described above, the information in these flip-flops is first checked to determine whether or not a complete called number has been dialed by the subscriber. If a complete number has not been dialed by the subscriber so that the equipment timed out, as described above, then the circuits function to apply busy tone to the calling subscriber's line.

If, on the other hand, when the numbers recorded in these flip-flops are checked and found to be complete then the calling line number is compared with the dialed number to determine whether or not the call is a reverting call, that is to determine whether or not the called subscriber's station is one of the parties on the same party line as the calling subscriber. In making this check, the various codes representing the various stations on a party line are all translated to a code representing the called line. Suppose the code representing the called line is the code employed to designate the calling line. Thus, if after translation the two codes are identical indicating that the called and calling party are connected to the same party line the circuits, as described hereinafter, will establish a reverting call connection or path.

If the two codes do not check, indicating that the called and calling subscriber are connected to different lines, then the circuits advance and determine whether or not the called subscriber's line is connected to another circuit through the switching network. If it is discovered that the called line is so connected, indicating that it is busy, then a busy signal is applied to the calling party's line.

If the called subscriber's line is not connected through the network to another circuit then still another test is made to determine whether or not the called subscriber is dialing. If the called subscriber has initiated a call and is dialing then a busy signal is again transmitted to the calling subscriber. If all of the foregoing tests show that the called sobscriber's line is not busy, then the circuits function to establish connections through the network as will be described.

When some one of the common flip-flops 34–326 through 34–333 is set in its "1" state, positive potential will be transmitted through one of the diodes such as 34–10, in the "or" circuit 34–11 to the set "1" input of the busy flip-flop 34–380. In its "1" state the "busy" flip-flop 34–380 removes positive battery from its "0" output. As a result, the transistor gate 28–10 is deactivated so that further signals cannot be transmitted from call register tubes to the common flip-flops. In addition, positive potential is no longer on wire 34–01 or resistor 33–01 or on the lower terminal of the diode 33–29. This condition occurs when the common flip-flops of FIG. 34 are busy. In addition, positive battery is removed from the base of the transistor gate 39–340. This also occurs when these common flip-flops of FIG. 34 are busy.

The positive output from the "or" gate 34–11 is also transmitted through the delay device 34–15 to the transistor gate 34–14. The delay device 34–15 is provided with a delay interval which is longer than the time required to set in succession each and all of the line flip-flops 34–326 through 34–341 to their "1" states. "And" circuit 34–254 has an input connected to the "0" output of each of the flip-flops of FIG. 34 employed to register the identity of the first dialed digit. Likewise, "and" circuit 34–255 has an input connected to the "0" output of each of the flip-flops of FIG. 34 employed to store the identity of the second dialed digit. When all of the flip-flops employed to register either of these digits remain in their "0" states, it indicates that the corresponding digit was not dialed or that the dialed signals were not received. These potentials will be transmitted from these "and" circuits through the "or" circuit 34–07 over conductor 34–12 to the transistor gate 34–14. Consequently, positive voltage will be obtained on the output of the transistor switch 34–14 from either one or the other or both of these "and" circuits when the transistor gate 34–14 is rendered active by the potential transmitted through the delay device 34–15. The manner in which this potential is employed to transmit busy tone to the calling subscriber will be described hereinafter.

"Or" circuit 34–02 has inputs respectively connected to the No. 1 outputs of the flip-flops 34–334 through 34–337, inclusive, of FIG. 34 and is employed to register the first dialed digit. "Or" circuit 34–03 has similar inputs respectively connected to the No. 1 outputs of the flip-flops 34–338 through 34–341, inclusive, of FIG. 34 and is employed to recognize the second dialed digit. The output of each of these "or" circuits extends to an input of the "and" circuit 34–253. Consequently, if some one or more of the flip-flops employed to register the first dialed digit and some one or more of the flip-flops employed to register the second dialed digit are set in their "1" states, positive output is transmitted from each of the "or" circuits 34–02 and 34–03 to the "and" circuit 34–253. As a result, a positive voltage is obtained on the output of this "and" circuit 34–253 and transmitted over conductor 34–13 to the delay device or network 34–26.

The delay device 34–26 is employed to delay the application of the positive potential from the "and" circuit 34–253 to the set "1" input of the flip-flop 34–382 to insure that sufficient time has been allowed to successively set all of the flip-flops employed to register the last dialed digit to their "1" state as may be required by the identity of this last dialed digit. Thereafter, the flip-flop 34–382 is actuated to its "1" state and applies a positive voltage to the base of the transistor gates 39–300 through 39–307. In addition, the positive voltage is applied to the input of a delay device 39–13. As a result, the transistor gates 39–300 through 39–307 are conditioned for conduction and effectively interconnect the eight outputs of the translator 34–16, to the eight left-hand inputs of the matching circuit 39–10. The No. 1 outputs from the flip-flops 34–326 through 34–333 employed to register the calling line identification or number are connected to the right-hand inputs of the matching circuit 39–10. In addition, the No. 1 outputs from the flip-flops 34–334 through 34–341 are connected to the left-hand inputs of the translator 34–16.

The translator 34–16 transmits the called station number identifying signals from its left-hand input terminals to its right-hand output terminals for all single party subscriber lines. However, for all parties connected to a subscriber's line the translator circuit 34–16 translates each of the subscriber's directory numbers connected to a party line to a number identifying that party line.

An exemplary portion of this translator shows details of the manner in which the directory number of the subscriber's station 17 connected to the party line 1–22 is translated to the designation of line 1–22. Thus, the transistor gates 34–18, 34–20 and 34–21 are normally conditioned for conduction so that these transistor gate circuits normally transmit the positive potentials applied to the left-hand input terminals of the translator 34–16 to the corresponding right-hand output terminals of this translator. In addition, an "and" circuit 34–17 is provided with inputs connected to certain left-hand input terminals of the translator 34–16 upon which positive potentials may be applied representing the subscriber's station 17. As a result, at this time and this time only, positive potential is obtained from the output of the "and" circuit 34–17 and applied to the bases of the transistor gates 34–18, 34–20 and 34–21, thus deactivating these transistor gates and preventing the potentials representing the subscriber station designation 17 from being transmitted to the output terminals of this translator 34–16. Instead, diode 34–19 is interconnected between the output of the "and" circuit 34–17 to the No. 2 output conductor of the first or tenth digit. In addition, the No.

2 conductor of the units digit extends directly through the translator. Since this conductor also has positive potential applied to it by the designation 17, the outputs from the translator 34–16 at this time represent the subscriber station line 1–22 to which the subscriber station 17 is connected.

The delay devices or networks 34–22 connected in each of the paths within the translator 34–16 are provided to delay the transmission of signals through the translator sufficiently long to permit the "and" circuit 34–17 and the translator gate circuits 34–18, 34–20 and 34–21 to be fully actuated so that improper outputs will not be obtained even momentarily from the translator 34–16. Thus, potentials identifying the calling subscriber's line are connected to the right-hand inputs of the matching circuit 39–10 while similar potentials identifying the called line are applied to the left-hand terminals of the matching circuit 39–10. This matching circuit is similar to the matching circuit 19–10 and operates in a similar manner and applies a positive potential to its output conductor 39–21 in case the signals applied on both sides represent the same numerals. Thus, an output will be obtained on this conductor 39–21 in case both the calling and called subscribers are connected to the same party line. Otherwise, no output is obtained on this conductor at this time. The manner in which the circuits respond to a positive output on conductor 39–21 will be described hereinafter.

Assuming now for purpose of illustration that no positive potential is obtained on conductor 39–21 from the matching circuit 39–10 at this time.

After ample time has been provided for the translator 34–16 and the matching circuit 39–10 to function, as described above, positive potential is obtained from the No. 1 output of the flip-flop 34–382, after transmission through the delay device or network 39–13, and applied to the base of the transistor 39–310, thus conditioning this transistor gate for conduction. At this time since no positive potential is assumed to be present on the conductor 39–21, the transistor gates 39–309 and 39–310 become conducting with a result that positive potential is applied to the set "1" input of the flip-flop 39–384 thus setting this flip-flop in its "1" state. Flip-flop 39–384 in being actuated to its "1" state, applies positive battery to the base of the transistors 39–312 and 39–337, thus conditioning these transistors for conduction. Flip-flop 39–384, being actuated to its "1" state, applies positive voltage to its No. 1 output terminal, which voltage is transmitted over conductor 39–14, and to diode 38–10 to the base of the transistor 32–11, thus turning on this transistor. Transistor 32–10 in turn upon being actuated or turned on applies a positive busy test voltage to the line translators, that is to the tens line translator 24–10 and the units line translator 24–11. This voltage is appreciably higher than the voltage normally applied to the line terminations of the network and is of the order of half of the voltage required to establish connection through the network.

The conditioning of the gates 39–300 through 39–307 from the "1" output of the flip-flop 34–382 in addition to extending the outputs of the translator 34–16 to the left-hand inputs of the matching circuit 39–10 also connects the right-hand output terminals of the translator 34–16 to the cable conductors 34–24 extending to the input terminals of the tens and units line translator shown in FIG. 24. The input flip-flops of the translators 24–10 and 24–11 are set in accordance with the voltages transmitted over the cable conductors 34–24. These voltages represent the called subscriber's directory or line number 28. As described above, these voltages are arranged in a binary code for each decimal digit. As a result, the flip-flops in the tens translator are set in accordance with the binary code representing the tens digit 2, while the flip-flops in the units translator 24–11 are set in accordance with the binary code representing the units digit 8. These flip-flops are supplied with a high voltage, higher than is desired to apply to the switching network, and supply either this high voltage or substantially ground potential to their output conductors. The outputs of the translators comprise ten leads, one for each of the possible digital values of the particular denominational order; and each lead is provided with an "and" circuit as described herein having four inputs, one of which is interconnected with each of the flip-flops. These interconnections are so arranged that, for any setting of the flip-flops, one and only one of the output leads has a high voltage applied to it. The magnitude of this high voltage is determined by the magnitude of the voltage supply from the voltage sources of FIG. 32. Under the aforementioned conditions, the magnitude of this voltage is determined by the magnitude of the source 32–12 which is transmitted through the actuated switching gate circuit 32–10.

Thus, high voltage is obtained on the No. 2 output conductors from the tens translator 24–10 and the No. 8 output conductors from the units translator 24–11. These voltages are transmitted through the respective diodes 17–30 and 17–13 and resistor 17–40 to the conductor 17–28 extending to the line termination of the called subscriber's line 1–28. As a result, due to the increased voltage from the translators of FIG. 24 to this line terminal, an increased current will flow through the network of FIG. 31 provided a path is established from this line through this network. (If no such path is established through the network, then no increased current will flow over the conductor 17–28 and through the network from the line translator of FIG. 24.) This increased current, when a path through the network has been established to this line terminal, will flow through the resistor 17–38 and cause an increase in the voltage drop across resistor 17–38. This voltage drop is applied to the "busy" transformer 17–48 to give a busy indication, thus: If an increase in current flows through the resistor 17–38 a pulse current is transmitted through the transformer 17–48 and actuates the transistor amplifier comprising transistor 17–60 with the result that a positive pulse is transmitted over the conductor 17–102 to the transistor gate 39–312. Since the transistor gate 39–312 was previously enabled by positive voltage from the "1" output from flip-flop 39–384, this positive potential will be transmitted through the transistor gate 39–312 to the base of the transistor 39–308 thus disabling transistor 39–308. In addition, the positive potential from the transistor gate 39–312 is transmitted through the delay device or network 39–15 and also through the diode 39–16. The response of these circuits will be described hereinafter.

Assuming, however, that the line 1–28 is idle, then positive potential is not applied to the conductor 17–102 in a manner described herein. Consequently, the transistor gate 39–308 remains conducting due to the normal bias potential applied thereto. The transistor gate 39–337 is also conducting due to the positive potential applied to its base from the "1" output of the flip-flop 39–384. As a result, positive potential is transmitted through the transistor gates 39–308 and 39–337 to charge the condenser 39–17 to a positive voltage. The constants of the condenser 39–17, resistor 39–18, and related circuit elements are adjusted so that the potential across the condenser does not reach the threshold or operating value until ample time has been provided to make a "busy" test and for the transistor gate 39–312 to become conducting and render the transistor gate 39–308 inactive.

At the end of this interval of time, the positive potential on the condenser 39–17 which is applied to the set "1" input of the flip-flop 39–386 will be of sufficient magnitude to actuate this flip-flop to its "1" state. Potential from the condenser 39–17 is also transmitted through the delay device or network 39–19 through the diode 39–20 and over cable conductor 33–26 to the set "0" input conductor of all of the line flip-flops of FIG. 24, thus restoring these flip-flops to their "0" states. The restoration of the flip-flops of FIG. 24 to their "0" states removes the high voltages from the No. 2 tens lead and the No. 8 units lead so the high voltage is removed from conductor 17–28 and the voltage on this conductor is returned to substantially the voltage caused by 17–41.

The actuation of the flip-flop 39–386 also applies positive potential to the bases of the transistor gates 39–321 through 39–328, which transistor gates interconnect the circuits of the right-hand output terminals of the translator 34–16 and the cable conductors 15–25 which extend to FIG. 15. In FIG. 15 these cable conductors extend to gates 15–14, 15–16, 15–17 and 15–18.

The positive voltage from the No. 1 output from the flip-flop 39–386 also extends over conductor 39–23 to the set "0" input of the binary counter stage 15–22 through the diode 15–30 and condenser 15–31, thus setting the binary counter 15–22 in its "0" state where positive output on its "0" output terminal conditions the gates 15–18 for conduction. In addition, the positive potential from the "1" output of the flip-flop 39–386 extends to the base of the transistor gate 15–32 thus rendering this gate active which in turn applies positive potential to the control terminals of the gates 15–17, thus also conditioning these gates for conduction. As a result, signals representing the translated called subscriber's number are transmitted from the translator 34–16 through the transistor gates 39–321 through 39–328 and over conductors of cable 15–33 to the conductors 15–25 and then through the gate 15–18 to the input of the match circuit 19–10 of the call register tubes 2–24 and 2–25.

These signals are also transmitted through the gates 15–17 to the corresponding input conductors of the corresponding match circuit in the control circuits of the second register pair of tubes 2–26 and 2–27.

The positive potential from the "1" output of the flip-flop 39–386 is also transmitted through the diode 39–22 to the set "0" input of the flip-flop 39–384 thus returning this flip-flop to its "0" state which in turn removes the conditioning battery from the base of the transistor gates 39–312 and 39–337 thus rendering these transistor gates nonconducting or inactive. In addition the restoration of the flip-flop 39–384 to its "0" state removes a positive potential from its "1" output previously supplied through the diode 388–10 and condenser 32–09 to the base of the transistor gate 32–10.

Figure 27:
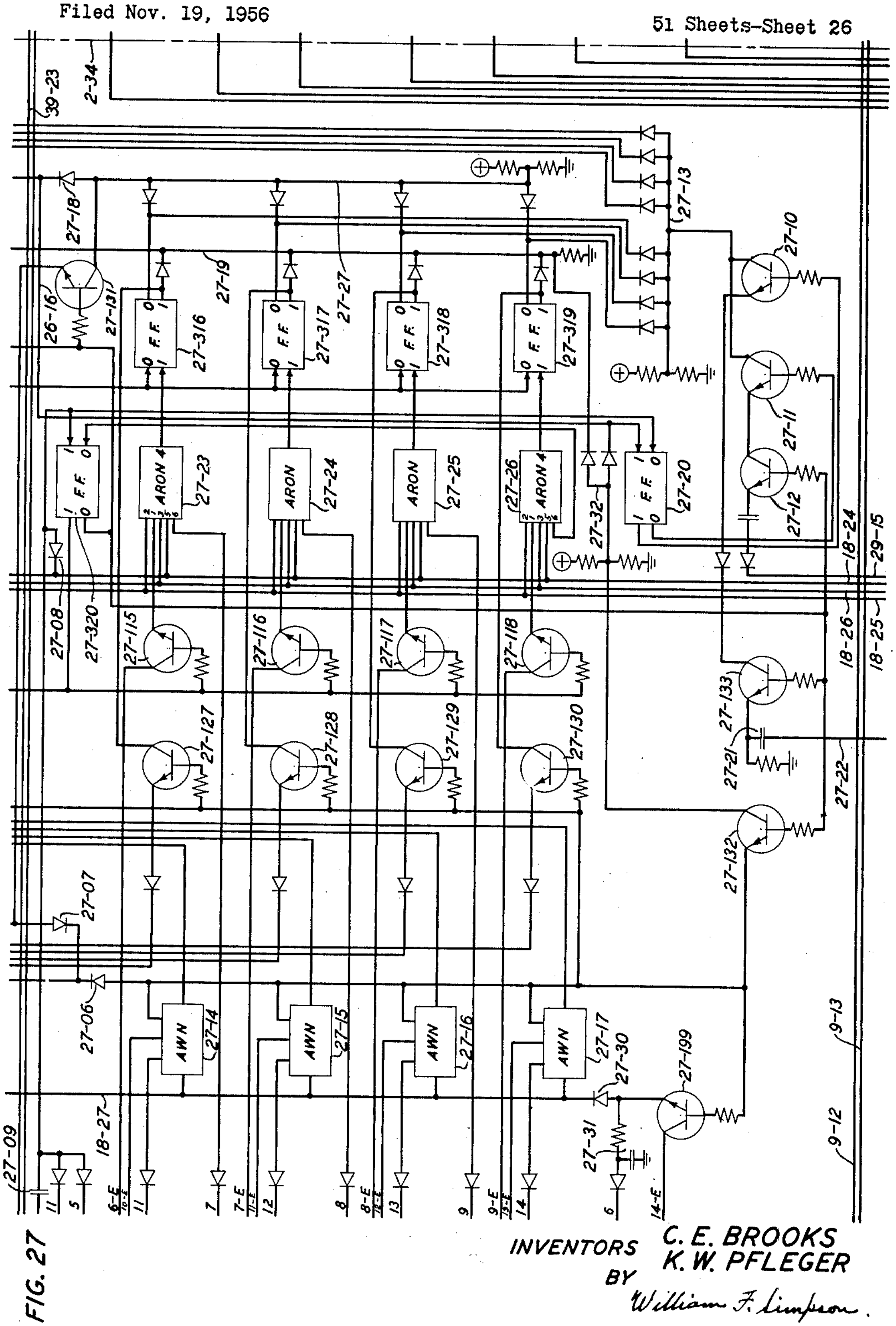
FIG. 27 shows the circuits for transferring another portion of the line number in the call register tubes.
Figure 28:
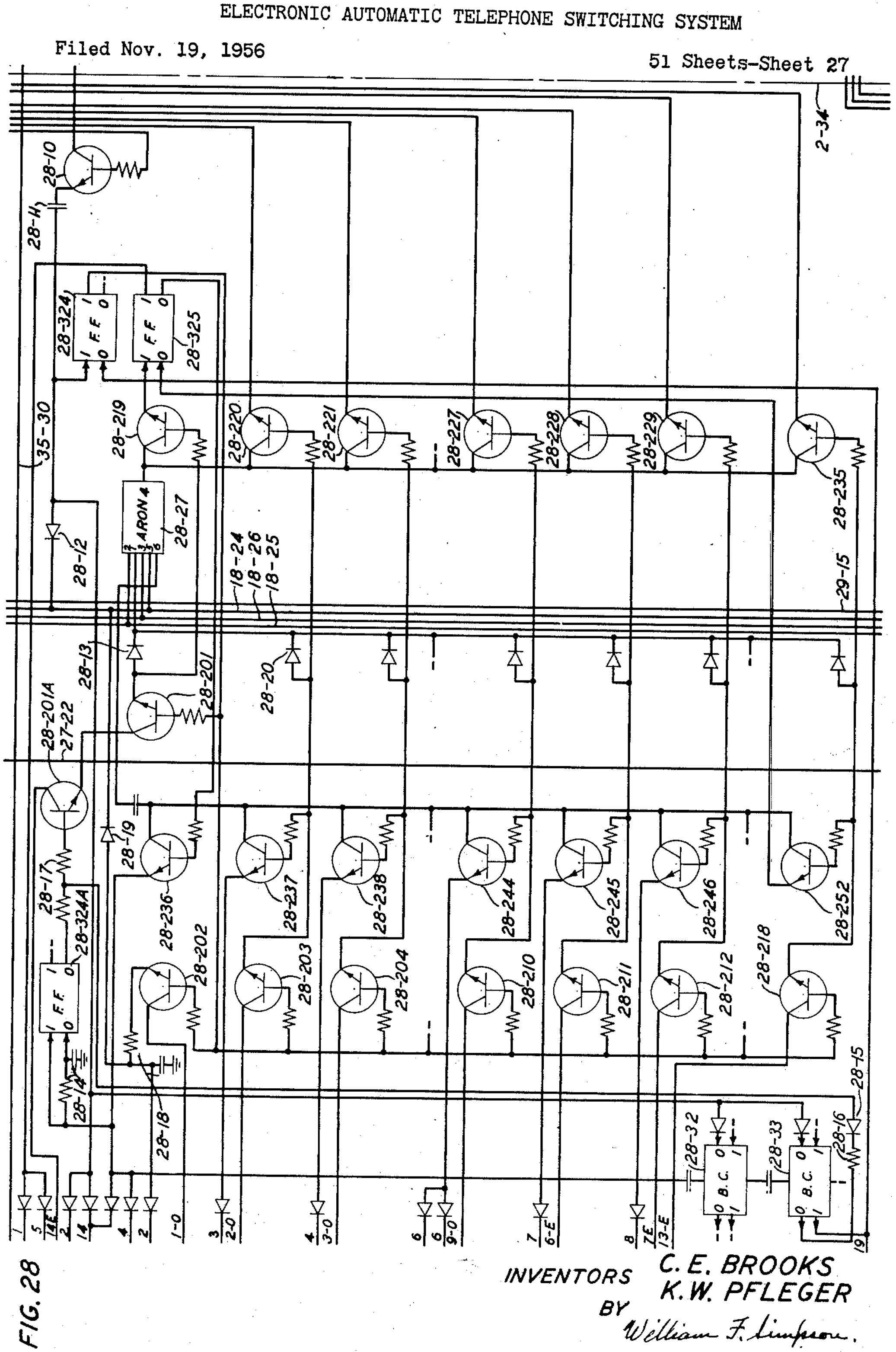
FIG. 28 shows the circuits for reading out the stored information upon completion of dialing.

The application of positive potential to the "1" output of the flip-flop 39–386 is transmitted over conductor 39–23 extending through FIGS. 34, 27 and 20, through condenser 20–27 to the set "1" input of flip-flop 19–342 and also through diode 19–66. The flip-flop 19–342 in being actuated to its "1" state applies positive voltage from its "1" output through the diode 19–67 to the base of the transistor gate 19–253 thus rendering this gate inactive and preventing transmission of voltages through it and through the delay device 19–50. Thus, the positive voltages from the match circuit 19–10 are not transmitted at this time through this gate 19–253 to the "10" input conductor of cable 25–19 nor are they transmitted back to the line flip-flops or to the circuits of FIGS. 20 and 30. Similar voltages are transmitted from the "1" output of the flip-flop 39–386 to a corresponding input of the control circuits 2–35 of the second pair of call register tubes 2–26 and 2–27 shown in FIG. 16. The circuits of FIG. 16 thus act in the same manner as the control circuits of the call register tubes 2–24 and 2–25 as described herein.

The positive potential is applied to diode 19–66 and transmitted to the set "0" inputs of the binary counter stages 19–11 and 19–12 thus restoring these counter stages to their "0" state.

The positive potential from the diode 19–66 is also transmitted through the diodes 19–68 and 19–69 to the set "0" inputs of the flip-flops 19–20 through 19–27, thus restoring these flip-flops to their "0" state. Positive potential from the diode 19–69 is also transmitted to the set "0" input of the flip-flop 19–308 thus insuring that this flip-flop is set in its "0" state. Positive voltage from the diode 19–68 is also transmitted through the condenser 19–37 and the diode 19–19 to the set "0" input of the flip-flop 19–208, thus insuring that this flip-flop is set in its "0" state. The positive potential from the condenser 19–37 is also transmitted through diode 19–38 over conductor 18–24 to the set "0" input of the read-out flip-flop 18–206, thus insuring that this flip-flop is set in its "0" state.

Positive potential from the condenser 19–37 is also transmitted through the diode 19–15 to the set "0" input of the flip-flop 18–207 thus insuring that this flip-flop is in its "0" state and the circle gates 2–28 controlled thereby are inactive.

The positive potential from the diode 19–68, as described above, is transmitted to the delay network or device 19–39. A sufficiently high positive voltage to enable gates 19–51 and 19–52 does not appear at the bases of these gates until after the time interval determined by the delay device or network 19–39. Meantime, positive potential from the condenser 19–37 is applied through the diode 19–35 to the "1" conductor of the input cable 25–19 while a positive voltage from the diode 19–65 is transmitted through the diode 19–34 to the "1" conductor of the input horizontal cable 25–20. As a result, the beams within the call register tubes 2–24 and 2–25 are directed to the first or activity spots of the first call register spaces. The beams are then turned on, as described herein, and if the first call register spaces are idle, dots will have been previously recorded in their activity spots so that the read-out flip-flop 18–206 remains in its "0" state. If on the other hand these register spaces are employed on the call, then circles will be read out and the read-out flip-flop 18–206 actuated to its "1" state.

After ample time has been provided for the actuation of the read-out flip-flop 18–206 in case circles were previously recorded in the activity spots, positive potential is transmitted from the "1" output of this flip-flop. This positive voltage is applied to the collectors of the transistors 19–51 and 19–52 now conditioned for conduction. If the read-out flip-flop 18–206 is in its "1" state then the transistor gate 19–51 becomes conducting, while if the read-out flip-flop 18–206 remains in its "0" state then the gate 19–52 becomes conducting.

Assume for purpose of illustration that the read-out flip-flop 18–206 remains in its "0" state due to the fact that dots were previously recorded in the activity spots of these register spaces indicating that the register spaces are idle and do not have any line numbers recorded therein. Consequently, the calling line number will not be read out to any of the flip-flops of FIG. 19. Thus, it will be impossible to obtain any match or output pulse from the match circuit 19–10 under these conditions. However, with the read-out flip-flop 18–206 in its "0" state when a pulse is obtained from the delay device or network 19–39, transistor gate 19–52 becomes conducting. As a result, positive voltage is applied to the "1" input of the flip-flops 19–308 and 19–208. Flip-flop 19–308 in being actuated to its "1" state removes positive voltage from the bases of the transistor gates 19–57 through 19–64 thus rendering these gates inactive. The actuation of the flip-flop 19–208 applies positive voltage to its "1" output, which voltage is transmitted over conductor 19–40 to the upper input of the "and" circuit 10–16.

Assume also that the circuits of the second pair of call register tubes 2–35 operate in a similar manner and apply positive voltage to the lower input of the "and" circuit 10–16. Consequently, positive voltage is obtained on the output of this "and" circuit and applied to advance the counter stage 10–17 from its "0" state to its "1" state. As a result, positive voltage is applied over conductor 10–26 to the delay device or network 19–46.

The delay of the delay device 19–46 is sufficiently long to permit other of the circuits to actuate as described herein. At the end of this delay interval positive voltage will be applied from the delay device 19–46 to the set "1" input of the flip-flop 19–16. After a delay interval determined by the delay network or devices 19–32 and 19–33 this flip-flop is restored to its "0" state as described herein. During the time this flip-flop is in its "1" state, a positive voltage from its "1" output is transmitted over diode 19–44 to the collector of the transistor gate 19–71. Since this register space is idle no calling line number is read out into the flip-flops 19–20 through 19–27; transistor gate 19–71 does not become conductive at this time. Consequently, the transistor gate 19–54 is not conditioned for conduction at this time. Moreover, inasmuch as it is assumed that no information was stored in the first register spaces, no match pulse will be obtained from the match circuit 19–10 at this time. Consequently, a positive voltage is not transmitted from the match circuit through the transistor gate 19–54 at this time.

Positive voltage from the "1" output of the flip-flop 19–16 is applied through the diode 19–18 to the set "0" input of the flip-flop 19–208 thus restoring this flip-flop to its "0" state. In addition, positive voltage from the "1" output of the flip-flop 19–16 is transmitted through the diodes 19–44 and 19–17 and delay network or device 19–41 to the set "1" input of the flip-flops 19–308 and 19–208, thus resetting these flip-flops to their "1" state. The delay of the delay device or network 19–41 is at least sufficiently long to allow the flip-flops 19–208 and 19–308 to be first reset to their "0" states and then to their "1" states as described above. When the flip-flop 19–208 is reset to its "1" state, as described above, it again applies positive voltage to conductor 19–40, which is transmitted to the upper terminal of the "and" circuit 10–16.

The circuits of the second pair of call register tubes 2–26 and 2–27, shown in FIG. 16, respond in the same manner as described above. Positive potential is again applied to the lower input of the "and" circuit 10–16 so that the binary counter 10–17 is again actuated and advanced from its "1" state to its "0" state. At this time positive potential is applied to the conductor 10–23 extending to the control circuits 2–35 of FIG. 16, the second call register tubes and also to the binary counter 19–11, thus advancing the respective counter stages from their "0" to their "1" states. Positive potential then is transmitted from the "1" output of the counter stage 19–11 to the "3" input conductor of the input horizontal cable 25–20 and also through the diode 19–43. From the diode 19–43 positive potential is also transmitted through the diode 19–69 which sets the flip-flops 19–20 through 19–27 and 19–308 to their "0" states. Positive potential is also transmitted from the diode 19–43 through the condenser 19–37 and diode 19–38 to the set "0" input of the read-out flip-flop 18–206, thus insuring that this flip-flop is returned to its "0" state. Positive potential from the condenser 19–37 is also applied through the diode 19–19 to the set "0" input of the flip-flop 19–208, thus insuring that this flip-flop is restored to its "0" state. In addition, positive voltage is applied from the condenser 19–37 through the diode 19–15 to the set "0" input of the flip-flop 18–207, thus insuring that this flip-flop is set in its "0" state and the circle gates 2–28 are inactive.

Positive potential from condenser 19–37 is also applied to the No. 1 conductor of the vertical input cable 25–19. As a result of the positive potential applied to the No. 1 conductor of cable 25–19 and the No. 3 conductor of the horizontal cable 25–20 the beams within the call register tubes 2–24 and 2–25 are moved to the first or activity spots of the second call register spaces within tubes 2–24 and 2–25. If dots are recorded in these spots then the read flip-flop 18–206 remains in its "0" state. If circles are recorded in these spots then the read-out flip-flop 18–206 is actuated to its "1" state.

Assume first that dots are recorded in these spaces so that the flip-flop remains in its "0" state. Consequently, when positive potential from the diode 19–43 is transmitted through the delay device 19–39 and applied to the base electrodes of the transistor gates 19–51 and 19–52, the transistor gate 19–52 will become conducting and set the flip-flops 19–208 and 19–308 in their "1" states, whereupon positive potential is applied to the upper terminal of the "and" circuit 10–16. The second set of call register tubes shown in FIG. 16 operate in substantially the same manner and read out the character of the activity spot in the second call register spaces. If dots are recorded in the activity spots of this call register's spaces, positive potential is applied to the lower input of the "and" circuit 10–16 so that the binary counter 10–17 is again stepped from its "0" to its "1" state so that it again applies positive potential to conductor 10–26 and after the delay interval of the delay device 19–46 again actuates the flip-flop 19–16 to its "1" state. This flip-flop after the delay interval of the delay device or network comprising devices 19–32 and 19–33 is again restored to its "0" state.

During the time the flip-flop 19–16 is in its "1" state, positive potential is applied from its "1" output to the set "0" input of flip-flop 19–208 through diode 19–18, thus restoring this flip-flop to its "0" state. A short time later, positive potential from the "1" output of the flip-flop 19–16 and diodes 19–44 and 19–17 is transmitted through the delay network or device 19–41 to the set "1" input of flip-flop 19–208 thus resetting this flip-flop to its "1" state and again applying potential to the upper input terminal of the "and" circuit 10–16. The circuits of FIG. 16 operate in a similar manner and apply positive potential to the lower input of "and" circuit 10–16 and as a result binary counter stage 10–17 is again advanced from its "1" state to its "0" state where positive potential is again applied to conductor 10–23 which advances the binary counter stage 19–11 from its "1" to its "0" state and in turn binary counter stage 19–12 is advanced from its "0" to its "1" state whereupon potential is applied to conductor 19–45 which is applied to diode 10–24 of "and" circuit 10–15. Also a potential from FIG. 16 is applied to the diode 10–25 of the same "and" circuit. This causes operation to its "1" state of the flip-flop 10–91 in the manner described hereinbefore. Inasmuch as the line flip-flops of one group have all been restored to "0" in the first or second interval of this scanning cycle, actuation of the flip-flop 10–91 to its "1" state performs no useful function at this time.

In the above description it was assumed that dots were recorded in each of the activity spots of the call register spaces of the call register tubes. Under these circumstances no positive output will be obtained from the match circuits 19–10 of FIG. 19 or the corresponding match circuits of the second pair of call register tubes represented in FIG. 16. Consequently, no positive potential will be transmitted to the diode 19–31.

Assume now for purpose of illustration that instead of a dot being recorded in all of the activity spots of call register spaces, circles are recorded in one pair of these spots, say the first activity spots of the first call register spaces, then when a positive potential is transmitted through the diodes 19–66 and diodes 19–68 and delay device or network 19–39 from the No. 1 output of flip-flop 39–386, as described above, the read-out flip-flop 18–206 will be actuated to its "1" state instead of remaining in its "0" state. As a result, when the positive potential from the diode 19–66 is transmitted through the diode 19–68 and the delay device 19–39 and applied to the base electrodes of the transistor gates 19–52 and 19–51, the transistor gate 19–51, instead of 19–52, is rendered conducting. The calling line spots are thereafter read out of the call register tubes 2–24 and 2–25 and stored in the flip-flops 19–20 through 19–27 and also regenerated and restored in the corresponding spots in the register spaces in the manner described above. The circuits of the second set of call register tubes operate in substantially the same manner. Consequently, if the input to the match circuit 19–10 or the input to the match circuits of the second pair of call register tubes corresponding with the setting of the flip-flops 19–20, 19–21 and 19–27 or the corresponding flip-flops of the call register tubes 2–26 and 2–27, then a positive pulse will be obtained from the corresponding match circuit such as 19–10.

As described above, the gates 15–17 and 15–18 are both conditioned for conduction at this time so that the left-hand inputs of the match circuit 19–10 and the corresponding inputs of the corresponding match circuit of the call register tubes shown in FIG. 16 are all connected over cable 15–33 and transistor gates 39–321 through 39–328 to the output of the translator circuit 34–16. After the call register tubes have functioned as described above the call register tube circuits advance and positive potential from the No. 6 output of the auxiliary read-out network 19–08 is transmitted over conductor 19–48 to diode 19–44, to transistor 19–71, and to delay device 19–41.

The diode 19–44 is poled so that it does not conduct the positive potential applied to conductor 19–48 from the No. 6 output to the auxiliary read-out network 19–08. This positive voltage is transmitted through the transistor 19–71 at this time because this transistor has positive voltage applied to its base from one or more of the diodes of the "or" circuit 19–70. The positive voltage through these diodes is obtained from the "1" output of one or more of the flip-flops 19–20 through 19–27. Inasmuch as these flip-flops are set in accordance with a subscriber's calling line number, they will not all be set at zero; therefore a positive potential is obtained from one or more of their "1" outputs to prime the transistor gate 19–71.

Unless some one or more of the flip-flops 19–20 through 19–27 are thus positioned to their "1" state, the transistor gate 19–71, and thus the transistor gate 19–54 are inactive and prevent transmission of any positive output pulses from the match circuit 19–10. If, however, as assumed above, these gates are conditioned for conduction and if the signals applied to the two sides of the match circuit are the same, i.e., represent the same subscriber's line, a positive voltage is obtained on the output conductor 19–49 from the match circuit 19–10 and transmitted through the transistor gate 19–54 to the base of the transistor gate 19–55 and to transistor gate 19–253 and to diode 19–31.

A positive potential applied to the base of the transistor gate 19–55 conditions this gate for conduction. However, inasmuch as a positive voltage is not applied to its collector electrode at this time, no current flows through this gate. Likewise, since the transistor gate 19–253 was previously rendered inactive by positive potential from the "1" output of the flip-flop 19–342, no current flows through this gate at this time.

The positive potential applied to the diode 18–31 is transmitted to the transistor gate 39–340. Since the transistor gate 39–340 is conditioned for conduction, the positive potential transmittetd from the diode 19–31 is transmitted through this transistor and through the diode 39–44 to the set zero input flip-flop 39–386 thus setting this flip-flop in its zero state with the result that positive voltage is removed from its "1" output before this positive voltage is transmitted through the delay device 39–24 to the set "1" input of flip-flop 39–387. Thus, flip-flop 39–387 is prevented from operating at this time.

A positive potential transmitted through the transistor gate 39–340, as described above, also causes the calling subscriber's line to receive a busy tone or signal as will be described hereinafter.

Assume for purpose of description that the called line is not in the process of dialing some other subscriber at the time this call is being made so that no such positive match pulse is obtained.

The flip-flop 39–386 was set in its "1" state to initiate the comparison of the called line number with the numbers of the dialing subscriber's lines as described above. At this time positive potential from the No. 1 output of the flip-flop 39–386 is also transmitted to the delay device or network 39–24. The delay interval of the delay device 39–24 is sufficiently long to allow ample time for comparing the called subscriber's line number with the number of the calling lines recorded in all of the call register spaces as described above. After this interval of time, positive output from the delay device or network 39–24 is applied to the set "1" input of flip-flop 39–387 and the set "0" input of the flip-flop 39–386. As a result, the flip-flop 39–387 is set in its "1" state and the flip-flop 39–386 restored to its "0" state. With the flip-flop 39–386 restored to its "0" state the transistor gates 39–321 through 39–328 are restored to their nonconducting states and potential is removed from the conductors extending to the control circuits of the call register tubes.

The operation of the flip-flop 39–387 to its "1" state initiates the operation of the system to establish circuits and connections between the calling and called subscribers' stations and to initiate ringing of the called party.

With flip-flop 39–387 in its "1" state high positive potential from its "1" output is applied to the bases of the transistor gates 34–329 through 34–336 thus conditioning these gates for operation and in effect connecting the called number flip-flops 34–334 through 34–341 over cable conductors 34–24 to the line translator input flip-flops of FIG. 24. At the same time positive potential from the "1" output of the flip-flop 39–387 is applied through the diode 34–27 to the "0" input of the flip-flop 34–382 thus setting this flip-flop on "0" and rendering the transistor gates 39–300 through 39–307 inactive. Consequently, the "1" outputs from the called number flip-flops are now connected to the "1" inputs of the line translator flip-flops of FIG. 24 and cause these line flip-flops to be set in accordance with the identity of the called subscriber's station number.

Positive potential from the "1" output of the flip-flop 39–387 is applied to the base of the transistor gate 38–339 and conditions this gate for conduction. Inasmuch as it is assumed that the call is directed to the subscriber's station 28 the transistor gate 38–338 remains biased for conduction so that upon the application of positive voltage to the base of the transistor gate 38–339 the transistor gates 38–338 and 38–339 become conducting and apply positive voltage to the set "0" input of the flip-flop 32–81 and also through diode 32–17 to the source 32–20. The source 32–20 is arranged to generate a saw-tooth wave form having a relatively slowly rising linear voltage wave form and may be of the type, for example, disclosed in United States Patents 2,422,204 and 2,422,205, both granted to L. A. Meacham on June 17, 1947. The positive voltage from the "1" output of the flip-flop 39–387 is also transmitted through the diode 38–11 to the set "0" input of flip-flop 32–80 thus setting this flip-flop in its "0" state and also through the diode 32–18 to the source 32–20 described above.

With the flip-flops 32–80 and 32–81 set in their "0" states, relatively low output voltage is obtained from their "1" output terminals. This voltage is amplified and applied to the bases of the respective transistor gates 32–21 and 32–19 to thus condition these transistor gates for operation.

The No. 1 output of flip-flop 39–387 also applies positive voltage through the diode 38–12 and through condenser 32–22 and amplifier 32–23 to the base of the transistor gate 32–14, thus activating this gate and causing the high voltage source 32–24A to be applied over conductor 32–15 to energize the "and" circuits of the line translators 24–10 and 24–11. As described above, these translator flip-flops and diode networks have been energized in accordance with the identity of the called line and function to apply high voltage to the control terminal of the called line since this line has been found to be idle as described above.

Under the assumed conditions of a call directed to the subscriber's station 28, high voltage will be applied through the diodes 17–13 and 17–30 and resistor 17–40 to the conductor 17–28 extending to the lower terminal of the network side of the repeat coil of the termination circuit of the subscriber line circuit 1–28 and then through the winding of the repeat coil in the line circuit termination and over conductor 31–28 to the first vertical input conductor of the switching network shown in FIG. 31.

The actuation of the transistor gate 32–21 applies the output from the saw-tooth source 32–20 to conductors 41–01 and 41–02 through the respective resistors 41–21 and 41–22. A capacitor 41–32 is connected to the conductor 41–02 and resistor 41–22 and is employed to delay the rise in potential of conductor 41–02 so that the potential does not increase or rise as fast on conductor 41–02 as on conductor 41–01.

The actuation of the transistor gate 32–19 applies the output of the saw-tooth source 32–20 to conductors 41–03 and 41–04 through the respective resistors 41–23 and 41–24. Here again, the condenser 41–34 is employed to retard the rise of voltage on conductor 41–04 so that the voltage on this conductor rises slower than the voltage on conductor 41–03. The conductors 41–01 and 41–02 extend to the repeat coils of the talking trunk circuits 3–11 and 3–12. From the repeat coil winding of the talking trunk 3–11 and 3–12 circuit paths extend over conductors 31–01 and 31–02 to vertical input conductors of the transistor switching network shown in FIG. 31.

In addition, the conductors 41–03 and 41–04 extend to repeat coil windings of the 1000-cycle ringing trunks 3–13 and 3–14. From these repeat coils the circuits then extend over conductors 31–03 and 31–04 to other vertical inputs of the transistor switching network 2–19.

Thus, at this time, a relatively high positive voltage is applied to the conductor 31–28 of the first vertical column of the transistor switching network and linearly increasing negative voltages are applied to conductors 31–01, 31–02, 31–03 and 31–04 of the switching network. These conductors are connected through transistor crosspoints such as 31–30 and 31–31 to horizontal switch conductors such as 31–51.

Each of these transistor crosspoints may comprise a single transistor connected in a two-terminal network such as disclosed in United States patent application of B. G. Bjornson and E. Bruce, Serial No. 334,552, filed February 2, 1953, now Patent 2,876,285, issued March 3, 1959; or each of these transistor crosspoints may include a plurality of transistors or a plurality of transistors and diodes and other circuit elements interconnected to form two-terminal networks such as disclosed, for example, in United States Patents 2,655,609, granted to W. Shockley, October 13, 1953, and 2,655,610, granted to J. J. Ebers, October 13, 1953. These two-terminal networks are characterized by having two stable operating states. In one state they present a relatively high impedance between the two terminals which is changed to a relatively low impedance if the voltage applied between the two terminals exceeds a predetermined reference voltage. Thereafter, the low impedance condition will be maintained even though the voltage or current applied to the two terminals falls to a much lower voltage or current so long as it does not fall below another predetermined holding voltage or current. Between these two stable states these two terminal devices or circuits exhibit a, so-called, "negative resistance" region. This negative resistance region is employed to obtain "lock out" operation as described herein and in the above-identified patents.

Thus, a relatively high positive voltage is applied to conductor 31–28 and linearly increasing negative voltages are applied to the conductors 31–01 and 31–02 and also to conductors 31–03 and 31–04. When the critical breakdown voltage of two of the series crosspoints between conductor 31–28 and the other conductors is exceeded by the voltages across these crosspoints their impedances will change from high to low values. Assume for purpose of illustration that the diodes 31–30 and 31–31 are the first to have their impedance values changed abruptly due to the increasing voltages applied to the series connection of these crosspoints from conductor 31–28, conductor 31–51 and conductor 31–01. The change in impedance of the two crosspoints causes the voltage drop across them to fall to a relatively low value so that insufficient voltage is then applied to other pairs of crosspoints between these two conductors to cause the impedance level of these other pairs to change. If two pairs of crosspoints attempt to change their impedance levels at about the same time the negative resistance characteristics of these devices and circuits permits the impedance of only one pair to change.

This abrupt change in impedance level causes an abrupt increase in current flow over this path and in particular through transformer winding 32–24 connected in series with the output of the transistor gate 32–21. As a result, a sufficiently high voltage is induced in the secondary winding of this transformer and applied to the set "1" input of the flip-flop 32–80 thus setting this flip-flop in its "1" state and applying a high positive voltage to the base of the transistor gate 32–21 thus rendering this transistor inactive and removing the saw-tooth wave form from source 32–20 from the conductors 41–01 and 41–02 and thus from the conductors 31–01 and 31–02. As a result a path cannot be established at this time between conductors 31–28 and 31–02. However, holding voltage is maintained on the conductor 31–01 through the repeat coil winding of the line circuit 1–28 and on conductor 41–01 through the diode 41–41, thus maintaining a sufficient current and potential voltage across the series operated crosspoints 31–30 and 31–31 to maintain their impedances at a relatively low stable state. In a similar manner, another pair of diodes will break down and abruptly change from their high impedance condition to their low impedance condition and establish a path from conductor 31–28 to either conductor 31–03 or 31–04. Due to the operation of the condenser 41–34, described above, connection will normally be established from conductors 31–28 and 31–03 first, assume, for example, by means of diodes 31–32 and 31–33; at this time, a surge of current flows through the transformer winding 32–25 and applies a positive voltage on the secondary winding of this transformer to the set "1" input of the flip-flop 32–81, thus setting this flip-flop in its "1" state whereupon positive potential is applied to the base of the transistor gate 32–19, thus rendered inactive. Here again holding potential is nevertheless maintained on conductor 31–03 through the diode 41–43. The above-described operation of the crosspoints 31–32 and 31–33 prevent the similar operation of any other pair of crosspoints between conductors 31–28 and 31–03. In addition actuation of flip-flop 32–81 and the resulting disabling of the transistor gate 32–19 prevent the establishing of a path between conductor 31–28 and 31–04.

The energizing of these transistor crosspoints establishes communication paths from the called subscriber's line circuit 1–28 and the talking trunk circuit 3–11 and from the subscriber's line circuit 1–28 and the 1000-cycle ringing trunk 3–13. Ringing current is transmitted over this path and is employed to actuate the calling device at the called subscriber's station. As indicated herein, this ringing current has a frequency of the order of 1000-cycles and may be, but need not be, interrupted at some other frequency such as 20 cycles to furnish a distinctive calling signal to the called subscribed. The calling subscriber's station of the type described in the above-identified patent application responds to such ringing current or ringing signals.

The above-described operation of establishing connections between the called line and a talking trunk and between the called line and a source of ringing current is employed for one group of subscriber's stations. These stations are supplied with ringing current from the 1000-cycle ringing trunk 3–13 or 3–14 in the exemplary embodiment of this invention described herein. This group of subscribers includes the subscribers connected to the central station over an individual line and also the one of the parties of a party line, for example, the first party on a party line. A second group of stations comprises the other party on a party line such as the subscriber's station 17.

In case the subscriber's station 17 is being called, then the digits 1 and 7, representing directory number 17, will be dialed and the system operates substantially as described above; the only difference being that the various groups of flip-flops are energized to represent the directory number 17 instead of the directory number 28 as assumed above. In this case when the flip-flop 39–387 operates to its "1" state, as described above, the circuits operate substantially as described and the transistor gates 34–329 through 34–336 are conditioned for conduction. These transistor gates described above effectively interconnect the "1" output of the called number flip-flops 34–334 through 34–341 over cable conductors 34–24 with the set "1" inputs of the line translator flip-flops of FIG. 24. When the subscriber station 17 is called, these flip-flops will be energized to represent the designation of this subscriber's line so that a high positive potential will be applied to the conductor 17–17 in response to the application of a positive potential to the condenser 32–22, the amplifier 32–23, and the transistor gate 32–14. As a result, positive potential, in addition to being transmitted through diode 17–27 to the network side of the repeating coil of the line termination 1–22, is also transmitted over the conductor 17–17 to the base of the transistor gate 38–338 thus rendering this transistor gate nonconducting and inoperative. Consequently, positive potential cannot be transmitted through this transistor to the transistor gate 38–339 and to the set "0" input of the ringing flip-flop 32–81. As a result, the source of saw-tooth voltage wave form from source 32–20 is not applied to the conductors 41–03 and 41–04. Instead, positive voltage from the conductor 17–17 in addition to being applied to the base of the transistor 38–338 is also applied through the diode 38–13 and then through diodes 38–14 and 38–15 to the set "1" input terminals of appropriate flip-flops of the trunk connect translators 36–10 and 36–11 shown in FIG. 36. In the exemplary embodiment shown in the drawing, input potentials are applied to the translator so that the translator output potentials represent trunk No. 24.

Since these translators must deliver negative output potentials the "and" circuits therein have a negative potential applied to them over wire 36–12. Also the diodes of these "and" circuits are connected to "0" outputs instead of "1" outputs of flip-flops in these translators. Consequently the trunk connect translators cause the application of a relatively high negative voltage to the conductor 41–05 through the diodes 41–55 and 41–65 and associated resistance 41–64, in response to the operation of the transistor gate 32–30 due to positive voltage supplied from the "1" output of the flip-flop 39–387 and transmitted through the diodes 38–12 and 32–32 and applied to the base of the transistor gate 32–30. As a result, connection is established between the called line termination 1–22 and the 800-cycle ringing source or trunk 3–15. In addition thereto a connection is also established between the called line and one of the talking trunks 3–11 or 3–12.

Thus, in this case, a different source of ringing current designated 800 cycles is employed instead of the ringing source designated 1000 cycles. Of course, these sources may have the same or different frequencies and they may be interrupted at the same or different rates in accordance with different frequencies or codes. It is desirable of course that these two sources of ringing current produce easily recognized different calling signals at the respective subscriber's stations connected to the line.

It may be desirable to more uniformly distribute the load on the various ringing trunks so that some of the individual lines may be arranged to have the 800-cycle ringing current applied to them instead of the 1000-cycle by similar connections from the line circuit terminations to the transistor gate 38–338 and the other above-described circuits. When it is desirable to have more 800-cycle ringing trunks, an additional saw-tooth wave form generator similar to generator 32–20 may be employed or generator 32–20 may be employed and energized by the output from diode 38–13. Such additional control circuit would operate in the same manner as the ones described above.

Returning now to the establishment of the connection of the called subscriber's line termination 1–28 and the talking trunk 3–11 and the ringing trunk 3–13 as described above, the application of sufficiently high negative potential to the conductor 41–01 to initiate a discharge through a plurality of the crosspoints of the switching network to form a switching path also applies a negative voltage to the inverter device or network 49–01. Likewise, the substantially simultaneous application of a sufficiently high negative voltage to the conductor 41–03 to establish a path through the switching network from the ringing trunk 3–13 likewise applies a high negative voltage to the inverter network 49–03. These inverter networks change the negative voltage applied to their inputs to a positive voltage at their outputs. The positive voltages from the inverter networks 49–01 and 49–03 apply positive voltages to respective inputs of the "and" circuit 49–10, thus causing a positive output from this "and" circuit to be connected through the diode 49–11 to the transistor gate 49–12. The negative voltage applied to the conductor 41–01, as described above in addition to being applied to the input of the inverter 49–01, is also transmitted to diode 49–13. However, the diode 49–13 is poled in such a direction and connected to a small bias voltage 49–22 so that this diode does not transmit the negative voltage from the conductor 41–01.

Due to the negative bias voltages applied to the bases of the transistor gates 49–12 and 49–15 these transistor gates are normally conditioned to conduct. Consequently, the positive voltage from the diode 49–11 is transmitted through the transistor gate 49–12 and applied to the set "1" input of the flip-flop 49–415 thus setting this flip-flop in its "1" state indicating that the ringing trunk 3–13 is connected to the same line as the talking trunk 3–11. As described above, negative voltages are also applied to the conductors 41–02 and 41–04 at the same time negative voltages are applied to the conductors 41–01 and 41–03. The voltages applied to the conductors 41–02 and 41–04 do not rise as fast as the voltages applied to the conductors 41–01 and 41–03 assuming all of the trunk circuits are idle so that voltages applied to the conductors 41–02 and 41–04 do not reach a sufficiently high magnitude to actuate the other corresponding inverter "and" circuits and flip-flops. Of course, if either one of the trunks 3–11 or 3–13 is busy, then the voltage on the corresponding conductor does not rise; therefore the voltage applied to the trunk circuit 3–12 or 3–14 will rise and cause connection of the corresponding trunk to the subscriber's line. If the ringing trunk 3–14 had been employed instead of 3–13 then positive potential would have been transmitted from the inverter circuit 49–04 and in turn would have caused the flip-flop 49–416 to be set in its "1" state instead of flip-flop 49–415 as described above. If, as described above, the 800-cycle ringing current source and trunk 3–15 had been employed instead of either of the other ringing trunks 3–13 or 3–14 then negative voltage will be applied to the conductor 41–05 at substantially the same time as negative voltage is applied to the conductor 41–01 so that the inverter circuits 49–05 and 49–01 are actuated and in this case actuate the "and" circuit 49–16 which applies positive voltage to both of the transistor gates 49–12 and 49–15 thus setting both flip-flops 49–415 and 49–416 in their "1" state. Thus, the flip-flops 49–415 and 49–416 are employed to record or store which of the ringing trunks are connected to the same subscriber's line to which the talking trunk 3–11 is connected. (In case two ringing trunks, that is either one of the trunks 3–13 or 3–14 and 3–15, are interconnected with the same subscriber's line, as described hereinafter on the revertive calls from one subscriber on a party line to another subscriber on the same party line, then either the "and" circuit 49–17 or 49–18 will be actuated and cause a positive potential to be applied to its output circuit which disables the transistor gates 49–12 and 49–15 and insures that the flip-flops 49–415 and 49–416 remain in their "0" states.)

Thereafter, the flip-flops 49–415 and 49–416 remain in their set "1" state until restored to their "0" state as described hereinafter.

A second plurality of diodes and transistor and flip-flop circuits similar to the ones shown in rectangle 49–20 are provided and represented by the rectangle 49–21. This second plurality of circuits is similar to the circuits 49–20 and is employed to record which of the ringing trunks are interconnected with the same station as the talking trunk 3–12. These circuits operate in substantially the same manner as the circuits 49–20 described above.

The application of a relatively high negative voltage from the saw-tooth source 32–20 and transistor gate 32–19 in addition to being applied to the conductors 41–03 and 41–04 is also transmitted through the diode 32–33 to the bases of the transistor gates 32–26 through 32–29 thus conditioning these gates for operation. In case high negative voltage is applied to the conductor 41–05 then negative voltage is transmitted through the diode **32–34*d* to the bases of the transistor gates 32–26 through 32–29** to condition these transistor gates for operation.

The application of positive connect voltage to the conductor 17–28 substantially simultaneously with the application of the high negative voltage to conductors 41–03 and 41–04 or to conductor 41–05 causes the transistor gate 32–29 to become conducting and apply a positive voltage to the set "1" input of the flip-flop 32–393. The actuation of this flip-flop to its "1" state stores the information that ringing current has been applied to the subscriber's line extending to subscriber station 28. Had the ringing current been applied to other of the subscribers' lines then other of the transistor gates 32–26 through 32–28 and other of the flip-flops 32–390 through 32–392 would be actuated in a manner described above to record the application of ringing current to the respective subscribers' lines.

Having applied ringing current to the called subscriber's line and having connected the called subscriber's line to one of the talking trunks it is necessary to write a circle in the ringing spot in the line storage tube to indicate that the ringing current is applied to the subscriber's line. It is also necessary to connect the calling subscriber's line or line termination with the same talking trunk as is connected to the called subscriber's line. In order to accomplish this it is necessary to determine which of the talking trunks has been interconnected with the called subscriber's line. Both of these functions are accomplished during the next complete scanning interval during which all of the subscriber's lines are scanned as described above.

During this next scanning cycle while a binary counter 7–10 is set in its "0" state, the lines 1–14 and 1–22 are scanned as described above. At this time positive voltage is obtained from the "0" output of the binary counter stage 7–10 and applied to the bases of the transistor gates 32–394, 32–396, and 32–44, thus conditioning these gates for transmission. However, under the conditions assumed above, the flip-flops 32–390 and 32–392 are set in their "0" states so that their "1" outputs are at a relatively low or negative voltage. As a result, no current is conducted through the transistor gates 32–394 and 32–396 at this time.

After the lines 1–14 and 1–22 have been scanned, as described above, the binary counter 7–10 is actuated to its "1" state and the lines 1–15 and 1–18 are scanned. As a result, positive voltage is obtained from the "1" output of the binary counter stage 7–10 instead of from the "0" output. At this time, the transistor gates 32–395, 32–397, and 32–42 are conditioned for conduction instead of transistor gates 32–394, 32–396, and 32–44.

As described above, as each line is scanned the binary counters 7–51 and 7–50 are initially set in their "0" states and the cathode ray beams illuminate the phototransistors adjacent the ends of the tubes assigned to the respective lines, then the binary counter stage 7–51 is actuated from its "0" state to its "1" state whereupon the beams within the scanning tubes are moved up to the upper spots as described above. After the upper spots have been read out and regenerated, as described hereinbefore, the binary counter stage 7–51 is again restored to its "0" state and in turn causes the binary counter stage 7–50 to be set in its "1" state. At this time, positive voltage is simultaneously obtained from the "0" output, from the binary counter stage 7–51 and the "1" output of the binary counter stage 7–50. Consequently, positive voltage is simultaneously applied to both of the diodes 7–21 and 7–22 so that the output conductor of the "and" circuit comprising conductor 7–23 which extends to the bases of the transistors 32–398 and 32–399 has positive voltage applied to it. As a result, these transistors 32–398 and 32–399 are likewise conditioned for conduction.

As described above, at this time the beam within the line scanning tubes is directed to the lower or ringing storage spot. Thus, at this time under the assumed conditions, with the flip-flop 32–393 set in its "1" state and the transistor gates 32–397 and 32–399 conditioned for conduction, positive voltage will be transmitted from the "1" output of the flip-flop 32–393 and through both of these transistor gates and then over conductor 32–35 which extends to the ringing flip-flop in the second detector circuit corresponding to the ringing flip-flop 11–15 of the first detector circuit, thus setting the flip-flop in its "1" state. The following description is with reference to the first detector 1–50 circuit, since this circuit is shown in detail in the drawing. Also the second detector 1–51 circuit works the same for station 28 as described with reference to 1–50.

With the flip-flop 11–15 thus set in its "1" state at this time, positive voltage will be obtained on the output of the "and" circuit 11–20 when positive voltage is received over conductor 11–31 from the program circuit. This positive voltage is transmitted through the transistor gate 11–07, which is conditioned for conduction at this time by the bias applied to its base and by the low output voltage obtained from "and" circuit 11–18 at this time. From the gate circuit the positive voltage from gate circuit 11–07 is transmitted through the "or" circuit 11–19 to the circle gates 1–31 and causes current from the circle generator to be transmitted to the deflection circuits of the cathode ray tubes 1–10 and 1–11, thus causing a circle to be written in the lower or ringing spot assigned to line 1–18, thus indicating the application of ringing to the called subscriber's line 1–18.

In addition, the conductor 32–35 extends to the pulse stretcher 40–60. This pulse stretcher increases the length of the pulse on its output circuit and applies a prolonged pulse to conductor 35–12, thus rendering the transistor gate 35–11 inoperative for a number of pulse periods from the oscillator 35–01 to allow adequate time for the writing of the circles in the lower storage spot assigned to line 1–18. The output from the pulse stretcher 40–60 is also transmitted through a delay device 40–62 and through the diode 40–64 to the set "1" input of the flip-flop 40–407. The flip-flop 40–407 being actuated to its "1" state applies a proper potential to the cathode ray tubes 1–20 and 2–21 to turn the beams on in these tubes thus causing these circles to be stored in the lower storage spot assigned to line 1–18. At the end of the pulse interval from the pulse stretcher 40–60 the transistor gate 35–11 is again turned on and the next pulse from this transistor gate will cause the flip-flop 40–407 to be reset in its "0" state and turn off the beam within the line scanning tubes. Thus, a circle is now written in the ringing spot assigned to the line 1–18 to which the subscriber's station 28 is connected.

The output conductor 7–23 of the "and" circuit comprising diodes 7–21 and 7–22 also extends to the delay device and network 32–37A. The delay of this device or network is such that positive pulse is not applied to its output until after the circuits have operated as described herein to write circles in the line scanning tubes. However, at the end of this period, positive voltage is obtained from the output of the delay device or network 32–37A and applied to the set "0" inputs of the flip-flops 32–391 and 32–393 through the transistor gate 32–42 and thus restoring all of these flip-flops to their "0" state. Under the assumed conditions, the flip-flop 32–393 will be thus set in its "0" state.

After the called party is interconnected with one of the talking trunks and one of the ringing trunks as described above, it is necessary to interconnect the calling party with the same talking trunk. However, before this can be accomplished, it is necessary to determine with which talking trunk the called party has been interconnected since the called party can be interconnected with any one of a number of trunks depending upon the busy condition of the various talking trunks. In order to initiate the operation of the identification of the trunk with which the called party is connected, positive potential from the "1" output of flip-flop 39–387 was transmitted through the delay device or network 38–16 to the input of the pulse stretcher 32–34 and then through the amplifier 32–23 to the transistor gate 32–14, thus enabling this transistor gate and applying high voltage source 32–24A to the diode network in the tens line translator 24–10 and to the diode network in the units line translator 24–11. As pointed out above the actuation of the flip-flop 39–387 to its "1" state activated the gates 34–329, through 34–336 so that the line translator flip-flops were set in accordance with the called party's station identification or directory number.

The delay device 38–16 delays the application of the positive voltage to the pulse stretcher 32–34 during the time connection is established between the called party's line and the talking trunk and the ringing trunk as described above. After ample time has elapsed to permit these operations to be completed as described herein, then the pulse stretcher 32–34 and in turn the transistor gate 32–14 are actuated and cause a high identifying voltage to be applied to the network winding of the called party's repeat coil and thus to the network. This potential is transmitted through the network and raises the potential of the network repeat coil winding of the talking trunk interconnected through the called subscriber's line.

Under the assumed condition the path of this high positive voltage may be traced on the high voltage source 32–24A to the diode networks in the tens and units line translators. As assumed, the called party's station identification is subscriber station 28. Thus, positive potential applied on conductor 24–22 actuates the second of the tens flip-flops and this together with the other tens flip-flops remaining on "0" causes positive potential to be applied to the output conductor 24–32. Likewise, positive potential is applied to the conductor 24–28 which sets the flip-flop 24–07 in its "1" state which in turn, together with the fact that the other flip-flops 24–04 through 24–06 remain in their "0" state, causes a high positive potential to be applied to the No. 8 output units, conductor 24–48.

The positive potentials applied to the conductors 24–22 and 24–28 are transmitted from the corresponding common flip-flops 34–333 through 34–341.

High positive potential on the 2 tens output conductor 24–32 is transmitted through the diode 17–30 and resistor 17–40 and the high positive voltage on the 8 units output conductor 24–48 is transmitted through the diode 17–13. These two high positive potentials cause the voltage of conductor 17–28 to rise to a high positive voltage. This high positive voltage is transmitted through the network winding of the repeat coil in the line termination 1–28 and then over conductor 31–28 and through the crosspoint 31–30, conductor 31–51, crosspoint 31–31, conductor 31–01, the repeat coil winding of the talking trunk 3–11 and then to the holding battery or source of potential 41–40 connected to conductor 41–01 through the diode 41–41.

In addition, the high positive voltage from the conductor 41–01 is also transmitted to the phototransistor 3–31. This phototransistor is illuminated by the light from the beams within the trunk scanning tubes 3–20 and 3–21 in a manner similar to the manner in which the phototransistors 1–34 and 1–35 are illuminated by the beams within the line scanning tubes 1–10 and 1–11 striking the phosphorus on the ends of these tubes.

The beams within the trunk scanning tubes 3–20 and 3–21 are caused to scan the phototransistors individual to the various trunks. In the exemplary embodiment of this invention described herein two pairs of trunk scanning tubes are shown, one pair for scanning the talking trunks and the second pairs 3–22 and 3–23 being employed to scan the ringing and busy trunks. (When desired, talking and ringing trunks may be scanned by the same tube or pair of tubes.) Here again, as in the line scanning tubes and call register tubes, the second tube of each pair is employed for purposes of reliability so that if one of the tubes fails the other tube is capable of actuating the system until the defective tube and related circuits may be replaced, repaired, or corrected.

The deflection of the beams in the trunk scanning tubes is controlled by the binary counters 47–34 and 47–35. These binary counters are in turn controlled by voltage pulses applied to the conductor 35–411 by the diodes 35–34, and 35–36. Thus pulses are applied to this conductor when the binary counter 35–02 is set at the beginning of each line scanning interval to represent "0" and also when this counter has counted three input pulses. In other words, conductor 35–411 has two pulses applied to it during each line scanning interval or four pulses during a complete line scanning cycle during which all the lines are scanned. These pulses are transmitted through the delay device or network 47–11 in order to properly time them and then to the binary counter 47–34. The binary counter stages 47–34 and 47–35 are initially set in their "1" states so that the first pulse over the conductor 35–411, which will be transmitted through the diode 35–34 to this conductor as described above, sets the counters 47–34 and 47–35 in their "0" states. At this time high positive voltage is obtained from the "0" outputs of these counters and relatively low or preferably negative voltage from the "1" outputs of these counter stages. As a result, the transistor gates 47–253 and 47–254 are conducting so that the minimum positive voltage is applied to the base of the transistor amplifier 47–10. This amplifier applies the corresponding voltage to the horizontal deflecting plates of all of the trunk scanning tubes 3–20 through 3–23. As a result, the beams within the tubes 3–20 and 3–21 are directed to the phototransistor 3–31, while the beams within the tubes 3–22 and 3–23 cause the phototransistor 3–33 to be illuminated. The next pulse over the conductor 35–411 actuates the binary counter 47–34 to its "1" state where positive voltage on the No. 1 output turns off the transistor gate 47–253 causing this transistor to become nonconducting which in turn causes decreased voltage drop across the resistor 47–12 thus increasing the voltage applied to the transistor amplifier 47–10 by one unit of magnitude. As a result, the beams within the trunk scanning tubes are moved one step so that they cause the illumination of the phototransistors 3–31′ and 3–34.

The next pulse received over the conductor 35–411 restores the binary counter stage 47–34 to its "0" state and, in turn, the binary counter state 47–35 is actuated to the "1" state. As a result, the transistor gate 47–253 is turned on again while the transistor gate 47–254 is turned off causing decreased current to flow through both resistors 47–12 and 47–13 with the result that the voltage applied to the base of the transistor 47–10 is increased by two units of magnitude. Consequently, the beams within the trunk scanning tubes are caused to step and illuminate the next or third phototransistors 3–32 and 3–35.

On the application of the next pulse over conductor 35–411 the binary counter stage 47–34 is again actuated to its "1" state whereby the transistor 47–253 is again turned off and as a result decreased current flows through resistor 47–12 thus increasing the voltage applied to the base of the transistor 47–10 by another unit of magnitude or a total of three units of magnitude thus directing the beams within the trunk scanning tubes so they will illuminate the fourth phototransistors 3–32′ and 3–26. The next pulse received over the conductor 35–411 resets both binary counter stages to "0" and the above cycle of operation is repeated during which the beams within the tubes cause the respective phototransistors to be successively illuminated.

The binary counters 47–34 and 47–35 in addition to controlling the deflection or positioning of the beams within the trunk scanning tubes 3–20 through 3–23 also control the transistor gates 48–256 through 48–263, inclusive through the "and' circuits 47–247 through 47–250, inclusive. Thus, when the binary counters 47–34 and 47–35 are both in their "0" state, positive output voltage is obtained from their "0" output and applied to both inputs of the "and" circuits 47–247. As a result, a positive voltage is obtained from the output of this "and" circuit and applied to the base of the transistors 48–256 and 48–260, thus conditioning these transistors for conduction. Likewise, when the binary counter 47–34 is in the "1" state and the binary counter 47–35 is in the "0" state, then positive potential is applied to both inputs of the "and" circuit 47–248 and, as a result, positive voltage is obtained from this "and" circuit and applied to the base of the transistor gates 48–257 and 48–261. In a similar manner when binary counter 47–34 is in its "0" state and binary counter 47–35 is in its "1" state, transistor gates 48–258 and 48–262 are conditioned for conduction. Likewise, when the binary counters 47–34 and 47–35 are both in their "1" state then the transistor gates 48–259 and 48–263 are conditioned for conduction.

The transistor gates 48–256 through 48–263, inclusive, however do not conduct these times unless an output is obtained from the amplifiers 47–14 or 47–15.

Thus, during each of the complete line scanning cycles as described above, the beams within the trunk scanning tubes 3–20 through 3–23 also scan each of the talking, ringing and busy trunks. Normally, when these trunks are scanned and the respective phototransistors are illuminated by the beams impinging on the ends of the trunks adjacent to them they will have negative potential applied to them from the repeat coils of the respective trunks.

However, as described above when it is desired to identify a trunk a high identifying potential is applied to the network winding of the repeat coil of a subscriber's line, such as the repeat coil of the line terminal 1–28 and this high potential is transmitted through the network to the network side of the trunk repeating coil. As a result, the voltage applied to the associated phototransistor such as 3–31 under the assumed conditions becomes slightly positive. This voltage, however, does not become as positive as the bias voltage 49–22. As a result, the diode 49–13 does not become conducting at this time so that the circuits of FIG. 49 do not respond to this small positive voltage.

Figure 48:
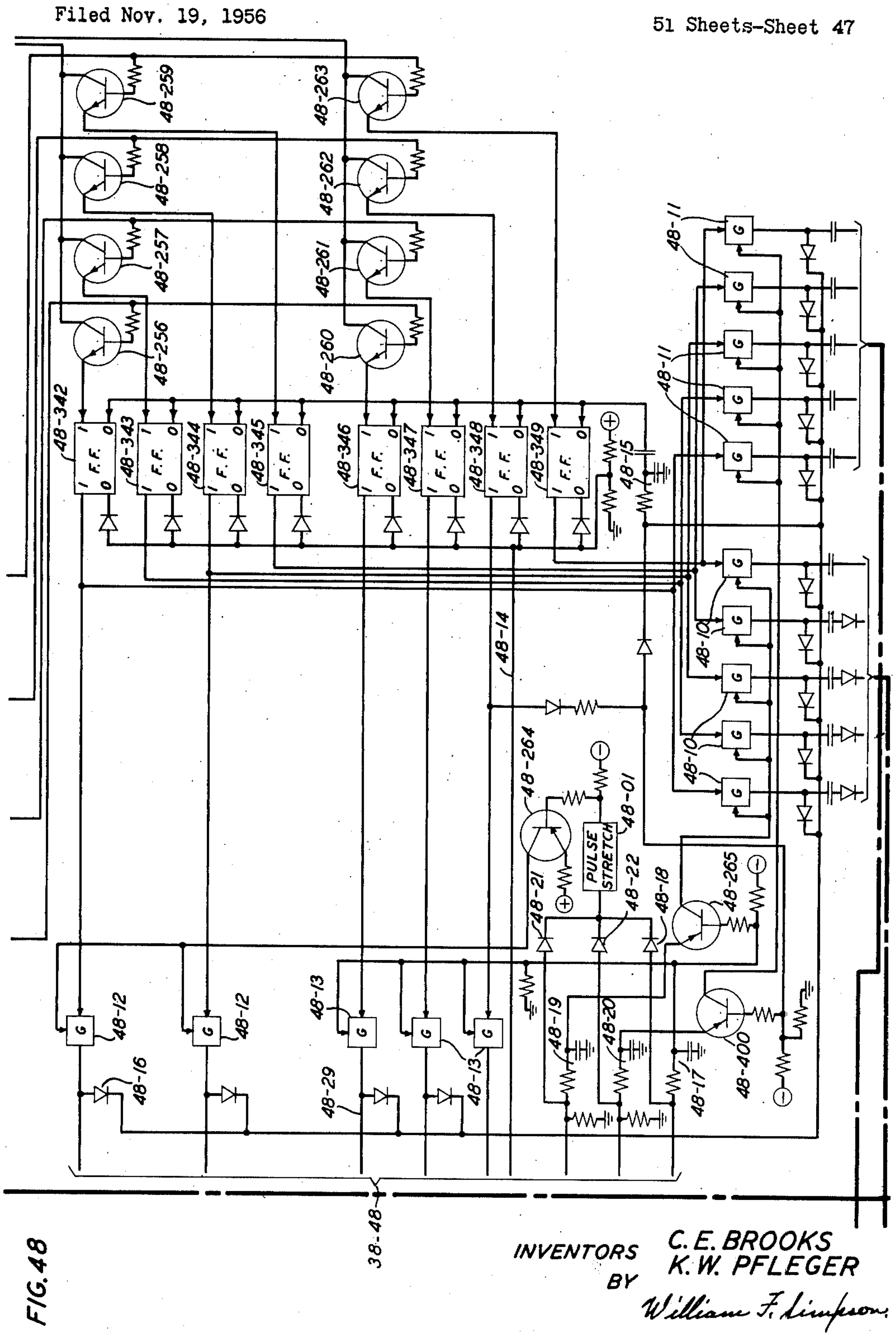
FIG. 48 shows trunk identifying circuits and storage flip-flops.

However, the circuits of FIGS. 47 and 48 do respond to this voltage when the beam is directed to illuminate one of the phototransistors of the trunk scanning tubes when this identifying potential is applied to the network as described above. Then a sufficient poistive voltage is applied to the phototransistor so that an output is obtained from either the amplifier 47–14 or 47–15 and transmitted to the transistor gates of FIG. 48 to set or control the corresponding flip-flops 48–342 through 48–349, inclusive. Thus, under the assumed conditions when both the binary counters 47–34 and 47–35 are in their "0" state and the gates 48–256 and 48–260 are conditioned for conduction and a high identifying potential is applied to the network as described above, sufficient voltage is obtained from the amplifier 47–14, due to the fact that phototransistor 3–31 has a small positive voltage connected to it and is illuminated by the trunk scanning tubes, to set the flip-flop 48–342 in its "1" state through the transistor gate 48–256.

When flip-flop 48–342 is actuated to its "1" state positive potential is removed from conductor 48–14 extending to the transistor 33–342 and thus rendering this transistor inactive so that the circuits of FIG. 33 do not operate at this time. Under the assumed conditions, the circuits of FIG. 33 are idle so that the transistor gate 48–264 is biased so as to permit conduction and in turn condition the gates 48–12 for operation. Consequently, when the flip-flop 48–342 is actuated to its "1" state, positive voltage from its "1" output is transmitted through the upper gate 48–12 to FIG. 38. In addition, positive voltage is transmitted through the diode 48–16 and through the delay device or network 48–15 to the set "0" inputs of the flip-flops 48–342 through 48–349. This positive voltage thus resets the flip-flop 48–342 in its "0" state where positive potential is again applied o the conductor 48–14 and removed from the upper gate circuits 48–12 and from the delay device or network 38–17. However, the delay interval of the delay device or network 48–15 is sufficiently long to permit flip-flop 48–342 to remain in its "1" state sufficiently long for the system to function as described hereinafter. The positive potential applied to the delay device or network 38–17 is delayed for an interval of time until after positive potential from the "1" output of the flip-flop 39–387 is transmitted through the delay device or network 39–25. The positive potential from the "1" output of the flip-flop 39–387 is delayed until after all of the trunks have been scanned following the application of a high positive voltage to the conductor 17–28 connected to the network winding of the repeat coil of the line terminal 1–28. This delay insures that ample time is provided for scanning all of the trunks. After this delay interval positive voltage is applied to the set "0" input of flip-flop 39–387 thus restoring this flip-flop to its "0" state where positive potential is removed from the base of the transistor gates 34–329 to 34–336 thus rendering these gates inactive.

In addition, positive voltage from the delay device or network 39–25 is transmitted through the diode 38–24 and over conductor 33–26 to the set "0" input of all of the flip-flops of the tens line translator and the units line translator thus restoring these flip-flops to their "0" states.

After the circuits have responded to the positive output from delay device or network 39–25 as described above positive voltage is obtained from the output of the delay device or network 38–17 and transmitted through the diode 38–18 to the input of the tens trunk connect translator 36–10 and through the diode 38–19 to the input of the units trunk connect translator 36–11. Positive voltage from the output of delay device or network 38–17 is also transmitted through the diode 38–18 and diode 38–20 over conductor 39–12 and diode 39–26 to the base of the transistor gates 39–313 through 39–320, inclusive, thus conditioning these transistor gates for conduction. These transistor gates 39–313 through 39–320 interconnect the "1" outputs of the flip-flops 34–326 and 34–327 through 34–333 to the flip-flops of the tens line translator 24–10 and flip-flops of the units line translator 24–11. As a result, these translator flip-flops are set in accordance with the directory number or other signals which identify the calling line.

Positive voltage from the delay device or network 38–17 is also transmitted through the diode 38–18 and diode 38–20 to the base of the transistor gate 32–16 and through the diode 32–33A to the base of the transistor gate 32–30. This positive potential is transmitted through condensers to the bases of these transistor gates so that this voltage appears as a positive pulse. This positive pulse activates both of these gates so that the gate 32–16 connects or applies the source of voltage 32–35A to the diode matrix of the tens line translator 24–10 and to the diode matrix of the units line translator 24–11. Likewise, the transistor gate 32–30 connects the source of negative voltage 32–36A via conductor from ground, 36–12, to the diode matrix of the tens single trunk connect translator and to the diode matrix of the units single trunk connect translator 36–11. As a result, positive voltage from source 32–35A is applied through the line translator diode matrix to the conductor 17–28. Likewise, negative voltage from source 32–36A is applied through the diode matrix of the single trunk connect translator and through the diodes 41–51 and 41–61 and resistor 41–50 to conductor 41–11 extending to the repeat coil of the talking trunk 3–11. These voltages identify the respective conductors 31–14 and 31–11 whereupon an idle path through the network such as through the crosspoint 31–34, conductor 31–52 and crosspoint 31–35 is established from the calling party's line to the talking trunk 3–11 to which the called party's line had been previously connected. As a result, since the ringing trunk is also connected to the called party's line the calling party will now receive the audible ringing signal.

After sufficient time has been allowed for the above-described circuit operations positive voltage from the delay device or network 38–17 is transmitted through the diodes 38–18, 38–20, 39–32 and then through the delay device or network 39–31 to the diodes 38–21 and 38–22. This voltage is transmitted through the diode 38–21 and then over conductor 33–26 to the set "0" inputs of the flip-flops in the line translators 24–10 and 24–11 thus restoring all of these flip-flops to their "0" states. Positive voltage is also transmitted through the diode 38–22 and over conductor 38–23 to the set "0" inputs of the flip-flops of the single trunk connect translators 36–10 and 36–11 thus restoring these flip-flops to their "0" or idle states.

After sufficient time has been allowed for the above operations positive voltage from the delay device 38–17 is transmitted through the diodes 38–18, 38–20, and 39–26, and then through the delay device or network 39–27 and diode 39–29, condenser 39–30 to the set "0" input of the flip-flop 39–385 thus insuring that this flip-flop is in its "0" state. Positive voltage from condenser 39–30 is also transmitted to the set "0" inputs of the common flip-flops 38–401, 34–380, and 34–326 through 34–341, inclusive, thus restoring all of these flip-flops to their "0" state where they are ready to respond to another call. The flip-flop 34–380, in being restored to its "0" state removes the busy condition from the common flip-flop circuits thus allowing them to be used on another call.

The flip-flop 38–401 in thus being restored to its "0" state permits the circuits of FIG. 33 to respond to another call and have access to the common flip-flops and the line translators 24–10 and 24–11 as described herein.

During the time ringing current is applied to the called subscriber's line the called subscriber's station circuit is arranged as described in the above-identified applications so that the ringing current is amplified in the subscriber's station set by means of transistor amplifiers and then applied to an audible calling device. The power for supplying the transistor amplifiers is obtained over the subscriber's line. However, this current required by the transistor amplifiers is not sufficient to cause the scanning circuits to recognize this current as being due to a closed subscriber's loop. In other words, the power required for the transistor amplifiers is so small that it appears to be due merely to a resistance leak across the line but is not a closed line or answering condition.

In the case of the calling subscriber, he has picked up his telephone instrument to initiate the call which causes the circuit equipment at his station to be changed and reconnected as set forth in the above-identified patent applications. At this time, the connections at the calling station do not amplify the ringing current to the extent it is amplified when the subscriber is being called so that the ringing current received by the calling subscriber is not amplified sufficient to injure his ear or be uncomfortable. Instead, the ringing current appears to him as a ringing or calling signal indicating that the called party is being called.

As pointed out hereinbefore the magnitude of the ringing current is small in comparison to the direct-current voltages so that the ringing current does not cause improper operation of the scanning tubes and equipment. In other words, all during the ringing interval until the called subscriber answers or the calling subscriber abandons the call, the line scanning equipment when scanning the called subscriber's line merely recognizes the line as continuing to be open so that no output is obtained from the detector circuits 1–50 or 1–51 at this time. Likewise, with the calling subscriber's line when it is scanned, the scanning equipment and detector circuits merely recognize this line as continuing to be closed.

Inasmuch as it may be desirable to apply ringing or calling signals to a subscriber's line for a prolonged interval it is desirable to periodically regenerate the ringing spot assigned to the various subscriber's lines. In the exemplary embodiment described herein the ringing spot is regenerated at intervals of time equal to approximately a half second.

A pulse is obtained from the counter stage 35–25 approximately every half second and is employed to set the flip-flop 35–404 in its "1" state. This flip-flop then remains in its "1" state for approximately a scanning interval due to the pulse transmitted from the binary counter 35–104 through the delay device 35–21. After this interval of time the flip-flop 35–404 is restored to its "0" state.

Meantime, however, positive potential is obtained from its "1" output and applied through the diode 40–17 to the "and" circuit 40–20 for each of these scanning intervals during which it may be desirable to regenerate the ringing spots. In order to actuate the regenerating circuits, it is necessary that the line being scanned test open and also that the line tested open on the immediately preceding scan. Under these circumstances the flip-flops 11–12 and 11–14 will both be actuated to their "0" states where positive voltage is applied to the conductors 11–32 and 11–35 with the result that positive voltage is obtained from the output of the "and" circuit 40–21. In a similar manner, should other lines being scanned test open both on the present scan and the immediately preceding scan then another "and" circuit such as 40–22 will have a positive voltage applied to its output. These voltages are transmitted through diodes 40–23 or 40–24, or both of them which comprise an "or" circuit and then to diode 40–19 of the "and" circuit 40–20. If the subscriber's line does not test open both on the present scan and the immediately preceding scan a circle cannot be stored in the ringing spot so that it is unnecessary to regenate this spot. However, during ringing the line will test open on each scan until either the called party answers or the calling party abandons the call. Under these circumstances during the last of the scanning interval upon which the line is scanned, positive voltage is obtained from the "and" circuit 35–15 as described herein which voltage is employed to direct the beams within the scanning tubes to the lower or ringing storage spots assigned to the respective lines. Positive voltage from the "and" circuit 35–15 is applied through the diode 40–18 to the "and" circuit 40–20. Thus under all of these conditions, namely: the half second timing pulse is received from the flip-flop 35–404, positive pulse is received from "and" circuit 35–15, and a positive pulse is received through the diode 40–19 indicating that some line (or lines) now test(s) open and tested open during a previous scan; positive voltage is obtained on the output of the "and" circuit 40–20. This positive output is employed to actuate the flip-flop 40–405 to its "1" state. As a result, positive voltage on the "1" output of flip-flop 40–405 is transmitted through the diodes 40–14 and 40–15, through the base of the transistor gate 35–11 thus interrupting the counter of 35–02 to permit sufficient time to regenerate the lower storage spots within the appropriate scanning tubes. In addition, positive voltage is transmitted from the "1" output of flip-flop 40–405 through the diodes 40–14 and 40–16 and then to the delay device 40–11. After sufficient time has elapsed for the deflecting circuits to properly position or direct the beams to the lower storage spots, positive voltage is obtained from the output of the delay device 40–11 and transmitted through the diodes 40–34 and 40–35 to the set "1" inputs of the flip-flops 40–406 and 40–407 thus setting these flip-flops in their "1" states which in turn causes the beams within the scanning tubes 1–10, 1–11, 1–20 and 1–21 to be turned on and the characters of the charges or signals stored in these spots read out and employed to control the flip-flops 11–14 in detectors 1–50 and 1–51. If dots had been previously stored in such a pair of spots then the appropriate flip-flop 11–14 remains in its "0" state and the circles are not rewritten in these spots. If, however, circles had been previously stored in these spots then the appropriate flip-flop 11–14 is actuated to its "1" state.

The positive pulse transmitted from the "and" circuit 35–15, as described above, is also employed to set the flip-flop 35–394 in its "1" state. As a result, positive voltage is transmitted from its "1" output over conductor 11–31 to the base of the transistor gate 11–23 and the right-hand diode of the "and" circuit 11–20. Since the flip-flop 11–15 is set in its "0" state at this time, the "and" circuit 11–20 does not transmit a positive voltage over its output circuit at this time. However, the application of positive voltage to the base of the transistor gate 11–23 conditions this gate for conduction so that a positive voltage will be transmitted through this gate circuit in case circles were previously stored in the ringing storage spots and therefore flip-flop 11–14 is set in its "1" state. The voltage transmitted from the "1" output of the flip-flop 11–14 of detector 1–50, through the transistor gate 11–23 is also transmitted through the transistor gate 11–07 which gate is conditioned for conduction at this time because the output of the "and" circuit 11–18 is maintained at a low voltage by the low voltage from the "1" output from flip-flop 11–13 which flip-flop is set in its "0" state at this time. From the transistor gate 11–07 positive voltage is transmitted through the "or" circuit 11–19 to the circle gates 1–31 thus causing circles to be rewritten in the lower or ringing storage spots assigned to a called subscriber's line which is being rung. Under the assumed conditions the subscriber station 28 is being called. Under these circumstances the second detector circuit 1–51 operates in the manner described above with respect to the detector circuit 1–50 which is shown in detail in the drawing.

The output of the transistor, gate 11–23 in addition to being transmitted through the transistor gate 11–07 is also transmitted over conductor 11–29 to the diode 40–42 and then to the pulse stretcher 40–44 of the control or synchronizing circuits of FIGS. 35 and 40. As described above, the pulse stretcher 40–44 responds and applies a pulse of long duration to the conductor 35–12 thus maintaining the gate 35–11 to be inactive for a period of time sufficient to write the circle in the ringing spots as described above.

The output of the flip-flop 40–405 is also transmitted through the delay device 40–10 to the set "0" input of flip-flop 40–405, while the output of the flip-flop 35–394 is also transmitted through the delay device 35–19 to the set "0" input of flip-flop 35–394. Thus the flip-flop 40–405 and related delay device 40–10 as well as the flip-flop 35–394 and delay device 35–19 operate as pulse stretchers similar to the pulse stretchers of FIG. 40 and in particular similar to pulse stretcher 40–44. The constants of the pulse stretcher 40–44 and the delay devices 35–19 and 40–10 are such that the positive outputs obtained from the pulse stretcher 40–44, and flip-flops 35–394 and 40–405 terminate at about the same time with the result that positive potential is removed from the conductor 11–31 which deactivates the gate circuit 11–23 so that circle gates 1–31 are turned off. In addition positive potential is removed from the conductor 35–12 with the result that transistor gate 35–11 is conditioned for conduction so that the next pulse from the oscillator 35–01 is transmitted to the binary counter 35–02 which actuates the "and" gate circuit 35–16 and restores the counter 35–02 to its "0" state and the scan of succeeding lines is initiated as described herein.

Except for the regeneration of the ringing spots as described above, the system does not further respond to the above-described call until either the calling subscriber abandons a call or the called subscriber answers.

Assume now that the called party answers by picking up the telephone instrument which changes the connections in this station set equipment so that the subscriber's loop is closed and that the talking connection within his station equipment is set up. As a result of the closing of the subscriber's loop, the next time the beams within the scanning tubes 1–20 and 1–21 are directed adjacent the phototransistor 1–38 the detector circuit 1–51 is actuated to recognize a change in the signaling condition of the subscriber's line from open circuit to closed circuit. Thus, the corresponding flip-flop 11–12 is actuated to its "1" state while flip-flop 11–14 remains in its "0" state so flip-flop 11–13 is actuated to its "1" state. In addition, the beams within the tubes 1–20 and 1–21 will be directed to the lower storage spots assigned to the subscriber's line 1–18 and read-out circles. Also, positive potential from "and" circuit 11–18 is applied to the base of the transistor gate 11–07 which in turn prevents conduction through this gate and thus prevents the writing of circles in the lower storage spots at this time. The flip-flop 11–14 is set in its "1" state by the reading out of the circle with the result that a positive potential, in addition to being applied to the conductor corresponding to conductor 11–24 indicating a change from open circuit to closed circuit, is also applied to the conductor of a second detector corresponding to the conductor 11–41 from "and" circuit 11–18 indicating that circles had been previously stored in the lower storage spots assigned to the subscriber's line. These two signals indicate that the subscriber has answered. In the process of reading out the circles, dots are recorded on these spots and remain on these spots because the flip-flop 11–15 is no longer set in its "1" state, it having been returned to the "0" state at the beginning of the scanning cycle subsequent to the time it was set in its "1" state.

In addition, signals representing the identity of the called (answering) subscriber's line are obtained from the translator shown in FIG. 12 at this time in the manner described hereinbefore. These identifying signals, together with the above two described pulses are transmitted to one of the sets of line flip-flops shown in FIGS. 8, 9, 13 and 14. Except for the fact that an additional signal representing the circle from the lower storage spot is stored in these flip-flops, these circuits operate in substantially the same manner at this time as described above.

During the first part of the subsequent scanning cycle the answering subscriber's line identifying signals stored in the line flip-flops are compared with all the calling line identifying signals stored in the register tubes 2–24 and 2–25 and 2–26 and 2–27. Since the called party was not in the process of dialing, a match will not be obtained between the signals representing the called (answering) party's line identifying signals and the line identifying signals stored in any of the call register spaces of the call register tubes 2–24, 2–25, 2–26 and 2–27. Thus, at the end of this first portion of the complete scanning cycle the called line number, together with the other tube signals remain stored in the line flip-flops. As a result, flip-flop 10–91 is set in its "1" state, as described hereinbefore, whereupon the gates 15–14 and 15–16 are alternately conditioned for conduction so that the setting of the line flip-flops will be transferred to the common flip-flops 33–601 through 33–610 and 33–612 in substantially the same manner as described hereinbefore. Under the assumed conditions the flip-flops 33–601 will be set in its "1" state as will be the flip-flop 33–612. In addition, the flip-flops 33–603 through 33–610 will be set in the state representing the called subscriber's directory or line number.

Positive potential from the "1" output of one or more of the flip-flops 33–603 through 33–610 which are thus set in their "1" state in accordance with the directory number of the called subscriber's station is transmitted through corresponding diodes of the "or" circuit 33–10 and the delay device circuit 33–11 over conductor 33–12. The delay device or network 33–11 is relatively short and is provided to assure that all of the flip-flops 33–610 and 33–612 will have had sufficient time to be set in their "1" states before positive voltage is applied to the conductor 33–12. The application of positive voltage to the conductor 33–12 is transmitted back through either the gates 15–14 or 15–16 and is employed to transmit voltages for setting the set of line flip-flops of FIGS. 8, 9, 13, and 14 to their "0" state. At this time the information that the called party has answered is thus stored in the common flip-flops 33–601 through 33–610 and 33–612.

It is of course, desirable to disconnect the ringing trunk as soon as the called subscriber has answered. In order to do this the called subscriber's line is first tested for busy to determine whether or not it has a connection established to it through the switching network. As described hereinbefore two sets of connections exist, one to the talking trunk and the second to the ringing trunk. Upon the determination that such a connection is established then the identities of the talking and ringnig trunks connected to the called lines are determined after which the ringing trunk is connected, as described below. The talking trunk, however, remains connected so that the calling and called subscribers may thereafter communicate with each other.

Assume now that the flip-flop 33–400 has been set in its "0" state indicating that the common flip-flops or control circuits are not in the process of identifying some other trunk and assume further, that the flip-flop 38–401 is likewise in the "0" state indicating that the common flip-flops and control circuits are not in the process of establishing the connection to a subscriber's line. Then, upon the beginning of the next complete scanning cycle, flip-flop 33–402 will be set in its "1" state. Of course, the flip-flop 33–402 may have been previously set in its "1" state so that it is not necessary to wait for the beginning of the next scanning cycle. However, with the flip-flop 33–402 set in its "1" state positive voltage from the "1" output of the flip-flop 33–402 is applied to the bases of the transistor gates 33–631 through 33–640 and 33–642 thus conditioning these transistor gates for conduction. Since under the assumed conditions the flip-flop 33–601 is assumed to be in its "1" state the transistor gate 33–631 becomes conducting and transmits a positive voltage from the "1" output of the flip-flop 33–601 through the diode 33–18 to the base elements of the transistor gates 33–290 through 33–299, inclusive, thus, conditioning these gates for conduction. In addition, since the flip-flop 33–612 was assumed to be in its "1" state, the positive potential from its "1" output is transmitted through the transistor 33–642 and to the delay device or network 48–17. Positive voltage or potential is transmitted from delay device or network 48–17 to the base of the transistor 48–265 and also through the diode 48–18 to the pulse stretcher 48–01 and to the base of the transistor 48–264 thus rendering these two transistor gates inactive. (The pulse stretcher keeps gate 48–264 inactive for the time of about two scanning periods, which is about equal to the delays in networks 48–17, 48–19, and 48–20). As a result, transistor gate 48–264 removes the control potential from the gates 48–12 thus preventing conduction through these gates. The transistor gate 48–265 in addition to becoming inactive or non-conducting as described above, prevents conduction through the gates 48–10, since it removes the control potential from these gates. The above operations are delayed by the delay device or network as described herein.

With the transistor gates 33–633 through 33–640 conditioned for conduction and the transistor gates 33–290 through 33–297 likewise conditioned for conduction, circuit paths from the "1" output of the flip-flops 33–603 through 33–610 are established to the "1" inputs of the corresponding flip-flops in the tens line translator 24–10 and to the corresponding flip-flops in the units line translator 24–11 thus causig the corresponding ones of these flip-flops to be set in their "1" states. As a result, these flip-flops are now set in accordance with the directory number of the called (answering) party.

In addition, the positive voltage transmitted through the diode 33–18 as described above from the "1" output of the flip-flop 33–601 through the transistor gate 33–631 is also transmitted through the condenser 33–21 to the set "0" input of the flip-flop 33–381 to insure that this flip-flop is set in its "0" state. Likewise the positive potential from the diode 33–18 is transmitted through the diode 33–19 to the base of the transistor gate 32–10 thus rendering this transistor gate conducting which in turn applies the busy test source of voltage 32–12 to the diode circuits of the line translators 24–10 and 24–11. These flip-flops are set to represent the directory number 28 so that the busy test voltage is transmitted out on the No. 2 tens conductor. Since the voltage source 32–12 is greater than the holding source 17–41 increased current will flow over the conductors 24–32 and 24–48 through resistor 17–38, if this line termination circuit 1–28 is connected through the network. Conductor 24–32 is connected through the diode 17–30 and resistor 17–40 to conductor 17–28. As a result, the increased current produces an increased voltage drop across resistor 17–38 which increased voltage drop is transmitted through the transformer 17–48 and the transistor amplifier comprising transistor 17–60 to conductor 17–102.

The application of the positive voltage to conductor 17–102 indicates that the called party's line is interconnected through the switching network of FIG. 31 to one or more of the trunk circuits. The positive voltage applied to conductor 17–102 is transmitted to the set "1" input of flip-flop 33–381 thus setting this flip-flop at its "1" state. The transistor gate 33–299 is conditioned for conduction at this time as described above. Consequently, it transmits the positive voltage of the "1" output of the flip-flop 33–381 through the pulse stretcher 32–37 to the base of the transistor gate or switch 32–13. As a result, the high voltage source 32–38 is substituted for the busy test source 32–12 and applied to the diode circuits of the line translator. These flip-flops are still set in accordance with the called subscriber's station identification so that this increased voltage is applied to the No. 2 tens conductor output 24–32 from the tens line translator 24–10 and to the No. 8 units conductor 24–48 of the units line translator 24–11. These voltages are transmitted to the respective diodes 17–13 and 17–30 and through the shunting resistor 17–40 to the line 17–28 thus raising the potential of this wire or conductor to a higher positive voltage.

In addition, the positive voltage from the "1" output of the flip-flop 33–381 is transmitted through the transistor gate or switch 33–299 to the set "1" input of the flip-flop 33–400 thus setting this flip-flop in its "1" state where positive voltage from its "1" output is transmitted through the diode 33–13 to the set "0" input of flip-flop 33–402. This positive voltage is also applied to the base of the transistor gate or switch 33–613 thus preventing conduction through this transistor gate. With the flip-flop 33–402 set in its "0" state positive voltage is removed from its "1" output thus rendering the transistor gates 33–631 through 33–642 non-conducting or inactive. Positive voltage from the "1" output of the flip-flop 33–381 is also transmitted through the transistor gate 33–299, the diode 33–30 to the set "0" inputs of all of the common flip-flops 33–601 through 33–610 and 33–612 thus restoring all these flip-flops to their "0" state. The positive potential from the transistor gate 33–299 is also transmitted through the diode 33–31 to the delay device or network 33–32. The delay device or network 33–32 has a relatively long delay interval of approximately one complete scanning cycle so that positive voltage does not appear on its output terminals at this time. However, the relatively higher positive voltage applied to the conductor 17–28 described above is transmitted through the network winding of the subscriber's line repeat coil in the line termination circuit 1–28 and then over conductor 31–28 to the switch network 2–19 through the network 2–19 and over conductors 31–01 and 31–03 through the network repeating coils of trunks 3–11 and 3–13 to conductors 41–01 and 41–03. These conductors are interconnected with the respective phototransistors 3–31 and 3–33 and as a result tend to have a less negative or more positive voltage connected to these phototransistors. If it had been assumed that only one trunk was interconnected with the subscriber's line extending to station 28 then the voltage source 32–38 will be of sufficient magnitude to cause the voltage of the interconnected phototransistor illuminated by the trunk scanning tubes to have approximately 3 volts positive applied to it from the network winding of the corresponding trunk repeating coil. However, inasmuch as under the assumed conditions two trunks, namely trunk 3–11 and 3–13 are both interconnected with the subscriber's line 1–28 the voltage of source 32–38 is insufficient to raise the potential of both of these transistors to the +3 volts. Consequently, during the next scanning cycle when the trunk scanning tubes again scan these phototransistors, insufficient positive output voltage will be obtained from the amplifiers 47–14 and 47–15 to actuate any of the flip-flops 48–342 through 48–349 or more specifically flip-flops 48–342 and 48–346 under the assumed conditions to their "1" states. As a result, positive voltage is maintained on the output conductor 48–14 of the "and" circuit interconnected with each of the "0" outputs of the flip-flops 48–342 through 48–349, inclusive. Consequently, at the end of a complete scanning cycle during which all of the phototransistors of the trunks have been scanned by the trunk scanning tubes 3–20 through 3–23, inclusive, positive voltage will be obtained from the output of the delay device or network 33–32 and applied to the base of the transistor gate or switch 33–342. As a result, positive voltage is transmitted through this transistor gate or switch 33–342 to the base of the transistor gate or switch 33–341 thus preventing conduction through this transistor gate or switch. The output of the delay device or network 33–32 is also transmitted through the additional delay device 33–33 to the emitter of the transistor gate or switch circuit 33–341. The delay device or network 33–33 provides sufficient delay to permit the transistor gate or switch 33–341 to be turned off as described above before positive potential is transmitted through the additional delay device 33–33. Consequently, the circuit path through transistor gates 33–342 and 33–341 does not conduct current at this time.

The output from the transistor gate or switch 33–342 is also transmitted through the diode 33–34 and through the pulse stretcher 32–34 to the transistor gate 32–14. The transistor gate 32–14 thus becomes conducting and effectively connects the higher voltage source 32–24A to the power conductor 32–15 extending to the line tens and line units translators as described herein. The pulse stretcher 32–37 maintains the transistor gate 32–13 conducting for substantially one complete scanning cycle after which this transistor gate 32–13 becomes non-conducting. At about this time, the transistor gate 32–14 becomes conducting as described above and maintains the voltage applied to the power conductor 32–15 at a still higher positive voltage, for another scanning cycle. The voltage of the source 32–24 is sufficiently high to insure that the potentials applied to the trunk scanning phototransistors during this second identifying scanning cycle will be sufficiently high to cause positive output from the amplifiers 47–14 and 47–15 to set flip-flops 48–342 and 48–346 in their "1" states. As a result, positive voltage is removed from conductor 48–14.

The gates 48–12 are now non-conducting because the transistor 48–264 is non-conducting as described above. The gates 48–13 are conditioned for conduction by the positive potential transmitted through delay device or network 48–17 from gate 33–642 and flip-flop 33–612 as described above. As a result, the "1" output from the flip-flop 48–346 is effectively interconnected through the top gate of 48–13 to conductor 48–29 which extends to the diodes 38–25, 38–26 and 38–27. Positive voltage is thus transmitted through these diodes to the flip-flops of the trunk disconnect translators 37–10 and 37–11.

The positive potential from the "1" output of the flip-flop 48–346 in addition to being transmitted through the top gate of the group of gates 48–13 and over conductor 48–29 to the diodes 38–25, 38–26 and 38–27 as described above, is also transmitted through the diode 38–28 to the condenser 32–39 and amplifier 32–40 to the base of the transistor 32–31 which transistor switch or gate becomes conducting and interconnects the high voltage source 32–41 from ground over conductor 36–12 and to the trunk disconnect translators 37–10 and 37–11, which are similar to 36–10 and 36–11.

Thus this voltage together with the setting of the trunk disconnect flip-flops by the voltages transmitted through the diodes 38–25, 38–26 and 38–27 in a manner described above causes an increased negative voltage to be applied to the No. 1 tens conductor and to the No. 9 units conductor with the result that the condenser 41–73 transmits a high negative pulse to the diode 41–83. This diode is poled in the reverse direction to this pulse so this diode does not transmit this negative pulse. This negative pulse will be ineffective to alter the connections to the network at this time since a negative voltage is already applied to this conductor 41–01 from the negative battery through the diode 41–43. The condenser 41–73 is of relatively small magnitude so that this condenser in combination with the resistor 41–93 in effect differentiates the voltage of the pulse transmitted through this condenser. At the termination of the pulse this condensor discharges and in discharging applies a positive voltage through the diode 41–83 to the conductor 41–03 which voltage pulse is of sufficient magnitude and duration to reduce the current flowing over conductors 41–03 and 31–03 and through the network so that the current through the crosspoints 31–33 and 31–32 falls below the value required to maintain these devices in their low impedance state so that they immediately change to their high impedance state thus effectively disconnecting the ringing trunk from the called subscriber's line.

The negative potential first transmitted from condenser 41–73 and diode 41–83 to conductor 41–03 and the following positive potential transmitted over this path by the discharge of condenser 41–73 in addition to being applied to the winding of the repeat coil of the ringing trunk 3–13 is also applied to the phase inverter 49–03 and to the transistor gate or switch 49–23. The negative potential applied to the phase inverter 49–03 thus produces no useful results at this time because a high negative potential is not substantially simultaneously applied to the phase inverter 49–01 or the phase inverter 49–06. In addition, the positive potential applied to the phase inverter 49–03 likewise produces no effect since the circuits controlled by this phase inverter respond only to the negative potential applied to the input of the phase inverter as described above.

The application of negative potential to the transistor gate or switch 49–23 from condenser 41–73 is ineffective to cause any current to flow through the transistor gate 49–23 since this gate transmits only positive pulses. The positive pulse from the condenser 41–73 however, when applied to the transistor 49–23 flows through this transistor and the transistor gate or switch 49–24 since both of these transistors are conditioned for conduction. The transistor 49–23 is conditioned by the positive voltage applied to its base from the "1" output of the flip-flop 49–415 which is in its "1" state as described above. The flip-flop 49–416 is in its "0" state at this time and consequently high positive voltage from its "0" output conditions the gate circuit 49–24 for conduction.

The positive current thus transmitted through the transistor gates 49–23 and 49–24 is applied to the set "0" inputs of the flip-flops 49–415 and 49–416. As a result, flip-flop 49–415 is restored to its "0" state while the flip-flop 49–416 is maintained in its "0" state. Thus the circuits of FIG. 49 are restored to their normal or idle condition upon disconnection of the ringing trunk when the called subscriber answers.

After the above-described operations have been completed, positive voltage from the output of the transistor gate or switch 33–342 is transmitted through the delay device or network 33–35 and diodes 33–36 and 33–25 to the set "0" inputs of the flip-flops in the line translators 24–10 and 24–11 thus restoring these flip-flops to their "0" condition.

In addition, positive voltage is also transmitted from the diode 38–28 and through the delay device 38–29 at this time to the set "0" inputs of the flip-flops of the trunk disconnect translators 37–10 and 37–11, thus restoring these flip-flops to "0." In addition, positive voltage from the diode 33–36 is also applied to the set "0" input of the flip-flop 33–400 thus restoring this flip-flop to its "0" state and removing the positive voltage from its "1" output which was applied through the diode 33–13 to the base of the transistor gate 33–613 and to the set "0" input of the flip-flop 33–402. As a result positive voltage will be transmitted through the transistor gate 33–613 at the beginning of the next scanning cycle to the set "1" input flip-flop 33–402 thus setting this flip-flop in its "1" state where it in turn conditions the transistor gates 33–631 through 33–640 and 33–642 for transmission, whereupon the above-described control circuits are again conditioned for operation in the above-described manner for performing the above-described functions for other calls.

At this time a transmission or communication path extends from the calling subscriber's station 14 over the subscriber's line 1–14 and to the repeating coil of the line termination 1–24. One terminal of the network winding of this repeating coil extends to positive voltage battery 17–20 through the diode 17–21. The other terminal of the network winding of this repeat coil extends over conductor 31–14 and through the actuated crosspoint 31–34, conductor 31–52, actuated crosspoint 31–35, conductor 31–11 and then through a winding of the repeat coil of trunk 3–11 to negative battery 41–30 through the diode 41–31. The transmission path extends through the repeat coil of talking trunk 3–11. One terminal of the second winding of this repeat coil is connected to negative battery 41–10 through the diode 41–41 and over conductor 41–01. The other terminal of this second winding of the repeat coil of the talking trunk 3–11 connected over conductor 31–01 through the actuated crosspoints 31–31, conductor 31–51, crosspoint 31–30, conductor 31–28 to the network winding of the repeat coil of the line termination 1–28. The other terminal of this repeat coil winding extends over conductor 17–28 to the positive holding source 17–41 through the diode 17–42.

The direct current for operating the transmission equipment and transistor amplifiers at the subscriber's stations 14 and 28 is supplied over the respective subscriber's lines from the battery and ground connected in the center of the line windings of the repeat coils of the respective line terminations. A communication path exists between these subscribers so that they may converse with each other for the duration of the call.

Throughout the duration of the call, two subscriber lines will be scanned in the manner described above and the scanning equipment will find that the subscriber's lines are closed and remain closed. The voice signal currents are of insufficient magnitude to interfere with this operation of the scanning equipment. Consequently, no output will be obtained from either of the detector circuits 1–50 or 1–51, while either of the subscriber's lines 1–14 or 1–18 are being scanned during the time the two subscribers are in communication with each other.

Before describing the disconnection of subscriber's lines, the operation of the trunk and disconnect timing storage tubes and control circuits will be described. These tubes are designated 3–24 and 3–25 in FIG. 3 and are shown in FIG. 3 together with exemplary control circuits in FIGS. 42, 43, 44, 45, and 46. As with the other storage tubes, these tubes are provided in duplicate but each of the tubes is capable of performing all of the functions required so that in case of trouble one of the tubes may be removed without interfering with the operation of the system. Each of these tubes is provided with fifteen storage spots. These spots are arranged in five vertical columns and three horizontal rows as shown in FIG. 54. Each vertical column is provided for one of of the trunk terminals which may be interconnected with the network. Thus, two vertical columns are provided for each of the talking trunks and one vertical column for the busy trunk. These tubes are the usual Williams type storage tubes arranged to represent zeros by dots and ones by circles recorded in their respective storage spots or spaces. The control circuits are provided with the circle generator 46–15 which generates two alternating currents of relatively high frequency having a phase displacement or difference of substantially 90°. (Circle generators 1–60, 18–10, and 46–15 may be replaced by one circle generator when desired.) When these currents are applied through the transformers 46–25 and 46–26 to the deflecting plates of the cathode ray tubes, the beams of these tubes are caused to move in small circles at the locations of the storage spots to which the beams are directed. In addition, the deflections of the beams within these tubes are controlled by a horizontal input translator 45–12 having five inputs and a vertical input translator 45–11 having three inputs. The vertical input translator, in turn, controls two vertical control flip-flops 45–350 and 45–351 and the horizontal input translator 45–12 controls three horizontal input control input flip-flops 45–352, 45–353 and 45–354. An output translator 45–13 is connected to the outputs of these deflection flip-flops and arranged to apply an output potential to one of the fifteen output leads in accordance with the particular spot to which the beam is directed. The one outputs of the vertical flip-flops 45–350 and 45–351 are connected to the control elements of the transistor gates 46–20 and 46–21. These gates are connected through cascade or series connected resistors 46–27 and 46–28 to the input of the vertical control transistor amplifier 46–18. The output of this amplifier is connected to the vertical deflecting plates and controls the vertical deflection of the beam. Thus each time positive potential is applied to the one input of the vertical translator 45–11, a positive pulse is transmitted through the series condenser and through this translator to set the flip-flops 45–350 and 45–351 in their "0" state whereupon the two transistors 46–20 and 46–21 are cut off thus applying a more positive voltage to the base of the transistor 46–18 with the result that the most positive voltage is applied to the vertical deflecting plates causing the beams to be directed to the uppermost storage spots.

When positive potential is applied to the No. 2 input to the vertical translator 45–11, the beams will be directed to the second row or middle elevation of storage spots. Likewise, when a positive potential is applied to the No. 3 input conductor of the vertical translator 45–11, the beams are directed to the third or lowest rows of spots. In a similar manner the application of positive potential to one of the input conductors of the horizontal translator 45–12 causes the beams to be directed horizontally to the corresponding vertical column of spots. By thus applying positive potentials to one input conductor or terminal to the vertical translator and to one input conductor or terminal of the horizontal translator, the beams will be directed to a particular pair of the storage spots on the faces of the tubes 3–24 and 3–25. The horizontal deflection is controlled similarly to the vertical deflection by means of the flip-flops 45–352, 45–353, 45–354 as well as the transistor amplifiers or gates 46–22, 46–23, and 46–24. These transistor gates are interconnected with the series chain of resistors 46–29, 46–30 and 46–31 and control a potential applied to the base of the horizontal deflection amplifier 46–19 and thus control the horizontal deflection of the beams within the tubes 3–24 and 3–25 in a manner described herein.

The output pulses from the vertical translator 45–11 and from the horizontal translator 45–12 in addition to setting the control flip-flops 45–350 through 45–354 in a manner described above are also applied through one or more of the diodes of the control circuit 45–28 which is connected to the set "0" input of the flip-flop 45–355 and also to the input of the delay device or network 45–17. As a result, each time the deflections of the beams are changed by the application of positive potentials to one of the input leads of either of the vertical translator 45–11 or of the horizontal translator 45–12 or to one input of each of these translators, the positive potential from the control circuit 45–28 sets the flip-flop 45–355 in its "0" state or maintains it in this state. As a result, the beams within the tubes 3–24 and 3–25 are interrupted or turned off. In addition, positive voltage from the "0" output of the "0" flip-flop 45–355 is applied to the set "0" input of the flip-flop 45–356 thus insuring that this flip-flop is set in a "0" state and that the circle gates 3–26 are turned off. After ample time has been provided for the beam to be positioned a positive pulse will be transmitted through the delay device 45–17 and applied to the set one input of the flip-flop 45–355 with the result that this flip-flop is actuated to its one state where it applies positive voltage to its No. 1 output terminal and thus turns on the beams within the tubes 3–24 and 3–25. About the time the beam is turned on, positive voltage is applied to the corresponding output terminal of the output translators 45–13. A delay device or network such as 45–30 is connected in series with each of the output terminals of this translator to insure that positive potential is not applied to these terminals until the beam has been turned on after being directed to the new position or location.

During each of the scanning cycles the beams within these tubes are directed to the No. 1 spots or activity spots in each of the vertical columns and if a predetermined signalling condition has been received at this time, circles are written in these spots. During another interval of each of the line scanning cycles the count stored on the lower spots of the storage tubes is advanced when a .1 second timing pulse is received. During a third portion of each of the line scanning intervals counting spots are erased when they are no longer required.

At the beginning of operation of the system or between each of the line scanning cycles a positive pulse is applied to the conductor 35–30 by the program control or synchronizing circuits shown in FIG. 35, as described herein, and in addition to controlling, other circuits as described herein these pulses are also supplied to the set "1" input of the flip-flop 42–362 thus setting this flip-flop in its "1" state. As a result positive voltages from the "1" output of this flip-flop conditions gates 42–16 through 42–20 for conduction.

Positive voltage applied to the conductor 35–30 is also applied to the No. 1 conductors of the vertical input cable 45–18 and the horizontal input cable 45–19 thus turning the beams off within the tubes 3–24 and 3–25 and then directing the beams to the top storage spots of the first columns. Thereafter, when the beams are turned on, positive output voltage will be obtained from the 1*a* output terminal of the output translator 45–13 and transmitted through the previously conditioned gate 42–16. If the flip-flop 42–357 is in its one state, circles will be written in these spots as will be described hereinafter. Assuming, however, that the talking connection described above is still established, flip-flop 42–357 will be in its "0" state. Consequently, the transistor gate 42–266 is rendered inactive.

Likewise, when the beams are turned on within the tubes 3–24 and 3–25, if circles had been previously written in these spots a positive output of sufficient magnitude will be obtained through the amplifier 3–27 and the wave shaping circuit 3–28 to set the flip-flop 45–363 in its "1" state. However, if dots had been previously stored in these spots as assumed herein, then no such output will be obtained and the flip-flop 45–363, initially on "0," will remain in its "0" state. As a result, the application of positive voltage from the gate 42–16 through the diode 42–21 to the one input of the auxiliary read-out network 42–350 will not cause a positive voltage on the No. 4 output terminal of this network so that the circle gates 3–26 will not be turned on. Instead, a positive output voltage is obtained only on the No. 5 output terminal from this network and, after a suitable delay interval as described herein, this voltage is applied to the set zero input of the flip-flop 45–363 thus insuring that this flip-flop remains in its zero state.

The positive voltage from the gate circuit 42–16 is also transmitted through the delay device or network 42–11 to the set "0" input of the flip-flop 45–357 thus restoring the flip-flop to its zero state or insuring that it remain in its zero state. The output from the delay device 42–11 is also applied over the No. 2 conductor of the horizontal input cable 45–19 to the No. 2 input to the horizontal translator 45–12. As a result, the beams within the tubes 3–24 and 3–25 are turned off and directed to the first or activity spots in the No. 2 columns of spots in these tubes and the above cycle of operation repeated.

Thus the beams are successively directed to the first or activity spots in each of the columns of storage spaces and a circle is written in each spot, if the circle had been previously stored therein or if the corresponding flip-flop in the group 42–357 through 42–361 is set in its "1" condition.

After the first spot in the fifth column has been scanned in the manner as described above positive potential from the delay device or network 42–15 is transmitted to the set "0" input of the flip-flop 42–362 thus restoring this flip-flop to its "0" state whereupon the gates 42–16 to 42–20 are all rendered inactive since low potential is now applied to the "1" output of flip-flop 42–362. In addition, positive potential from the delay device or network 42–15 is applied to the set zero of flip-flop 42–361 thus assuring that this flip-flop is in its zero state. In addition, positive potential from the delay device or network 42–15 is transmitted to the control input of the gate 45–14 and to the delay device 45–27. Assume first, for purposes of description, that positive potential is not obtained on the tenth second timing pulse conductor 35–39 at this time. Consequently, gate 45–14 does not become conducting so that the flip-flop 45–364, initially on "1" remains in its "1" state. As a result, when the positive potential is transmitted through the delay device or network 45–27 a short interval of time later the gate circuit 45–15 is rendered conducting and a positive potential transmitted through it to the set "1" input of the flip-flop 43–370. Flip-flop 43–370 is thus set in its "1" state wherein it initiates the operation of the erase circuits shown in FIG. 43.

The flip-flops 43–371 to 43–375 are all controlled from the trunk scanning tubes. One of these flip-flops will be set in its "1" state if it is desired to stop the operation of the timing of any trunk circuit as will be described herein. Assume first that all of these flip-flops are set in their "0" states. Consequently, high positive potentials will be obtained from their "0" outputs which conditions the gates 43–21 through 43–25 for conduction. Likewise, relatively low positive or negative potentials will be obtained from the "1" outputs of these flip-flops 43–371 through 43–375, thus rendering the gate circuits 43–11 through 43–15 inactive.

With the gate circuits 43–21 through 43–25, all conditioned to be conducting and a positive output obtained from the "1" output of the flip-flop 43–370, positive potential is transmitted through these gates to the set zero input of the flip-flop 43–370 thus restoring this flip-flop to its "0" state indicating that none of the timing spots of the trunk timing tubes should be erased. Thereafter, the circuits operate in the same manner during the next complete line scanning cycle and each succeeding line scanning cycle until it is desired to time a disconnect.

During one of the line scanning cycles approximately every tenth of a second positive potential is applied to the tenth second timing conductor 35–39. During these cycles the operation of the circuit of FIG. 42 will cause the beam to scan the activity spots of each of the columns in the trunk timing tubes as described herein. At the end of this operation positive potential is again applied to the lower input of the gate circuit 45–14 as described above and also to the input of the delay device 45–27. Inasmuch as positive potential is now applied to the tenth second timing conductor 35–39, gate circuit 45–14 becomes conducting and sets the flip-flop 45–364 in its "0" state thus removing the conditioning potential from the gate 45–15. Consequently, positive voltage from the delay device 45–27 is not transmitted through the gate 45–15 at this time. Instead, positive potential from the "0" output of the flip-flop 45–364 is transmitted over a number of paths to cause the timing indication on the active timing spots to be advanced as described herein. However, under the assumed conditions none of the trunks are in the process of timing out, so dots will be recorded in the activity spots in all columns in the trunk disconnect timing tubes 3–24 and 3–25. Under these circumstances the activity spots are nevertheless scanned successively from one column to the next in the following manner. Positive potential from the "0" output of the flip-flop 45–364 is transmitted through the diode 44–11 to the No. 1 input conductor of the horizontal input cable 45–19 extending to the horizontal deflecting translator 45–12 which causes the beams to be deflected to the first pair of columns. In addition, positive potential is transmitted from the "0" output of the flip-flop 45–364 and diodes 45–23 and 44–12 to the No. 1 input conductor of the vertical input cable 45–18. Thus, the beam is directed to the first or activity spots of the first pair of columns. As described before, upon being directed to these spots, the beams are cut off and then after they have been accurately positioned, they will be turned on and read out the charges stored on these spots. Meantime, however, positive potential is transmitted through the condenser 45–22 and diode 45–21 to the set zero input of the reading flip-flop 45–363 thus assuring that this flip-flop is restored to its "0" state. In addition, positive potential is transmitted through the condenser 45–22 to the set "0" inputs of the binary counter stages 44–36 and 44–37 thus insuring that these counter stages are set in their "0" states.

When the beams are turned on as described above, the flip-flop 45–363 remains in its "0" state under the assumed conditions where dots are recorded in all of the activity spots. The positive potential from the condenser 45–22 is also transmitted through the delay device 45–16 so that after ample time has been allowed for the flip-flop 45–363 to be set in its "1" state in response to circles being previously recorded in the activity spots, positive potential is obtained from the output of the delay device or network 45–16 and applied to the bases of the transistor gates 45–271 and 45–272. Under the assumed conditions with flip-flop 45–363 remaining in its "0" state, the transistor gate 45–272 becomes conducting, while transistor gate 45–271 remains non-conducting. As a result, the gate circuits **44–21*d*, and 44–22 through 44–25** have positive voltages applied to their right-hand inputs.

In addition, the positive potential from the "0" output of the flip-flop 45–364 in addition to being transmitted through the diode 45–23 and the diode 44–11 as described above is also transmitted to the inputs of the gate circuits 44–31, **44–21*d*, 44–41*c* and 44–41*b*, thus conditioning all of these gates for operation. Consequently, when positive potential from the transistor gate 45–272 is also applied to the right-hand input of the gate circuit 44–21*d* this gate circuit becomes conducting and sets the flip-flop 44–365** in its "1" state.

Positive potential from the gate **44–21*d* in addition to actuating the flip-flop 44–365 to its "1" state is also applied to the "1" input of the flip-flop 45–364 and actuates this flip-flop to its "1" state. As a result, gate 45–15 is conditioned for conduction. However, the pulse from the delay device or network 45–27 has terminated at this time so that the gate 45–15** does not become conducting at this time.

With flip-flops 45–364 actuatd to its "1" state positive potential is removed from its zero output and thus from the conditioning terminals of gates 44–31, **44–21*d*, 44–41*b* and 44–41*c***, thus rendering all of these gates inactive.

Flip-flop 44–365 when actuated to its "1" state applies positive potential to condition the gates 44–32, 44–22, **44–42*b* and 44–42*c* for conduction. In addition, positive potential from the one output of the flip-flop 44–365 is applied to the No. 2 conductor of the horizontal input cable 45–19 and also through the diodes 44–13 and 44–12** to the No. 1 conductor of the vertical input cable 45-18. As a result, the beams within the trunk disconnect tubes 3-24 and 3-25 are interrupted and directed to the first or activity spots of the second columns of storage spots in these tubes.

After the beams have been again turned on they read the characters of the activity spots at the tops of the second columns which are assumed to be dots. Consequently the flip-flop 45-363 remains in its "0" state at this time. The positive potential from the diode 44-13, in addition to being transmitted through the diode 44-12, is also transmitted through condenser 45-22 and the delay device or network 45-16 to the bases of the transistor gates 45-271 and 45-272. This potential is also transmitted to the diode 45-21 to the set "0" input of flip-flop 45-363. If dots are stored in the spots being read, as assumed, flip-flop 45-363 remains in its zero state. Consequently, when positive potential is transmitted through the delay device or network 45-16, the transistor gate 45-272 becomes conducting and transmits a positive voltage from the "0" output of the flip-flop 45-363 through the transistor gate 45-272, gate 44-22 to the set "0" input of flip-flop 44-365 and to the set "1" input of flip-flop 44-366 thus restoring the flip-flop 44-365 to its "0" state and actuating the flip-flop 44-366 to its "1" state.

With the flip-flop 44-365 restored to its zero state the conditioning potential is removed from the gates 44-32, 44-22, 44-42*b* and 44-42*c*.

The actuation of the flip-flop 44-366 then controls the beams within the trunk disconnect timing tubes 3-24 and 3-25 in the same manner as described above except that the beams are now directed to the activity spots of the third columns. In the above-described manner the beams are successively directed to the activity spots of each pair of the columns in succession and the circuits respond as described herein assuming that dots are recorded in all of these activity spots. After the beams have been so directed to the activity spots of the fifth pair of columns a pulse will be transmitted through the gate 44-25 to the set "1" input of the flip-flop 43-370 thus setting this flip-flop in its "1" state at the same time. The flip-flop 44-368 is returned to the "0" state. As a result, the erasing circuits shown in FIG. 43 are again activated with the result that this circuit operates as described above since it is still assumed that a dot is still recorded in each of the activity spots at the head of the storage spots in the trunk disconnect timing tubes.

Thus the circuits of the trunk disconnect tubes function as described above during the various scanning cycles under control of the program circuits of FIGS. 35 and 40.

At the termination of the conversation between the subscribers' stations 14 and 28, one or the other of the subscribers usually hangs up first and thus gives the disconnect signal to the central office equipment. Assume for example that the called subscriber at station 28 hangs up first by placing his receiver on the switchhook or his instrument on the supporting cradle or member. As a result, the subscriber's line 1-18 is opened at the subscriber's station which interrupts the current flowing over the subscriber's line from the repeat coil in the line terminal 1-28. Consequently, when the phototransistor 1-38 and the related storage spots on the face of the combined scanning and storage tubes 1-20 and 1-21 are again scanned as described heerin, the detector circuit 1-51 will respond and recognize the change in the subscriber's line circuit from a closed circuit condition to an open circuit condition. This voltage, together with voltages from the translator device in the left-hand portion of FIG. 12 representing the identity of the subscriber's line 1-18 as described hereinbefore are transmitted to the line flip-flops shown in FIGS. 8, 13, 9 and 14. These voltages are thus stored on one set of the line flip-flops at this time in a manner as described herein. Thereafter, the line scanning equipment scans the remaining lines and during subsequent scanning intervals finds the subscriber's line 1-18 open so the detector circuit 1-51 transmits no further pulses from line 1-18 to the control equipment until it is desired to initiate another call.

During the scanning cycle subsequent to the one just described in which the change in the subscriber's line 1-18 from a closed circuit to an open circuit condition was detected, the voltages representing this line and the change in the condition thereof are transmitted from the line flip-flops to the control circuits of the call register tubes as described herein and are compared with the calling line numbers stored in the various register spaces in these tubes. Inasmuch as line 1-18 or the subscriber at station 28 was not in the process of dialing a call, the identity of the line 1-18 stored in the common flip-flops will not match the identity of any of the calling lines registered in the register spaces in the call register tubes. Consequently, at the end of this comparing portion of the scanning cycle the line flip-flops having stored therein the identity of the line 1-18 and the change in the signaling condition of this line from closed circuit to open circuit will not be reset to zero. Then, during the subsequent interval of the scanning cycle the setting of the line flip-flops is transferred to the common flip-flops 33-601 through 33-610 and 33-612 through the gate circuits of FIGS. 10 and 15 in the manner described hereinbefore. When one or more of the flip-flops 33-603 through 33-610 are thus set in accordance with the identity of the called party's line number, positive potential will be obtained from the "1" outputs of the corresponding ones of these common flip-flops and transmitted through the "or" circuit 33-10 to the delay device or network 33-11. The delay interval of the delay device 33-11 is sufficiently long to insure that all of the flip-flops 33-603 through 33-610 will have ample time to be accurately set in accordance with the identity of the disconnecting subscriber's line 1-18.

At the end of this delay interval, a positive pulse is transmitted over conductor 33-12 through the gating equipment of FIGS. 10 and 15 as described herein and causes the line flip-flops which previously stored the identity of the line 1-18 and its change in signaling condition to be reset to their "0" states.

The output of the delay device 33-11 is also interconnected with the transistor gate 33-611, which is blocked at this time, and with the delay device or network 32-28. The delay device or network 33-28 has a relatively long delay time of the order of a scanning cycle or more so that the application of a positive pulse to its input produces no output until a later time.

If the common flip-flops are idle then the flip-flop 33-402 will be in its "1" state. If, on the other hand, the common flip-flops are busy or engaged in other operations, then the flip-flop 33-402 will be in its "0" state. Flip-flop 33-402 remains in its "0" state until the common flip-flops and connecting circuits for control of the switching network 2-19 become idle. When the circuits become idle then the flip-flop 33-402 is set in its "1" state during the next complete scanning cycle by a positive voltage from the "1" output of the binary counter 35-106 in the program control circuit.

With flip-flop 33-402 set in its "1" state, positive voltage is obtained on its "1" output which voltage is applied to the bases of the transistor gates 33-631 through 33-642, thus conditioning these transistor gates for conduction.

With the flip-flop 33-602 set in its "1" state, due to the fact that the line 1-18 changed from a closed circuit to an open circuit signalling condition, and the gate 33-632 conditioned for conduction, a positive voltage is applied to the diode 33-17 from the "1" output of flip-flop 33-602 through the gate 33-632. As a result, poistive voltage is applied to the bases of the transistor gates 33-290 through 33-299 thus conditioning these gates for conduction. In addition, a poistive pulse is transmitted through the condenser 33–21 to the set "0" input of the flip-flop 33–381 thus insuring that this flip-flop is set in its "0" state.

With the gates 33–633 to 33–640 conditioned for conduction and the gate circuits 33–290 through 33–297 also conditioned for conduction the identity of the disconnecting line is transmitted from the "1" outputs of the flip-flops 33–603 through 33–610 through the gate circuits 33–633 through 33–640, and 33–290 through 33–297 to the line translator flip-flops in the tens line translator 24–10 and in the units line translator 24–11 thus setting these flip-flops in accordance with the designation of the line 1–18.

In addition, a positive voltage from the diode 33–17 is also transmitted through the diode 33–19 to the base of the transistor gate 32–10 through condenser 32–09 thus rendering this transistor gate active and causing the application of the busy test voltage source 32–12 to the conductor 32–15. This busy test voltage is applied to the diode circuits of the line translators of FIG. 24. As a result of the setting of these line translator flip-flops and the application of a busy test voltage to these translator circuits a busy test voltage is applied to the conductor 17–28 extending to the network side of the line termination 1–28 of the subscriber's line 1–18. Under the assumed conditions this subscriber's line is interconnected through the network 2–19 to the left-hand winding of the trunk transformer of trunk 3–11. The increased current due to the higher busy test voltage applied over conductor 17–28 flows through the resistor 17–38 and causes a higher voltage to be transmitted through the busy test transformer 17–48 to the busy test transistor amplifier 17–60. A high positive voltage is in turn transmitted over the conductor 17–102 to the set "1" input on the busy test flip-flop 33–381 thus setting this flip-flop in its "1" state. The flip-flop 33–381 is set in its "1" state at this time before the delay device or capacitor 33–22 becomes charged positively sufficiently to actuate the circuits as described above when the line being tested for busy was found not to be interconnected through the network 2–19.

With the busy flip-flop 33–381 set in its "1" state, positive voltage is transmitted from its "1" output and through the transistor gate 33–299 and through the diode 33–30 to the set "0" inputs of the flip-flops 33–601 through 33–610 and 33–612 thus restoring these flip-flops all to their "0" state. Meantime, however, the identity of the disconnect line is still registered in the line translator flip-flops of FIG. 24 as described above.

In addition, positive voltage from the output of the transistor gate 33–299 is transmitted to the set "1" input of the flip-flop 33–400 thus setting this flip-flop in its "1" state where positive potential is applied from its "1" output and through the diode 33–13 to the set "0" input of flip-flop 33–402 thus restoring this flip-flop to its "0" state and rendering the transistor gates 33–631 through 33–604 and 33–642 inactive. Positive voltage from the "1" output of flip-flop 33–400 also makes gate 33–613 inactive.

Positive voltage is applied from the output of the busy test transistor gate 33–299 to the pulse stretcher 32–37 which in turn applies positive voltage to the base of the transistor gate 32–13.

It should be noted that the voltage applied to the base of the transistor gate 32–10 from the diode 33–19 is transmitted through a condenser. Thus, the transistor gate 32–10 remains conducting or active only during the time that this condenser charges. This time interval is sufficiently long to make the above-described busy test. However, when the voltage is later applied to the base of the transistor gate 32–13 the voltage applied to the base of the transistor gate 32–10 has been reduced to such a low value that this transistor gate is not conducting. Furthermore, the rendering of the transistor gate 32–13 conducting now applies or substitutes an identifying voltage to the diodes of the line translator of FIG. 24. This voltage, together with the previous setting of the flip-flops as described herein of the tens line translator 24–10 and the units line translator 24–11 causes a much higher identifying voltage to be applied to the conductor 17–28 extending to the network winding of the line termination transformer in the line termination circuit 1–28.

This voltage is transmitted from this transformer winding over the above-described circuit through the switching network 2–19 and the left-hand winding of the repeat coil of the trunk 3–11 to the phototransistor 3–31. This voltage is also transmitted to the conductor 41–01 as described herein. As described above, this higher voltage causes the voltage applied to the phototransistor 3–31 to change from the negative voltage to a positive voltage so that during the next scanning cycle when this phototransistor is illuminated by the beams within the trunk scanning tubes 3–20 and 3–21 as described herein, current is transmitted through this phototransistor and through the output amplifier 47–14 to the inputs of the gate circuits 48–256 through 48–259. As described hereinbefore these transistor gates are conditioned for conduction in succession under the control of and in synchronism with the deflection circuits of the trunk scanning tubes 3–20 through 3–23. As a result, when the phototransistor 3–31 is illuminated and the positive output obtained from the amplifier 47–14 and wave shaping equipment, the gate circuit 48–256 is conditioned for conduction, so that positive voltage is then transmitted from the amplifier 47–14 through gate 48–256 to the set "1" input terminal of the flip-flop 48–342 thus setting this flip-flop in its "1" state.

When flip-flop 33–602 was set in its "1" state as described above, by positive voltage applied to its set "1" input from one of the line flip-flops through the gating circuits of FIGS. 10 and 15, this positive voltage was also transmitted to the delay device 48–20. This delay device has a relatively long delay interval of the order of one or more scanning cycles. Consequently, at about the time flip-flop 48–342 is set in its "1" state as described above, positive voltage is obtained from the delay device 48–20 and transmitted through the transistor gate 48–400 to a controlling input of gates 48–11. The transistor gate 48–400 is normally biased for conduction due to the negative potential normally connected to its base electrode. Part of the energy from the "1" output of flip-flop 33–602 is applied through transistor gates 33–632 and 33–622 and diode 48–22 to the input of pulse stretcher 48–01. This disables gate 48–264 and disables gates 48–12 for about two scanning periods.

Thus, with the gates 48–11 conditioned for conduction and with flip-flop 48–342 set in its "1" state, positive potential is transmitted from the "1" output of this flip-flop and through the left-hand gate 48–11 to the set "1" input of the flip-flop 42–357 thus setting this flip-flop in its "1" state. In addition, a positive potential from the left-hand gate of the gates 48–11 is also transmitted to the delay device or network 48–15. After a sufficient interval of time has elapsed to insure that the flip-flop 42–357 is thus set in its "1" state, positive, output is obtained from the delay device or network 48–15 and applied to the set "0" inputs of all the flip-flops 48–342 through 48–349 thus restoring the flip-flop 48–342 to its "0" state and insuring that all of the other ones of these flip-flops remain in their "0" states. Meantime, however, during the time the flip-flop 48–342 is set in its "1" state positive potential is removed from its "0" output with the result that positive potential is removed from the conductor 48–14 extending to the transistor gate 33–342.

The positive potential obtained from the busy gate 33–299 in addition to being applied to the set "1" input of the flip-flop 33–400 is also transmitted through the diode 33–31 to the delay device or network comprising network 33–32. The delay device or network 33–32 has a relatively long time delay of the order of a scanning cycle so that under the assumed conditions positive potential is removed from the conductor 48–14 and thus from the transistor gate 33–342 before the positive voltage is obtained on the output of the delay device or network 33–32 and thus this transistor gate 33–342 does not conduct at this time.

Instead, the positive output obtained from the delay device or network 33–32 is transmitted through a further delay device or network 33–33 which has a relatively short delay interval and then through the transistor gate 33–341. This transistor gate is normally biased for conduction and since the transistor gate 33–342 does not become conducting the transistor gate 33–341 does become conducting at the end of the further delay interval of the delay device or network 33–33. As a result, positive voltage is applied to the set "0" input of the flip-flop 33–400 thus restoring this flip-flop to its "0" state and removing positive potential from the base of the transistor gate 33–613 thus conditioning the circuits of FIG. 33 to respond to another call at the beginning of the next scanning cycle. In addition, the positive output from the transistor gate 33–341 is transmitted through the diode 33–25 to the set "0" inputs of the flip-flops of the tens line translator 24–10 and the units line translator 24–11 thus restoring all these flip-flops to their "0" states. Thus the control circuits of the network and the common flip-flops are restored and conditioned for response to operations of the types described herein as may be required on this or other calls.

With the flip-flop 42–357 set in its "1" state as described above circles will be written in the activity spots of the first columns of the trunk disconnect timing tubes 3–24 and 3–25 in a manner described above. Briefly, the next time the beams in the trunk timing tubes 3–24 and 3–25 are directed to the No. 1 or activity spots of the first columns, positive potential is obtained from the 1*a* output of the output translator 45–13 and transmitted over the 1*a* conductor of cable 45–20 to gate 42–16. Since flip-flop 42–357 is now set in its "1" state positive voltage from its "1" output is transmitted to the base of the transistor gate 42–266 which gate thus becomes conducting when positive voltage is obtained on the 1*a* output terminal of the output terminal translator 45–13 as described above. As a result, positive voltage is applied to the set "1" input of the circle flip-flop 45–356. This flip-flop transmits a positive voltage from its "1" output which causes the circle gates 3–26 to become conducting and cause the trunk timing disconnect tubes 3–24 and 3–25 to write circles on the activity spots of the first pair of columns in a manner described hereinbefore.

During each of the subsequent scanning cycles the beams within the trunk disconnect timing tubes 3–24 and 3–25 will be first directed to the activity spots of the first columns in a manner described hereinbefore. At this time however, the beams find circles written in these spots so the auxiliary read-out network 42–350 applies positive potential to its No. 4 output which voltage is transmitted through diode 42–26 to the base of the transistor gate 42–266 thus conditioning this transistor gate for conduction. This transistor gate in turn transmits positive voltage from gate 42–16 to the set "1" input of the circle flip-flop 45–356 which in turn turns on the circle gates 3–26 and causes circles to be rewritten in these activity spots. At the end of this time the beams are automatically directed to the first or activity spots of the second pair of columns in a manner described above. The beams are then successfully directed to the activity spots of each of the succeeding columns where they will read the characters of the stored information in these spots and where they find circles will cause circles to be rewritten in the respective spots. In addition, where it is desired to initiate the operation of the timing circuits as described above in response to the operation of any of the flip-flops 42–358 through 42–361 in a manner similar to that described above, the circles will be written in the appropriate activity spots in a fashion previously described for the circles in the activity spots of the first pair of columns.

Thus, the timing tubes 3–24 and 3–25 operate during each scanning cycle as described herein. During the next succeeding scanning cycle during which a tenth second timing pulse is received from the program circuits shown in FIGS. 35 and 40, in a manner described above, the circuits (FIG. 44) for advancing the count of the timing spots are rendered active immediately following the time that the circuits of FIG. 42 operate to record or rerecord circles in the activity spots. These circuits at this time act in the manner described above.

Figure 42:
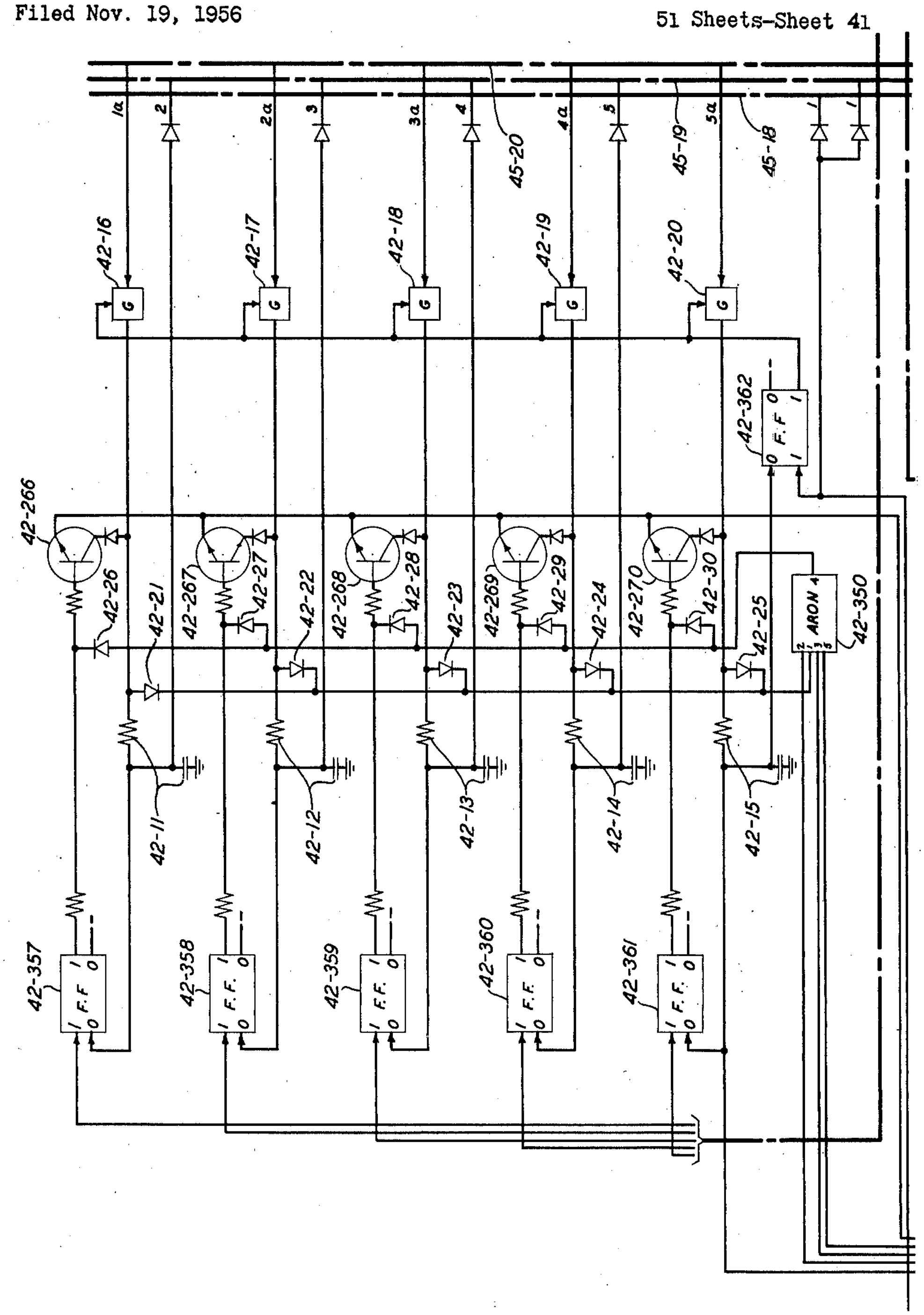
FIG. 42 shows the circuits for initiating timing operation of the trunk disconnect timing tubes shown in FIG. 46.
Figure 43:
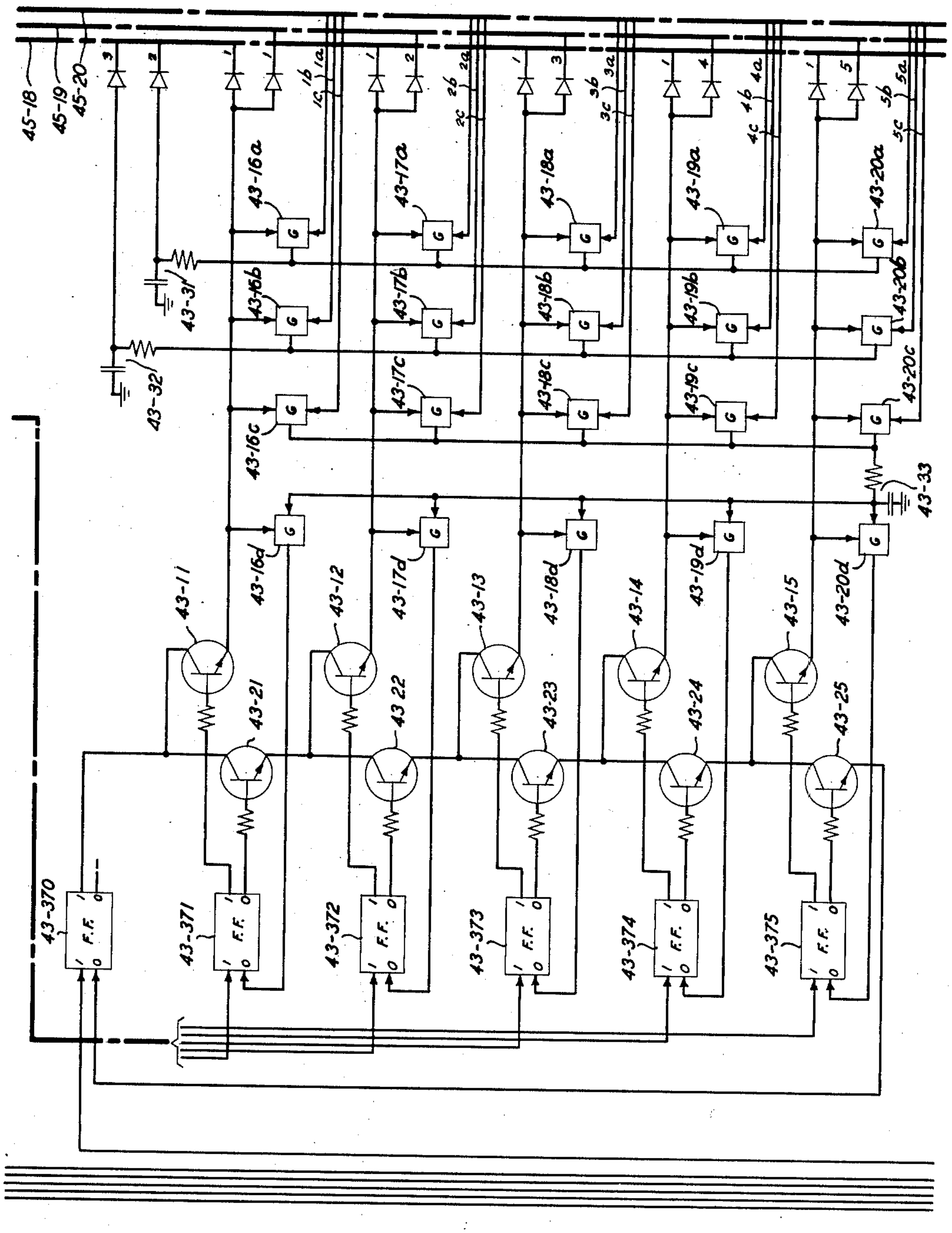
FIG. 43 shows circuits for interrupting the trunk timing operations.

When a positive tenth second pulse is received from the program circuit, positive potential is applied to the conductor 35–39 which extends to the gate circuit 45–14. When the operation of FIG. 42 is completed in the manner described above during this cycle, positive potential from the delay device or network 42–15 in addition to being applied to the set zero input of the flip-flop 42–361 is also applied to the delay device or network 45–27 and to a control terminal of the gate circuit 45–15. As a result, since positive potential is supplied to both inputs of the gate 45–14 at this time positive potential is also applied to the set "0" input of the flip-flop 45–364. As a result, positive voltage is removed from a control terminal of the gate 45–15. Consequently, this gate is rendered inactive and does not transmit positive potential received from the delay device or network 45–27 at a short interval of time later.

Positive potential from the zero output of the flip-flop 45–364 is transmitted through the diode 45–23, condenser 45–22 and diodes 45–21 to the set "0" input of the read-out flip-flop 45–363 thus insuring that this flip-flop is set in its "0" state. Positive potential transmitted through the condenser 45–22 is also applied to the set "0" inputs of the binary counter stages 44–36 and 44–37 thus insuring that these binary counter stages are reset to zero.

The positive potential transmitted through the diode 45–23 is also transmitted through diode 44–12 to the No. 1 conductor of the vertical input cable 45–18 and positive potential from the "0" output of the flip-flop 45–364 is transmitted through the diode 44–11 to the No. 1 conductor of the horizontal input cable 45–19. As a result, the beams within the tubes 3–24 and 3–25 are turned off and directed to the first activity spots of the first columns. When the beams are properly positioned they are turned on again as described.

Under these circumstances, circles having been previously recorded in these spots, output is obtained from the amplifier 3–27 and the wave shaping network and equipment 3–28 and applied to the set "1" input of the read-out flip-flop 45–363 thus setting this flip-flop in its one state which indicates that a "1" had been stored in each of these spots. At about this time, the positive voltage from condenser 45–22 is transmitted through the delay device or network 45–16 and applied to the base of the transistor gates 45–271 and 45–272. Since the flip-flop 45–363 is set in its "1" state at this time, transistor gate 45–271 becomes conducting and transmits the positive potential from the "1" output of flip-flop 45–363 to the circle flip-flop 45–365 thus causing this flip-flop to be actuated to its "1" state where it causes a circle to be rewritten in the first activity spot of each of the first columns.

Positive potential from the transistor gate 45–271 is also transmitted to the delay device or network 45–24. After a delay interval which is sufficiently long to complete the writing of the circles in the activity spots as described above a positive voltage pulse is obtained from the delay device or network 45–24 and transmitted through the diodes 45–25 and 45–26. The voltage transmitted through the diode 45–25 is employed to set the read-out flip-flop 45–363 to its "0" state.

The voltage transmitted through the diode 45–26 is applied to the No. 2 conductor of the vertical input cable 45–18. This voltage is transmitted to the translator 45–11 as described above and causes the beams within the tubes 3–24 and 3–25 to be first turned off and then directed to the second spots in the first columns, and then again turned on. Under the assumed conditions dots have been previously stored in these second spots in these first columns so that the flip-flop 45–363 remains in its "0" state.

After the beams have been turned on, and a sufficient time allowed for the flip-flop 45–363 to be actuated, positive potential will be obtained from the 1*b* terminal of the output translator 45–13 and transmitted over the output cable 45–20 to the lower input of the gate 44–41*b*. At this time, positive potential from the "0" output of the flip-flop 45–364 is also applied to the left-hand input of this gate so that positive voltage is obtained from its right-hand or output terminal and transmitted through the transistor gate 44–275 to the No. 1 input of the auxiliary read-out network 44–20. The transistor gates 44–275 and 44–274 are normally conditioned for conduction due to the positive potential applied to their bases from the "0" output of the flip-flop 44–369. Positive potential applied to the auxiliary read-out network 44–20 conditions or primes this network for operation. However, since dots have been assumed to have been read out from the second spots of the first columns, flip-flop 45–363 remains in its "0" state so that no positive output voltage is obtained from the No. 4 output terminal of the auxiliary read-out network 44–20. Consequently, the binary counter stage 44–36 remains in its "0" state at this time. Positive voltage, however, is obtained from the No. 5 and No. 6 outputs of this network and applied to the set "0" input of the flip-flop 45–363 thus insuring that this flip-flop is in its "0" state. Positive voltage is also applied to the No. 3 input conductors of the vertical input cable 45–18 which causes the beams to be directed to the third spots of these columns. These spots are also assumed to have had dots recorded in them so that the circuits operate in substantially the same manner as described above except that positive potential is obtained from the 1*c* output of the output translator 45–13 and the gate circuits 44–41*c* and 44–274 are conditioned for operation. As a result, the auxiliary read-out network 44–21 is employed to further control circuits. Since dots have been recorded in the third spots of the first columns of tubes 3–24 and 3–25, no positive potential is obtained from the No. 4 output of the auxiliary read-out network 44–21. As a result the binary counter stage 44–37 remains in its "0" state at this time. Positive potential is obtained, however, from the fifth output of this network and is applied to the set "0" input of the flip-flop 45–363 thus insuring that this flip-flop is in its "0" state. Positive potential is also obtained from the No. 6 output of the auxiliary read-out network 45–21 applied to the diode 44–26 to the input of the binary counter stage 44–36 thus advancing this counter to its "1" state. Positive potential is also applied to the delay device or network 44–27 to the base of the transistor gate 44–28 thus conditioning this gate for transmission. Since positive potential will be obtained from the "0" output of the binary counter stage 44–37 at this time, positive potential is transmitted through the transistor gate 44–28 to the set "1" input of flip-flop 44–369 thus actuating this flip-flop in its "1" state. As a result, positive voltage from the "1" output of this flip-flop is applied to the "1" input terminals of the auxiliary writing networks 44–18 and 44–19 thus conditioning these networks for operation.

Positive potential from the one output of the flip-flop 44–369 is also transmitted through the condenser 44–29 to the No. 2 conductor of vertical input cable 45–18. As a result, the beams within the tubes 3–24 and 3–25 are again directed to the No. 2 spots in the first columns and then turned on.

When the beams are turned on again on the second spots, positive potential is again obtained from the No. 1*b* output of the output translator 45–13 with the result that gate 44–41*b* again becomes conducting and applies positive voltage to the No. 2 input terminal of the auxiliary writing network 44–18. In addition, since the binary counter stage 44–36 is now set in its "1" state, positive voltage from its "1" output is applied to the No. 3 input of the auxiliary writing network 44–18 with the result that positive voltage is obtained from the No. 4 output of this network and applied to the "1" input to circle flip-flop 45–365. As a result, the beams now write circles in the second spots of the first columns. After sufficient time has elapsed for writing circles in the second spots of these columns as described above, positive voltage is obtained from the No. 5 output of the auxiliary writing network and applied to the No. 3 conductor of the vertical input cable 45–18 and thus removing positive potential from the 1*b* output of the translator 45–13 and advancing the beams within the tubes 3–24 and 3–25 to the third spots of the first columns and then turning them on. At this time positive potential will be obtained from the 1*c* output of this translator and cause the gate 44–41*c* to become conducting and apply a positive voltage to the No. 2 input terminal of the auxiliary writing network 44–19. Inasmuch as the binary counter stage 44–37 remains in its "0" state under the assumed conditions, positive voltage is not now obtained from the fourth output of the auxiliary writing network 44–19, so that no circle is written in any third spot at this time. Positive potential is obtained from the fifth output of this network a short interval of time later and applied to the set "0" input of the flip-flop 44–369 thus restoring this flip-flop to its "0" state. Positive potential from the No. 5 output of the auxiliary writing network 44–19 is also transmitted to the gate 44–21*d* to the set "1" input of flip-flops 45–364 and 44–365 thus setting both of these flip-flops in their "1" states. With flip-flop 45–364 in its one state, gate 45–15 is conditioned for conduction, and positive potential is removed from the activating terminals of the gates 44–21*d*, 44–31, 44–41*c* and 44–41*b*.

Thereafter, the circuits operate substantially in the same manner as described above and scan the activity spots of the second columns due to the actuation of the flip-flop 44–365. If dots had been previously stored in these spots then the circuit is advanced to the activity spots of the next columns. If, however, circles had been previously written in the activity spots then the circles are rewritten therein, and, in addition, the other spots in the same columns are read out and the pulse count advanced by one in the manner described herein. After the beams have advanced to all the columns of the timing tubes the circuits of FIG. 44 are rendered inactive in the manner described herein.

Thereafter, until the next tenth second timing pulse is received from the program circuits of FIGS. 35 and 40, the circuits operate in substantially the same manner during which the activity spots are read out and regenerated and additional circles are written in activity spots as may be required in the manner described above.

If at any time during this interval the subscriber's line becomes reclosed indicating that the open signal is not a true disconnect signal but merely an additional opening of the line or due to stray or spurious currents, reclosure of the line is detected by the scanning circuits and equipment in the manner described herein. Potentials indicating this change in signaling condition, together with potentials identifying the line are again stored on one set of the line flip-flops and then compared with the line numbers recorded in the register spaces in the call register tubes shown in FIGS. 16 and 18 as described above. Inasmuch as the reclosure is not part of a dial pulse no match will be found. Thereafter, the subscriber's line will be tested for busy and found to be busy as described hereinbefore. Next, under these circumstances the trunk 3–11 interconnected with the line will be identified and the flip-flop 48–342 again set in its one state. At this time, however, positive voltage will be transmitted through the delay device 48–19 instead of the delay device 48–20 with the result that the gates 48–10 are conditioned for conduction and cause flip-flop 43–271 to set in its "1" state. Gates 48–12 are disabled due to energy from the input of delay 48–19 acting over diode 48–21 into the pulse stretcher 48–01 as herein previously described. Thereafter, during the final part of the scanning cycle, all of the spots in the columns of the trunk disconnect timing tubes, assigned to a particular trunk, namely, column 1, under the assumed conditions, will be erased and will have dots recorded in them.

Figure 44:
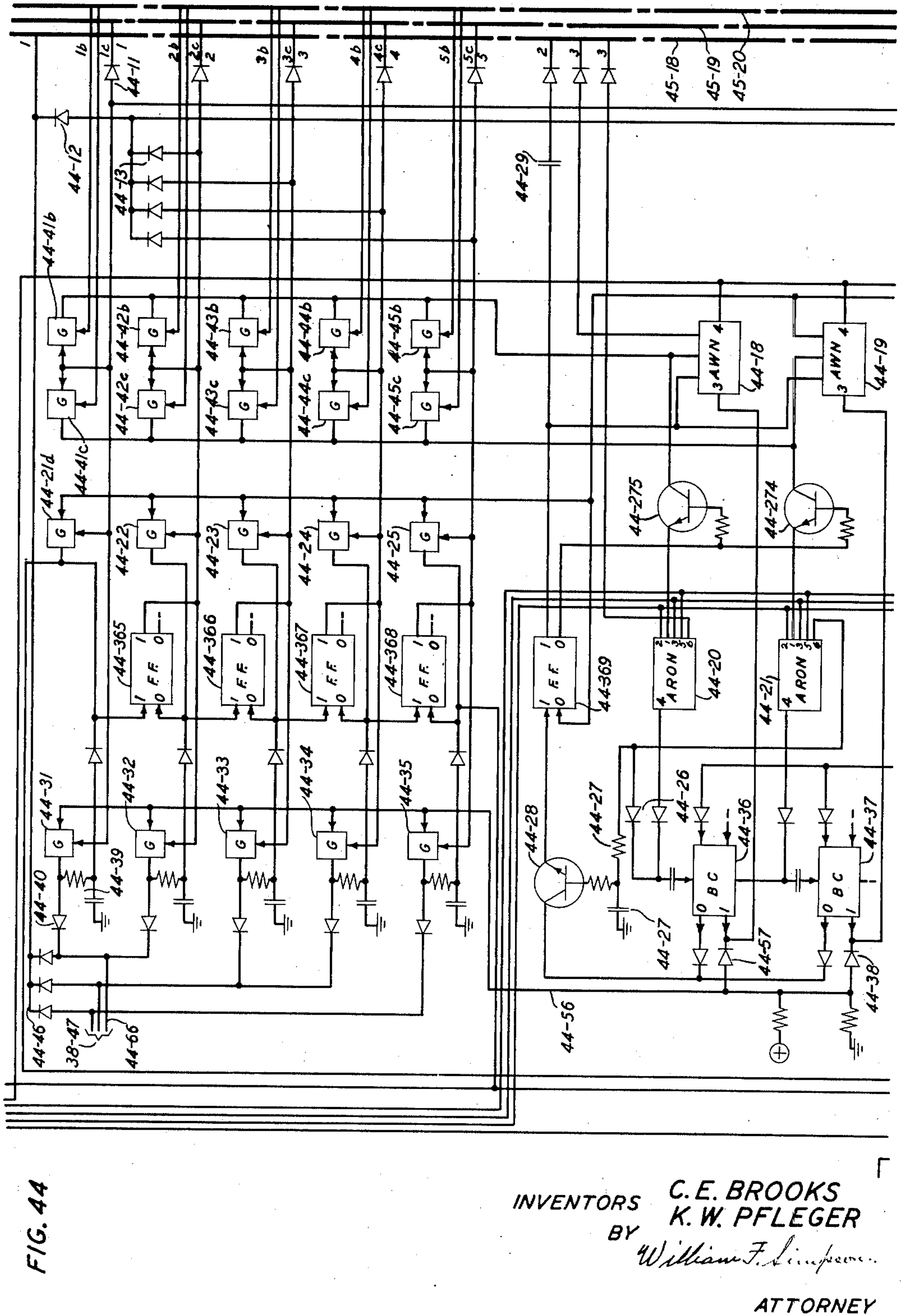
FIG. 44 shows circuits for initiating disconnections.
Figure 45:
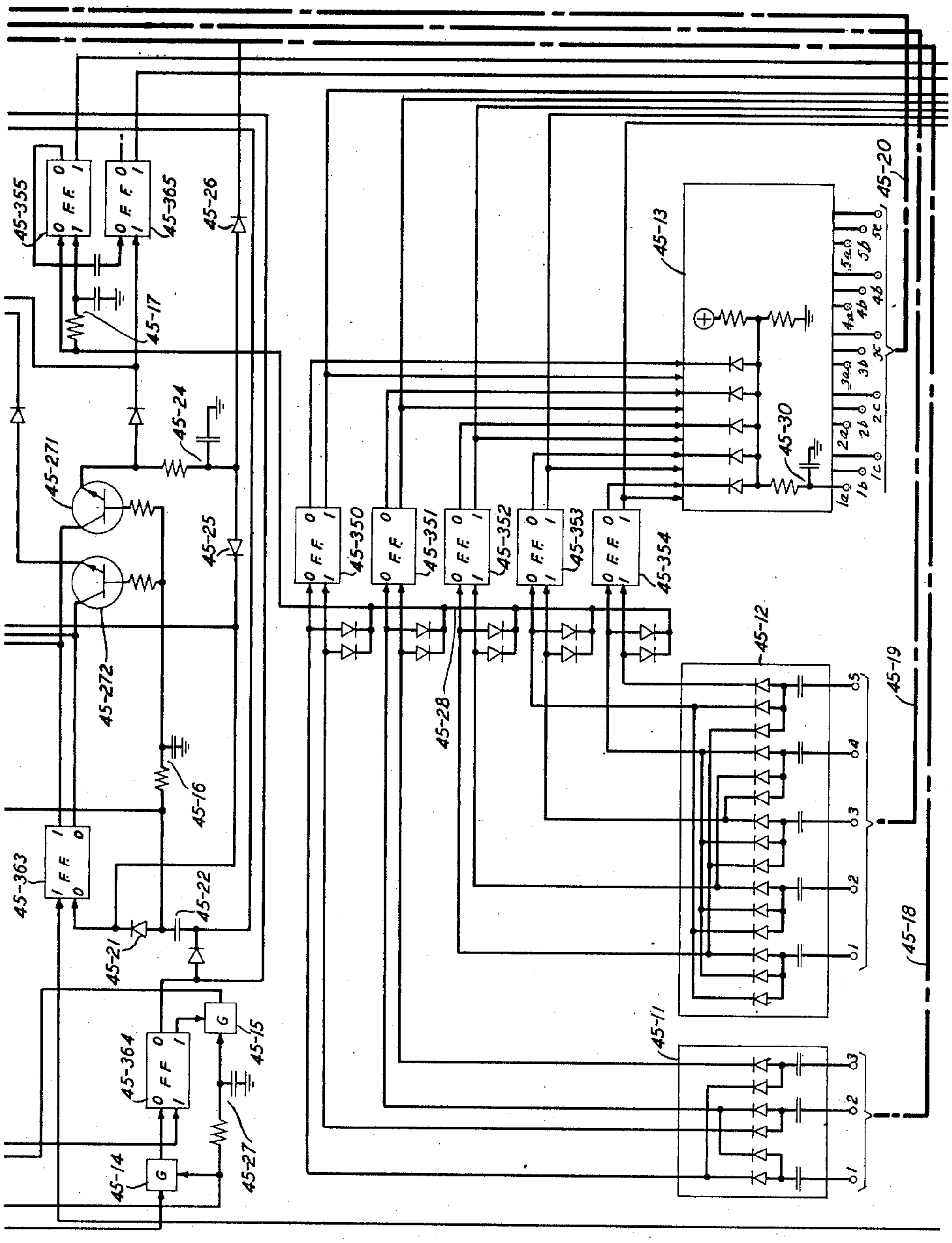
FIG. 45 shows deflection control circuits for the trunk disconnect timing tubes.
Figure 46:
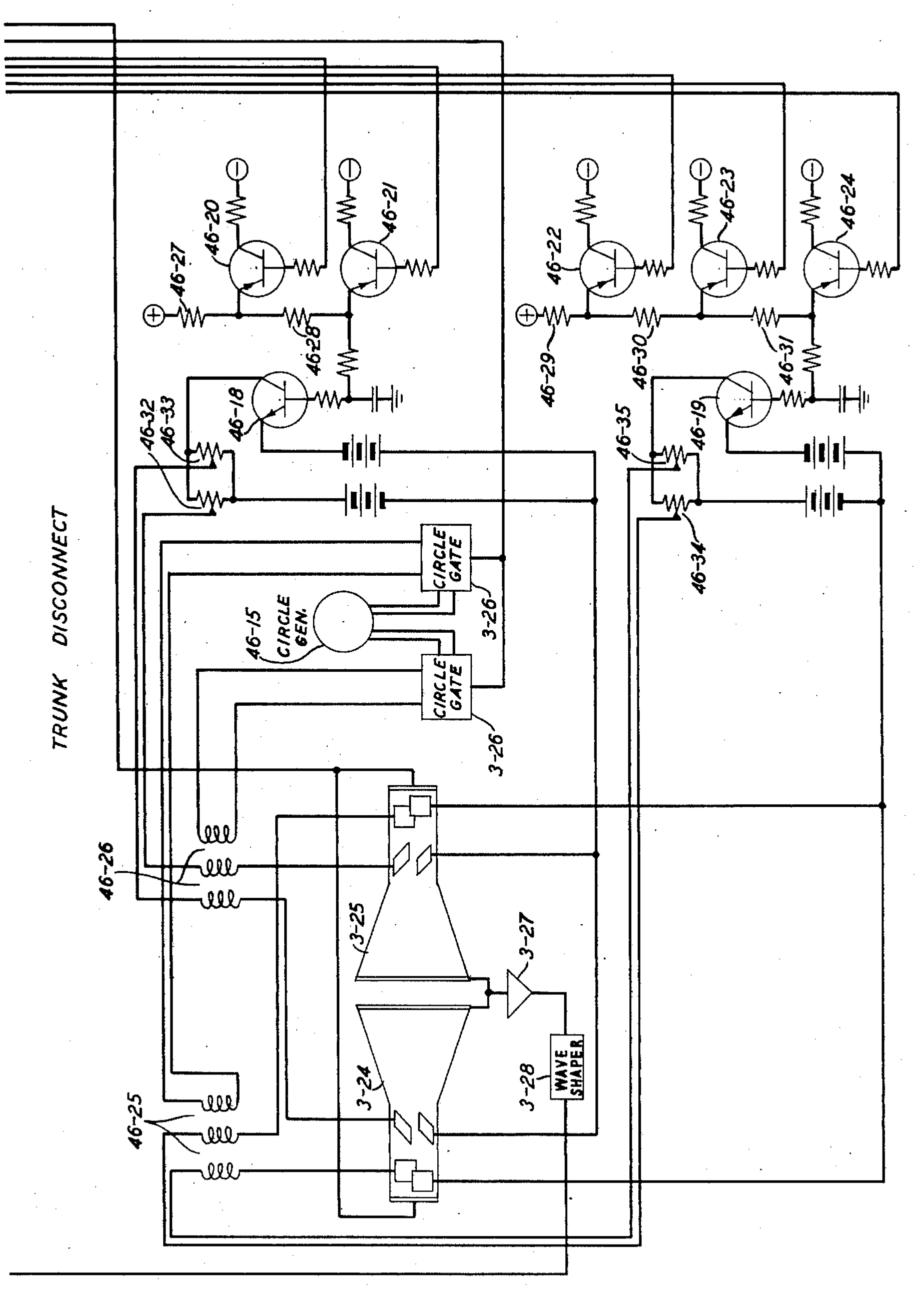
FIG. 46 shows the trunk disconnect timing tubes and a portion of the deflection circuits therefor.

Thus, with flip-flop 43–371 set in its "1" state when the flip-flop 43–370 is set in its "1" state either after the operation of the circuits of FIG. 42 or after the operation of the circuits of FIGS. 44 and 45, as described above, positive potential is obtained from the "1" output of the flip-flop 43–371, instead of from the "0" output of this flip-flop. Consequently, gate 43–11 becomes conducting instead of gate 43–21. As a result, the gates 43–16*a*, 43–16*b*, 43–16*c* and 43–16*d* are all conditioned for conduction. In addition, positive potential is applied to the one input conductors of both the vertical input cable 45–18 and horizontal input cable 45–19 with the result that the beams are directed towards the first or activity spots of the first columns. A "1" will be read out at this time but not further employed to control the circuits.

At about the time beams are turned on at the first spots, positive voltage is obtained from the 1*a* output of the output translator 45–13 and transmitted through the gate circuit 43–16*a*, to the delay device or network 43–31. After ample time has been allowed for writing dots and insuring that the circles have been erased in these spots, positive voltage from the delay device or network 43–31 is applied to the No. 2 conductor, of the vertical input cable 45–18. As a result, the beams are cut off in tubes 3–24 and 3–25 and the positive output from the 1*a* terminal of the output translator 45–13 is cut off. The beams are then directed to the second spots of the first columns and turned on again at which time a positive voltage is also applied to the 1*b* output of the output translator 45–13 which is interconnected with the gate 43–16*b*. This gate thus becomes conducting and applies a positive pulse or voltage to the delay device or network 43–32. The beams being directed to this spot without the circle gates 3–26 being rendered active and turned on, causes the beams to erase circles if any had been previously stored in these spots and to write dots over the circles with the result that the circles are erased and dots are written in the second spots of the first columns. After sufficient time has been allowed to thus erase circles and write dots, positive output from the delay device or network 43–32 is applied to the No. 3 conductor of the vertical input cable 45–18 with the result that the above-described action is repeated with respect to the third spots. After ample time has been allowed for erasing the circles in the third spots, positive potential is transmitted through the gate 43–16*c* from the No. 1*c* output of the output translator 45–13 through the delay device or network 43–33 and through the gate circuit 43–16*d* to the set "0" input of the flip-flop 43–371 thus restoring this flip-flop to its "0" state. As a result, positive voltage is removed from its "1" output and thus from the base of the transistor gate 43–11 thus rendering this gate inactive. In addition, positive voltage is applied to the "0" output of the flip-flop 43–371, whereupon the gate 43–21 becomes conducting and transmits the positive output from the "1" output terminal of the flip-flop 43–370 to the gates 43–12 and 43–22. The above described operations are repeated for the other columns of the storage spots of the trunk time out tubes.

Thereafter, the circuits function during each scanning cycle in the above-described manner and await a true disconnect signal at which time the time out circuits are set into operation as described herein.

Assuming now for purposes of description that the subscriber actually terminates a call in a manner as described above and that the line remains open. As a result, the circuits function as described above and first cause activity spots to be recorded in the proper columns of storage spots in the trunk disconnect time out tubes. Then when the first tenth second timing pulse is received the circuits cause the circle to be written in the No. 2 spot of the first column as well as the circle in the No. 1 or activity spot of this column. Thereafter, the circuits are operated as described herein until the second tenth second timing pulse is received which indicates that the line had been opened for at least a tenth of a second. During this cycle of operations, circuits of FIG. 42 operate in the manner described hereinbefore and upon completion of their scanning of the activity spots and rewriting circles in those spots which have circles stored in them and writing circles in other spots when required by the operation of the system as described above; then the control of the trunk time out tubes 3–24 and 3–25 is transferred to the circuits shown in FIGS. 44 and 45 which cause the timing spots to be advanced by the count of one. Under the conditions assumed above, during the operation of these circuits circles will be read out from the second spots in the first columns and will be employed to set the binary counter stage 44–36 to its "1" state. A dot will be read out of the third spots in these columns so that the binary counter stage 44–37 remains set in its "0" state. After the auxiliary read-out network 44–21 has been actuated in the manner described above, positive voltage is obtained from its No. 6 output and transmitted through the diode 44–26 to the counting input of the binary counter stage 44–36. As a result, this counter stage is actuated from its "1" state to its "0" state and the binary counter stage 44–37 advanced to its "1" state. At this time, positive voltage will be obtained from the "0" output of the binary counter stage 44–36 and transmitted through the transistor gate 44–28 which again actuates the flip-flop 44–369 to its "1" state and causes the setting of the binary counter stages 44–36 and 44–37 to be transferred to the second and third spots of the first columns. In other words, dots are written in the second spots and circles in the third spots of these columns thus indicating that the subscriber's line circuit has continuously been opened for at least a tenth of a second but not longer than two-tenths of a second.

Assuming that the subscriber's line circuit remains open for another tenth of a second and that the third tenth of a second timing pulse is obtained from the program circuits of FIGS. 35 and 40 during a scanning cycle. As a result, the circuits of FIGS. 44 and 45 will again be set into operation upon the completion of the cycle of operation of the circuit of FIG. 42. In this case the binary counter stage 44–36 will be set in its "0" state and the binary counter stage 44–37 will be set in its "1" state. Then upon the completion of the operation of the auxiliary read-out network 44–21 positive voltage is transmitted through the diode 44–26 which advances the binary counter stage 44–36 to its "1" state. The positive pulse from the No. 6 output of the auxiliary read-out network 44–21 is also transmitted to the base of the transistor gate 44–28 through the delay device or network 44–27. In this case, however, since both binary counter stages 44–36 and 44–37 are both set in their "1" state, positive potential is removed from the collector of the transistor 44–28 before the positive potential is applied to the base thereof from the delay device or network 45–27. As a result, the circles are not rewritten in the second and third spots of the first columns of the trunk disconnect timing tubes. Instead, dots are left stored in these spots in the first columns.

However, since the binary counter stages 44–36 and 44–37 are both set in their "1" states, positive voltage is obtained from the "1" output of both of these counters and as a result positive voltage is obtained from the output conductor 44–56 since positive potential is applied to both the input diodes 44–57 and 44–38 of this "and" circuit.

The positive potential on conductor 44–56 is applied to the right-hand input of the gate circuits 44–31 through 44–35, inclusive and conditions all of these gate circuits for conduction. Since the gate circuit 44–31 is also conditioned for conduction by the positive voltage from the "0" output of the flip-flop 45–364 at this time, the gate circuit 44–31 becomes conducting and applies a positive voltage to the delay device or network 44–39. In addition, positive voltage is transmitted from the gate circuit 44–31 through the diode 44–40 and through the "or" circuit 44–46 to the No. 1 input conductor of the vertical input cable 45–18. Positive potential is also transmitted through the delay device or network 44–39 to the set "1" inputs of the flip-flops 44–365 and 45–364. Thereafter the circuits are advanced as described herein and scan the activity spots and bring the other counter spots up to date in the manner described herein.

Meantime, however, positive voltage from the diode 44–40 is transmitted over conductor 44–66 to the set "1" input of the flip-flop 38–377 thus setting this flip-flop in its "1" state.

At the beginning of each of the scanning cycles, a positive voltage pulse is obtained on conductor 35–30 from the program circuit of FIG. 35. This positive voltage pulse in addition to being transmitted to the other circuits described herein is also transmitted through and applied to the set "1" input of the flip-flop 38–376 thus setting this flip-flop in its "1" state. As a result, a positive voltage is obtained from the "1" output of this flip-flop which voltage is transmitted through the delay devices 38–30, 38–31 and 38–32 in succession and then applied to the set "0" inputs of flip-flops 38–379 and 38–376 thus restoring the flip-flop 38–376 to its "0" state and also restoring flip-flop 38–379 to its "0" state if it had been in its "1" state.

The positive voltage from the "1" output of the flip-flop 38–376 is also applied to the base of the transistor gate 38–286. Thus, when flip-flops 38–376 and 38–377 are set in their "1" states as assumed above, the transistor gate 38–286 becomes conducting. A short interval of time later if flip-flop 38–378 had been set in its "1" state, the gate 38–287 would become conducting. Similarly, after the delay interval of the delay device or network 38–31, and when the flip-flop 38–379 is set in its "1" state, the transistor gate 38–288 becomes conducting.

Under the assumed conditions only flip-flop 38–377 was set in its "1" state. Consequently, the transistor gate 38–286 becomes conducting and, after the delay interval of the delay device or network 38–30, flip-flop 38–377 is restored to zero. Meantime, however, the positive voltage transmitted through the gate 38–286 is applied through diodes 38–33 and 38–34 to set the trunk disconnect translator flip-flops in accordance with the identification of the trunk 3–11 which under the assumed conditions is trunk No. 12. Thus positive potential is transmitted to the No. 1 conductor of the trunk tens disconnect translator 37–10 and to the No. 2 conductor of the trunk units disconnect translator 37–11. Thus the input flip-flops of this trunk disconnect translator are set in such a way that negative voltage is applied through the translator to the lower terminal of condenser 41–14 through the diodes 41–71 and 41–72. In addition, positive voltage is transmitted from the transistor gate 38–286 through the diode 38–35 and then through condenser 32–39 and amplifier 32–40 to the base of the transistor gate or switch 32–31. As a result, the transistor gate 32–31 becomes conducting and connects the high voltage source 32–41 to the diodes of trunk disconnect translators 37–10 and 37–11 and causes a relatively high negative disconnect voltage to be applied to the lower terminal of the condenser 41–14 as described above. Since the upper terminal of the condenser 41–14 is connected to ground through resistor 41–81 and since the diodes 41–84 and 41–85 are poled in a direction to oppose the direction of negative current, the condenser 41–14 becomes charged to a high negative value.

The positive voltage from the diode 38–35 is also transmitted to the delay device or network 38–36. This delay device or network has a delay interval comparable with the time required to charge the condensers 32–39 and 41–14. At the end of the delay interval of the delay device positive potential is applied to the set "0" inputs of the flip-flops of trunk disconnect translators 37–10 and 37–11 with the result that these flip-flops are returned to their "0" states. In addition, upon the completion of the charge of condenser 32–39 the high voltage source 32–41 is disconnected from the diodes of the trunk disconnect translators and as a result the voltage applied to the lower terminal of condenser 41–14 returns to a voltage near ground potential so that this condenser discharges. Since the upper terminal is previously at ground potential and the lower terminal at a high negative voltage upon restoring the lower terminal to near ground potential, the upper terminal of this condenser rises to a relatively high positive voltage and applies a positive discharge current pulse through the diodes 41–84 and 41–85 to both winding terminals of the trunk repeat coil 3–11. This positive voltage opposes the normal direct current flowing through these coils and through the above-described crosspoints and paths through the network so that the crosspoints of the network are restored to their non-conducting or high impedance condition and the paths between the subscriber's stations 14 and 28 are thus interrupted.

Thereafter the circuits are all substantially in their normal condition except for the calling party line. It was assumed that the calling party had not yet disconnected or hung up. When the calling party hangs up or disconnects the above-described operation is substantially the same as when the called party hangs up except now when the disconnect signal together with the identity of the calling party's line is transferred to the common flip-flops and the busy test made on the calling party's line to determine whether a connection exists from this line through the network, the line will test idle. This condition is recognized as a disconnect signal from a subscriber whose line has already been disconnected. Consequently, the circuits are restored to normal and do not respond further to this signal.

If it is assumed that the calling party should hang up first instead of the called party as assumed above, then the circuits will operate in substantially the same manner as described above except that the gate 44–32 becomes conducting instead of the gate 44–31 but this causes the same flip-flop 38–377 to be set in its "1" state and the disconnect operation thereafter is substantially the same as described above. In this case the called party's line disconnect will be recognized as a disconnect signal from a subscriber station, whose line has already been disconnected and the circuits will not further respond to this signal but will be restored to normal.

Assume now that when the subscriber station 14 calls the subscriber station 28, that the subscriber station 28 is busy communicating with some other subscriber. Under these circumstances the system works in a manner described herein in response to the initiation of the call by the subscribed at station 14. In addition, the system responds as described above in storing and registering the calling and the called party's station identification, i.e., the dialed numbers, in one of the register spaces in one of the pairs of called register tubes. Thereafter circles are written in the ready completion spots in the pair of call register spaces. Then, when the common control and common flip-flop circuits are not engaged in handling other calls, both the called party's station identification and the called party's station identification, are transferred to the flip-flops 34–326 through 34–341 in the manner described herein. Upon the transferring of the calling number to the flip-flops 34–326 through 34–333, positive potential on the "1" output of one or more of these flip-flops is transmitted through the "or" circuit 34–11 to the set "1" input of the "busy" flip-flop 34–380, thus setting this flip-flop in its "1" state and making the common flip-flops and common control circuits busy, so that operation of these circuits will not be interfered with by another call.

As before, upon the transfer of the called station identification to the flip-flops 34–334 through 34–341 one or more of the first four of these flip-flops will be set in its "1" state presenting the tens digits of the called station identification and one or more of the last four of these flip-flops will be also set up in its "1" state representing the units digit of the called station. As a result, positive potential is transmitted through one or more of the diodes from the "1" outputs of these flip-flops through each of the "or" circutis 34–02 and 34–03. Consequently, positive potential will be obtained from the output of the "and" circuit 34–253 and transmitted through the delay device or network 34–26 to set flip-flop 34–382 in its "1" state as described above.

With the flip-flop 34–382 in its "1" state, the transistor gates 39–300 through 39–307 are conditioned for conduction so that the output of the translator 34–16 is applied to the matching circuit 39–10. As described herein the dialed or called party's station identification from the flip-flops 34–334 through 34–341 is applied to the translator 34–16 and then matched with the calling party's station identification as recorded on the flip-flops 34–326 through 34–333. The translator 34–16 translates the identification of stations on a party line to identification of the party line. As a result, the match circuit 39–10 will provide a positive output on the output conductor 39–21 in case one party line is calling another party on the same party line. Under the assumed conditions no match will be obtained and no positive potential will be applied to conductor 39–21. Consequently, a transistor gate 39–309 remains conducting so that after the delay interval of the delay device 39–13 which is sufficiently long to permit the operation of the above-described matching operations, positive voltage from the "1" output of the flip-flop 34–382 will be applied to the base of the transistor gate 39–310 with the result that positive potential from the transistor gate 39–309 is transmitted through the transistor gate 39–310 to the set "1" input of the busy test flip-flop 39–384, thus setting this flip-flop in its "1" state. With flip-flop 39–384 in its "1" state, positive potential from its "1" output is transmitted through the diode 38–10 and condenser 32–09 to the base of the transistor gate or switch 32–10 turning on this transistor gate or switch and supplying the busy test potential source 32–12 to the diodes of the line translators 24–10 and 24–11. Meantime, upon the conditioning of the transistor gates 39–300 through 39–307, the identity of the called party's station in addition to being applied to the left-hand terminals of the matching circuit 39–10 are also transmitted over the cable conductors 34–24 to the input flip-flops of the line translators 24–10 and 24–11 thus setting the input flip-flops of these translators in accordance with the dialed number. Then, upon the turning on of the transistor switch 32–10, a higher busy test voltage is applied to the diodes of the translation sections of the line translators, which in turn causes a higher voltage to be applied to conductor 17–28 extending through the network side of the repeat coil of the called line. When this line is busy as is now assumed the application of a higher busy test voltage to the conductor 17–28 causes an increased current to flow over this conductor and through the resistor 17–38. As a result, the increased voltage drop across this resistor is repeated through the transformer 17–48 and applied to the transistor amplifier 17–60 with the result that a positive voltage is obtained on the output conductor 17–102 indicating that the called line or subscriber's station 28 is busy.

Positive voltage when transmitted over the conductor 17–102 is applied to the collector terminal of the transistor gate 39–312.

Meantime, positive potential from the "1" ouput of the flip-flop 39–384 in addition to being applied to the base of the transistor gate or switch 32–10 is also applied to the base of the transistor gates or switches 39–312 and 39–337. Positive potential applied to the base electrodes of these transistor switches conditions the gates for conduction and the transistor gate 39–337 starts to conduct current through the transistor 39–308 from positive battery, over transistor gate 39–337 to charge the condenser 39–17. As described herein the time constant for charging this condenser in combination with resistor 39–18 and the other circuit parameters is such that this condenser does not become sufficiently charged immediately to set the flip-flop 39–386 in its "1" state or to otherwise control these circuits as described herein. When the positive voltage is obtained on the conductor 17–102 as described above the transitsor gate 39–312 becomes conducting and applies positive voltage to the base of the transistor gate 39–308 thus turning this transistor gate off and preventing further conduction through the transistor gate 39–337. Consequently, condenser 39–17 is then discharged through the resistor 39–18 without having set the flip-flop 39–386 in its "1" state and without having transmitted a sufficiently positive potential through the delay device or network 39–19 to further actuate the circuits as described herein.

Positive voltage from the transistor gate 39–312 is also transmitted through the diode 39–16 to the set "0" input terminals of the flip-flops of the line translators 24–10 and 24–11 thus restoring these flip-flops to their "0" state.

Positive potential from the transistor gate 39–312 is also transmitted to the delay device network 39–15. Then when the line translator flip-flops of FIG. 24 have all been reset to their "0" states, positive potential from the delay device or network 39–15 is transmitted to a number of circuits including the set "0" input of the flip-flop 34–382 through the diode 34–29 thus restoring this flip-flop to its "0" state with the result that positive potential from its "1" output is removed and the transistor gates 39–300 to 39–307, in turn, are rendered inactive or non-conductive.

Positive potential from the delay device or network 39–15 is also applied to the set "1" input of the busy test flip-flop 39–385 setting this flip-flop in its "1" state with the result that positive voltage is obtained on its "1" output and applied to the base of the transistor gates 39–313 through 39–320, inclusive, thus conditioning these transistor gates for conduction. As a result, the "1" outputs of the flip-flops 34–326 through 34–333 are connected over cable 34–23 and through the gates 39–313 to 39–320 and cable 34–24 to the set "1" inputs of the flip-flops of the line translators 24–10 and 24–11. As a result, the input flip-flops of the line translators 24–10 and 24–11 are now set in accordance with the identity of the calling party's station identification, that is, in accordance with the directory number of the calling party.

Figure 38:
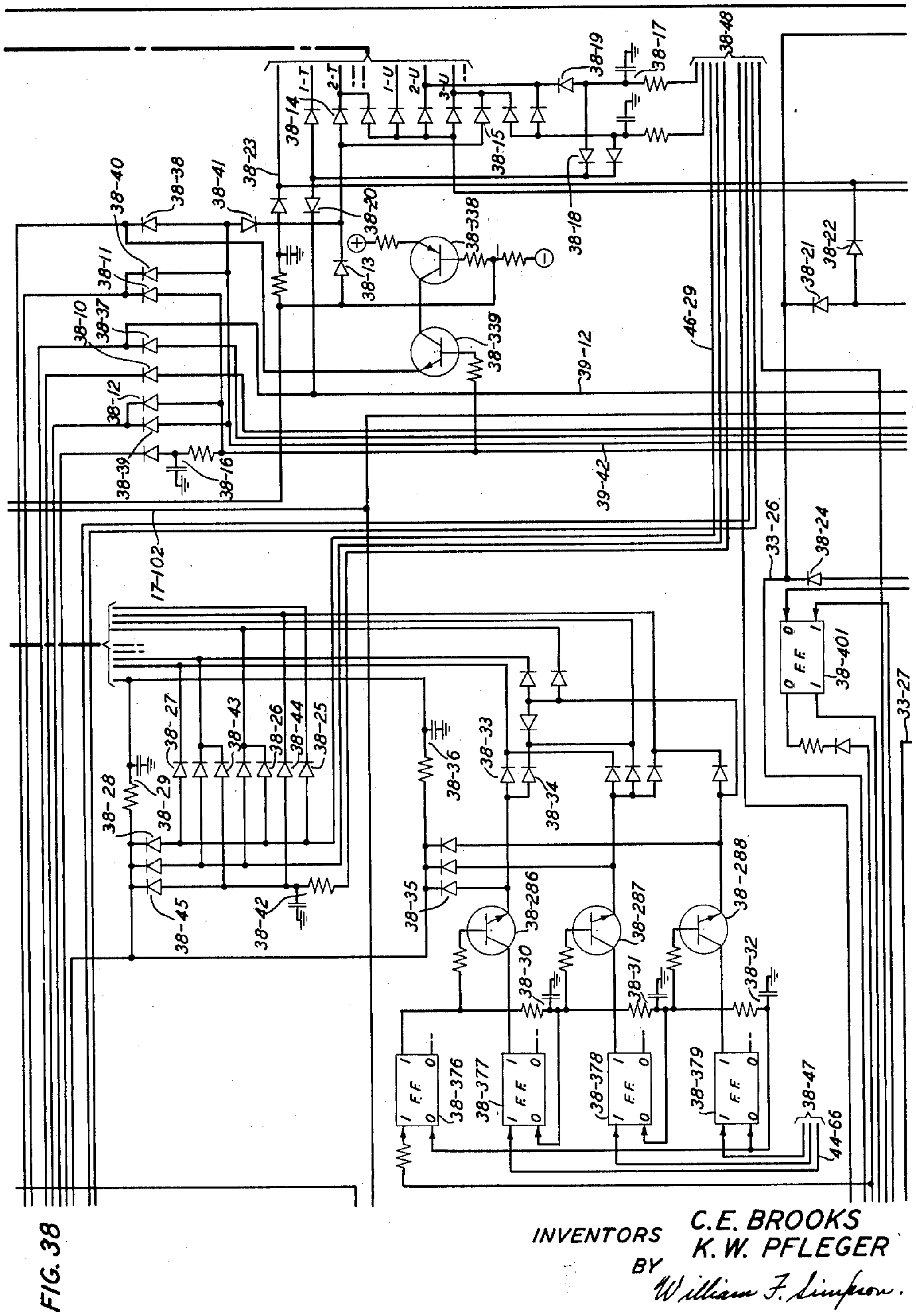
FIG. 38 shows the trunk number group circuits.
Figure 39:
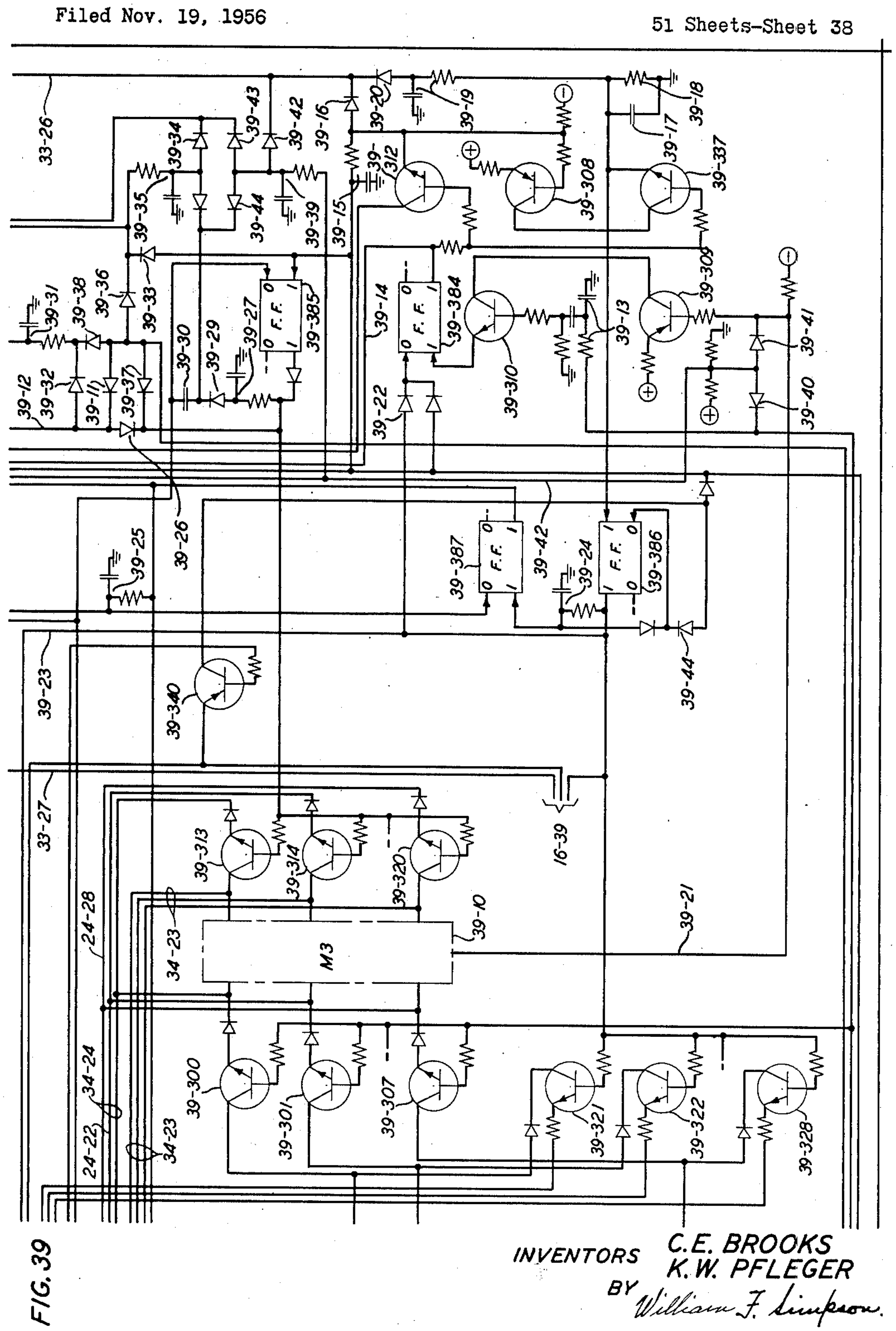
FIG. 39 shows matching, gate and other control circuits for controlling the sequence of operations for establishing connections through the network.

The output from the delay device or network 39–15 is also transmitted through the diode 39–33 to the translator shown in the right-hand portion of FIG. 38. Thus, positive potential is applied to the number 2–T tens conductor and to the number 1–U, 2–U, and 3–U units conductors of inputs of the trunk connect translators 36–10 and 36–11. As a result, corresponding input flip-flops of these translators are conditioned in accordance with the No. 27, which number identifies busy tone trunk 3–16.

The output of the delay device or network 39–15 is also transmitted through the diode 38–37 to the base of the transistor gate 32–16 and also through the diode 32–33A to the base of the transistor gate 32–30. As a result, the connect potential source 32–35A is connected to the diodes of the line translators 24–10 and 24–11 with the result that the connect voltage or potential is applied to the conductor 17–14 through the diodes 17–44 and 17–54 and resistor 17–65.

Likewise, the application of the positive voltage to the base of the transistor gate 32–30 turns on this gate and supplies the connect trunk voltage source 32–36A to the trunk connect translators 36–10 and 36–11 with the result that a high negative connect voltage is applied to the conductor 41–06 through the diodes 41–56 and 41–66 and resistor 41–86. The high positive connect voltage applied to the conductor 17–14 is transmitted through the network winding of the line repeat coil of the subscriber's line 1–14 and then to the switching network 2–19 over conductor 31–14. Likewise, the high negative connect voltage applied to conductor 41–06 is transmitted through the network winding of the repeat coil of the busy tone trunk 3–16 to the network 2–19 over conductor 31–06. As a result, two of the transistor crosspoints in the network break down, that is, change from their high impedance state to their low impedance state and in so breaking down prevent the breaking down of any other crosspoint transistors or devices. Assume for purposes of illustration that the crosspoints 31–36 and 31–37 thus change their impedance from a high value to a low value and thus establish a communication signaling path from the conductor 31–06 to the conductor 31–14 thus effectively interconnecting the subscriber's station 14 with the busy trunk 3–16. As a result, busy tone from the busy tone source 3–18 is transmitted to the subscriber's station.

In addition, positive voltage from the "1" output of the flip-flop 39–385 is transmitted through the delay device 39–27 after the above-described connection has been established. This voltage is then transmitted through the diode 39–29 and condenser 39–30 to the set "0" input of the flip-flop 39–385 thus restoring this flip-flop to its "0" state which removes positive potential from its "1" output. As a result, the transistor gates 39–313 through 39–320 are rendered inactive.

The positive pulse transmitted through the condenser 39–30 is also applied to the set "0" inputs of flip-flop 38–401 and of the common flip-flops 34–380 and 34–326 through 34–341 thus restoring all of these flip-flops to their "0" states after which they are available for use on other calls. A positive voltage obtained from the diode 39–33 is also transmitted through the delay device or network 39–35 and diode 39–34 to the set "0" conductor 38–23 extending to the set "0" inputs of the trunk connect translator flip-flops of FIG. 36 thus restoring the flip-flops of the trunk connect translators 36–10 and 36–11 to their "0" states after the above-described connections have been established.

The output from the diode 38–10 is also transmitted through the diode 39–32 and the delay device 39–31 and through the diode 38–21 to the set "0" inputs of the flip-flops of the line translators 24–10 and 24–11, thus restoring these flip-flops to their "0" states. Thereafter, the control circuits are all restored to their normal or idle condition where they are available for handling other calls.

The subscriber at station 14, upon observing or hearing the busy tone from the busy tone source 3–18 connected to busy trunk 3–16, will then understand that the called party's line is busy, and will hang up and again make the call at a later time if he so desires. Upon hanging up, the subscriber's line 1–14 is open and the disconnect signal is transmitted to the central office. This disconnect signal is recognized by the trunk scanning tubes and circuits and employed to control the circuits in the manner described herein for disconnecting calls between the subscriber's stations. As a result, the above-described connection from the subscriber's line repeat coil to the busy tone trunk repeat coil is interrupted in a manner similar to that described herein for interrupting connections between the subscriber's stations.

As described above, when a subscriber fails to dial; where the subscriber's line remains closed due to trouble condition or conditions on the line; or the subscriber fails to complete dialing of the called party's number, the register circuits time out as described herein and cause circles to be written in the call ready for completion spots in the register spaces, even though none or only a part of the called subscriber's complete number has been dialed. Thereafter, the calling line identification and as much of the dialed number as is stored in the call register spaces in the call register tubes is transferred to the common flip-flops 34–326 through 34–341 in the manner described herein when these circuits and the common control circuits are free to handle the call. In this case, the identity of the calling subscriber's line is stored in the flip-flops 34–326 through 34–333 as before. However, either all of the last four called number flip-flops 34–338 through 34–341 remain in their "0" states or else all of the called number flip-flops 34–334 through 34–341 remain in their "0" states. Consequently, positive potential will not be obtained on both of the output conductors from "or" circuits 34–02 and 34–03 so that flip-flop 34–382 remains in its "0" condition.

On the other hand, positive potential will be obtained on the output conductor of the "and" circuit 34–255 or upon the output of both this "and" circuit and upon the output of the "and" circuit 34–254, because all of the last four, or all of the called number flip-flops remain in their "0" states under the assumed condition. As a result, positive voltage will be obtained on the output of the "or" circuit 34–07 and transmitted to the collector of the transistor gate 34–14.

Meantime, as before, the actuation of various flip-flops 34–326 through 34–333 in accordance with the calling line number causes a positive voltage to be applied to the output of the "or" circuit 34–11 which voltage is transmitted to the set "1" input of the flip-flop 34–380, which flip-flop is actuated to its "1" state where it makes the common flip-flops and control circuits busy as described herein so that other calls will not interfere with the operation of these circuits on the call being described. In addition, positive potential from the output of the "or" circuit 34–11 is transmitted through the delay device or network 34–15 to the base of the transistor gate 34–14. The delay device or network 34–15 has a delay period sufficiently long to insure that ample time is provided for actuation of the various called number flip-flops 34–334 through 34–341 if information is available to operate these flip-flops. Under the assumed conditions, either the last four or all of the flip-flops remain in their "0" states so that at the end of the delay interval of the delay device or network 34–15, transistor gate 34–14 transmits positive voltage from the "or" circuit 34–07 through the transistor gate 34–14 to a plurality of diodes shown in the upper right-hand corner of FIG. 39.

In the first place, positive voltage from the transistor gate 34–14 is transmitted through the diode 39–37 to the base of the transistor gates 39–313 through 39–320, thus conditioning these gates for transmission. As a result, the No. 1 outputs of the calling line number flip-flops 34–326 through 34–333 are interconnected over cable 34–23 to transistor gates 39–313 through 39–320 and then over cable 34–24 to the set "1" inputs of the flip-flops of the line translators 24–10 and 24–11. These flip-flops are thus set in accordance with the identity of the calling line.

In addition, positive potential from the transistor gate 34–14 is transmitted through the diode 39–36 to the diode translator shown in the right-hand portion of FIG. 38. The positive potential transmitted to this translator at this time sets the flip-flops of the trunk connect translators 36–10 and 36–11 in accordance with one of the trunks to which it is desired to establish connection. Under the assumed conditions, positive potential is transmitted through the diode 39–36 which selects the busy tone trunk in the same manner described above when positive potential is transmitted through the diode 39–33. As a result, the input flip-flops of the trunk connect translators 36–10 and 36–11 are set in accordance with the No. 27 identifying the busy tone trunk 3–16.

The positive output from the transistor gate 34–14 is also transmitted through the diode 39–11 to the base of the transistor gate 32–16 and also through the diode 32–33A to the base of the transistor gate 32–30. As a result, the transistor gate 32–16 applies the connect source of potential 32–35A to the diode circuits of the line translators 24–10 and 24–11. Likewise, the actuation of the transistor gate 32–30 applies the connect source of potential 32–36A to the diodes of the trunk connect translators 36–10 and 36–11.

The application of the connect source of voltage 32–35A to the line translators 24–10 and 24–11, together with the actuation of the input flip-flops of these translators causes a high positive connect voltage to be applied to the conductor 17–14 extending to the network winding of the repeat coil of the subscriber's line 1–14 and then to the switching network over conductor 31–14. Likewise, the application of the connect source of potential 32–36A and the setting of the flip-flops of the trunk connect translators 36–10 and 36–11 in accordance with the No. 27 identifying the busy tone trunk 3–16 causes a high negative voltage to be applied to the conductor 41–06 through the diodes 41–56 and 41–66 and resistor 41–86. This potential is transmitted through the network winding of the trunk repeat coil to the network conductor 31–06. The high negative potential transmitted over conductor 31–06 together with the high positive potential transmitted over conductor 31–14 causes a pair of crosspoints in the network to change from a high impedance to a low impedance state and establish a path from the subscriber's station to the busy trunk. Thereafter busy tone is transmitted from the source of busy tone 3–18 connected to the busy tone trunk 3–16 to the subscriber's station 14 thus indicating that the subscriber should hang up and dial over again if he still wishes to communicate with some other subscriber.

After the above-described connection between the subscriber's station 14 and the busy tone trunk 3–16 has been established, positive potential from the transistor gate 34–14 is also transmitted through the diode 39–38 and delay device or network 39–31 and diode 38–21 and to the set "0" inputs of the line translator flip-flops shown in FIG. 24 thus restoring these flip-flops to their "0" condition. Similarly, positive potential from the diode 39–36 is transmitted through the delay device or network 39–35 and diode 39–34 to the conductor 38–23 extending to the set "0" inputs of the flip-flops of the trunk connect translators 36–10 and 36–11 thus restoring these flip-flops to "0."

Positive potential from the transistor gate 34–14 through the diode 39–37 is also transmitted through the delay device or network 39–27 and diode 39–29 and condenser 39–30 to the set "0" inputs of flip-flop 38–401, the "busy" flip-flop 34–380, and the common flip-flops 34–326 through 34–341 thus insuring that all these flip-flops are likewise reset to zero at this time. Thus, the common flip-flops and the network control circuits are restored to their normal condition where they are available for handling another call.

Upon hearing or observing busy tone the subscriber will hang up and may initiate a new call and dial again. Upon hanging up, the subscriber's line 1–14 is again opened as described above and this change in signaling condition on the line is detected by the scanning detecting circuits in the central office, which in turn causes the above-described time out circuits to function. If the subscriber's line remains open for a period of from two-tenths to three-tenths of a second, the above-described connection from the subscriber's line to the busy trunk 3–16 is interrupted and the circuits restored to their idle or normal condition in the manner described herein.

Returning now to the above description of establishing a call from the calling party's line such as 1–14 to a called party's line, such as 1–18 assuming that the connections have been established as described herein, wherein the connection is established from the talking trunk 3–11 to the subscriber's line 1–18 through the network 2–19 and that a connection is also established from the talking trunk 3–11 through the switching network 2–19 to the calling party's line 1–14 in a manner described herein. As also described above prior to the answering of the call by the called subscriber, a ringing trunk such as trunk 3–13 is also connected through the switching network 2–19 to the called party's line 1–18. At this time as described above since the ringing trunk 3–13 is interconnected with the same line as talking trunk 3–11, the flip-flop 49–415 is set in its "1" state.

In case the called party answers, the circuits operate as described hereinbefore which causes the ringing trunk to be disconnected. This in turn causes the flip-flop 49–415 to be restored to its "0" state. However, the connections between the called line and the talking trunk and between the calling line and the talking trunk remains established.

Now, assume that the called party does not answer the call so that the calling party eventually abandons the call. At this time the calling party's line changes from a closed circuit condition to an open circuit condition. This change in signaling condition is detected by the line scanning tubes and associated detector circuits as described hereinbefore and transmitted through the line flip-flops of FIGS. 8, 9, 13 and 14 and then through the gate circuits of FIGS. 10 and 15. The calling party's line identification is then compared with the calling line identification stored in the register spaces in the call register tubes and since under the assumed conditions no match will be found, the change in signaling condition, together with the calling party's line identification is transferred to the common flip-flops and a busy test on the calling line made. Since the line is interconnected through the network the line will test busy and as a result the interconnected trunks identified. After the line remains open for a period of time between two-tenths and three-tenths of a second, disconnect potential is applied through the diodes 41–71 and 41–72 and condenser 41–14 to both of the windings of the repeat coil of the talking trunk 3–11. As described herein this disconnect potential is a positive pulse of sufficient magnitude and duration to cause the crosspoints in the crosspoint network 2–19 employed in providing the connections from the talking trunk to both the called and calling party's lines to change from a low impedance condition to a high impedance condition and thus disconnect the connections through the network from the talking trunk to the called line and to the calling line.

The application of positive pulse due to the discharge of the condenser 41–14 through the diode 41–75 to the left-hand winding of the repeat coil in the talking trunk 3–11 is also connected to the input of the phase inverting device 49–01 and to the diode 49–13. The phase inverter 49–01 does not respond to the application of a positive pulse at its input. However, the positive disconnect pulse applied to the diode 49–13 is of sufficient magnitude that it exceeds the bias voltage of the source 49–22 so that the diode 49–13 becomes conducting and transmits a pulse through the condenser 49–14 to the set "0" input of the flip-flop 49–415 thus restoring this flip-flop to its "0" state.

Under the conditions assumed above wherein the trunk 3–13 was interconnected with the same line as the talking trunk 3–11, flip-flop 49–415 was set in its "1" state, while the flip-flop 49–416 remained in its "0" state.

As a result, under these conditions, positive voltage from the "0 output of the flip-flop 49–416 is applied to the base of the transistor gate circuit 49–420, thus conditioning this gate for conduction. Consequently, when the flip-flop 49–415 is restored to its "0" state as described above, a pulse of positive voltage will be transmitted through the condenser 49–25 and through the conditioned transistor gate 49–420 to the network side of the repeat coil of the ringing trunk 3–13 and then through the repeat coil to the switching network 2–19. This positive voltage is of sufficient magnitude to cause the crosspoints employed in establishing the connection from the ringing trunk 3–13 to the called line 1–18 to change from their low impedance state to their high impedance states and thus effectively disconnect the ringing trunk from this line.

If ringing trunk 3–14 instead of 3–13 had been connected to the called line 1–18 at this time, then the flip-flop 49–416 would have been operated to its "1" state, while the flip-flop 49–415 would remain in its "0" state. Upon abandoning the call under these circumstances the positive pulse from the "0" output of flip-flop 49–416 would be transmitted through the transistor gate 49–421 to the network side of the ringing trunk 3–14 thus causing the connection between this trunk and the called line to be interrupted.

As described herein, should the ringing trunk 3–15 be employed to ring the called party, then the flip-flops 49–415 and 49–416 are both set in their "1" states, and upon the abandonment of a call these flip-flops are both restored to their "0" states with the result that positive potential from their "0" outputs is transmitted through the respective diodes 49–26 and 49–27 so that the output of the "and" circuit 49–28 is also positive. This positive pulse is then transmitted through condenser 49–29 to the network side of the repeat coil of the trunk 3–15 thus causing the connections through the switching network 2–19 between the ringing trunk 3–15 and the called party's line to be interrupted and the circuits restored to their normal or idle condition.

Had the talking trunk 3–12 been employed in the connection instead of the talking trunk 3–11, then the ringing trunk disconnect circuits 49–21 will operate in a manner similar to the above-described operation of the ringing disconnect circuits 49–20.

Sometimes flip-flop 33–400 or flip-flop 38–401 may be set on "1" at the time when a pulse is emitted from binary counter 35–104 over conductor 35–30. This condition may arise when the common flip-flops have not yet completed a connection or other functions for which they began to be employed during the preceding scanning period. In this case it is necessary to prevent any operation of flip-flop 38–376 at the start of the new scanning period so that the trunk disconnect circuit will not attempt to utilize the trunk disconnect translations at a time when they may be otherwise employed.

In order to prevent operation of flip-flop 38–376 at such a time, a high resistance 34–60 is provided between conductor 35–30 and the "0" outputs of flip-flops 33–400 and 38–401. In case either or both these flip-flops are on "1" a large current will flow over resistor 34–60 due to the pulse from conductor 35–30 which flows into the "0" output(s) of the flip-flop or flip-flops now at low potential. Consequently the set "1" input of flip-flop 38–376 will not rise to any appreciable potential due to the voltage drop in resistor 34–60 and therefore will not operate at this time.

Usually the positive potential from the "0" output of flip-flop 34–380 which occurs when this flip-flop is in the "0" state, is a signal to the control circuits of the call register tubes that the common flip-flops are idle and available for storage of calling and called line number information. However, in case a busy test has just been made and conductor 17–02 has pulsed the set "1" input of flip-flop 33–381, and positive potential from the "1" output thereof flows over gate 33–299 to the set "1" input of flip-flop 33–400 as described herein, it becomes necessary to prevent the operation of FIG. 34 during the time that flip-flop 33–400 is on "1" so that the line translator flip-flops may be employed during trunk identification and not at the same time by circuits of FIGS. 34 and 39. Therefore a high resistance 34–59 is provided in series with the "0" output of flip-flop 34–380. When this flip-flop is on "0" and flip-flop 33–400 is on "1," a large current flows over resistors 34–59 and 33–01 and over diode 33–29 to the "0" output of flip-flop 33–400. The resulting voltage drop across resistor 34–59 is great in comparison with that across resistor 33–01 and diode 33–29. Consequently the left hand terminal of resistor 34–59 is then at low or negative potential which causes FIG. 34 to appear busy as seen by the register tube's control circuits.

The system has also been arranged to permit one of the subscribers on the party line to call another subscriber on the same party line merely by dialing the other subscriber's directory number. In this case, the signals indicating the initiation of a call as well as each of the changes in the signaling condition of the subscriber's line during dialing are detected and relayed or transmitted through the system in the manner described herein. Assume, for example, that the subcriber at station 22 wishes to call the subcriber at station 17. The subscriber at station 22 will then initiate a call in a normal fashion and dial the No. 17, that is, dial a 1 followed by a 7. The circuits respond to all of these signals and changes of line condition to cause the dial pulses to be counted and stored in a pair of call register spaces in one of the pairs of call register tubes. When the number is completely dialed, circles are written in the call ready for completion spots and then both the calling line number and the dialed or called station number relayed or transferred to the common flip-flops 34–326 through 34–341.

The system responds to the various received signals and transfers the information from different portions of the system as described above with respect to a call from the subscriber's station 14. Under the assumed conditions, when the calling line number is stored in the flip-flop 34–326 through 34–333 "busy" flip-flop 34–380 is actuated to its "1" state where it renders the common flip-flop circuits and related control circuits busy. Since the called party's number was completely dialed the output of the "and" circuits 34–254 and 34–255 remain at a low level, while high positive voltages are obtained from the output of both "or" circuits 34–02 and 34–03. Consequently, a high positive voltage is obtained from the "and" circuit 34–253. After the delay interval of the delay device or network 34–26, which delay is sufficient to insure the full recording of all of the common flip-flops 34–334 through 34–341, positive voltage from the output of the delay device or network 34–26 is transmitted to the set "1" input of the flip-flop 34–382 thus setting this flip-flop in its "1" state in the manner similar to that described herein on a call from the subscriber's station 14.

As before with the flip-flop 34–382 set in its "1" state, positive output from its "1" output terminal is applied to the base of the transistor gates 39–300 through 39–307 which interconnect the output of the translator 34–16 with the left-hand input to the matching circuit 39–10. As shown in FIG. 34, the called party's number is connected to the left-hand input of the translator 34–16 and this translator circuit is arranged as described hereinbefore to translate the directory numbers of all of the stations connected to a party line to the party line number. Under the assumed conditions the translator circuit 34–16 is arranged so that the directory number 22 will be transmitted through the translator circuit unchanged, whereas the directory number 17 is translated into the number 22. Under the assumed conditions with station 22 dialing 17 the directory number or station 17 recorded in the flip-flops 34–334 through 34–341 is translated to the number 22 and transmitted to the left-hand input of the matching circuit 39–10. Meantime, the output of the calling number flip-flops 34–326 through 34–333 are connected to the right-hand terminal of the matching circuit 39–10. Since this number is 22 the numbers or signals on the input leads on both the right-hand and left-hand sides applied to the matching circuit 39–10 correspond so that the match is obtained and a positive voltage is obtained from the matching circuit 39–10 over conductor 39–21. The "1" output of the flip-flop 34–382 is also connected to the delay device or network 39–13. The delay interval of this device or network is sufficient to permit positive pulse to be obtained from the match circuit 39–10 before a positive output is obtained from the delay device or network 39–13. The positive potenital from the conductor 39–21 is applied to the base of the transistor gate 39–309 thus rendering this gate inoperative so that the positive voltage is not transmitted through the transistor gate 39–310 when positive voltage is obtained from the delay device or network 39–13. Instead, the positive voltage from match circuit 39–10 is applied to the diode 39–41 and positive voltage of the flip-flop 34–382 is applied to the diode 39–40. Then positive voltage is obtained on the conductor 39–42 of the "and" circuit indicating that a match has been obtained from the match circuit 39–10 and that the call is intended for another station on the same party line as the calling party. The positive potential on the conductor 39–42 is employed to set up the connection from the calling party line to one of the talking trunks and also to a ring trunk for the calling station and also a ringing trunk for the called station.

The calling subscriber upon completing the dialing of the called party's number then hangs up and listens for ringing from his own calling device and then when the ringing stops he will then pick up the receiver and converse with the other party.

Positive potential is transmitted from conductor 39–42 through the diodes 38–40 and 32–18 and through the diodes 38–38 and 32–17 to initiate operation of the blocking oscillator 32–20. In addition, positive potential on this conductor also sets the flip-flops 32–80 and 32–81 in their "0" states which in turn apply a low or negative potential to the bases of the transistors 32–21 and 32–19 thus conditioning these transistors for operation.

Positive potential from the conductor 39–42 is also transmitted through the diode 38–41 and through the translator diodes of the right-hand side of FIG. 38 to the number 2–T tens conductor and to the number 3–U units conductor, then to the "1" inputs of the corresponding flip-flops of the trunk connect translators 36–10 and 36–11.

At this time the output of the translators 34–16 in addition to being transmitted through the transistor gates 39–300 through 39–307 to the left-hand side of the matching circuit 39–10 is also transmitted over the cable 34–24 to the "1" inputs of the flip-flops of the line translators 24–10 and 24–11.

In addition positive potential from conductor 39–42 is also transmitted through the diode 38–39 and condenser 32–22 and amplifier 32–23 to the base of the transistor gate 32–14. As a result, a high positive double connect voltage is applied to the diodes of the translator networks 24–10 and 24–11. This voltage is transmitted to the line translators of FIG. 17 and then through the diode 17–11 and resistor 17–67 and diode 17–52 to the conductor 17–62 and then through the diode 17–12 to the conductor 17–22 through the busy test circuit 17–63.

Positive potential transmitted through the diode 38–39 is also transmitted through the diode 32–32 to the base of the transistor 32–30 thus conditioning this transistor and applying a high negative connect potential to the trunk connect translator networks 36–10 and 36–11 and then to the diodes 41–55 and 41–65 and to the resistor 41–64, and thence to the conductor 41–05. The high positive potential applied to conductor 17–22 is transmitted through the network side of the repeating coil of the line termination 1–27 and over conductor 31–27 to the network 2–19. Likewise, potential from conductor 41–05 is transmitted to the network side of the 800-cycle ringing trunk repeat coil to the network over conductor 31–05. Likewise, positive potential from the transistor gates 32–19 and 32–21 are also applied to the network sides of the talking trunk repeat coils and the network sides of the 1000-cycle ringing trunk repeat coils. As a result of the substantial simultaneous application of all these potentials to the network, three paths are established through the network from the party line conductor 31–27 to one of the talking trunks assumed to be trunk 3–11, another path from the party line to one of the 1000-cycle ringing trunks, assumed to be 3–13, and a third path from the party line repeat coil to the 800–cycle ringing trunk.

After the above-described connections have been established through the network due to a change of crosspoints of the network from the high impedance to the low impedance condition as described herein, positive potential from the conductor 39–42 is also transmitted through the delay device or network 39–39 and diode 39–42 and then to the set "0" inputs of the flip-flops of the line translators 24–10 and 24–11. Positive potential is also transmitted to the diode 39–43 to the set zero input of the flip-flops of the trunk connect translators 36–10 and 36–11 with the result that all of the flip-flops of the line and trunk translators are restored to zero. In addition, positive potential from the delay network 39–39 is also transmitted through the diode 39–44 and condenser 39–30 to the set "0" inputs of flip-flops 38–401, 34–380, 34–326 through 34–341, inclusive and 34–382, thus restoring all these flip-flops to "0" and restoring their circuits to their idle or normal conditions where they are available for use on other calls. The potentials transmitted to the bases of the transistor gates 32–14 and 32–30 as described above are transmitted through condensers so that pulses of short duration are applied to these gates with the result that the high positive and negative voltages applied to the translator network are applied for only a very brief instant of time during which interval said condensers become charged. As a result, the line and trunk translators are also restored to their idle conditions.

The above-described operations of establishing a connection to the party line require only a very short interval of time so that the calling subscriber station 22 will still have its receiver off the hook. This subscriber may even receive some ringing tones sometimes but they indicate that he should hang up and listen for signals from his calling device. So long as he continues to receive signals from his calling device he knows that the called party has not answered. However, when ringing is interrupted by the called party answering, the calling party will then pick up his receiver and communicate with him. However, when ringing is initiated the calling party usually in this case will not have hung up and may therefore hear some of the ringing current transmitted over the line. The fact that his station equipment is bridged across the line may prevent the called party from receiving a sufficient amount of ringing current to actuate the calling device at his station.

When the calling subscriber hangs up his low impedance station equipment is removed from the party line so that sufficient ringing current is received at both the calling and called station to actuate the calling devices at both of these stations. In addition, the subscriber's line is substantially open, which change in signaling conditions is recognized on the next scan of the subscriber's line by the scanning tubes and their related detector and control circuits. The line identity together with the change of the signaling condition are transmitted through the gate circuits of FIGS. 10 and 15 to the call register tubes where the line number is compared with the calling line numbers of all of the busy called register spaces in the call register tubes. Since no match will be found this information is transmitted to the common flip-flops and a busy test made as described herein since the line is now connected through the network and the busy test will indicate that the line is busy. Hereafter, the trunk circuits interconnected with this line are identified in a manner described hereinbefore with the result that the flip-flops 48–342, 48–346 and 48–348 are all operated to their "1" states. At about this time positive voltage is obtained at the input of the delay device or network 48–20 and applied to the pulse stretcher 48–01 controlling the base of the transistor gate 48–264 thus cutting off this transistor and preventing transmission through the gates 48–12. Positive output from the "1" output of the flip-flop 48–348 is also applied to the base of the transistor gate 48–400 thus rendering this transistor gate non-conducting and preventing the conditioning of the gates 48–11 from conducting in response to the positive potential received from the delay device or network 48–20. As a result, none of the flip-flops 42–357 through 42–361 are actuated to their "1" state to initiate timing. After the delay interval of the delay device 48–15 positive potential is also transmitted through this network to the set "0" inputs of the flip-flops 48–342 through 48–349 thus restoring all of these flip-flops to their "0" states. These circuits are ready to be actuated on other calls.

The application of a high negative voltage through the transistor 32–19 to establish connection as described above is also transmitted through the diode 32–33 and the high negative potential applied to the conductor 41–05 as described above is also transmitted through the diode **32–34*d* and then through the condenser 32–43 to the bases of the transistor gates 32–26 through 32–29, inclusive, thus conditioning these gates for conduction. In addition, the application of a high positive voltage to the conductor 17–22 is also transmitted through the transistor 32–28 to the set one input of flip-flop 32–392 thus setting this flip-flop in its "1" state. During the time the line 1–22 is next scanned the transistor gates 32–396 and 32–399 again become conducting and set the flip-flop 11–15 in detector 1–51 in its "1" state which causes circles to be written in the lower or ringing spots associated with the line 1–22. In addition, positive voltage is transmitted through the delay device or network 32–37A after flip-flop 11–15 is actuated and through transistor gate 32–44 to the set "0" input of the flip-flop 32–392** thus restoring this flip-flop to its "0" state.

During the time ringing current is thus applied to the party line the ringing current for the called party and ringing current for the calling party are both applied to the subscriber's line. If the subscriber's stations are arranged for full selective ringing then the calling party's line rings on his type of ringing and the called party's station rings on his type of ringing. If the various stations on the party line are arranged for code ringing then the codes representing both the called and calling party's stations are transmitted so that both codes are received by the calling devices at each of the subscriber's stations on the line.

When the called party answers or the calling party abandons by momentarily picking up his instrument again, the subscriber's line is reclosed and this change in signaling condition is detected by the line scanning tubes and related detector and control circuits as described herein. This change is then transmitted through the gate circuits of FIGS. 8, 9, 13 and 14 and the line identification compared with the calling line identification stored in all of the register spaces in the call register tubes as described herein. Since under the assumed conditions no match will be obtained the information is transmitted to the common flip-flops where busy test of the line is made and it is found to be busy. As a result, identification potentials are applied and again cause the flip-flops 48–342, 48–346 and 48–348 to be actuated. In this case, positive potential will also be transmitted through the delay devices 48–19 and 48–17 at this time, instead of through the device 48–20.

Positive pulses of potential from the inputs of delay devices 48–17 and 48–19 are transmitted through the diodes 48–18 and 48–21 to the pulse stretcher 48–01 controlling the base of the transistor gate 48–264 and disabling this transistor gate so that the gates 48–12 are also disabled and unable to conduct current. Positive potential from the delay device 48–17 is also applied to the base of the transistor gate 48–265 and disables this gate so potential from delay device 48–19 does not condition the gates 48–10 for conduction. Consequently, these gates remain inactive and do not transmit positive voltages to set the flip-flops 43–371 through 43–375, in their "1" states. Thus the timing spots in the trunk time out tube are not affected at this time.

Positive voltage from the delay device 48–17 is also applied to the gates 48–13 thus conditioning these gates for transmission. As a result, positive voltage from the "1" output of the flip-flop 48–346 and positive voltage from the "1" output of the flip-flop 48–348 transmitted through the upper and lower of these gates are applied to the translator in the upper left-hand portion of FIG. 38. Positive voltage from the "1" output of flip-flop 48–346 is transmitted over the conductor 48–29 and then through the diode 38–27 to the No. 1 tens input of the trunk disconnect translator 37–10 and through diodes 38–26 and 38–25 to the No. 1 and No. 8 inputs of the units trunk disconnect translator 37–11, causing the top and the bottom flip-flops of this translator to assume the "1" condition and thus register the digit 9 in binary form. In addition, positive potential is transmitted through the diode 38–28, condenser 32–39 and amplifier 32–40 to the base of the transistor gate 32–31, turning on this transistor and applying a high negative disconnect voltage to the trunk disconnect translating elements of the translators 37–10 and 37–11. As a result, high negative voltage is applied to the lower terminal of condenser 41–73 through the diodes 41–74 and 41–75. This high negative voltage is transmitted through the condenser 41–73 during the charging of this condenser. This negative voltage produces no effects other than to charge this condenser. Upon the termination of this pulse after the condenser 32–39 becomes substantially fully charged the condenser 41–73 discharges and applies a positive disconnect voltage to the conductor 41–03 which voltage is transmitted through the network winding of the repeat coil of the ringing trunk 3–13. This voltage is of sufficient magnitude and duration to cause the crosspoints in the network employed to establish connection in the ringing trunk 3–13 to the subscriber's line 1–22 to abruptly change from a low impedance condition to a high impedance condition thus effectively disconnecting the trunk 3–13.

Thereafter positive potential from the diode 38–28 is transmitted through the delay device or network 38–29 to the set "0" inputs of the flip-flops of the trunk disconnect translators 37–10 and 37–11 thus setting these flip-flops to "0." At a slightly later interval of time, positive potential from the "1" output of the flip-flop 48–348, transmitted through the lower gate 48–13, reaches the output of delay device or network 38–42, then passes through diode 38–43 to the No. 2 tens conductor of the trunk disconnect translator 37–10 and through the diode 38–44 to the No. 4 units input conductor of the trunk disconnect units translator 37–11. These voltages are transmitted to the set "1" input of the corresponding flip-flops of the trunk disconnect translators and set these flip-flops in accordance with the identity (number 24) of the 800-cycle ringing trunk 3–15. In addition, positive potential is transmitted through the diode 38–45 to the condenser 32–39 thus applying another pulse of high positive voltage to the base of the transistor gate 32–31 through the amplifier 32–40. As a result, an additional high negative voltage is transmitted to and through the trunk disconnect transistors 37–10 and 37–11 to the lower terminal of condenser 41–79 thus charging the lower terminal of this condenser to a high negative value.

Termination of this positive pulse of condenser 41–79 discharges and transmits a high positive voltage through the diode 41–80 to the network winding of the repeat coil of the 800-cycle ringing trunk, thus causing a disconnection of this trunk from the subscriber's line 1–22 in a manner similar to that described herein. In addition, a pulse from the diode 38–45 is transmitted through the delay device or network 38–29 to the set "0" inputs of the flip-flops of the trunk disconnect translators 37–10 and 37–11 thus restoring these circuits to their normal or idle conditions.

Thereafter, the subscriber's station 22 may communicate with the subscriber at station 17.

Upon the termination of conversations between these two subscribers they will hang up. The last subscriber to hang up will cause the line circuit to change from a closed circuit condition to an open circuit condition. This change is recognized and sets the trunk timing tube into operation as described herein. When the line remains open for an interval of time between two and three-tenths of a second, the connection between the line and the talking trunks 3–11, or 3–12 as the case may be, is interrupted in the manner described hereinbefore.

It is to be understood that the above-described arrangements are illustrative of the application of the principles of the invention. Numerous other arrangements may be devised by those skilled in the art without departing from the spirit and scope of the invention.

What is claimed is:

1. In a telephone switching system, in combination, a plurality of subscribers' lines, a source of electrical energy for energizing said subscribers' lines, a phototransistor individual to each of said subscribers' lines interconnected with the respective subscribers' lines and said source of electrical energy, a pair of cathode ray beam electron discharge tubes each having a phosphor at one end thereof, means for supporting said phototransistors between said ends of said tubes, and means for simultaneously directing the beams within said tubes to energize a small section of the respective phosphors adjacent the same phototransistor.

2. In a telephone switching system, scanning means comprising in combination a plurality of circuits to be scanned, a phototransistor individual to and individually connected to each of said circuits to be scanned, a plurality of cathode ray beam electron discharge tubes each having a phosphor at one end thereof, means for supporting said phototransistors between said phosphors to be illuminated thereby, means for substantially simultaneously directing the beams within a plurality of said tubes to portions of the respective phosphors adjacent an individual one of said phototransistors whereby said phototransistors are substantially simultaneously illuminated from a plurality of said phosphors.

3. A telephone switching system comprising, in combination, a plurality of subscribers' lines, means for repeatedly scanning said subscribers' lines comprising in combination a phototransistor individual to and individually interconnected with each of said subscribers' lines, a plurality of cathode ray beam electron discharge tubes each having a phosphor upon one end thereof, means for supporting a plurality of said phototransistors between the phosphors of a plurality of said tubes, means for simultaneously directing the beams of said tubes upon the phosphors adjacent the individual one of said phototransistors for substantially simultaneously illuminating said individual transistors, means for directing said beams towards other portions at the ends of said tubes for controlling electrostatic charges on said other portions of said tubes under control of current flowing through said individual ones of said phototransistors.

4. In a telephone switching system, a plurality of circuits to be repeatedly scanned, a phototransistor individual to and individually interconnected with each of said circuits, a cathode ray beam electron discharge tube having a phosphor at the end thereof, means for supporting said phototransistors adjacent said phosphor, means for directing said beam upon portions of said phosphor adjacent said phototransistors, other means for directing said beam towards other portions of said phosphor for controlling electrostatic charges on said other portions of said phosphor under control of current flowing through individual ones of said phototransistors and means for deriving signals from said tube jointly under control of current flowing through individual ones of said transistors and the electrostatic charges on said other portions of said tubes controlled by the current flowing through the corresponding individual ones of said phototransistors.

5. A telephone switching system comprising in combination a plurality of subscribers' lines, means for successively scanning said subscribers' lines including a phototransistor individual to and interconnected with each of said subscribers' lines, a cathode ray beam electron discharge tube for individually illuminating each of said phototransistors, a storage portion of said tube individually assigned to each of said transistors, means for controlling electrostatic charge stored upon said portion under control of current flowing through said transistor, means for comparing the current flowing through said transistor during the time said transistor is illuminated with the electrostatic charge controlled by the current flowing through said same transistor the previous time said transistor was illuminated.

6. A telephone switching system comprising in combination a plurality of subscribers' lines, means for repeatedly scanning said subscribers' lines, cathode ray beam storage tube having a plurality of elemental storage areas, means controlled by said scanning means for storing in each of a plurality of said storage areas electrostatic charges representing the electrical condition of respective ones of said subscribers' lines, and means jointly controlled by said scanning means and said storage means for indicating changes in the electrical condition of each of said lines.

7. In a telephone switching system a combined scanning and storage cathode ray beam tube comprising a phosphor and a plurality of phototransistors located adjacent said phosphor, a plurality of circuits to be scanned, means for individually interconnecting each of said transistors with one of said circuits, means for directing a beam of electrons upon said phosphor adjacent individual ones of said phototransistors, other means for directing said beam towards other portions in said phosphor for controlling electrostatic charges on said other portions, and means for changing the intensity of said beam when it is directed to said other portions of said phosphor.

8. In a telephone switching system in combination a multistage switching network including a plurality of input terminals and means for selectively establishing electrical communication paths through said network between selected ones of said input terminals, an electrical transmission circuit individual to and individually interconnected with a plurality of said input terminals, a source of calling signals, and means for concurrently and selectively establishing one path through said network between two of said transmission paths and another path through said network between one of said paths and said source of calling signals.

9. In a telephone switching system in combination a multistage switching network comprising a plurality of input terminals and means for selectively establishing electrical communication paths through said network to a selected one of said terminals, a source of ringing current interconnected with one of said terminals, means for establishing a communication path through said network to said selected one of said terminals, and other means for concurrently establishing another transmission path from said source of ringing current through said network to said selected one of said terminals.

10. In a telephone switching system in combination a multistage switching network comprising a plurality of input terminals and means for selectively establishing electrical communication paths through said network to a selected one of said terminals, a source of ringing current interconnected with one of said terminals, means for establishing a communication path through said network to said selected one of said terminals, other means for concurrently establishing a ringing path from said source of ringing current through said network to said selected one of said terminals, and means for interrupting said ringing path between said selected terminal and said source of ringing current while maintaining said transmission path to said selected terminal.

11. In a telephone switching system in combination a multistage switching network comprising a plurality of input terminals and means for selectively establishing electrical communication paths through said network to a selected one of said terminals, a source of ringing current interconnected with one of said terminals, means for establishing a communication path through said network to said selected one of said terminals, other means for concurrently establishing a transmission path from said source of ringing current through said network to said selected one of said terminals, a telephone transmission path interconnected with said selected one terminal, and means responsive to an answer signal received over said transmission path for interrupting said path between said source of ringing current and said selected terminal.

12. In a telephone switching system in combination a multistage switching network comprising a plurality of input terminals and means for selectively establishing electrical communication paths through said network to a selected one of said terminals, a source of ringing current interconnected with one of said terminals, means for establishing a communication path through said network to said selected one of said terminals, other means for concurrently establishing a transmission path from said source of ringing current through said network to said selected one of said terminals, a telephone transmission path interconnected with said selected terminal, a means responsive to an answer signal received over said path for applying a predetermined electrical condition to said terminal for identifying said interconnected source of ringing current, means for applying a disconnect potential to said terminal to which said source of ringing is connected for interrupting the transmission path from said source of ringing current to said selected terminal and other means for maintaining the transmission path through said network to said selected terminal.

13. In a telephone switching system a plurality of telephone lines, a plurality of talking trunk circuits, a multistage switching network comprising a plurality of input terminals and means responsive to predetermined electrical conditions applied to selected ones of said terminals for establishing electrical transmission paths between said selected terminals, interconnections between said lines and individual ones of said terminals, other interconnections between said trunks and other ones of said input terminals, means for applying a predetermined electrical condition to a terminal interconnected with the line, other means for successively applying a predetermined electrical signal to a plurality of terminals interconnected with trunks for establishing a transmission path from said line to an idle one of said trunks, means for applying an identifying potential to said line terminal and identifying the interconnected trunk, means for thereafter applying predetermined electrical conditions to another line terminal and to a terminal of said identified trunk for establishing a transmission path from said other line terminal to said identified trunk whereby a communication path is established between said line terminals.

14. A telephone switching system comprising in combination a plurality of subscribers' lines, a source of electrical energy for energizing said subscribers' lines, a phototransistor individual to each of said subscribers' lines interconnected with the respective subscribers' lines and said source of energy, a cathode ray beam electron discharge tube, means for directing said beam upon phosphor at the end of said tube, means for supporting said phototransistors adjacent the end of said tube whereby said phototransistors are illuminated by the light from said phosphor when said beam impinges thereupon, and means for directing said beam towards other portions of said end of said tube for controlling electrostatic charges on said other portions of said tube under control of current flowing through the individual ones of said phototransistors.

15. A telephone switching system comprising in combination a plurality of subscribers' lines, a phototransistor individual to each of said subscribers' lines, a source of electrical energy interconnected with said phototransistors and said subscribers' lines, a cathode ray beam electron discharge tube including beam forming and beam deflecting elements and a phosphor at the end of said tube, means for supporting said phototransistors external to but adjacent the end of said tube whereby said phototransistors are illuminated by the light from said phosphor when said beam impinges thereupon adjacent said respective phototransistors, means for directing said beam towards other portions at the end of said tube, each other portion being adjacent one of the portions employed to illuminate said phototransistors, means for storing electrostatic charges on said other portions under control of current flowing through the respective phototransistors when illuminated by the beam impinging upon the phosphor adjacent the respective phototransistor.

16. A telephone switching system comprising in combination a plurality of subscribers' lines, a source of electrical energy for energizing said subscribers' lines, a phototransistor individual to each of said subscribers' lines and each interconnected with said respective subscribers' lines and said source of energy, a cathode ray beam electron discharge tube including a phosphor at the end thereof, means for directing a beam of electrons upon said phosphor, means for supporting said phototransistors adjacent the end of said tube whereby said phototransistors are illuminated by light from said phosphor when said beam impinges thereupon adjacent said phototransistor, means for applying a calling signal to said subscriber's line, means for directing said beam to other portions of said phosphor for controlling the charge thereupon under control of the calling signal applied to said subscriber's line, and means for directing said beam to said other portions between times when said beam is directed to portions of said phosphor illuminating said phototransistors.

17. A telephone switching system comprising in combination a plurality of subscribers' lines, a source of electrical energy for energizing said subscribers' lines, a phototransistor individual to each of said subscribers' lines and each interconnected with the respective ones of said subscribers' lines and said source of energy, a cathode ray beam electron discharge device including a phosphor at the end thereof, means for directing the beam of electrons at said phosphor, means for supporting said phototransistors adjacent the end of said tube whereby said phototransistors are illuminated when said beam impinges on said phosphor adjacent said phototransistors, apparatus for directing said beam to the areas adjacent said phototransistors one after another in succession, storage means for storing signals under control of current flowing through said phototransistors when they are illuminated by the beam impinging on said phosphor adjacent the respective phototransistors.

18. A communication switching system comprising in combination a plurality of subscribers' lines, a source of electrical energy for energizing said subscribers' lines, a phototransistor individual to each of said subscribers' lines and each interconnected with the respective subscriber's line and said source of energy, a cathode ray beam electron discharge tube including the phosphor at the end thereof, means for directing a beam of electrons at said phosphor, means for supporting said phototransistors adjacent said phosphor whereby said phototransistors are illuminated when said beam impinges upon a portion of said phosphor adjacent each of said phototransistors, means for directing said beam to said portions of the phosphor one after another and in succession, means for directing said beam to other portions of said phosphor for controlling electrical charges thereupon under control of current flowing through said phototransistors when they are illuminated, and means for directing said beam to at least one other of said portions of the phosphor between the times said beam is directed to portions of said phosphor adjacent said phototransistors.

19. A telephone switching system comprising in combination a plurality of subscribers' lines for transmitting signaling changes, an electron discharge storage tube having a plurality of elemental storage areas comprising at least one call register space, means responsive to initiation of a call over one of said subscribers' lines for entering the identity of the calling line in certain of said areas of one of said register spaces and means for entering in other of said areas in said one register space additional signaling changes of said subscriber's line.

20. A telephone switching system comprising in combination a plurality of subscribers' lines, a source of electrical energy for energizing said subscribers' lines, scanning means for periodically determining the electrical signaling condition in each of said subscribers' lines, a cathode ray beam storage tube, a phosphor on the end of said tube means for directing an electronic beam at said phosphor, means for assigning portions of the area of said phosphor to different call register spaces, means operating in combination with said scanning means for detecting changes in signaling conditions on a subscriber's line, temporary storage means for temporarily storing the identity of the calling lines and the change in signaling conditions received therefrom, commutating means for conveying each signaling condition on a given call from said temporary storage means to said register tube and means for further directing the beam of said tube for storing indicia of each of said signaling changes in the register space having stored therein the identity of the calling line.

21. A telephone switching system comprising in combination a plurality of subscribers' lines, a source of electrical energy for energizing said subscribers' lines, means for detecting signaling changes on said lines, a first plurality of groups of temporary storage means, a second plurality of temporary storage means, means for alternately employing said storage means to record the identity of the calling subscribers' lines and the signaling changes received therefrom, and other means operative after indicia have been recorded in one of said pluralities of said storage devices for utilizing the indicia previously recorded in said plurality of storage devices while other information is being recorded in the other plurality of said storage means.

22. A telephone switching system comprising in combination a plurality of subscribers' lines, a cathode ray tube for storing a plurality of different discrete and discernible electrostatic charges a plurality of which comprises a call register space, means responsive to the initiation of a call over one of said subscribers' lines for storing charges in said call register space representing the identity of the calling line, and means for storing additional electrostatic charges in said register space in response to each additional signaling change of said calling subscriber's line.

23. A telephone switching system comprising in combination a plurality of subscribers' lines and cathode ray tube for storing a plurality of different discrete and discernible electrostatic charges a plurality of which comprises a call register space, means responsive to the initiation of a call over one of said subscribers' lines for storing charges in said call register space representing the identity of the calling line, means for transmitting dial pulses over said subscriber's line, and means for changing the electrostatic charges in said call register space in response to each received dial pulse.

24. A telephone switching system comprising in combination a plurality of subscribers' lines and cathode ray tube for storing a plurality of different discrete and discernible electrostatic charges a plurality of which comprise a call register space, means responsive to the initiation of a call over one of said subscribers' lines for storing charges in said call register space representing the identity of the calling line, means responsive to each change in signaling condition of said subscriber's line, and means for changing the charges stored in said call register space in response to each change in signaling condition received from said subscriber's line.

25. A telephone switching system comprising in combination a plurality of subscribers' lines and cathode ray tube for storing a plurality of different discrete and discernible electrostatic charges a plurality of which comprise a call register space, means responsive to the initiation of a call over one of said subscribers' lines for storing charges in said call register space representing the identity of the calling line, means for transmitting dialing signals over said subscriber's line, and means for changing the electrostatic charges stored in said register space in response to each received dial signal.

26. A telephone switching system comprising in combination a plurality of subscribers' lines and cathode ray tube for storing a plurality of different discrete and discernible electrostatic charges a plurality of which comprise a call register space, means responsive to the initiation of a call over one of said subscribers' lines for storing charges in said call register space representing the identity of the calling line, means for transmitting dialing signals over said subscriber's line, means for changing the electrostatic charges stored in said register space in response to each received dial signal, timing means for recognizing the end of a dialed digit, means responsive to said timing means for transferring the electrostatic charges representing said digit in said call register space.

27. A telephone switching system comprising in combination a plurality of subscribers' lines, scanning means for repeatedly scanning said lines, a cathode ray tube for storing a plurality of separate discrete and discernible electrostatic charges a plurality of which comprise a call register space, means responsive to the initiation of a call over one of said subscribers' lines for entering charges in said register space uniquely representing the identity of the calling subscriber's line, means responsive to a change in signaling conditions of said subscriber's line when scanned by said scanning means for comparing signals representing the identity of said subscriber's line with the charges stored in said register space representing the identity of the calling line.

28. A telephone switching system comprising in combination a plurality of subscribers' lines, scanning means for repeatedly testing the signaling condition of said lines, a cathode ray storage tube for storing a plurality of different discrete and discernible electrostatic charges, means responsive to said scanner for controlling one of said discrete charges in accordance with the signal condition of said line each time said line is scanned.

29. A telephone switching system comprising in combination a plurality of subscribers' lines, scanning means for repeatedly testing the signaling condition of said lines, a cathode ray storage tube for storing a plurality of different discrete and discernible electrostatic charges a portion of which is arranged in a plurality of groups each group comprising a call register space, means responsive to said scanner for controlling one of said discrete charges in accordance with the signaling condition of said line each time said line is scanned, and apparatus responsive to the initiation of a call over one of said subscribers' lines for storing electrostatic charges in said call register space representing the identity of the calling line.

30. A telephone switching system comprising in combination a plurality of subscribers' lines, scanning means for repeatedly testing the signaling condition of said lines, a cathode ray storage tube for storing a plurality of different discrete and discernible electrostatic charges a portion of which is arranged in a plurality of groups each group comprising a call register space, means responsive to said scanner for controlling one of said discrete charges in accordance with the signal condition of said line each time said line is scanned, means responsive to each succeeding change in signaling condition received from said line for comparing signals representing the identity of said line with electrostatic charges stored in all of said groups of stored charges representing calling lines.

31. In a telephone switching system comprising in combination a plurality of subscribers' lines, a scanner for repeatedly scanning each of said subscribers' lines, a plurality of telephone transmission paths, an electronic switching network for selectively establishing electrical transmission paths from individual ones of said subscribers' lines to individual ones of said trunks, apparatus connected to said scanner responsive to disconnect signals received over one of said lines for applying a distinctive electrical condition to said line, means for recognizing said distinctive electrical signal after transmission through said network for identifying the transmission path interconnected with said line, means for applying a disconnect potential to said transmission path.

32. A telephone switching system comprising in combination a plurality of telephone transmission lines, an electronic switching network for selectively interconnecting said lines over transmission paths through said network, means for receiving a disconnect signal from one of said lines, apparatus responsive to a received disconnect signal for transmitting a distinctive signaling condition to said line and through said network, means for recognizing said distinctive signal after transmission through said network, other means for applying the disconnect signal to the path over which said distinctive signal is recognized.

33. In a telephone switching system in combination a plurality of telephone transmission lines, an electronic switching network for selectively establishing an electrical transmission path between individual ones of said lines through said network, means for recognizing a disconnect signal received from one of said lines, apparatus for applying an identifying signal to said one line, means responsive to said identifying signal after transmission through said network to identify another of said lines, and means for applying a disconnect electrical condition to said identified line.

34. In a telephone switching system, an electronic switching network having a first plurality of terminals and a second plurality of terminals, transmission paths interconnected with said first and second plurality of terminals, means responsive to a disconnect signal received over one of said paths connected to one of said first plurality of terminals for applying an identifying signal to the path over which said disconnect signal has been received, means responsive to said identifying signal for identifying a terminal of said second plurality of terminals and means for applying a disconnect signal to said identified terminal.

35. In a telephone switching system in combination a plurality of telephone lines, a plurality of trunk circuits, a switching network for selectively interconnecting individual ones of said lines with individual ones of said trunks, means for establishing communication paths through said network between individual ones of said lines and individual ones of said trunks, means responsive to a change in signaling condition of said lines from closed circuit to open circuit for applying an identifying signal to said line, means responsive to said identifying signal for identifying the trunk interconnected with said line, timing means responsive to identification of said trunk for determining a predetermined interval of time, and means responsive to said timer for applying a disconnect potential to said identified trunk.

36. In a telephone switching system in combination a multistage switching network having a plurality of terminals for selectively establishing individual communication paths between pairs of said terminals, means for applying busy indicating signals to one of said terminals, means for interconnecting telephone lines to other of said terminals, apparatus responsive to receive signals for applying electrical potential conditions to pairs of said terminals for establishing a communication path through said network, means for applying a change in voltage to a selected terminal and means to detect a change in current to determine whether or not said selected terminal is busy, and means responsive to a busy indication to interconnect said source of busy indicating signals to one of said terminals.

37. In a telephone switching system a plurality of subscribers' lines, means for repeatedly scanning said lines to determine electrical conditions thereof, a cathode ray beam electronic discharge tube for controlling and determining the character of stored charges in said tube, means controlled by calling signals received over one of said lines for storing charges in one of said tubes, timing means controlled by electrostatic charges stored in said tube, and other means for establishing a connection from one of said terminals to said busy circuit when insufficient signals are received from said line in a predetermined time interval.

38. In a telephone switching system in combination a switching network including a plurality of input terminals and means for selectively establishing paths between selected ones of said terminals, means for tracing paths through said network comprising means for connecting a predetermined identifying potential to one of said terminals, detecting means for detecting said potential after transmission over a path through said network, and means operative upon failure of said detecting means to detect said potential to apply a different identifying potential to said terminal to identify the path through said network from said terminal.

39. In a telephone switching system in combination, a switching network, control means therefor, a plurality of transmission circuits interconnected with said network, scanning means interconnected with said transmission circuits; synchronously operated program means for cyclically synchronizing the operations of said network and said control means, and means responsive to the operation of said scanning means for prolonging the cycle of said synchronously operating program means.

40. An electronic telephone switching system comprising in combination; an electronic switching network; control means for said switching network; a plurality of telephone lines interconnected therewith; scanning means for repeatedly scanning the electrical condition of each of said lines; cyclically operating timing means for coordinating the operation of said scanning means, said network, and said control means; and means responsive to the electrical conditions of said lines for changing the length of cycle of said cyclically operating timing means.

41. An electronic telephone switching system comprising in combination a plurality of telephone lines; a switching network interconnected with said lines for establishing communication paths between said lines; control means for said network including cyclically operable scanning means and cyclically operable register means, a clock circuit for timing the cycles of operations of said cyclically operable scanning means and said cyclically operable register means; and means responsive to the traffic through said switching network for changing the length of cycle of said clocking means.

42. An electronic telephone switching system comprising in combination electronic switching means, a plurality of telephone lines interconnected with said switching means, scanning apparatus for repeatedly scanning each of said telephone lines, means for registering calls, a cyclically operable clock circuit for cyclically controlling said scanning apparatus, and means for initiating the establishing of paths between said lines through said network during one portion of said cycles of said clock means, and initiating operation of said register means during another portion of said cycles of said clock means.

43. An electronic telephone switching system comprising in combination an electronic switching means, a plurality of telephone lines interconnected with said switching means, scanning apparatus for repeatedly scanning each of said telephone lines, a cyclically operable clock circuit for cyclically controlling said scanning apparatus, means for establishing paths between said lines through said network during one portion of each of said cycles of said clock means, means for interrupting paths through said network during another portion of said cycles of said clock means, and means responsive to the calls received over said lines for changing the length of cycles of operation of said clock means.

44. In a telephone switching system in combination, a plurality of telephone lines, switching means for establishing paths between said lines, a cathode ray beam storage tube having a plurality of storage spots therein, two of which are assigned to each of said telephone lines and means for storing electrostatic charges in said spots representing the signaling conditions of the respective lines to which said spots are assigned.

45. A telephone switching system comprising in combination, a plurality of communication circuits, means for selectively establishing paths between said communication circuits, an electronic cathode ray beam tube for storing a plurality of discrete electrostatic charges therein, and means for controlling two of said discrete charges in accordance with the conditions of one of said communication circuits.

46. An electronic telephone switching system comprising in combination, a plurality of communication circuits, an electronic switching network for selectively establishing electrical transmission paths between individual ones of said communication circuits, a cathode ray storage tube comprising means for storing a plurality of discrete electrostatic charges therein, means for storing electrical indicia in a plurality of said spots individual to and under control of each of said communication circuits.

47. An electronic telephone switching system comprising in combination, a plurality of telephone lines, electronic telephone switching network for selectively establishing communication paths between individual ones of said lines, a cathode ray storage tube for storing a plurality of electrostatic charges therein, means for controlling one of said charges solely by the signaling condition of a respective one of said lines.

48. An electronic telephone switching system comprising in combination, a plurality of telephone lines, electronic telephone switching network for selectively establishing communication paths between individual ones of said lines, a cathode ray storage tube for storing a plurality of electrostatic charges therein, means for controlling one of said electrostatic charges under control of ringing current applied to one of said lines.

49. In an electronic telephone switching system in combination, a party line having a plurality of subscribers' stations connected thereto, a switching center connected to said line, means at said switching center for responding to calls from one party on said line intended for another party on said line, means for simultaneously interconnecting through said switching center two sources of ringing current to said line, one for calling a called station and the other for calling the calling station, and means for establishing an additional connection from said line to a talking trunk.

50. In an electronic telephone switching system in combination, a party line having a plurality of subscriber's stations connected thereto, a switching center connected to said line, means at said switching center for responding to calls from one party on said line intended for another party on said line, means for simultaneously interconnecting through said switching center two sources of ringing current to said line, one for calling a called station and the other for calling the calling station, means for establishing an additional connection from said line to a talking trunk, and means for disconnecting both of said sources of ringing current when any party on said line answers.

51. An electronic switching system, a subscriber's line, a plurality of subscribers' stations connected therewith, revertive call means for responding to calls from one station on said line directed to another station on said same line comprising means for translating all station codes on said line to a station code representing the line and then comparing the line code with the translated station code, and means responsive to said codes for concurrently establishing paths from said line to a plurality of sources of ringing current, one for the calling station and one for each called station.

52. In an electronic switching system, a plurality of telephone lines, a plurality of subscribers' stations, a plurality of which are individually connected to said telephone lines, another plurality of said stations being connected to each of a plurality of said lines comprising party lines, electronic switching means interconnected with said lines, control means responsive to a call from one of said individual lines to one of said party lines for selectively establishing a telephone transmission path through said switching means from said individual line to said party line, and a plurality of different sources of ringing current means for concurrently and selectively connecting one of said sources of ringing current to said party line in accordance with the called station thereon.

53. In an electronic telephone switching system having subscribers' lines and storage apparatus, the method of registering calls for establishing paths through the switching system which comprises the steps of (1) scanning the subscribers' lines for information representing changes in signaling conditions, (2) comparing the present signaling condition of a line with the previously stored signaling condition of the line, and (3) upon detection of a change in signaling condition, entering in a storage space in the storage apparatus for registering calls a first coded identifying information representing the calling line together with a second coded information distinct from said first coded identifying information and representing the present signaling condition.

54. In an electronic telephone switching system the method of claim 53 further comprising the step of (4) recording information representing additional signaling changes of the line in said storage space.

55. In a telephone switching system having lines and storage apparatus, the method of establishing a path through the switching system which comprises the steps of (1) storing coded identifying information representing lines from which dial pulses are being received, (2) testing a called line for a connection through the switching network, and (3) comparing coded information representing the called line with said stored information representing lines from which dial pulses are being received, said stored information being stored in call register spaces in the storage apparatus.

56. In a telephone switching system, the method in accordance with claim 55, further comprising the steps of (4) marking the called line for connection, (5) concurrently marking talking and ringing trunks for connection and (6) then establishing a connection between said called line and said talking trunk and between said called line and said ringing trunk.

57. In a telephone switching system, the method in accordance with claim 56, further comprising the steps of (7) identifying the interconnected talking trunk and (8)

establishing a connection between the identified talking trunk and the calling line.

58. In an electronic telephone switching system a plurality of subscribers' lines, a switching network interconnected with said lines for establishing communication paths from said lines through said network, busy test means for applying busy test signals to said lines for causing an increased current to flow over said paths through the network when such paths exist from such lines through the network.

59. In an electronic telephone switching system call register means comprising an electrostatic storage cathode ray beam electron tube having a plurality of call register spaces, means for individually directing changes in signaling conditions from individual ones of said lines to idle call register spaces including means for storing indicia in one of said register spaces representing the condition of said line on each scanning thereof.

60. A telephone switching system comprising in combination a plurality of subscriber's lines for transmitting signals, a switching network for interconnecting said lines, control means for controlling said switching network including a cathode-ray electron discharge storage tube for storing a plurality of discrete charges, means responsive to signals received over one of said lines for storing a plurality of charges in said tube representing said line, means responsive to other signals received over said line for entering other charges in said tube representing a called line, means for reading out said charges representing the calling and called lines, and means for controlling the establishment of a connection through said network between said lines under control of said charges representing the calling and called line.

61. A telephone switching system comprising in combination a plurality of telephone subscriber's lines, means for transmitting calling signals over said subscriber's lines, a switching network interconnected with said lines for selectively establishing transmission paths through said network between selected ones of said lines, control means interconnected with said network comprising a cathode-ray storage tube having a plurality of discrete elemental storage areas, means responsive to signals received over one of said lines for entering electrical charges in a plurality of said storage areas representing the identity of the calling line, means for entering other charges in other of said elemental areas representing a called line, and means controlled by the charges entered in said elemental areas for selectively establishing a transmission path through said network between the lines represented by said charges.

62. A telephone switching system comprising in combination a plurality of subscriber's lines for transmitting calling signals, a switching network for selectively establishing transmission paths between selected ones of said lines, control means for controlling said switching network including a cathode-ray storage tube having a plurality of elemental storage areas, means operating independently of said network for storing charges in predetermined ones of said elemental areas representing a calling line in response to a calling signal received therefrom, other means for entering each subsequent signal received over said line in other of said elemental storage areas, and means responsive to the charges entered in said elemental areas for selectively establishing transmission paths through said network between said lines represented by said stored charges.

63. A telephone switching network comprising a plurality of input and output terminals, control means for said network comprising a cathode-ray storage tube having a plurality of elemental storage areas, means for selectively entering charges in predetermined ones of said elemental areas to uniquely identify terminals of said network, means responsive to said charges stored in said tube to apply a predetermined potential to the terminal of said network identified by said charges, and means responsive to said potential applied to said terminal to establish a path through said network to said terminal.

64. A telephone switching system comprising in combination a switching network including a plurality of input and output terminals, a plurality of negative-resistance switching elements interconnected in said network between said input and output terminals, control means for said network including a cathode-ray storage tube having a plurality of elemental storage areas, means for entering electrostatic charges in predetermined ones of said storage areas to uniquely identify individual ones of said input terminals, means for entering other charges in other of said elemental areas to uniquely identify individual ones of said output terminals, means responsive to charges stored in said elemental areas in said storage tube for applying predetermined electrical voltages to identified input and output terminals, and means responsive to voltages applied to identified ones of said input and said output terminals for selectively establishing a communication path through said negative-resistance elements from an identified input terminal and an identified output terminal.

65. A telephone switching system comprising in combination a plurality of subscriber's lines fc transmitting calling signals, a switching network interconnected with said lines for selectively establishing transmission paths between selected ones of said lines, control means for controlling said switching network including a cathode-ray storage tube having a plurality of elemental storage areas, means operating independently of said network for storing charges in predetermined ones of said elemental areas representing a calling line in response to a calling signal received therefrom, other means for entering charges in response to each subsequent signal received over said line in other of said elemental storage areas, means responsive to charges entered in said elemental areas for applying predetermined voltages to the line terminals represented by said charges, and means responsive to said voltages for selectively establishing transmission paths through said network between said lines represented by said stored charges.

References Cited in the file of this patent

UNITED STATES PATENTS

| | | |
|---|---|---|
| 2,523,365 | Gross | Sept. 26, 1950 |
| 2,585,904 | Busch | Feb. 19, 1952 |
| 2,654,049 | Clark | Sept. 29, 1953 |
| 2,671,824 | Soffel | Mar. 9, 1954 |
| 2,764,634 | Brooks et al. | Sept. 25, 1956 |
| 2,774,071 | Trousdale | Dec. 11, 1956 |